United States Patent
Konda et al.

(10) Patent No.: US 12,373,959 B2
(45) Date of Patent: Jul. 29, 2025

(54) COMPUTING OPTICAL FLOW USING SEMI-GLOBAL MATCHING

(71) Applicant: NVIDIA Corporation, Santa Clara, CA (US)

(72) Inventors: Raju Konda, Hyderabad (IN);
Sampurnananda Mishra, Pune (IN)

(73) Assignee: NVIDIA Corporation, Santa Clara, CA (US)

(*) Notice: Subject to any disclaimer, the term of this patent is extended or adjusted under 35 U.S.C. 154(b) by 539 days.

(21) Appl. No.: 17/678,904

(22) Filed: Feb. 23, 2022

(65) Prior Publication Data

US 2023/0267624 A1     Aug. 24, 2023

(51) Int. Cl.
```
G06T 7/246      (2017.01)
G06T 5/70       (2024.01)
G06T 7/13       (2017.01)
G06T 7/136      (2017.01)
```

(52) U.S. Cl.
CPC ........... *G06T 7/248* (2017.01); *G06T 5/70* (2024.01); *G06T 7/13* (2017.01); *G06T 7/136* (2017.01)

(58) Field of Classification Search
CPC .......... G06T 7/20; G06T 7/223; G06T 7/231; G06T 7/238; G06T 7/248; G06T 5/70; G06T 7/10; G06T 7/13; G06T 7/136
See application file for complete search history.

(56) References Cited

U.S. PATENT DOCUMENTS

| | | | |
|---|---|---|---|
| 2014/0147031 A1* | 5/2014 | Rzeszutek | G06T 7/593 382/154 |
| 2018/0054609 A1* | 2/2018 | Park | H04N 13/271 |
| 2018/0293454 A1* | 10/2018 | Xu | G06V 20/49 |
| 2019/0087971 A1* | 3/2019 | Sano | G06T 7/85 |
| 2020/0082541 A1* | 3/2020 | Jouppi | G06T 7/194 |

OTHER PUBLICATIONS

Xu, Jia, René Ranftl, and Vladlen Koltun. "Accurate Optical Flow via Direct Cost Volume Processing." 2017 IEEE Conference on Computer Vision and Pattern Recognition (CVPR). IEEE, 2017. (Year: 2017).*

Banz, Christian, Holger Blume, and Peter Pirsch. "Real-time semi-global matching disparity estimation on the GPU." 2011 IEEE International Conference on Computer Vision Workshops (ICCV Workshops). IEEE, 2011. (Year: 2011).*

Hu, Han, et al. "Binary adaptive semi-global matching based on image edges." Seventh International Conference on Digital Image Processing (ICDIP 2015). vol. 9631. SPIE, 2015. (Year: 2015).*

Rzeszutek, Richard, Dong Tian, and Anthony Vetro. "Disparity estimation of misaligned images in a scanline optimization framework." 2013 IEEE International Conference on Acoustics, Speech and Signal Processing. IEEE, 2013. (Year: 2013).*

(Continued)

*Primary Examiner* — Geoffrey E Summers
(74) *Attorney, Agent, or Firm* — Davis Wright Tremaine LLP

(57) ABSTRACT

Apparatuses, systems, and techniques to determine optical flow. In at least one embodiment, a set of disparity values is used to determine optical flow between input and reference images. For each of a plurality of image regions of the input image, the set of disparity values may include disparity values for a plurality of directions intersecting the image region.

26 Claims, 73 Drawing Sheets

(56) References Cited

OTHER PUBLICATIONS

Birchfield et al., "Depth Discontinuities by Pixel-to-Pixel Stereo," International Journal of Computer Vision 35(3), 1999, 25 pages.

Hirschmüller, "Accurate and Efficient Stereo Processing by Semi-Global Matching and Mutual Information," IEEE Conference on Computer Vision and Pattern Recognition, Jun. 20-26, 2005, 8 pages.

Hirschmüller, "Stereo Processing by Semi-Global Matching and Mutual Information," IEEE Transactions on Pattern Analysis and Machine Intelligence, Apr. 16, 2007, 14 pages.

IEEE "IEEE Standard for Floating-Point Arithmetic", Microprocessor Standards Committee of the IEEE Computer Society, IEEE Std 754-2008, dated Jun. 12, 2008, 70 pages.

Wikipedia, "IEEE 802.11," Wikipedia the Free Encyclopedia, https://en.wikipedia.org/wiki/IEEE_802.11, most recent edit Sep. 20, 2020 [retrieved Sep. 22, 2020], 15 pages.

* cited by examiner

| PR₁ | PR₂ | PR₃ |
|---|---|---|
| PR₄ | PR₅ | PR₆ |
| PR₇ | PR₈ | PR₉ |

← 710

| P₁ | P₂ | P₃ |
|---|---|---|
| P₄ | P₅ | P₆ |
| P₇ | P₈ | P₉ |

← 210

| 10 | 10 | 10 |
|---|---|---|
| 10 | 3 | 10 |
| 10 | 10 | 10 |

← 706

| 10 | 10 | 10 |
|---|---|---|
| 10 | 4 | 1 |
| 10 | 10 | 10 |

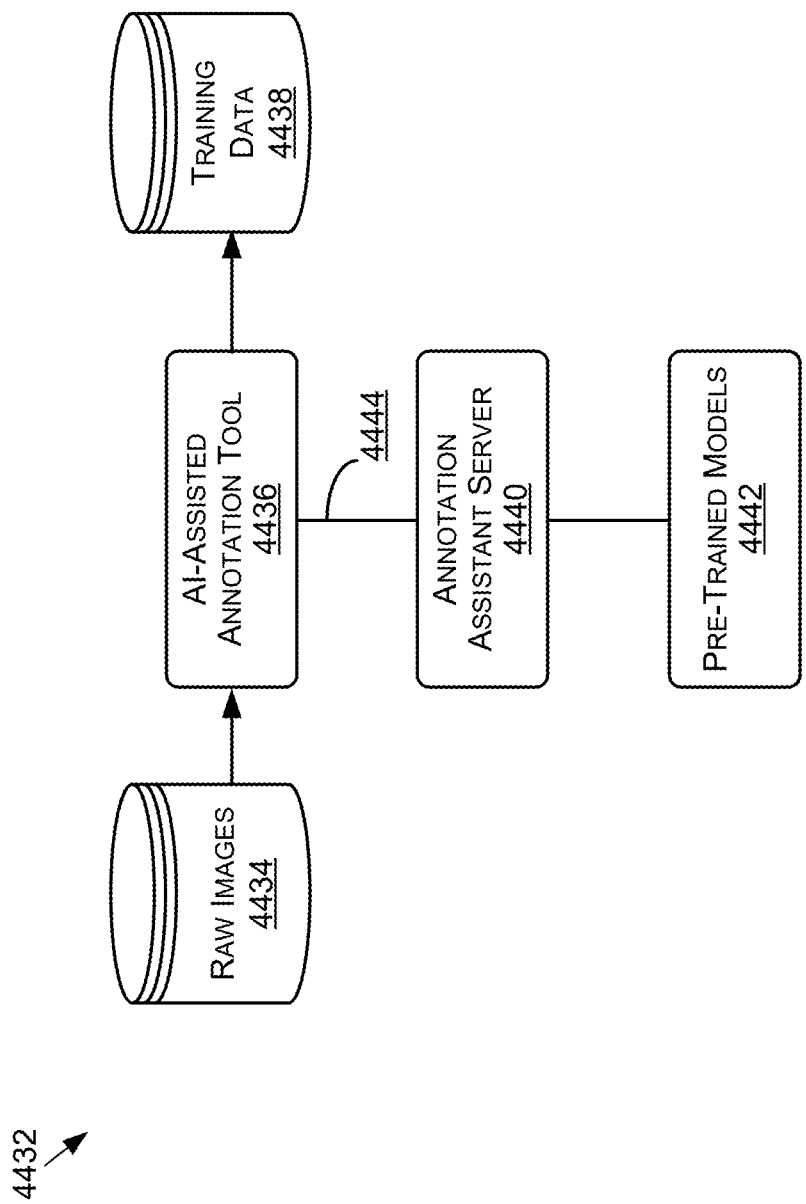

COMPUTING OPTICAL FLOW USING SEMI-GLOBAL MATCHING

TECHNICAL FIELD

At least one embodiment pertains to methods of determining optical flow for at least a pair of images. For example, at least one embodiment, pertains to processors or computing systems that obtain disparity maps used to determine optical flow according to various novel techniques described herein.

BACKGROUND

Optical flow is a measure of apparent motion of subject matter (e.g., objects) occurring from a first image to a second image (e.g., video frames). For example, optical flow may be calculated based the apparent motion of image regions (e.g., pixels) occurring from the first image to the second image. Optical flow may be used in motion estimation, object detection, object tracking, image dominant plane extraction, movement detection, robot navigation, visual odometry, camera motion detection, and video compression.

BRIEF DESCRIPTION OF DRAWINGS

FIG. 7 illustrates a first set of the image regions determined for the reference image, example values of one or more metrics assigned to each of the image regions in the first set, the second set of the image regions determined for the input image, and example values of one or more metrics assigned to each of the image regions in the second set, in accordance with at least one embodiment;

FIG. 44B is an example illustration of a client-server architecture to enhance annotation tools with pre-trained annotation models, in accordance with at least one embodiment;

DETAILED DESCRIPTION

Figure 1:
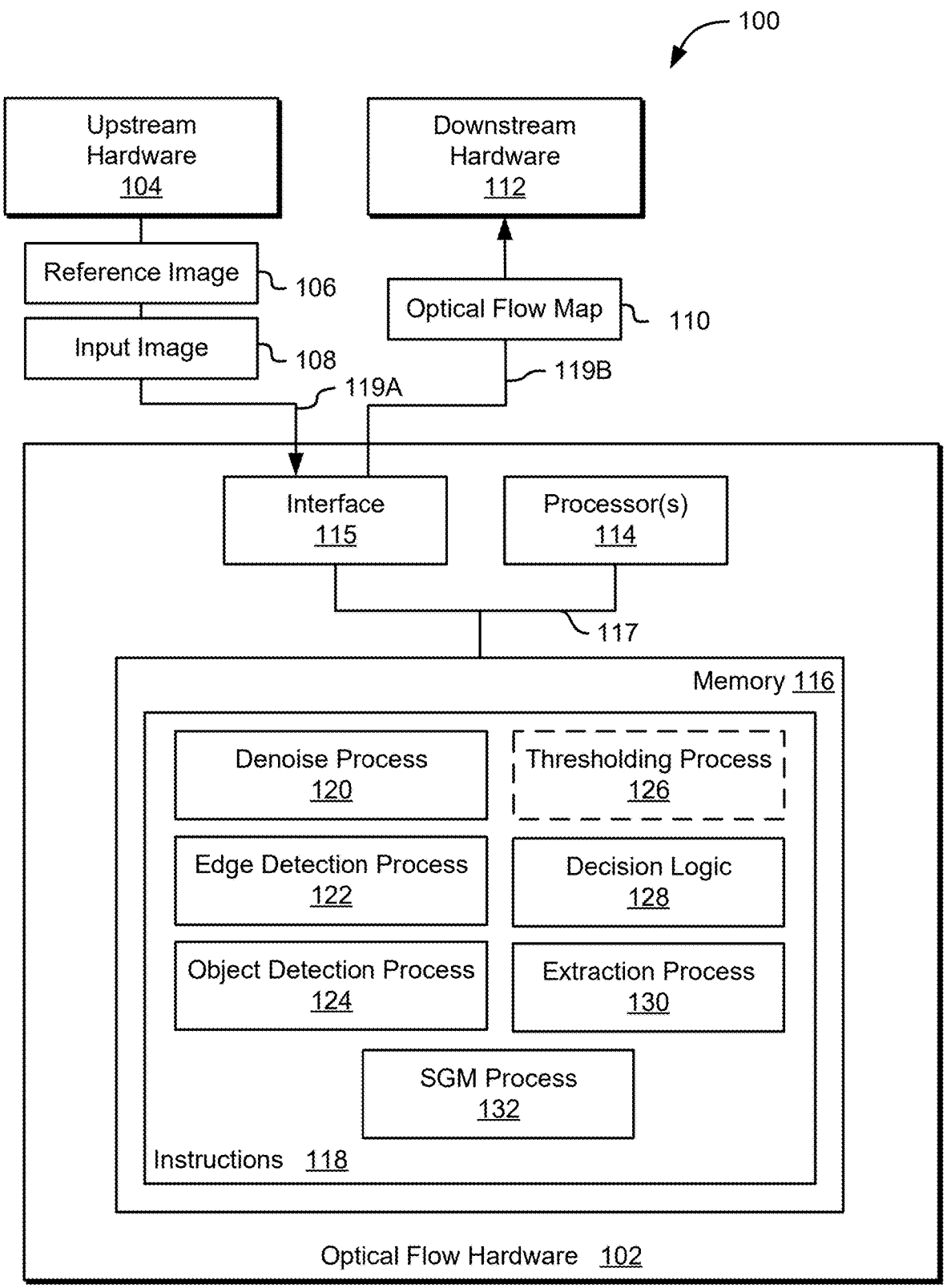
FIG. 1 illustrates an example system that determines optical flow, in accordance with at least one embodiment.

FIG. 1 illustrates an example system 100 that determines optical flow, in accordance with at least one embodiment. The system 100 includes optical flow hardware 102 that may implement a modified Semi-Global Matching ("SGM") method. As described below, the modified SGM method differs significantly from a conventional SGM algorithm described in Hirschmüller, Heiko, *Accurate and Efficient Stereo Processing by Semi-Global Matching and Mutual Information*, IEEE Conference on Computer Vision and Pattern Recognition ("CVPR"), San Diego, CA, USA, (Jun. 20-26, 2005), which is incorporated herein by reference in its entirety.

Referring to FIG. 1, upstream hardware 104 provides a reference image 106 and an input image 108 (e.g., a pair of stereo images, a pair of video frames, a pair of successive images, a pair of images captured at the same time, and the like) to the optical flow hardware 102. The upstream hardware 104 may include at least one data storage device, at least one camera, at least one video camera, a computing device, at least one microcontroller, at least one microprocessor, at least one controller, at least one central processing unit ("CPU"), at least one parallel processing unit (e.g., at least one graphic processing unit ("GPU")), one or more hardware state machines, and/or the like.

The reference and input images 106 and 108 may at least partially depict the same subject matter. For example, the reference and input images 106 and 108 may depict one or more objects at different points in time, from different points of view, or from different camera angles. By way of a non-limiting example, the reference image 106 may depict one or more objects in a first location and the input image 108 may depict at least one of the object(s) in the same first location or a different second location. In such an embodiment, one or more of the object(s) may have moved after the reference image 106 was captured but before the input image 108 was captured. By way of another non-limiting example, the reference and input images 106 and 108 may depict the same scene captured from different viewpoints or from different camera angles.

The optical flow hardware 102 maps image regions in the reference image 106 to corresponding image regions in the input image 108 and outputs a disparity map or an optical flow map 110. This optical flow map 110 shows an amount of location shift (or motion) that occurred for each of at least a portion of the image regions between the reference image 106 and the input image 108. The optical flow hardware 102 may provide the optical flow map 110 to downstream hardware 112.

The optical flow hardware 102 in FIG. 1 has been illustrated as including at least one processor 114, at least one interface 115, memory 116, and one or more buses 117. The interface(s) 115 is/are connected to the upstream and downstream hardware 104 and 112 by connections 119A and 119B, respectively. The connections 119A and 119B may each be implemented using one or more buses, one or more conductors (e.g., at least one wire, at least one signal trace, and/or the like), one or more switches, and/or the like. The interface(s) 115 receive(s) the reference and input images 106 and 108 from the upstream hardware 104 over the connection 119A and provide(s) the reference and input images 106 and 108 to the processor(s) 114 and/or the memory 116 over the bus(es) 117. The interface(s) 115 receive(s) the optical flow map 110 from the processor(s) 114 and/or the memory 116 over the bus(es) 117, and provides the optical flow map 110 to the downstream hardware 112 over the connection 119B.

The optical flow hardware 102 may implement a denoise process 120, an edge detection process 122, an object detection process 124, an optional thresholding process 126, decision logic 128, an extraction process 130, and a SGM process 132. The memory 116 may store processor-executable instructions 118 that, when executed by the processor(s) 114, implement the denoise process 120, the edge detection process 122, the object detection process 124, the optional thresholding process 126, the decision logic 128, the extraction process 130, and/or the SGM process 132. By way of non-limiting examples, the processor(s) 114 may include at least one microcontroller, at least one microprocessor, at least one controller, at least one CPU, at least one parallel processing unit (e.g., at least one GPU), one or more hardware state machines, and/or the like.

The instructions 118 may be incorporated into an optical flow software development kit ("SDK") for use with one or more parallel processing units (e.g., a graphics processing unit ("GPU"), such as a Turing GPU, an Ampere GPU, and the like) capable of computing relative motion of image regions (e.g., pixels) between the reference and input images 106 and 108. The optical flow SDK may be used to implement computer games, medical imaging software, computer animation, virtual reality, augmented reality, video editing, computer vision, and the like. The optical flow hardware 102 may be incorporated into a computer vision system that includes such parallel processing unit(s). The optical flow hardware 102 may be incorporated into autonomous devices (e.g., autonomous vehicles), medical imagining devices, and the like. The optical flow map 110 may be used by the optical flow hardware 102 and/or the downstream hardware 112 to perform intelligent video analytics. By way of a non-limiting example, a device incorporating the optical flow hardware 102 may include the upstream hardware 104 that provides the reference and input images 106 and 108 to the optical flow hardware 102 and/or the downstream hardware 112 that receives the optical flow map 110 from the optical flow hardware 102. A device (e.g., an autonomous device) may use the optical flow map 110 in further processing. For example, the device may use the optical flow map 110 to perform motion estimation, object detection, frame generation (e.g., using deep learning or deep neural networks), frame extrapolation, frame interpolation, object tracking, image dominant plane extraction, movement detection, robot navigation, visual odometry, camera motion detection, image (e.g., video) compression, image (e.g., video) decompression, and the like.

Figure 2:
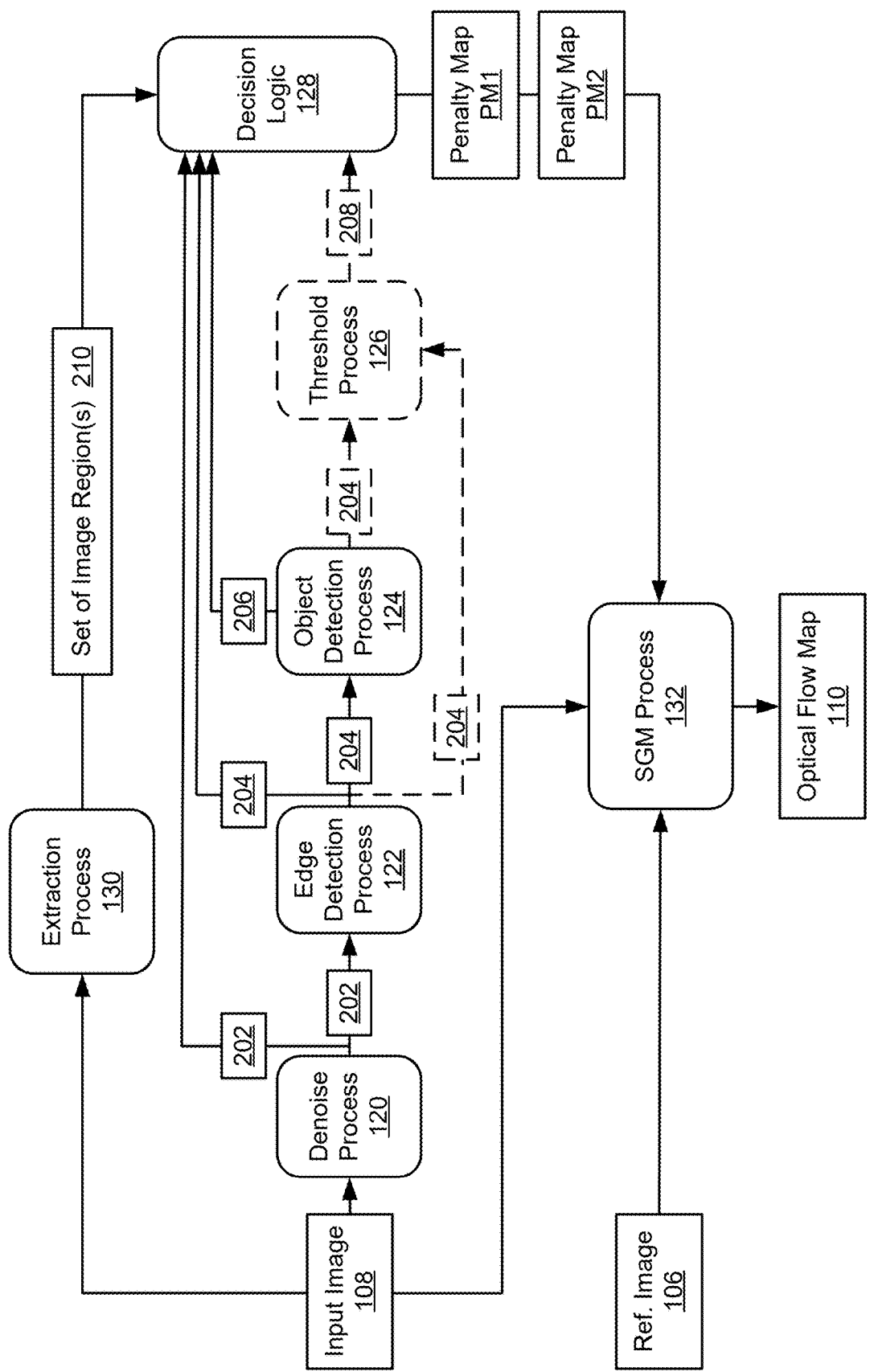
FIG. 2 illustrates a block diagram depicting a method of generating an optical flow map that may be performed by optical flow hardware of the system of FIG. 1, in accordance with at least one embodiment.

FIG. 2 illustrates a block diagram depicting a method of generating the optical flow map 110 that may be performed by the optical flow hardware 102 (see FIG. 1), in accordance with at least one embodiment. As mentioned above, the optical flow hardware 102 obtains the reference and input images 106 and 108 (e.g., from the upstream hardware 104 illustrated in FIG. 1). Then, the optical flow hardware 102 (e.g., the processor(s) 114) may execute those of the instructions 118 implementing the denoise process 120 to perform the denoise process 120 on the input image 108 and obtain a denoised image 202. The denoise process 120 may forward the denoised image 202 to the edge detection process 122, the object detection process 124, the optional thresholding process 126 when present, and/or the decision logic 128. By way of a non-limiting example, the denoise process 120 may generate the denoised image 202 using spatial filtering, a Gaussian filter, a median filter, a mean filter, a frequency domain filter (e.g., a notch filter), a machine learning technique, a Deep Convolutional neural network ("CNN"), a Denoising Auto encode, a bilateral filter, a Kuwahara filter, an anisotropic diffusion technique, a weighted least squares method, an edge-avoiding wavelets technique, edge-preserving filtering, geodesic editing, guided filtering, iterative guided filtering, one or more domain transforms, and/or the like.

The edge detection process 122 receives the denoised image 202 created by the denoise process 120 (e.g., from the denoise process 120) and the optical flow hardware 102 (e.g., the processor(s) 114) may execute those of the instructions 118 implementing the edge detection process 122 to perform the edge detection process 122 on the denoised image 202 and obtain an edge map 204. The edge detection process 122 may forward the denoised image 202 and/or the edge map 204 to the object detection process 124, the optional thresholding process 126 when present, and/or the decision logic 128. By way of a non-limiting example, the edge detection process 122 may use a Canny edge detector, a Sobel edge detector, and/or the like to generate the edge map 204.

The object detection process 124 receives the edge map 204 created by the edge detection process 122 (e.g., from the edge detection process 122) and may optionally receive the denoised image 202 (e.g., from the denoise process 120 and/or the edge detection process 122). Then, the optical flow hardware 102 (e.g., the processor(s) 114) may execute those of the instructions 118 implementing the object detection process 124 to perform the object detection process 124 on the denoised image 202 and/or the edge map 204 and obtain an object map 206. The object detection process 124 may forward the denoised image 202, the edge map 204, and/or the object map 206 to the optional thresholding process 126 when present and/or the decision logic 128. By way of a non-limiting example, the object detection process 124 may use a neural network (such as a cellular neural network ("CNN")), a Scale Invariant Feature Transform ("SIFT"), and/or the like to generate the object map 206.

Optionally, the optional thresholding process 126 may receive the edge map 204 created by the edge detection process 122 (e.g., from the edge detection process 122). The optional thresholding process 126 may receive the object map 206 from the object detection process 124, and/or the denoised image 202 from the denoise process 120, the edge detection process 122, and/or the object detection process 124. The optical flow hardware 102 may execute those of the instructions 118 implementing the optional thresholding process 126 to perform the optional thresholding process 126 on the edge map 204 and obtain an optional thresholded edge map 208. The optional thresholding process 126 may forward the denoised image 202, the edge map 204, the object map 206, and/or the optional thresholded edge map 208 to the decision logic 128. By way of a non-limiting example, the optional thresholding process 126 may produce the optional thresholded edge map 208 by removing any edges from the edge map 204 that are not thicker than a threshold value.

The optical flow hardware 102 (e.g., the processor(s) 114) may execute those of the instructions 118 implementing the extraction process 130 to extract a set 210 of image regions from the input image 108. The set 210 of image regions may include feature points and/or pixels. For example, referring to FIG. 3A, the extraction process 130 may select every $n^{th}$ pixel (e.g., every fourth pixel) along both rows and columns of the input image 108. In other words, the extraction process 130 may down-sample the input image 108. In such embodiments, the selected pixels may be characterized as being at the center of a block of pixels or as being surrounded by neighborhood of pixels in the input image 108 For ease of illustration, the set 210 (represented by an array $P_i$) has been illustrated as including image regions $P_1$-$P_9$, which will be described as being pixels. However, each of the image regions in the set 210 may be any portion of an image, including a feature point. Optionally, the extraction process 130 may skip or otherwise not select image regions along the border of the input image 108. However, this is not a requirement and the extraction process 130 may select one or more image regions along the border of the input image 108 in at least one embodiment.

Figure 3A:
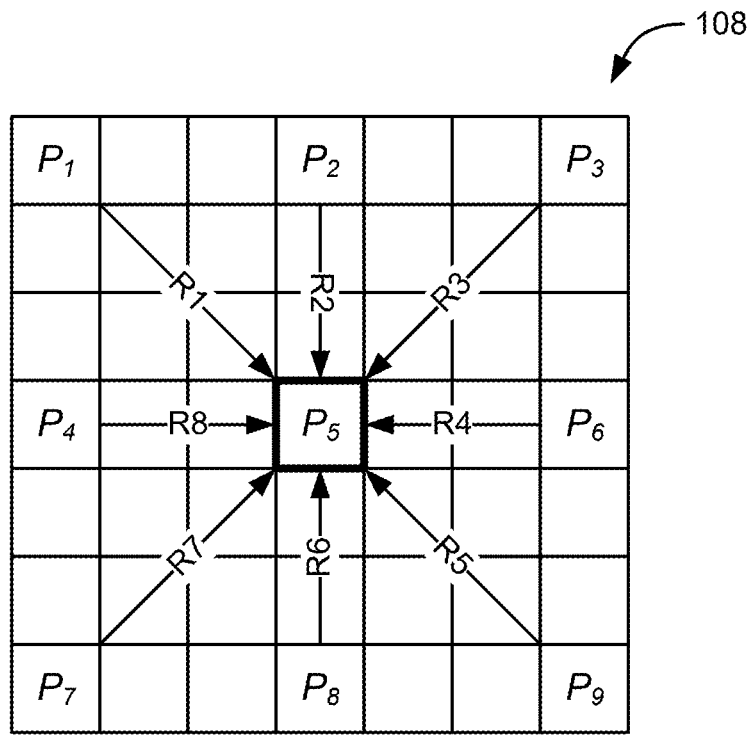
FIG. 3A illustrates an example input image that includes a set of image regions selected by the optical flow hardware of the system of FIG. 1 and directions determined for a particular one of those image regions by the optical flow hardware of the system of FIG. 1, in accordance with at least one embodiment.

The optical flow hardware 102 (e.g., the processor(s) 114) may execute those of the instructions 118 implementing the decision logic 128 to generate one or more disparity maps (e.g., penalty maps PM1 and PM2). Referring to FIG. 2, the denoised image 202, the edge map 204, the object map 206, the optional thresholded edge map 208 when present, and the set 210 of image regions $P_1$-$P_9$ (see FIGS. 3A-3C) of the input image 108 may be forwarded to the decision logic 128, which generates the two disparity (penalty) maps PM1 and PM2 for the set 210 of image regions $P_1$-$P_9$. Referring to FIG. 3A, the decision logic 128 (see FIGS. 1 and 2) determines directions (represented by an array $r_j$) for each of the image regions $P_1$-$P_9$ in the set 210 (illustrated in FIG. 2 and represented by the array $P_i$). For each of the image regions $P_1$-$P_9$ in the set 210, each of the directions determined for the image region passes through or intersects that image region. For example, in the FIG. 3A, the decision logic 128 may determine eight directions for each of the image regions $P_1$-$P_9$ in the set 210. In the example illustrated, directions R1-R8 are illustrated for the image region $P_5$. Directions similar to the directions R1-R8 may be determined for each of the other image regions $P_1$-$P_4$ and $P_6$-$P_9$. Along the border of the input image 108, fewer than eight directions may be considered. For example, only three directions may be considered that the corners (e.g., the image regions $P_1$, $P_3$, $P_7$, and $P_9$) of the input image 108 and only five directions may be considered along the border of the input image 108 between the corners (e.g., at the image regions $P_2$, $P_4$, $P_6$, and $P_8$). Alternatively, as mentioned above, the extraction process 130 may skip or otherwise not select image regions along the border of the input image 108.

Figure 3B:
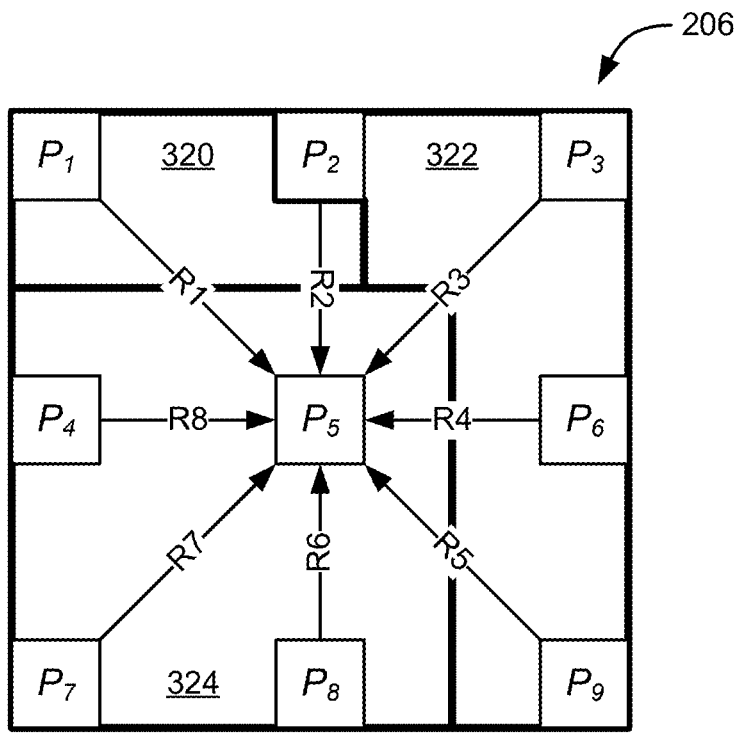
FIG. 3B illustrates an example object map generated for the input image by the optical flow hardware of the system of FIG. 1, in accordance with at least one embodiment.
Figures 3C, 4:
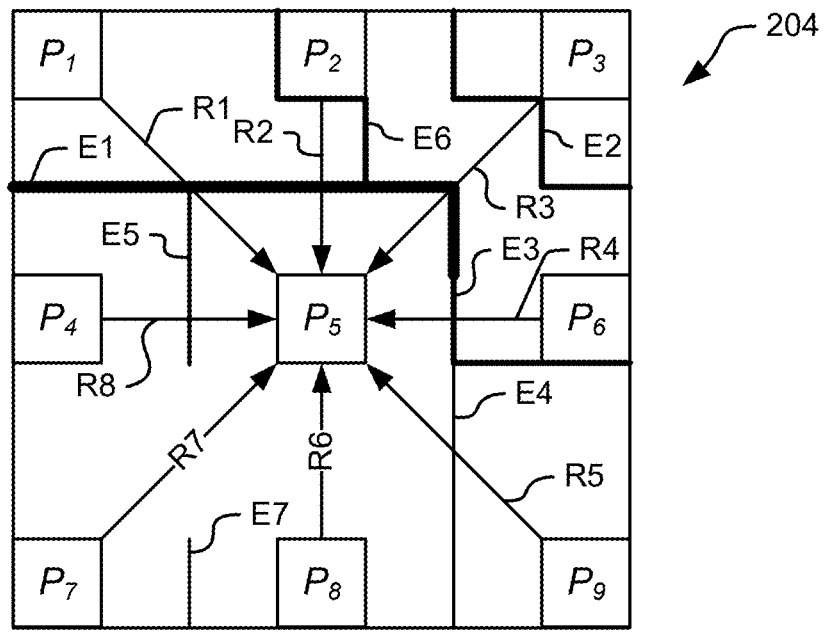
FIG. 3C illustrates an example edge map generated for the input image by the optical flow hardware of the system of FIG. 1, in accordance with at least one embodiment.
FIG. 4 illustrates example disparity maps generated for the input image by the optical flow hardware of the system of FIG. 1, in accordance with at least one embodiment.

Referring to FIG. 4, the penalty maps PM1 and PM2 each include a storage location corresponding to each of the image regions $P_1$-$P_9$ in the set 210 (represented by the array $P_i$) and each of the directions (represented by the array $r_j$). Each of the storage locations stores a disparity (penalty) value for one of the directions and one of the image regions $P_1$-$P_9$. For example, each of the penalty maps PM1 and PM2 may be implemented as a two-dimensional array that stores a penalty value for each of the directions (represented by the array $r_j$) and each of the image regions $P_1$-$P_9$. Thus, when the penalty maps PM1 and PM2 are implemented as two-dimensional arrays, one of the dimensions (e.g., rows) correspond to the image regions $P_1$-$P_9$ and the other of the dimensions (e.g., columns) correspond to the directions (represented by the array $r_j$). By way of a non-limiting example, the penalty maps PM1 and PM2 may store disparity values for only the image regions $P_1$-$P_9$ in the set 210. By way of another non-limiting example, the penalty maps PM1 and PM2 may store disparity values for all of the image regions (e.g., pixels) in the input image 108.

The decision logic 128 assigns a disparity value to each of the storage locations in each of the penalty maps PM1 and PM2. By way of a non-limiting example, referring to FIG. 4, the penalty maps PM1 and PM2 may each include eight disparity values for the image region $P_5$, with one of the eight disparity values being for each of the eight directions (represented by the array $r_j$), which are illustrated as being directions R1-R8 in FIGS. 3A-3C. Similarly, referring to FIG. 4, the penalty maps PM1 and PM2 will each include eight disparity values for each of the image regions $P_1$-$P_4$ and $P_6$-$P_9$, with one of the eight disparity values being for each of the eight directions (represented by the array $r_j$) that are similar to the directions R1-R8.

The decision logic 128 (see FIGS. 1 and 2) assigns the disparity value to the penalty map PM1 for each of directions (represented by the array $r_j$) for each of the image regions $P_1$-$P_9$ in the set 210 (represented by the array $P_i$) based on the object map 206. For example, the decision logic 128 may assign one of two disparity values V1$a$ and V1$b$ to each storage location in the penalty map PM1 based on the object map 206. The value V1$a$ may be larger than the value V1$b$. For a particular one of the directions and a particular one of the image regions $P_1$-$P_9$, the decision logic 128 may assign the larger value V1$a$ if the object map 206 indicates the particular image region is part of the same object as at least one neighboring image region in the set 210 along the particular direction. Otherwise, a smallest value V1$b$ may be assigned to the penalty map PM1 for the particular image and the particular direction. For example, the decision logic 128 may assign the larger value V1$a$ if the object map 206 indicates the particular image region is part of the same object as a closest neighboring image region in the set 210 along the particular direction. Otherwise, a smallest value V1$b$ may be assigned to the penalty map PM1 for the particular image region and the particular direction.

For example, referring to FIG. 3B, the object detection process 124 (see FIGS. 1 and 2) may determine that the input image 108 (see FIGS. 1, 2, 5, and 6) includes three objects 320, 322, and 324. In this example, the image region $P_1$ is illustrated inside the object 320, the image regions $P_2$, $P_3$, $P_6$, and $P_9$ are illustrated inside the object 322, and the image regions $P_4$, $P_5$, $P_7$, and $P_8$ are illustrated inside the object 324. Along each of the directions R6-R8, the image regions $P_4$, $P_7$, and $P_8$ are inside the same object, namely the object 324, as the image region $P_5$. Therefore, as shown in FIG. 4, the decision logic 128 may assign the larger value V1$a$ to the penalty map PM1 for the image region $P_5$ for each of the directions R6-R8. Further, referring to FIG. 3B, along each of the directions R1-R5 and R9, the image regions $P_1$-$P_3$, $P_6$, and $P_9$ are inside different objects than the image region $P_5$. Specifically, the image region $P_1$ is inside the object 320 and the image regions $P_2$, $P_3$, $P_6$, and $P_9$ are inside the object 322. Therefore, as shown in FIG. 4, the decision logic 128 may assign the smaller value V1$b$ to the penalty map PM1 for the image region $P_5$ for each of the directions R1-R5. In this example, the penalty map PM1 would store the values V1$b$, V1$b$, V1$b$, V1$b$, V1$a$, V1$a$, and V1$a$ for the image region $P_5$ for the directions R1-R8, respectively.

The decision logic 128 (see FIGS. 1 and 2) assigns the penalty value to the penalty map PM2 for each of directions (represented by the array $r_j$) for each of the image regions $P_1$-$P_9$ in the set 210 (represented by the array $P_i$) based on the edge map 204 (see FIGS. 2 and 3C) and, optionally, on the optional thresholded edge map 208 (see FIG. 2). For example, the decision logic 128 may assign one of three penalty values V2$a$-V2$c$ to the penalty map PM2 for each of the image regions $P_1$-$P_9$ in the set 210 for each of the directions. The value V2$a$ may be the largest and the value V2$c$ may be the smallest of the three values V2$a$-V2$c$. The values V2$a$-V2$c$ assigned to the penalty map PM2 are larger than the values V1$a$ and V1$b$ assigned to the penalty map PM1. Thus, the value V2$a$ may be largest penalty and the value V1$b$ may be smallest penalty. For a particular one of the directions and a particular image region in the set 210, the decision logic 128 may assign the largest value V2$a$ if the edge map 204 does not indicate that an edge is positioned between the particular image region and at least one neighboring image region (in the set 210 selected by the extraction process 130) along the particular direction. On the other hand, the decision logic 128 may assign the smallest value V2$c$ if the optional thresholded edge map 208 indicates that an edge (having a thickness greater than the threshold value) is positioned between the particular image region and at least one neighboring image region (in the set 210 selected by the extraction process 130) along the particular direction. The decision logic 128 may assign the intermediate value V2$b$ if the edge map 204 indicates that an edge is positioned between the particular image region and at least one neighboring image region (in the set 210 selected by the extraction process 130) along the particular direction that has a thickness less than or equal to the threshold value.

For example, FIG. 3C illustrates an example of the edge map 204 that includes edges E1-E7. In this example, only the edge E1 is thicker than the threshold value and would therefore be included in the optional thresholded edge map 208 (see FIG. 2). In this example, no edges are positioned between the image region $P_5$ and the neighboring image regions $P_7$ and $P_8$ along the directions R7 and R6, respectively. Therefore, the decision logic 128 may assign the largest value V2$a$ to the image region $P_5$ for the directions R6 and R7. The edge E1, which has a thickness greater than the threshold value, is positioned between the image region $P_5$ and the neighboring image region $P_1$-$P_3$ along the directions R1-R3, respectively. Therefore, the decision logic 128 may assign the smallest value V2$c$ to the image region $P_5$ for the directions R1-R3. The edge E3 is positioned between the image region $P_5$ and the image region $P_6$ along the direction R4, the edge E4 is positioned between the image region $P_5$ and the image region $P_9$ along the direction R5, and the edge E5 is positioned between the image region $P_5$ and the image region $P_4$ along the direction R8. The edges E3-E5 are not thicker than the threshold value and would therefore not be included in the optional thresholded edge map 208. Thus, the decision logic 128 may assign the intermediate value V2$b$ to the image region $P_5$ for the directions R4, R5, and R8. In this example, as shown in FIG. 4, the penalty map PM2 would store the values V2$c$, V2$c$, V2$c$, V2$b$, V2$b$, V2$a$, V2$a$, and V2$b$ for the image region $P_5$ for the directions R1-R8, respectively.

As mentioned above, each of the penalty maps PM1 and PM2 may be implemented as a two-dimensional array. The first dimension (e.g., rows) may correspond with the image regions $P_1$-$P_9$ in the set 210 (e.g., pixels represented by the array $P_i$) and the second dimension (e.g., columns) may correspond with the directions (represented by the array $r_j$). For example, the penalty maps PM1 and PM2 may be represented by arrays PM1($i, j$) and PM2($i, j$), respectively, in which a variable "i" identifies one of the image regions in the set 210 and the variable "j" identifies one of the directions.

The optical flow hardware 102 (e.g., the processor(s) 114) may execute those of the instructions 118 implementing the SGM process 132 to generate the optical flow map 110. The reference image 106, the input image 108, the penalty maps PM1 and PM2, and the set 210 of image regions $P_1$-$P_9$ are forwarded to the SGM process 132. Referring to FIG. 2, the penalty maps PM1 and PM2 are used by the SGM process 132 to generate the optical flow map 110, which encodes motion from the reference image 106 to the input image 108. The SGM process 132 implements the modified SGM method that outputs the optical flow map 110, which as mentioned above, may be forwarded to the downstream hardware 112 (see FIG. 1).

Figure 5:
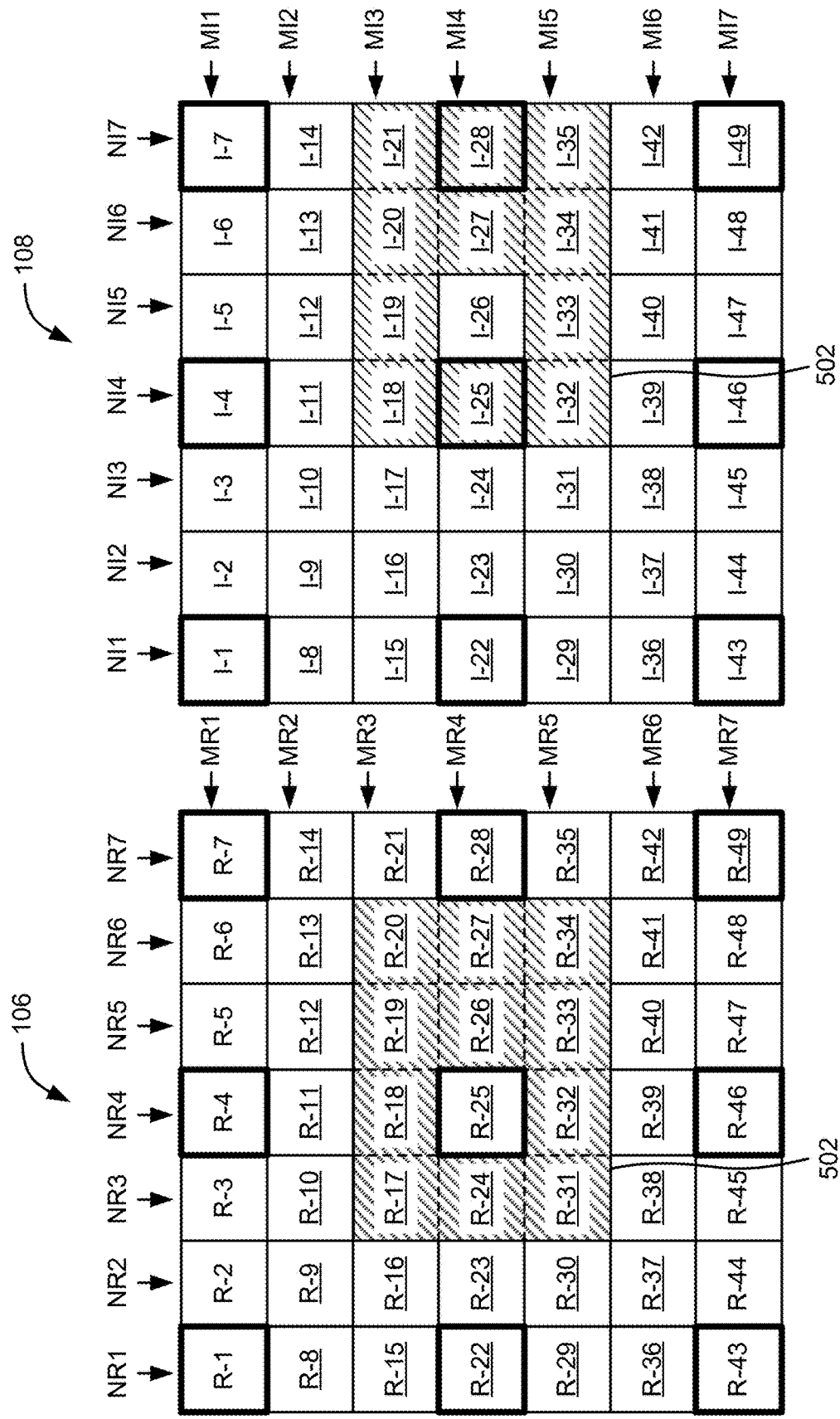
FIG. 5 illustrates an example reference image side-by-side with the example input image, in accordance with at least one embodiment.

FIG. 5 is a block diagram illustrating example content of the reference image 106 side-by-side with an example content of the input image 108. In this example, the reference image 106 includes image regions R-1 to R-49 arranged in rows MR1-MR7 and columns NR1-NR7. Similarly, the input image 108 includes image regions I-1 to I-49 arranged in rows MI1-MI7 and columns NI1-NI7. In this example, the image regions $P_1$-$P_9$ (see FIGS. 3A-3C and 7) correspond to the image regions I-1, I-4, I-7, I-22, I-25, I-28, I-43, I-46, and I-49, respectively. The image regions R-17 to R-20, R-24 to R-27, and R-31 to R-34 of the reference image 106 depict an object 502, which is illustrated as being a rectangle. The same object 502 is also depicted in the input image 108 by the image regions I-18 to I-21, I-25 to I-28, and I-32 to I-35. Thus, the object 502 may appear to have moved to the right by one column from the reference image 106 to the input image 108.

Figure 6:
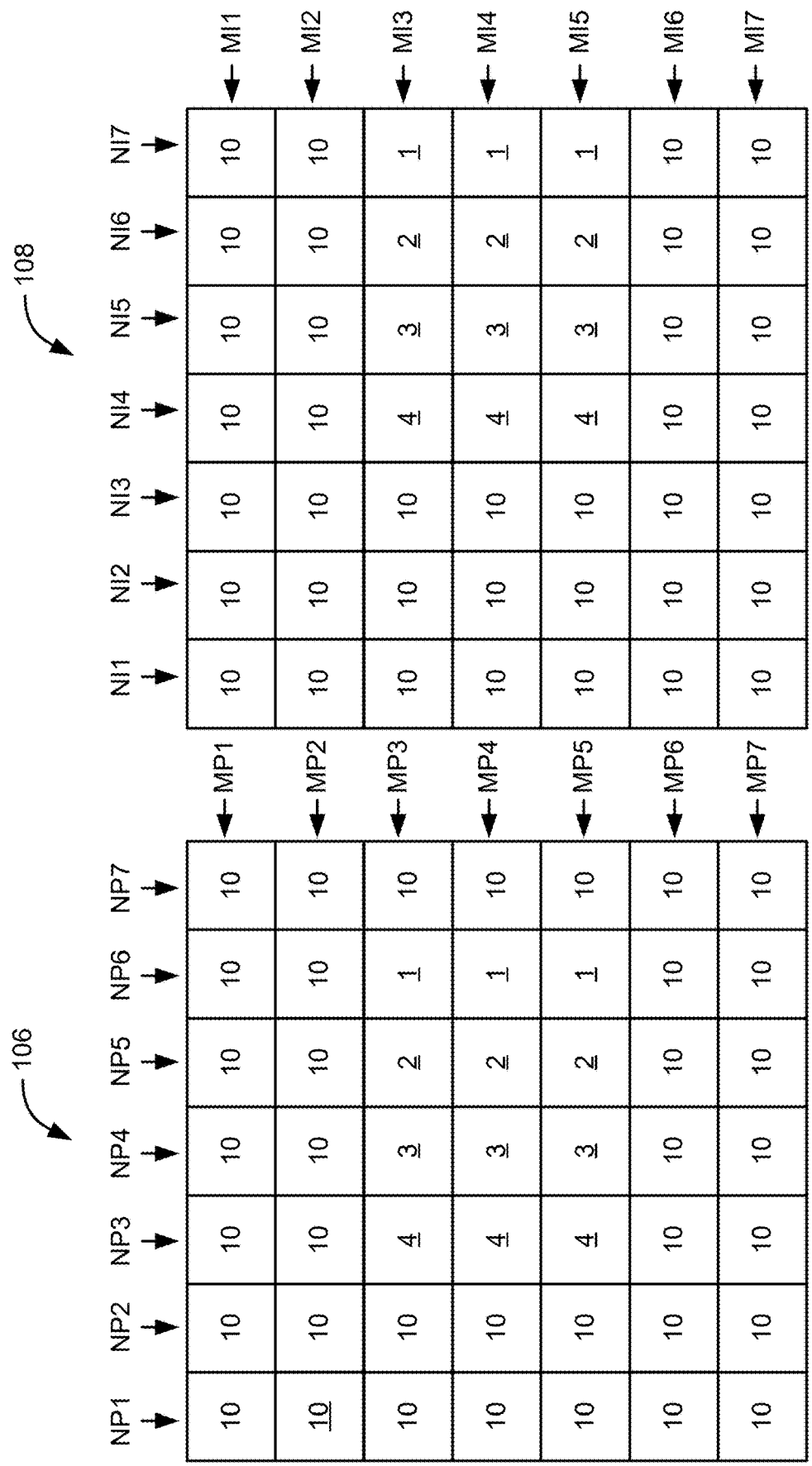
FIG. 6 illustrates example values of one or more metrics assigned to each of the image regions in the reference and input images, in accordance with at least one embodiment.

FIG. 6 illustrates example values of one or more metrics assigned to each of the image regions R-1 to R-49 in the reference image 106 and each of the image regions I-1 to I-49 in the input image 108, in accordance with at least one embodiment. The values may be assigned by the optical flow hardware 102 (see FIG. 1) or may be properties of the reference and input images 106 and 108 themselves. The metric(s) may include any parameter or feature of an image region. For example, the metric(s) may include intensity, color, mutual information, and the like. For ease of illustration, the values of the metric(s) have been depicted in FIG. 6 as ranging from zero to ten.

FIG. 7 illustrates a set 710 of the image regions $PR_1$-$PR_9$ determined for the reference image 106, a two-dimensional array 706 that depicts example values of the metric(s) in the image regions $PR_1$-$PR_9$ of the set 710, the set 210 determined for the input image 108, and a two-dimensional array 708 that depicts example values of the metric(s) in the image regions $P_1$-$P_9$ of the set 210, in accordance with at least one embodiment. The SGM process 132 (see FIGS. 1 and 2) determines where each image region in the set 710 of the image regions R-1 to R-49 in the reference image 106 is located in the input image 108. For ease of illustration, referring to FIG. 7, the set 710 will be described as including image regions $PR_1$-$PR_9$. The image regions $PR_1$-$PR_9$ correspond to the image regions R-1, R-4, R-7, R-22, R-25, R-28, R-43, R-46, and R-49, respectively, illustrated in FIG. 5. The SGM process 132 may select the set 710 from the image regions R-1 to R-49 using the extraction process 130 (see FIGS. 1 and 2) or the SGM process 132 may include a separate extraction process (not shown) substantially similar to the extraction process 130 that selects the set 710. For example, the SGM process 132 may down-sample the reference image 106 to obtain the set 710. Alternatively, the set 710 may include all of the image regions R-1 to R-49, in which case, the SGM process 132 may determine where the contents of all of the image regions R-1 to R-49 appear in the input image 108.

In the example illustrated in FIG. 5, the contents of the image region R-25 in the reference image 106 appear in the image region I-26 of the input image 108. Disparity is a distance between a first point (e.g., the image region R-25) in the reference image 106 and a second point (e.g., the image region I-26) in the input image 108. For example, if the reference and input images 106 and 108 are regularized, the rows MR1-MR7 of the reference image 106 should correspond to the rows MI1-MI7 of the input image 108. In other words, the input image 108 may only be displaced with respect to the reference image 106 by a number of the columns. Thus, the example reference and input images 106 and 108 illustrated in FIGS. 1, 2, 5, and 6, have thirteen possible disparities (e.g., negative six to six). But, referring to FIG. 7, if instead the image regions $PR_1$-$PR_9$ of the set 710 are compared to the image regions $P_1$-$P_9$ of the set 210 there are only five possible disparities (e.g., negative two to two). On the other hand, if the reference and input images 106 and 108 are not regularized, the input image 108 may be displaced with respect to the reference image 106 by a number of rows and/or columns.

Figure 8:
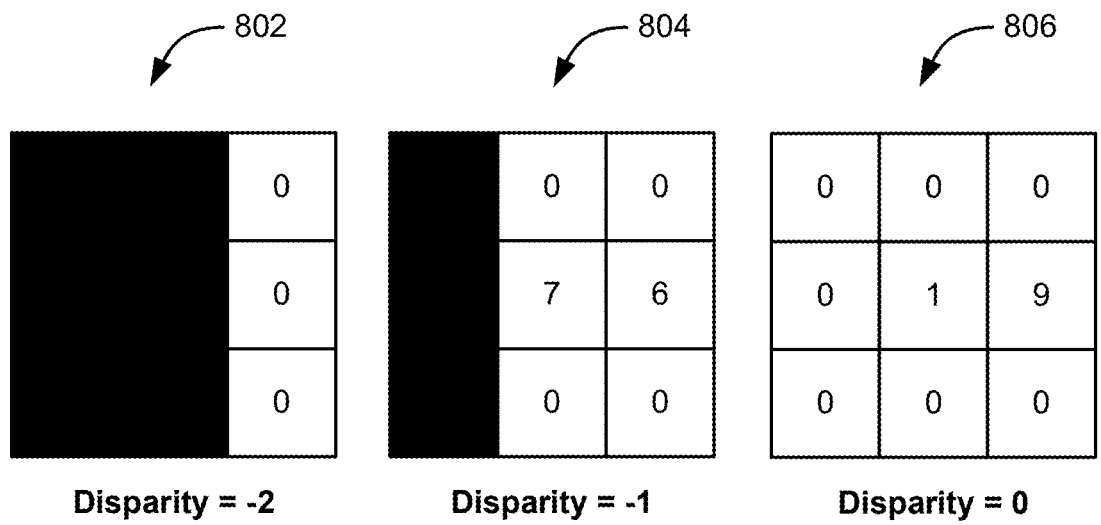
FIG. 8 illustrates example disparity maps, in accordance with at least one embodiment.
Figure 8:
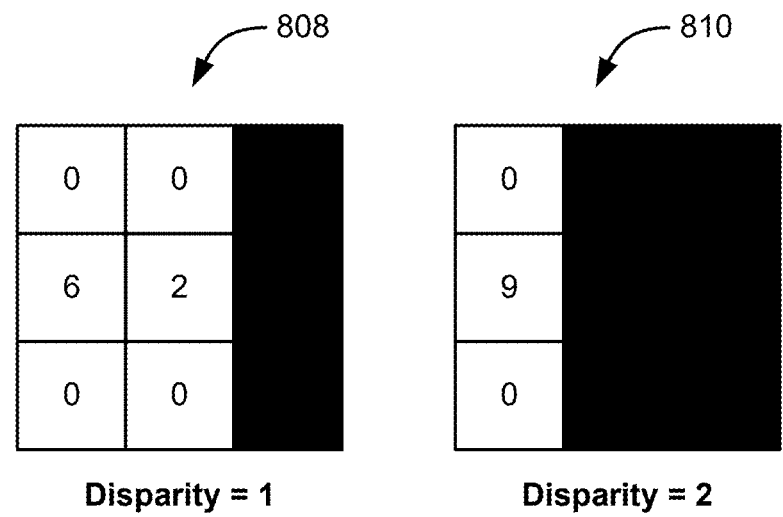

The values of the metric(s) may be used to generate disparity maps. For example, FIG. 8 illustrates example disparity maps 802-810, in accordance with at least one embodiment. The SGM process 132 (see FIGS. 1 and 2) may generate the disparity maps 802-810 by comparing the values of the metric(s) of the image regions $PR_1$-$PR_9$ of the set 710 to the values of the metric(s) of the image regions $P_1$-$P_9$ of the set 210. In the example illustrated, the disparity maps 802-810 were calculated for disparities negative two to two, respectively. The disparity maps 802-810 illustrated store a disparity metric value for each of the image regions $PR_1$-$PR_9$ in the set 710 at the disparities negative two to two, respectively. For example, the disparity maps 802-810 each include a plurality of locations corresponding to the image regions $PR_1$-$PR_9$ in the set 710. Within each of the plurality of locations, each of the disparity maps 802-810 stores the disparity metric value for the corresponding image region of the reference image 106. For ease of illustration, the disparity metric values in each of the disparity maps 802-810 illustrated are an absolute value of a difference between the values of the metric(s) of the image regions $PR_1$-$PR_9$ and the values of the metric(s) of the image regions $P_1$-$P_9$, respectively, when the set 710 is offset from the set 210 by the disparity.

In other words, disparity map 806 depicts disparity is zero, in which the SGM process 132 evaluates whether the image regions $PR_1$-$PR_9$ corresponds to the image regions $P_1$-$P_9$. Thus, the disparity map 806 includes a metric for each of the image regions $PR_1$-$PR_9$, which indicates a difference in the value of the metric(s) (e.g., intensity, color, mutual information, etc.) in the image regions $PR_1$-$PR_9$ and the image regions $P_1$-$P_9$, respectively. Similarly, if the disparity is one, the SGM process 132 is comparing the image regions $PR_1$, $PR_2$, $PR_4$, $PR_5$, $PR_7$, and $PR_8$ to the image regions $P_2$, $P_3$, $P_5$, $P_6$, $P_8$, and $P_9$. On the other hand, if the disparity is negative one, the SGM process 132 is comparing the image regions $PR_2$, $PR_3$, $PR_5$, $PR_6$, $PR_8$, and $PR_9$ to the image regions $P_1$, $P_2$, $P_4$, $P_5$, $P_7$, and $P_8$. A different disparity map may be calculated in this manner for each available disparity.

The SGM process 132 (see FIGS. 1 and 2) determines optical flow by calculating an accumulated cost (represented by an expression $S(p, d)$) for each of the image regions $PR_1$-$PR_9$ in the set 710 (represented by a variable p) at each possible disparity (represented by a variable d) with the input image 108. For example, as mentioned above, if the images are regularized, the rows MR1-MR7 of the reference image 106 should correspond to the rows MI1-MI7 of the input image 108 and the input image 108 may only be displaced with respect to the reference image 106 by a number of columns. In the example illustrated in FIG. 7, the SGM process 132 may calculate three accumulated costs (each represented by the expression $S(p, d)$) for each of the image regions $PR_1$-$PR_9$ in the set 710. For example, the image region $PR_5$ may be compared to the image regions $P_4$, $P_5$, and $P_6$ at disparities negative one, zero, and one, respectively. Therefore, in this example, the SGM process 132 may calculate an accumulated cost (represented by the expression $S(p, d)$) for the image region $PR_5$ for each of the disparities negative one, zero, and one (each represented by the variable d in the expression $S(p, d)$).

After the SGM process 132 (see FIGS. 1 and 2) calculates the accumulated costs for each of the image regions $PR_1$-$PR_9$ in the set 710 (represented by the variable p) at each possible disparity (represented by the variable d) with the input image 108, the SGM process 132 selects a smallest one of the accumulated costs (e.g., represented by an expression $\min_d S(p, d)$) for each of the image regions $PR_1$-$PR_9$ in the set 710. The selected accumulated cost was calculated for a selected disparity. For each of the image regions $PR_1$-$PR_9$ in the set 710, the SGM process 132 includes the selected disparity (or a value determined based at least in part on the selected disparity) in the optical flow map 110 at a location corresponding to the image region.

The accumulated cost (represented by an expression $S(p, d)$) is a sum of costs (represented by an expression $L_r(p, d)$) each calculated along one of a predetermined number of directions passing through a particular image region (represented by the variable p) and for a particular one of the disparities (represented by the variable d). Thus, the accumulated cost may be calculated using an Equation 1 below:

$$S(p,d)=\Sigma_r L_r(p,d) \quad \text{Equation 1}$$

Figure 9:
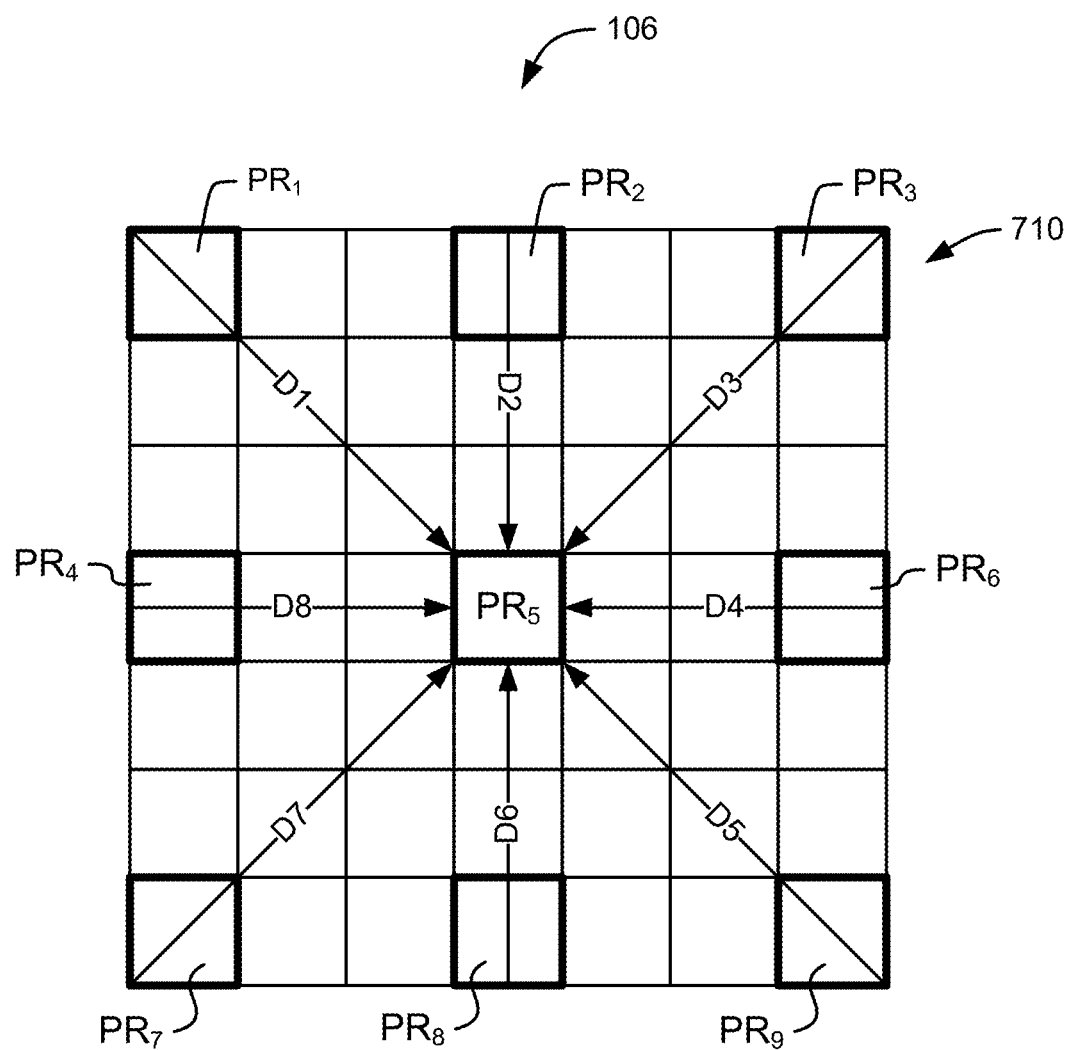
FIG. 9 illustrates the set of image regions of the reference image and directions determined for a particular one of those image regions by the optical flow hardware of the system of FIG. 1, in accordance with at least one embodiment.

For ease of illustration, the predetermined number of directions will be described as being the same as the predetermined number (represented by the variable j) of directions (represented by the array $r_j$) used to generate the penalty maps PM1 and PM2. But, this is not a requirement and the SGM process 132 may use a different predetermined number of directions. FIG. 9 illustrates the set 710 of the image regions $PR_1$-$PR_9$ and directions D1-D8 determined for a particular one of the image regions $PR_1$-$PR_9$ by the optical flow hardware 102 of the system of FIG. 1, in accordance with at least one embodiment. For the example illustrated in FIG. 9 in which each of the image regions $PR_1$-$PR_9$ may have three disparity values, if the eight directions D1-D8 (which are similar to the directions R1-R8 illustrated in FIGS. 3A-3C) are used, the SGM process 132 may calculate 24 costs (represented by the expression $L_r(p, d)$) for each of the image regions $PR_1$-$PR_9$. In FIG. 9, the image region $PR_5$ is illustrated with eight directions D1-D8 (which are similar to the directions R1-R8 illustrated in FIGS. 3A-3C). The SGM process 132 sums those of the costs (represented by the expression $L_r(p, d)$) calculated for the same disparity and the same image region to produce each of the accumulated costs for the image region. As mentioned above, in the example illustrated in FIG. 8, the SGM process 132 will calculate three accumulated costs for each of the image regions $PR_1$-$PR_9$.

The cost (represented by the expression $L_r(p, d)$) is calculated by summing a matching term (represented by an expression $C(p, d)$) and a regularization term (represented by an expression $R(d_p, d_q)$) in accordance with Equation 2 below.

$$L_r(p,d)=C(p,d))+R(d_p,d_q))\qquad\text{Equation 2}$$

In Equation 2 above, the matching term (represented by the expression $C(p, d)$) is a measure of how closely a particular one of the image regions $PR_1$-$PR_9$ (e.g., the image region $PR_5$) matches one of the image regions $P_1$-$P_9$ (e.g., the image region $P_5$) at the particular disparity (e.g., disparity zero). The regularization (represented by the expression $R(d_p, d_q)$) term promotes smoothness by penalizing changes in disparity assigned to neighboring image regions.

The SGM process 132 may determine the matching term (represented by the expression $C(p, d)$) for a particular one of the image regions $PR_1$-$PR_9$ (represented by the variable p) based at least in part on the value of its metric(s) (e.g., intensity) and the value of the metric(s) of the one of the image regions $P_1$-$P_9$ located at the particular disparity (represented by the variable d). For example, the SGM process 132 may use any method to determine the matching term, including any methods suitable for use by the conventional SGM algorithm. By way of a non-limiting example, the method used to calculate the matching term may include a sampling insensitive measure described by Birchfield and Tomasi, S. Birchfield and C. Tomasi, *Depth discontinuities by pixel-to-pixel stereo*, In Proceedings of the Sixth IEEE International Conference on Computer Vision, pages 1073-1080, Mumbai, India (January 1998), which is incorporated herein by reference in its entirety. By way of another non-limiting example, the method used to calculate the matching term may include a mutual information method described by described in Hirschmüller, Heiko, *Accurate and Efficient Stereo Processing by Semi-Global Matching and Mutual Information*, IEEE Conference on Computer Vision and Pattern Recognition ("CVPR"), San Diego, CA, USA, (Jun. 20-26, 2005).

Turning now to the regularization term (represented by the expression $R(d_p, d_q)$), the modified SGM method implemented by the SGM process 132 differs from a conventional SGM algorithm in several respects. For example, the conventional SGM algorithm uses an Equation 3 (below) to determine the value of the regularization term (represented by the expression $R(d_p, d_q)$):

$$R(d_p, d_q) = \begin{cases} 0 & d_p = d_q \\ P1 & |d_p - d_q| = 1 \\ P2 & |d_p - d_q| > 1 \end{cases}\qquad\text{Equation 3}$$

In Equation 3 above, a variable $d_p$ represents the disparity metric value for the image region (e.g., the image region $PR_5$) at the disparity (represented by the variable d) for which the cost (represented by the expression $L_r(p, d)$) is being calculated. A variable $d_q$ represents the disparity metric value for a neighboring image region (e.g., the image region $PR_4$) along the direction (e.g., the direction D8) at the disparity (represented by the variable d) for which the cost (represented by the expression $L_r(p, d)$) is being calculated.

Referring to FIG. 8, values of the variables $d_p$ and $d_q$ may be obtained from the disparity map created for the particular disparity. In other words, the SGM process 132 may simply look up the values of the variables $d_p$ and $d_q$ from the disparity map created for a particular disparity.

In Equation 3 above, variables "P1" and "P2" represent penalties. The variables "P1" and "P2" may be two constant parameters, with the value of the variable "P1" being less than the value of the variable "P2." The regularization term is set equal to zero when the disparity metric value does not change. When the disparity metric value changes a little bit ($|d_p-d_q|=1$), the regularization term is set equal to the value of the variable "P1." On the other hand, when disparity metric value changes a lot ($|d_p-d_q|>1$), the regularization term is set equal to the larger value of the variable "P2." The smaller value of the variable "P1" penalizes small changes less and allows one or more of the image regions $PR_1$-$PR_9$ depicting a slanted or curved surface to more accurately map to corresponding image regions in the input image 108 depicting the same surface. The larger value of the variable "P2" helps preserve discontinuities. To further preserve discontinuities, the larger value of the variable "P2" may be adapted or modified based at least in part on the value of the metric(s) for each of the image regions $PR_1$-$PR_9$ compared to the value of the metric(s) of its neighboring image region. For example, Equation 4 below may be used to determine the value of the variable "P2:"

$$P2 = \frac{P2'}{|I_{bp} - I_{bq}|}\qquad\text{Equation 4}$$

In the Equation 4 above, a variable P2' represents a constant, a variable $I_{bp}$ represents the value of the metric(s) (e.g., intensity) at the image region, and a variable $I_{bq}$ represents the value of the metric(s) (e.g., intensity) at the neighboring image region along the direction for which the cost (represented by the expression $L_r(p, d)$) is being calculated.

The cost (represented by the expression $L_r(p, d)$) for a particular image region (represented by the variable p) at a particular disparity (represented by the variable d) along a particular direction (represented by the variable r) is typically implemented recursively using Equation 5 (below):

$$L_r(p,d)=D(p,d)+\min\{L_r(p-r,d),L_r(p-r,d-1)+P1,L_r(p-r,\\d+1)+P1,\min_i L_r(p-r,i)+P2\}-\min_k L_r(p-r,k)\qquad\text{Equation 5}$$

In Equation 5 (above), an expression "p−r" represents a previous image region that precedes the particular image region (represented by the variable p) along the particular direction (represented by the variable r). For example, referring to FIG. 9, if the particular image region is the image region $PR_5$, the previous image region along the direction D1 is the image region $PR_1$. In Equation 5 (above), an expression $\min_k L_r(p-r, k)$ represents a minimum cost at the previous image region.

When the set 710 includes fewer than all of the image regions (e.g., image regions $PR_1$-$PR_9$) of the reference image 106, using a constant value for the variable "P1" for the entire reference image 106 and adapting the larger value of the variable "P2" using Equation 4 (above) does not work as expected because the image regions (e.g., pixels) are spaced apart from one another. For example, the conventional SGM algorithm will miss thin or sharp objects if such objects are positioned in between the image regions for which optical flow is being determined. To correct this problem, the modified SGM method implemented by the SGM process 132 uses an Equation 5 below to determine the value of the regularization term (represented by the expression $R(d_p, d_q)$):

$$R(d_p, d_q) = \begin{cases} 0 & d_p = d_q \\ P1(p, q) & |d_p - d_q| = 1 \\ P2(p, q) & |d_p - d_q| > 1 \end{cases} \quad \text{Equation 6}$$

As shown above, the variables "P1" and "P2" present in Equations 3 and 5 above are replaced with expressions P1(p, q) and P2(p, q) in Equation 6 above. The expressions P1(p, q) and P2(p, q) refer to the penalty maps PM1 and PM2. Specifically, the SGM process 132 may look up the penalty values used by the modified SGM method in the penalty maps PM1 and PM2. Thus, in the recursive formulation (Equation 5 above), the expression P1(p, q) replaces the value "P1" and the expression P2(p, q) replaces the value "P2." For example, if the penalty maps PM1 and PM2 are represented by the arrays P1(i, j) and P2(i, j), the expression P1(p, q) will return a value at P1(2,3) and the expression P2(p, q) will return a value at P2(2,3) for the second image region (e.g., image region $PR_2$) and the third direction (e.g., the direction D3). In the modified SGM method, the penalty maps PM1 and PM2 adapt the flow generated by a particular image region to the flow of its neighboring image regions. The modified SGM method may be used to compute optical flow between images that are not stereo images because the modified SGM algorithm replaces a one-dimensional search disparity range with a two-dimensional search window.

The penalty maps PM1 and PM2 may help preserve discontinuities better than using the constant values for the variables "P1" and "P2" or using a constant value for the variable "P1" and adapting the value of the variable "P2" using Equation 4 above (e.g., based on intensity differences). In particular, using the penalty maps PM1 and PM2 may work well to calculate optical flow when the set 710 includes fewer than all of the image regions of the reference image 106 (e.g., sparse feature points, a single pixel per a block, and the like).

Using fewer than all of the image regions of the reference image 106 (e.g., sparse feature points, a single pixel per a block, and the like) when determining optical flow may help speed-up computation where an image region-wise (e.g., pixel-wise) optical flow is not needed. The modified SGM method allows the computations to be done only for those image regions (e.g., pixels) that are some distance away from one another. For example, optical flow can be computed for every $n^{th}$ (e.g., fourth) image region (e.g., pixel) in horizontal and vertical dimensions of the reference image 106.

Figure 10:
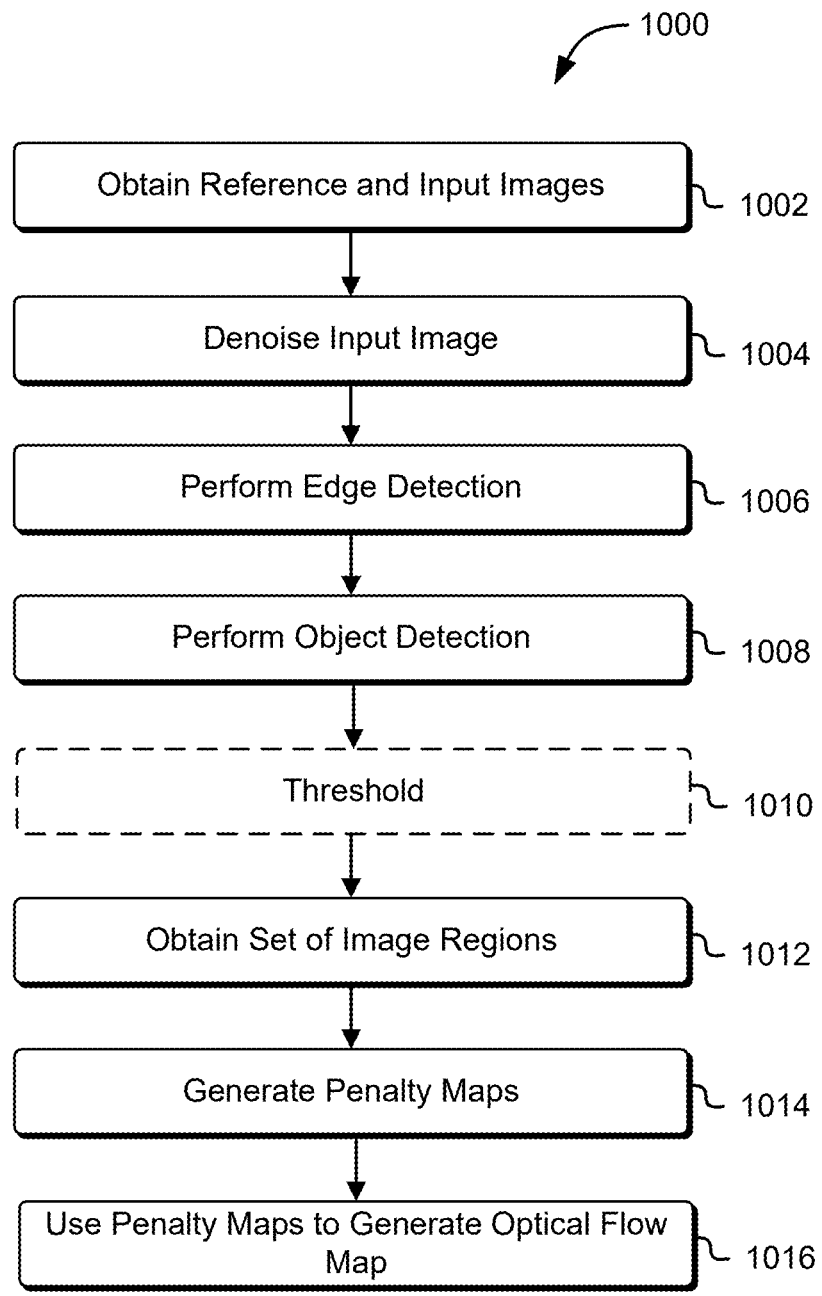
FIG. 10 illustrates a flow diagram of a method that may be performed by the optical flow hardware of FIG. 1, in accordance with at least one embodiment.

FIG. 10 illustrates a flow diagram of a method 1000 that may be performed by the optical flow hardware 102 (see FIG. 1), in accordance with at least one embodiment. In first block 1002, referring to FIG. 1, the optical flow hardware 102 obtains the reference and input images 106 and 108. Then, in block 1004 (see FIG. 10), the optical flow hardware 102 performs the denoise process 120 on the input image 108 to obtain the denoised image 202 (see FIG. 2). Referring to FIG. 2, the denoise process 120 forwards the denoised image 202 to the edge detection process 122 and/or stores the denoised image 202 in the memory 116 (see FIG. 1) at a location accessible by the edge detection process 122. The denoise process 120 may optionally forward the denoised image 202 to the decision logic 128 and/or store the denoised image 202 in the memory 116 (see FIG. 1) at a location accessible by the decision logic 128.

Next, in block 1006 (see FIG. 10), the optical flow hardware 102 performs the edge detection process 122 on the denoised image 202 to obtain the edge map 204. The edge detection process 122 may forward the edge map 204 to the object detection process 124 and/or store the edge map 204 in the memory 116 (see FIG. 1) at a location accessible by the object detection process 124. The edge detection process 122 may forward the edge map 204 to the optional thresholding process 126 and/or store the edge map 204 in the memory 116 at a location accessible by the optional thresholding process 126. The edge detection process 122 may forward the edge map 204 to the decision logic 128 and/or store the edge map 204 in the memory 116 at a location accessible by the decision logic 128. The edge detection process 122 may forward the denoised image 202 to the object detection process 124, the optional thresholding process 126, and/or the decision logic 128. The edge detection process 122 may store the denoised image 202 in the memory 116 at a location accessible by object detection process 124, the optional thresholding process 126, and/or the decision logic 128.

Then, in block 1008 (see FIG. 10), the optical flow hardware 102 performs the object detection process 124 on the denoised image 202 and/or the edge map 204 to obtain the object map 206. The object detection process 124 forwards the object map 206 to the decision logic 128 and/or stores the object map 206 in the memory 116 (see FIG. 1) at a location accessible by the decision logic 128. The object detection process 124 may forward the object map 206 to the optional thresholding process 126 and/or store the object map 206 in the memory 116 at a location accessible by the optional thresholding process 126. The object detection process 124 may forward the edge map 204 and/or the denoised image 202 to the optional thresholding process 126 and/or the decision logic 128. The object detection process 124 may store the edge map 204 and/or the denoised image 202 in the memory 116 at a location accessible by the optional thresholding process 126 and/or the decision logic 128.

Next, in optional block 1010 (see FIG. 10), the optical flow hardware 102 may perform the optional thresholding process 126 on the edge map 204 to obtain the optional thresholded edge map 208. The optional thresholding process 126 forwards the optional thresholded edge map 208 to the decision logic 128 and/or stores the optional thresholded edge map 208 in the memory 116 (see FIG. 1) at a location accessible by the decision logic 128. The optional thresholding process 126 may forward the object map 206, the edge map 204 and/or the denoised image 202 to the decision logic 128. The optional thresholding process 126 may store the object map 206, the edge map 204, and/or the denoised image 202 in the memory 116 at a location accessible by the decision logic 128. In embodiments omitting the optional block 1010, the optical flow hardware 102 may perform block 1012 or block 1014 after block 1008.

In block 1012 (see FIG. 10), the optical flow hardware 102 performs the extraction process 130 on the input image 108 to obtain the set 210. While block 1012 is illustrated as occurring after optional block 1010 in FIG. 10 (or block 1008 in embodiments omitting optional block 1010), block 1012 may be performed at any time before block 1014. In embodiments in which optional block 1010 is present and block 1012 is performed before optional block 1010, the optical flow hardware 102 may perform block 1014 after optional block 1010. Similarly, in embodiments in which optional block 1010 is not present and block 1012 is performed before the block 1008, the optical flow hardware 102 may perform block 1014 after block 1008.

In block 1014, referring to FIG. 2, the optical flow hardware 102 uses the decision logic 128 to determine the penalty maps PM1 and PM2 for the input image 108. The decision logic 128 forwards the penalty maps PM1 and PM2 to the SGM process 132 and/or stores the penalty maps PM1 and PM2 in the memory 116 (see FIG. 1) at a location accessible by the SGM process 132.

In block 1016 (see FIG. 10), the optical flow hardware 102 performs the SGM process 132, which obtains the reference image 106, obtains the set 210 (see FIGS. 2 and 7) of image regions in the input image 108, selects the set 710 (see FIGS. 7 and 9) of image regions in the reference image 106, and uses the penalty maps PM1 and PM2 to determine the optical flow map 110. The optical flow map 110 includes a metric for each of the image regions in the set 710 indicating a direction of motion and a magnitude of motion that occurred at the image region from the reference image 106 to the input image 108. Then, the method 1000 terminates.

Inference and Training Logic

Figure 11A:
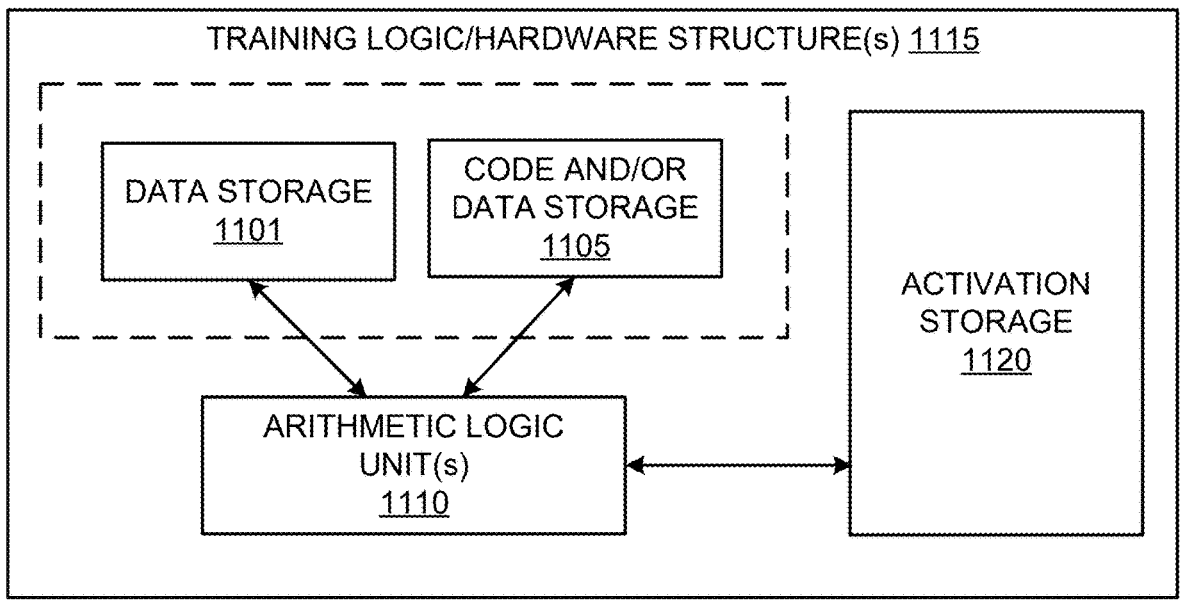
FIG. 11A illustrates inference and/or training logic, according to at least one embodiment.

FIG. 11A illustrates inference and/or training logic 1115 used to perform inferencing and/or training operations associated with one or more embodiments. Details regarding inference and/or training logic 1115 are provided below in conjunction with FIGS. 11A and/or 11B.

In at least one embodiment, inference and/or training logic 1115 may include, without limitation, code and/or data storage 1101 to store forward and/or output weight and/or input/output data, and/or other parameters to configure neurons or layers of a neural network trained and/or used for inferencing in aspects of one or more embodiments. In at least one embodiment, training logic 1115 may include, or be coupled to code and/or data storage 1101 to store graph code or other software to control timing and/or order, in which weight and/or other parameter information is to be loaded to configure, logic, including integer and/or floating-point units (collectively, arithmetic logic units (ALUs). In at least one embodiment, code, such as graph code, loads weight or other parameter information into processor ALUs based on an architecture of a neural network to which such code corresponds. In at least one embodiment, code and/or data storage 1101 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 1101 may be included with other on-chip or off-chip data storage, including a processor's L1, L2, or L3 cache or system memory.

In at least one embodiment, any portion of code and/or data storage 1101 may be internal or external to one or more processors or other hardware logic devices or circuits. In at least one embodiment, code and/or code and/or data storage 1101 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 1101 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 1115 may include, without limitation, a code and/or data storage 1105 to store backward and/or output weight and/or input/output data corresponding to neurons or layers of a neural network trained and/or used for inferencing in aspects of one or more embodiments. In at least one embodiment, code and/or data storage 1105 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 1115 may include, or be coupled to code and/or data storage 1105 to store graph code or other software to control timing and/or order, in which weight and/or other parameter information is to be loaded to configure, logic, including integer and/or floating-point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any portion of code and/or data storage 1105 may be included with other on-chip or off-chip data storage, including a processor's L1, L2, or L3 cache or system memory. In at least one embodiment, any portion of code and/or data storage 1105 may be internal or external to one or more processors or other hardware logic devices or circuits. In at least one embodiment, code and/or data storage 1105 may be cache memory, DRAM, SRAM, non-volatile memory (e.g., flash memory), or other storage. In at least one embodiment, a choice of whether code and/or data storage 1105 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 1101 and code and/or data storage 1105 may be separate storage structures. In at least one embodiment, code and/or data storage 1101 and code and/or data storage 1105 may be a combined storage structure. In at least one embodiment, code and/or data storage 1101 and code and/or data storage 1105 may be partially combined and partially separate. In at least one embodiment, any portion of code and/or data storage 1101 and code and/or data storage 1105 may be included with other on-chip or off-chip data storage, including a processor's L1, L2, or L3 cache or system memory.

In at least one embodiment, inference and/or training logic 1115 may include, without limitation, one or more arithmetic logic unit(s) ("ALU(s)") 1110, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 1120 that are functions of input/output and/or weight parameter data stored in code and/or data storage 1101 and/or code and/or data storage 1105. In at least one embodiment, activations stored in activation storage 1120 are generated according to linear algebraic and or matrix-based mathematics performed by ALU(s) 1110 in response to performing instructions or other code, wherein weight values stored in code and/or data storage 1105 and/or data storage 1101 are used as operands along with other values, such as bias values, gradient information, momentum values, or other parameters or hyperparameters, any or all of which may be stored in code and/or data storage 1105 or code and/or data storage 1101 or another storage on or off-chip.

In at least one embodiment, ALU(s) 1110 are included within one or more processors or other hardware logic devices or circuits, whereas in another embodiment, ALU(s) 1110 may be external to a processor or other hardware logic device or circuit that uses them (e.g., a co-processor). In at least one embodiment, ALUs 1110 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 1101, code and/or data storage 1105, and activation storage 1120 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 1120 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 1120 may be cache memory, DRAM, SRAM, non-volatile memory (e.g., flash memory), or other storage. In at least one embodiment, activation storage 1120 may be completely or partially within or external to one or more processors or other logical circuits. In at least one embodiment, a choice of whether activation storage 1120 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 1115 illustrated in FIG. 11A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 1115 illustrated in FIG. 11A may be used in conjunction with central processing unit ("CPU") hardware, graphics processing unit ("GPU") hardware or other hardware, such as field programmable gate arrays ("FPGAs").

Figure 11B:
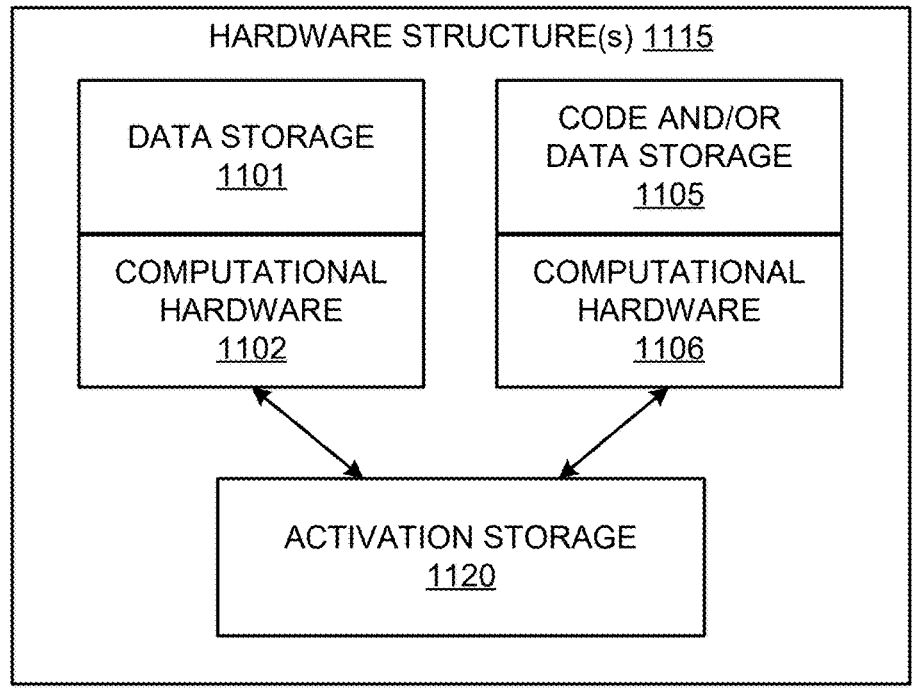
FIG. 11B illustrates inference and/or training logic, according to at least one embodiment.

FIG. 11B illustrates inference and/or training logic 1115, according to at least one embodiment. In at least one embodiment, inference and/or training logic 1115 may include, without limitation, hardware logic in which computational resources are dedicated or otherwise exclusively used in conjunction with weight values or other information corresponding to one or more layers of neurons within a neural network. In at least one embodiment, inference and/or training logic 1115 illustrated in FIG. 11B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 1115 illustrated in FIG. 11B may be used in conjunction with central processing unit (CPU) hardware, graphics processing unit (GPU) hardware or other hardware, such as field programmable gate arrays (FPGAs). In at least one embodiment, inference and/or training logic 1115 includes, without limitation, code and/or data storage 1101 and code and/or data storage 1105, which may be used to store code (e.g., graph code), weight values and/or other information, including bias values, gradient information, momentum values, and/or other parameter or hyperparameter information. In at least one embodiment illustrated in FIG. 11B, each of code and/or data storage 1101 and code and/or data storage 1105 is associated with a dedicated computational resource, such as computational hardware 1102 and computational hardware 1106, respectively. In at least one embodiment, each of computational hardware 1102 and computational hardware 1106 comprises one or more ALUs that perform mathematical functions, such as linear algebraic functions, only on information stored in code and/or data storage 1101 and code and/or data storage 1105, respectively, result of which is stored in activation storage 1120.

In at least one embodiment, each of code and/or data storage 1101 and 1105 and corresponding computational hardware 1102 and 1106, respectively, correspond to different layers of a neural network, such that resulting activation from one storage/computational pair 1101/1102 of code and/or data storage 1101 and computational hardware 1102 is provided as an input to a next storage/computational pair 1105/1106 of code and/or data storage 1105 and computational hardware 1106, in order to mirror a conceptual organization of a neural network. In at least one embodiment, each of storage/computational pairs 1101/1102 and 1105/1106 may correspond to more than one neural network layer. In at least one embodiment, additional storage/computation pairs (not shown) subsequent to or in parallel with storage/computation pairs 1101/1102 and 1105/1106 may be included in inference and/or training logic 1115.

The system 100 (see FIG. 1) may be implemented by at least a portion of the inference and/or training logic 1115. For example, the computational hardware 1102 and/or the computational hardware 1106 may implement the upstream hardware 104 (see FIG. 1), the optical flow hardware 102 (see FIG. 1), and/or the downstream hardware 112 (see FIG. 1). By way of another non-limiting example, the code and/or data storage 1105 may implement the memory 116 (see FIG. 1). Referring to FIG. 1, the inference and/or training logic 1115 (see FIG. 11) may perform inferencing and/or training operations with respect to any of the denoise process 120, the edge detection process 122, the object detection process 124, the optional thresholding process 126, the decision logic 128, the extraction process 130, and the SGM process 132.

Neural Network Training and Deployment

Figure 12:
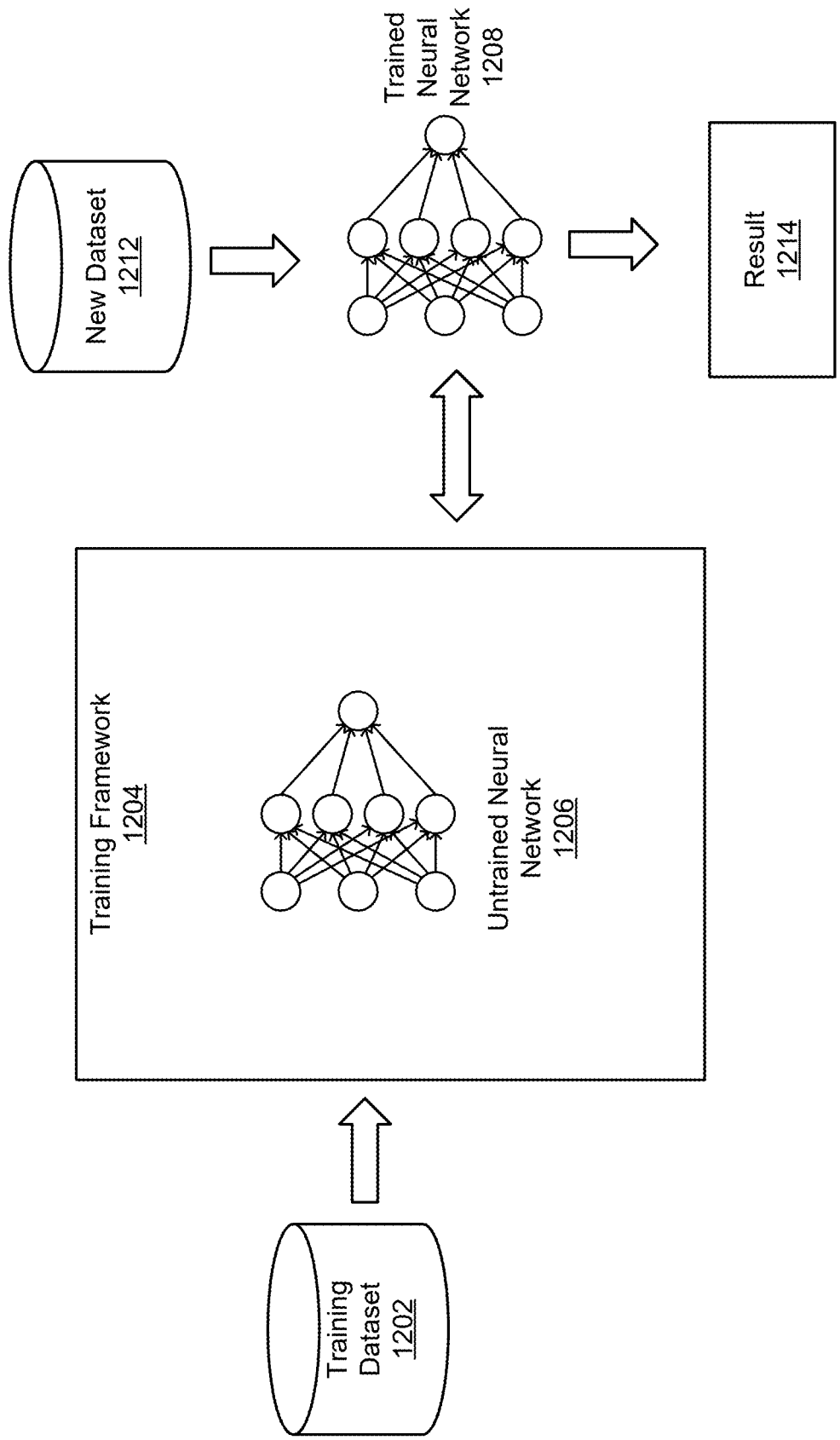
FIG. 12 illustrates training and deployment of a neural network, according to at least one embodiment.

FIG. 12 illustrates training and deployment of a deep neural network, according to at least one embodiment. In at least one embodiment, untrained neural network 1206 is trained using a training dataset 1202. In at least one embodiment, training framework 1204 is a PyTorch framework, whereas in other embodiments, training framework 1204 is a TensorFlow, Boost, Caffe, Microsoft Cognitive Toolkit/CNTK, MXNet, Chainer, Keras, Deeplearning4j, or other training framework. In at least one embodiment, training framework 1204 trains an untrained neural network 1206 and enables it to be trained using processing resources described herein to generate a trained neural network 1208. In at least one embodiment, weights may be chosen randomly or by pre-training using a deep belief network. In at least one embodiment, training may be performed in either a supervised, partially supervised, or unsupervised manner.

In at least one embodiment, untrained neural network 1206 is trained using supervised learning, wherein training dataset 1202 includes an input paired with a desired output for an input, or where training dataset 1202 includes input having a known output and an output of neural network 1206 is manually graded. In at least one embodiment, untrained neural network 1206 is trained in a supervised manner and processes inputs from training dataset 1202 and compares resulting outputs against a set of expected or desired outputs. In at least one embodiment, errors are then propagated back through untrained neural network 1206. In at least one embodiment, training framework 1204 adjusts weights that control untrained neural network 1206. In at least one embodiment, training framework 1204 includes tools to monitor how well untrained neural network 1206 is converging towards a model, such as trained neural network 1208, suitable to generating correct answers, such as in result 1214, based on input data such as a new dataset 1212. In at least one embodiment, training framework 1204 trains untrained neural network 1206 repeatedly while adjust weights to refine an output of untrained neural network 1206 using a loss function and adjustment algorithm, such as stochastic gradient descent. In at least one embodiment, training framework 1204 trains untrained neural network 1206 until untrained neural network 1206 achieves a desired accuracy. In at least one embodiment, trained neural network 1208 can then be deployed to implement any number of machine learning operations.

In at least one embodiment, untrained neural network 1206 is trained using unsupervised learning, wherein untrained neural network 1206 attempts to train itself using unlabeled data. In at least one embodiment, unsupervised learning training dataset 1202 will include input data without any associated output data or "ground truth" data. In at least one embodiment, untrained neural network 1206 can learn groupings within training dataset 1202 and can determine how individual inputs are related to untrained dataset 1202. In at least one embodiment, unsupervised training can be used to generate a self-organizing map in trained neural network 1208 capable of performing operations useful in reducing dimensionality of new dataset 1212. In at least one embodiment, unsupervised training can also be used to perform anomaly detection, which allows identification of data points in new dataset 1212 that deviate from normal patterns of new dataset 1212.

In at least one embodiment, semi-supervised learning may be used, which is a technique in which in training dataset 1202 includes a mix of labeled and unlabeled data. In at least one embodiment, training framework 1204 may be used to perform incremental learning, such as through transferred learning techniques. In at least one embodiment, incremental learning enables trained neural network 1208 to adapt to new dataset 1212 without forgetting knowledge instilled within trained neural network 1208 during initial training.

The training and deployment of a deep neural network illustrated in FIG. 12 may be used to train and/or deploy one or more deep neural networks used by or incorporated into any of the denoise process 120, the edge detection process 122, the object detection process 124, the optional thresholding process 126, the decision logic 128, the extraction process 130, and the SGM process 132. Further, the optical flow map 110 or data derived at least in part from the optical flow map 110 may be used as an input into the deep neural network illustrated in FIG. 12.

Data Center

Figure 13:
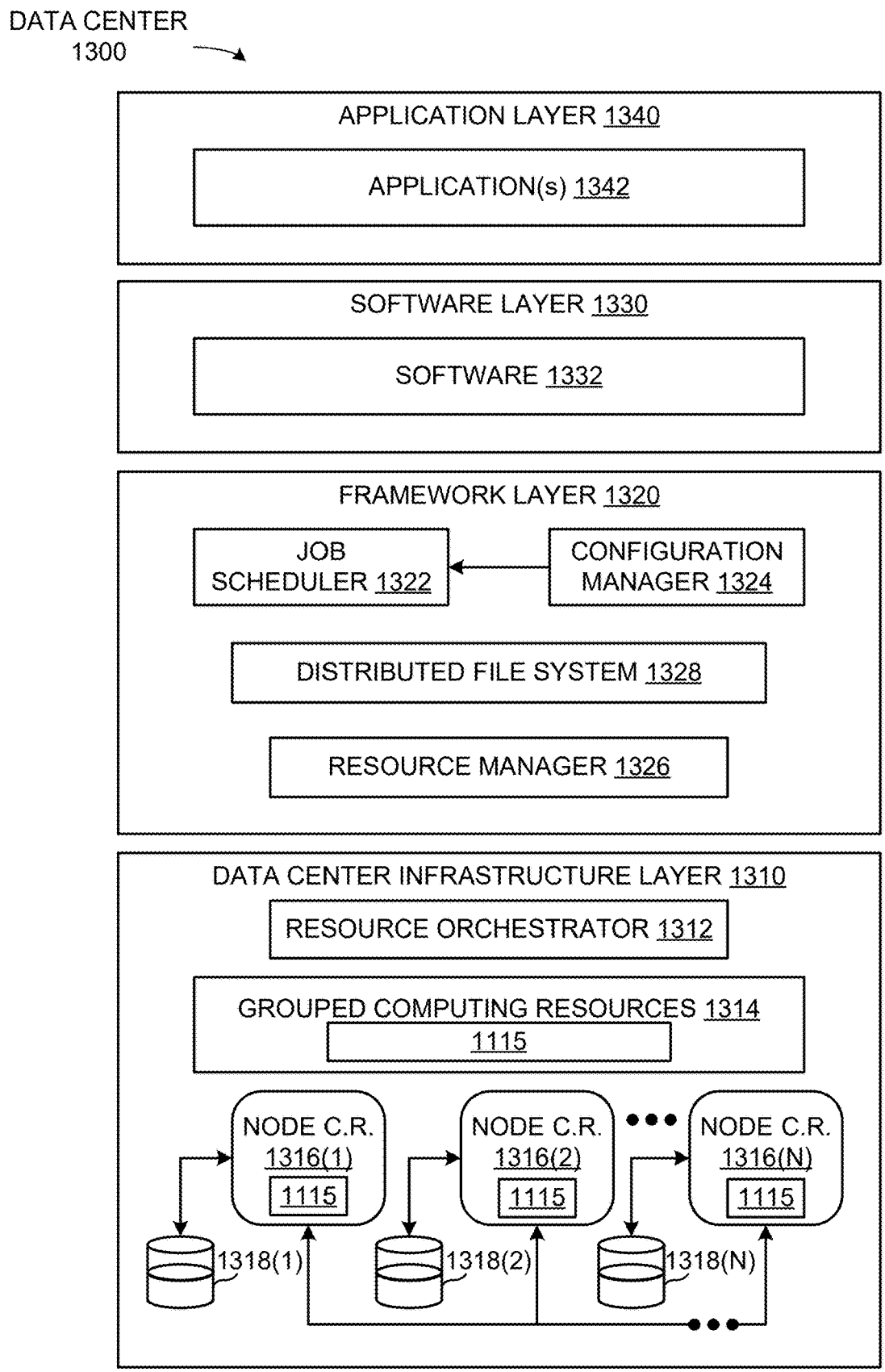
FIG. 13 illustrates an example data center system, according to at least one embodiment.

FIG. 13 illustrates an example data center 1300, in which at least one embodiment may be used. In at least one embodiment, data center 1300 includes a data center infrastructure layer 1310, a framework layer 1320, a software layer 1330 and an application layer 1340.

In at least one embodiment, as shown in FIG. 13, data center infrastructure layer 1310 may include a resource orchestrator 1312, grouped computing resources 1314, and node computing resources ("node C.R.s") 1316(1)-1316(N), where "N" represents a positive integer (which may be a different integer "N" than used in other figures). In at least one embodiment, node C.R.s 1316(1)-1316(N) may include, but are not limited to, any number of central processing units ("CPUs") or other processors (including accelerators, field programmable gate arrays (FPGAs), graphics processors, etc.), memory storage devices 1318(1)-1318(N) (e.g., dynamic read-only memory, solid state storage or disk drives), network input/output ("NW I/O") devices, network switches, virtual machines ("VMs"), power modules, and cooling modules, etc. In at least one embodiment, one or more node C.R.s from among node C.R.s 1316(1)-1316(N) may be a server having one or more of above-mentioned computing resources.

In at least one embodiment, grouped computing resources 1314 may include separate groupings of node C.R.s housed within one or more racks (not shown), or many racks housed in data centers at various geographical locations (also not shown). In at least one embodiment, separate groupings of node C.R.s within grouped computing resources 1314 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1312 may configure or otherwise control one or more node C.R.s 1316(1)-1316(N) and/or grouped computing resources 1314. In at least one embodiment, resource orchestrator 1312 may include a software design infrastructure ("SDI") management entity for data center 1300. In at least one embodiment, resource orchestrator 1112 may include hardware, software or some combination thereof.

In at least one embodiment, as shown in FIG. 13, framework layer 1320 includes a job scheduler 1322, a configuration manager 1324, a resource manager 1326 and a distributed file system 1328. In at least one embodiment, framework layer 1320 may include a framework to support software 1332 of software layer 1330 and/or one or more application(s) 1342 of application layer 1340. In at least one embodiment, software 1332 or application(s) 1342 may respectively include web-based service software or applications, such as those provided by Amazon Web Services, Google Cloud and Microsoft Azure. In at least one embodiment, framework layer 1320 may be, but is not limited to, a type of free and open-source software web application framework such as Apache Spark™ (hereinafter "Spark") that may utilize distributed file system 1328 for large-scale data processing (e.g., "big data"). In at least one embodiment, job scheduler 1322 may include a Spark driver to facilitate scheduling of workloads supported by various layers of data center 1300. In at least one embodiment, configuration manager 1324 may be capable of configuring different layers such as software layer 1330 and framework layer 1320 including Spark and distributed file system 1328 for supporting large-scale data processing. In at least one embodiment, resource manager 1326 may be capable of managing clustered or grouped computing resources mapped to or allocated for support of distributed file system 1328 and job scheduler 1322. In at least one embodiment, clustered or grouped computing resources may include grouped computing resources 1314 at data center infrastructure layer 1310. In at least one embodiment, resource manager 1326 may coordinate with resource orchestrator 1312 to manage these mapped or allocated computing resources.

In at least one embodiment, software 1332 included in software layer 1330 may include software used by at least portions of node C.R.s 1316(1)-1316(N), grouped computing resources 1314, and/or distributed file system 1328 of framework layer 1320. In at least one embodiment, one or more types of software may include, but are not limited to, Internet web page search software, e-mail virus scan software, database software, and streaming video content software.

In at least one embodiment, application(s) 1342 included in application layer 1340 may include one or more types of applications used by at least portions of node C.R.s 1316(1)-1316(N), grouped computing resources 1314, and/or distributed file system 1328 of framework layer 1320. In at least one embodiment, one or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1324, resource manager 1326, and resource orchestrator 1312 may implement any number and type of self-modifying actions based on any amount and type of data acquired in any technically feasible fashion. In at least one embodiment, self-modifying actions may relieve a data center operator of data center 1300 from making possibly bad configuration decisions and possibly avoiding underutilized and/or poor performing portions of a data center.

In at least one embodiment, data center 1300 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1300. In at least one embodiment, trained machine learning models corresponding to one or more neural networks may be used to infer or predict information using resources described above with respect to data center 1300 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in system FIG. 13 for inferencing or predicting operations based, at least in part, on weight parameters calculated using neural network training operations, neural network functions and/or architectures, or neural network use cases described herein.

In at least one embodiment, the system 100 (see FIG. 1) may be implemented by the data center 1300. For example, the instructions 118 may be executed by one or more of the grouped computing resources 814 and/or one or more of the C.R.s 816(1)-816(N) and used to obtain the optical flow map 110 (see FIGS. 1 and 2). As mentioned above, the system 100 (see FIG. 1) may be implemented by at least a portion of the inference and/or training logic 1115. Referring to FIG. 1, the data center 1300 (see FIG. 13) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

Supercomputing

The following figures set forth, without limitation, exemplary supercomputer-based systems that can be used to implement at least one embodiment.

In at least one embodiment, a supercomputer may refer to a hardware system exhibiting substantial parallelism and comprising at least one chip, where chips in a system are interconnected by a network and are placed in hierarchically organized enclosures. In at least one embodiment, a large hardware system filling a machine room, with several racks, each containing several boards/rack modules, each containing several chips, all interconnected by a scalable network, is one particular example of a supercomputer. In at least one embodiment, a single rack of such a large hardware system is another example of a supercomputer. In at least one embodiment, a single chip exhibiting substantial parallelism and containing several hardware components can equally be considered to be a supercomputer, since as feature sizes may decrease, an amount of hardware that can be incorporated in a single chip may also increase.

Figure 14A:
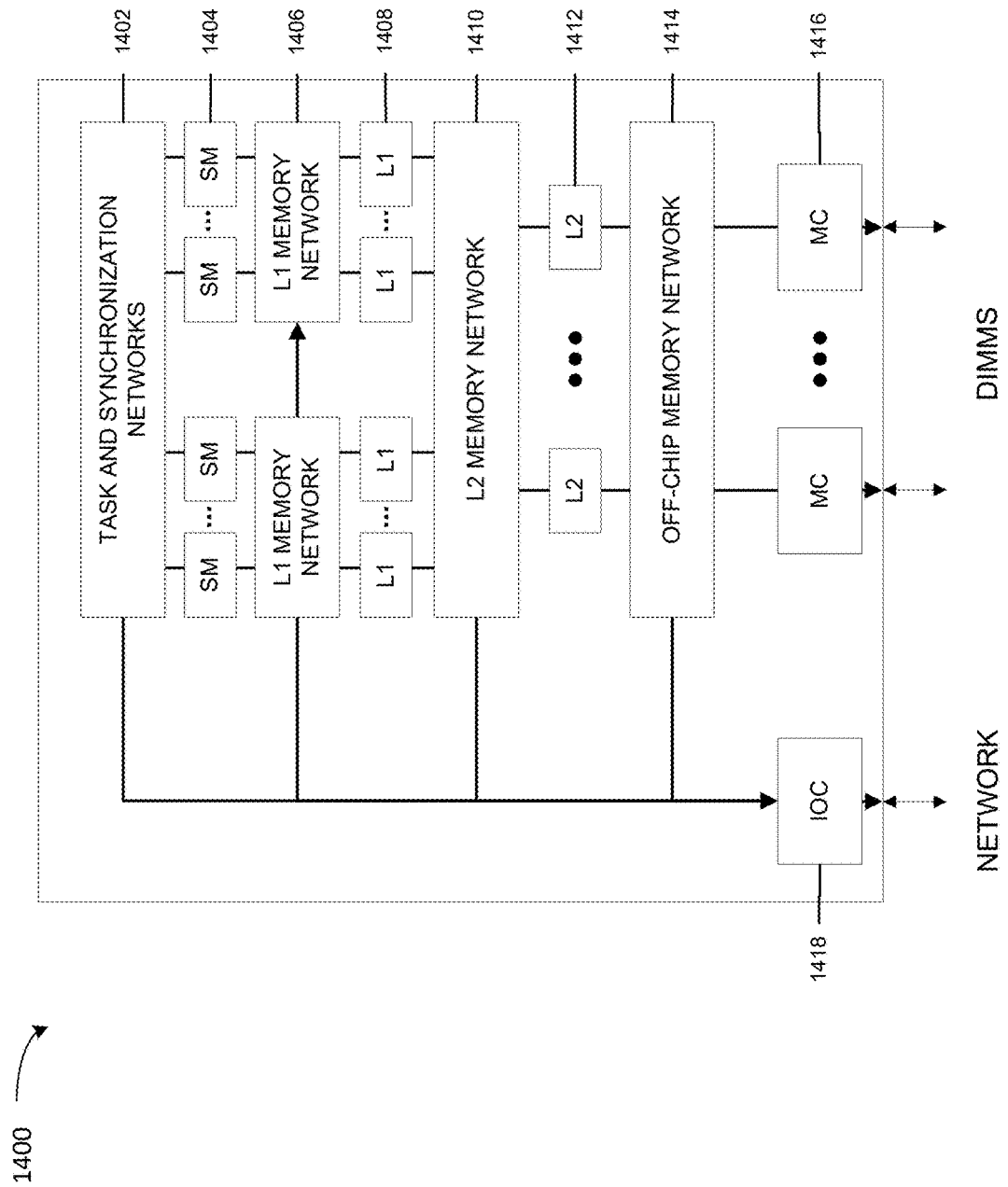
FIG. 14A illustrates a supercomputer at a chip level, in accordance with at least one embodiment.

FIG. 14A illustrates a supercomputer 1400 at a chip level, in accordance with at least one embodiment. In at least one embodiment, inside an FPGA or ASIC chip, main computation is performed within finite state machines (1404) called thread units. In at least one embodiment, task and synchronization networks (1402) connect finite state machines and are used to dispatch threads and execute operations in correct order. In at least one embodiment, a multi-level partitioned on-chip cache hierarchy (1408, 1412) is accessed using memory networks (1406, 1410). In at least one embodiment, off-chip memory is accessed using memory controllers (1416) and an off-chip memory network (1414). In at least one embodiment, I/O controller (1418) is used for cross-chip communication when a design does not fit in a single logic chip.

Figure 14B:
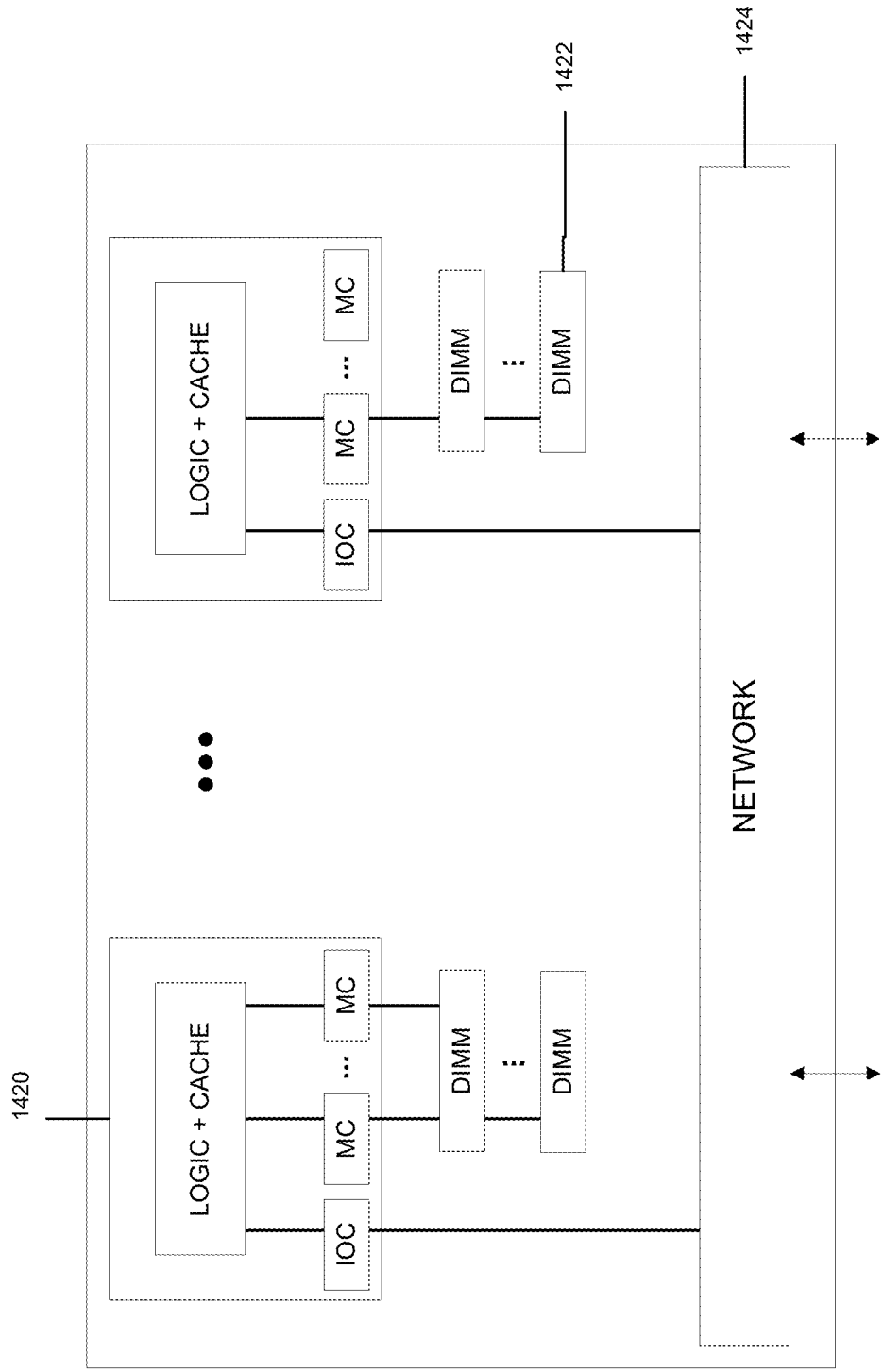
FIG. 14B illustrates a supercomputer at a rack module level, in accordance with at least one embodiment.

FIG. 14B illustrates a supercomputer at a rock module level, in accordance with at least one embodiment. In at least one embodiment, within a rack module, there are multiple FPGA or ASIC chips (1420) that are connected to one or more DRAM units (1422) which constitute main accelerator memory. In at least one embodiment, each FPGA/ASIC chip is connected to its neighbor FPGA/ASIC chip using wide busses on a board, with differential high speed signaling (1424). In at least one embodiment, each FPGA/ASIC chip is also connected to at least one high-speed serial communication cable.

Figure 14C:
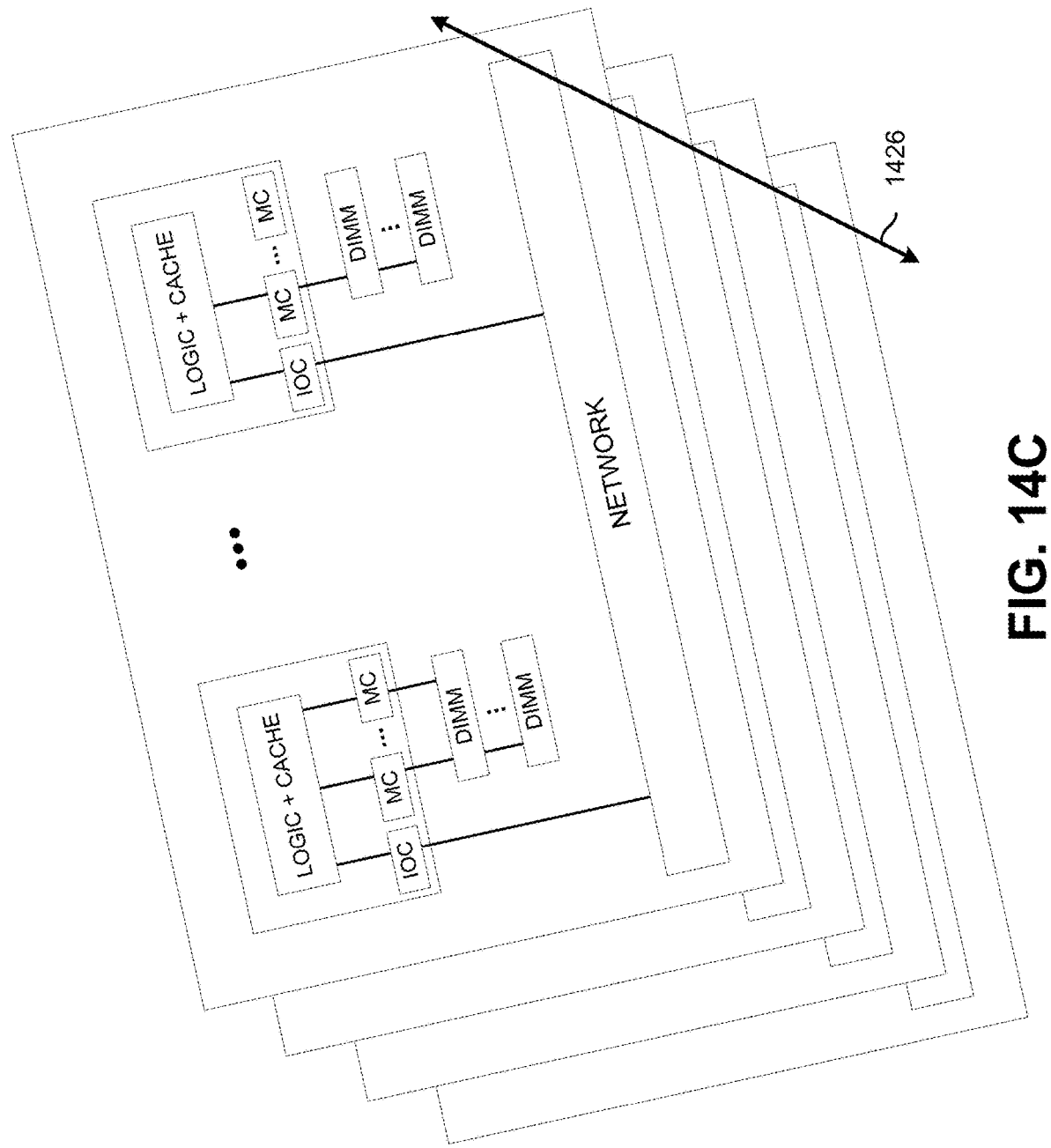
FIG. 14C illustrates a supercomputer at a rack level, in accordance with at least one embodiment.
Figure 14D:
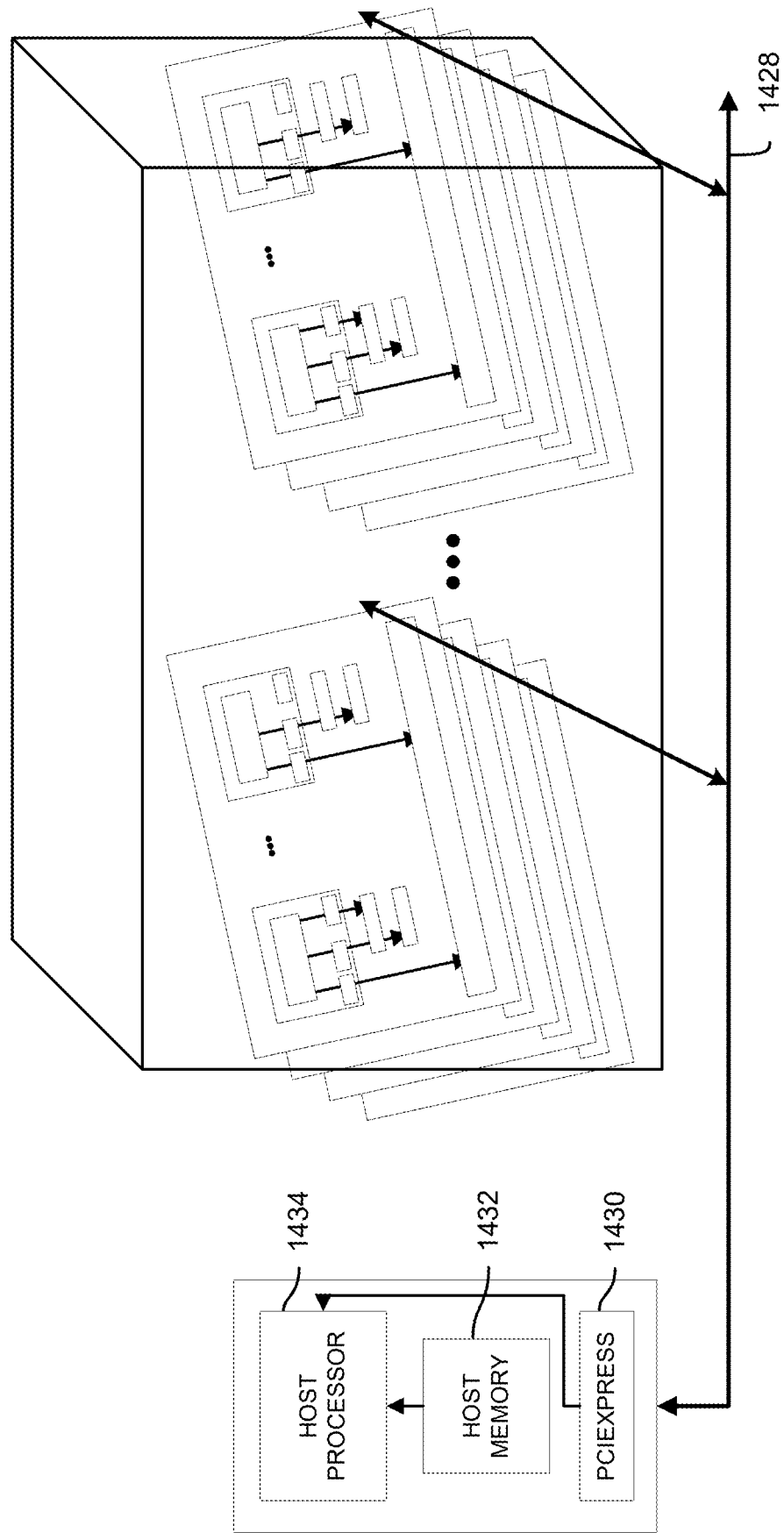
FIG. 14D illustrates a supercomputer at a whole system level, in accordance with at least one embodiment

FIG. 14C illustrates a supercomputer at a rack level, in accordance with at least one embodiment. FIG. 14D illustrates a supercomputer at a whole system level, in accordance with at least one embodiment. In at least one embodiment, referring to FIG. 14C and FIG. 14D, between rack modules in a rack and across racks throughout an entire system, high-speed serial optical or copper cables (1426, 1428) are used to realize a scalable, possibly incomplete hypercube network. In at least one embodiment, one of FPGA/ASIC chips of an accelerator is connected to a host system through a PCI-Express connection (1430). In at least one embodiment, host system comprises a host microprocessor (1434) that a software part of an application runs on and a memory consisting of one or more host memory DRAM units (1432) that is kept coherent with memory on an accelerator. In at least one embodiment, host system can be a separate module on one of racks, or can be integrated with one of a supercomputer's modules. In at least one embodiment, cube-connected cycles topology provides communication links to create a hypercube network for a large supercomputer. In at least one embodiment, a small group of FPGA/ASIC chips on a rack module can act as a single hypercube node, such that a total number of external links of each group is increased, compared to a single chip. In at least one embodiment, a group contains chips A, B, C and D on a rack module with internal wide differential busses connecting A, B, C and D in a torus organization. In at least one embodiment, there are 12 serial communication cables connecting a rack module to an outside world. In at least one embodiment, chip A on a rack module connects to serial communication cables 0, 1, 2. In at least one embodiment, chip B connects to cables 3, 4, 5. In at least one embodiment, chip C connects to 6, 7, 8. In at least one embodiment, chip D connects to 9, 10, 11. In at least one embodiment, an entire group {A, B, C, D} constituting a rack module can form a hypercube node within a supercomputer system, with up to 2¹²=4096 rack modules (16384 FPGA/ASIC chips). In at least one embodiment, for chip A to send a message out on link 4 of group {A, B, C, D}, a message has to be routed first to chip B with an on-board differential wide bus connection. In at least one embodiment, a message arriving into a group {A, B, C, D} on link 4 (i.e., arriving at B) destined to chip A, also has to be routed first to a correct destination chip (A) internally within a group {A, B, C, D}. In at least one embodiment, parallel supercomputer systems of other sizes may also be implemented.

In at least one embodiment, the system 100 (see FIG. 1) may be implemented at least in part by a supercomputer, such as one or more of the supercomputers illustrated in FIGS. 14A-14D. For example, the instructions 118 (see FIG. 1) may be executed by the supercomputer(s) and used to obtain the optical flow map 110 (see FIGS. 1 and 2). As mentioned above, the system 100 (see FIG. 1) may be implemented by at least a portion of the inference and/or training logic 1115. Referring to FIG. 1, the supercomputer(s) (see FIGS. 14A-14D) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

Computer Systems

Figure 15:
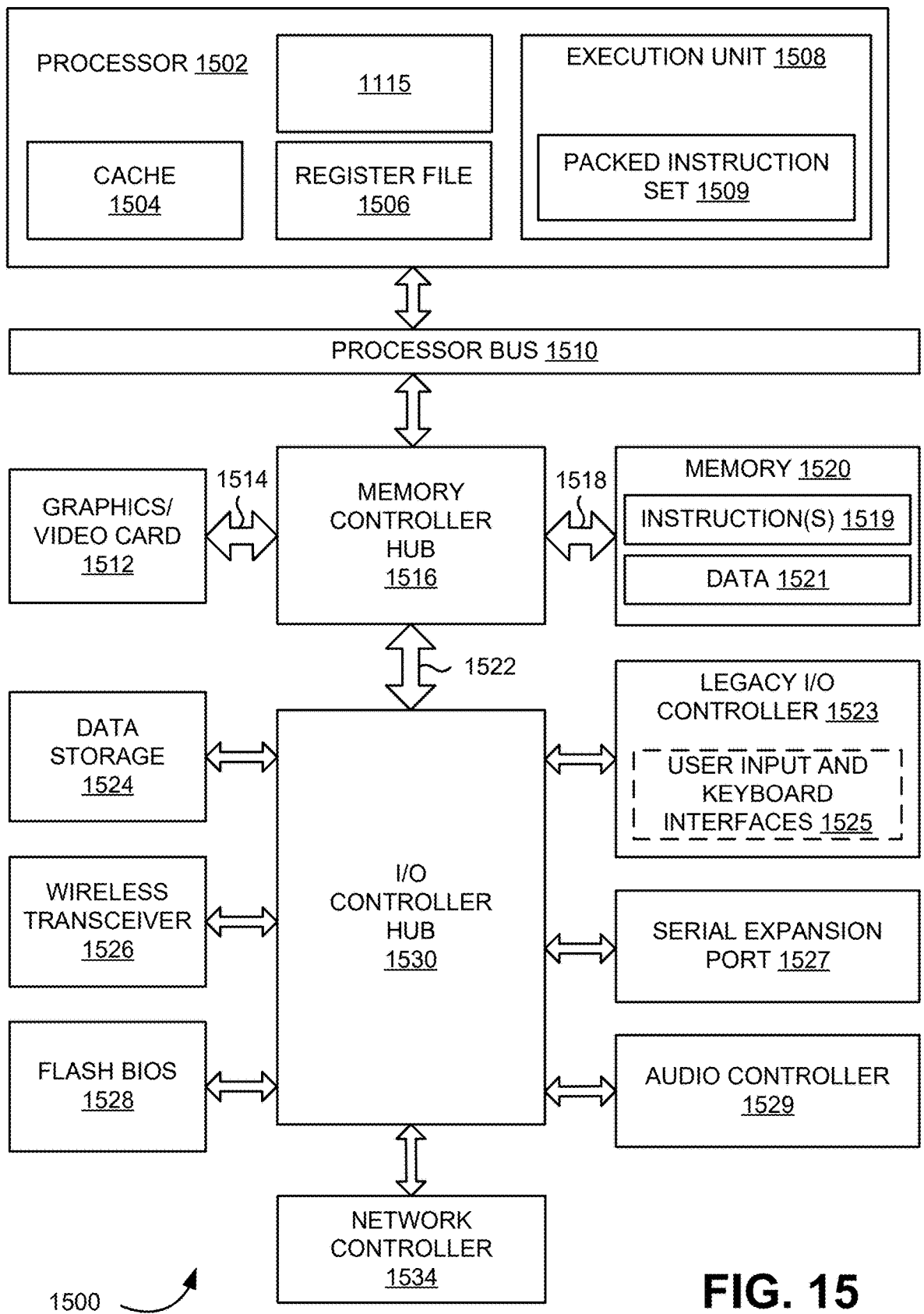
FIG. 15 is a block diagram illustrating a computer system, according to at least one embodiment.

FIG. 15 is a block diagram illustrating an exemplary computer system, which may be a system with interconnected devices and components, a system-on-a-chip (SOC) or some combination thereof formed with a processor that may include execution units to execute an instruction, according to at least one embodiment. In at least one embodiment, a computer system 1500 may include, without limitation, a component, such as a processor 1502 to employ execution units including logic to perform algorithms for process data, in accordance with present disclosure, such as in embodiment described herein. In at least one embodiment, computer system 1500 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1500 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 1500 may include, without limitation, processor 1502 that may include, without limitation, one or more execution units 1508 to perform machine learning model training and/or inferencing according to techniques described herein. In at least one embodiment, computer system 1500 is a single processor desktop or server system, but in another embodiment, computer system 1500 may be a multiprocessor system. In at least one embodiment, processor 1502 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1502 may be coupled to a processor bus 1510 that may transmit data signals between processor 1502 and other components in computer system 1500.

In at least one embodiment, processor 1502 may include, without limitation, a Level 1 ("L1") internal cache memory ("cache") 1504. In at least one embodiment, processor 1502 may have a single internal cache or multiple levels of internal cache. In at least one embodiment, cache memory may reside external to processor 1502. Other embodiments may also include a combination of both internal and external caches depending on particular implementation and needs. In at least one embodiment, a register file 1506 may store different types of data in various registers including, without limitation, integer registers, floating point registers, status registers, and an instruction pointer register.

In at least one embodiment, execution unit 1508, including, without limitation, logic to perform integer and floating point operations, also resides in processor 1502. In at least one embodiment, processor 1502 may also include a microcode ("ucode") read only memory ("ROM") that stores microcode for certain macro instructions. In at least one embodiment, execution unit 1508 may include logic to handle a packed instruction set 1509. In at least one embodiment, by including packed instruction set 1509 in an instruction set of a general-purpose processor, along with associated circuitry to execute instructions, operations used by many multimedia applications may be performed using packed data in processor 1502. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 1508 may also be used in microcontrollers, embedded processors, graphics devices, DSPs, and other types of logic circuits. In at least one embodiment, computer system 1500 may include, without limitation, a memory 1520. In at least one embodiment, memory 1520 may be a Dynamic Random Access Memory ("DRAM") device, a Static Random Access Memory ("SRAM") device, a flash memory device, or another memory device. In at least one embodiment, memory 1520 may store instruction(s) 1519 and/or data 1521 represented by data signals that may be executed by processor 1502.

In at least one embodiment, a system logic chip may be coupled to processor bus 1510 and memory 1520. In at least one embodiment, a system logic chip may include, without limitation, a memory controller hub ("MCH") 1516, and processor 1502 may communicate with MCH 1516 via processor bus 1510. In at least one embodiment, MCH 1516 may provide a high bandwidth memory path 1518 to memory 1520 for instruction and data storage and for storage of graphics commands, data and textures. In at least one embodiment, MCH 1516 may direct data signals between processor 1502, memory 1520, and other components in computer system 1500 and to bridge data signals between processor bus 1510, memory 1520, and a system I/O interface 1522. In at least one embodiment, a system logic chip may provide a graphics port for coupling to a graphics controller. In at least one embodiment, MCH 1516 may be coupled to memory 1520 through high bandwidth memory path 1518 and a graphics/video card 1512 may be coupled to MCH 1516 through an Accelerated Graphics Port ("AGP") interconnect 1514.

In at least one embodiment, computer system 1500 may use system I/O interface 1522 as a proprietary hub interface bus to couple MCH 1516 to an I/O controller hub ("ICH") 1530. In at least one embodiment, ICH 1530 may provide direct connections to some I/O devices via a local I/O bus. In at least one embodiment, a local I/O bus may include, without limitation, a high-speed I/O bus for connecting peripherals to memory 1520, a chipset, and processor 1502. Examples may include, without limitation, an audio controller 1529, a firmware hub ("flash BIOS") 1528, a wireless transceiver 1526, a data storage 1524, a legacy I/O controller 1523 containing user input and keyboard interfaces 1525, a serial expansion port 1527, such as a Universal Serial Bus ("USB") port, and a network controller 1534. In at least one embodiment, data storage 1524 may comprise a hard disk drive, a floppy disk drive, a CD-ROM device, a flash memory device, or other mass storage device.

In at least one embodiment, FIG. 15 illustrates a system, which includes interconnected hardware devices or "chips", whereas in other embodiments, FIG. 15 may illustrate an exemplary SoC. In at least one embodiment, devices illustrated in FIG. 15 may be interconnected with proprietary interconnects, standardized interconnects (e.g., PCIe) or some combination thereof. In at least one embodiment, one or more components of computer system 1500 are interconnected using compute express link (CXL) interconnects.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in system FIG. 15 for inferencing or predicting operations based, at least in part, on weight parameters calculated using neural network training operations, neural network functions and/or architectures, or neural network use cases described herein.

In at least one embodiment, the system 100 (see FIG. 1) may be implemented at least in part by the computer system 1500. For example, the processor(s) 114 may be implemented by the processor 1502 and/or the graphics/video card 1512, the interface(s) 115 may be implemented at least in part by the network controller 1534, the memory 116 may be implemented by the memory 1520, and the bus(es) 117 may be implemented at least in part by the processor bus 1510 and/or the AGP interconnect 1514. By way of another non-limiting example, the instructions 118 (see FIG. 1) may be stored by the memory 1520, executed by the processor 1502 and/or the graphics/video card 1512, and used to obtain the optical flow map 110 (see FIGS. 1 and 2). As mentioned above, the system 100 (see FIG. 1) may be implemented by at least a portion of the inference and/or training logic 1115. Referring to FIG. 1, the computer system 1500 (see FIG. 15) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

Figure 16:
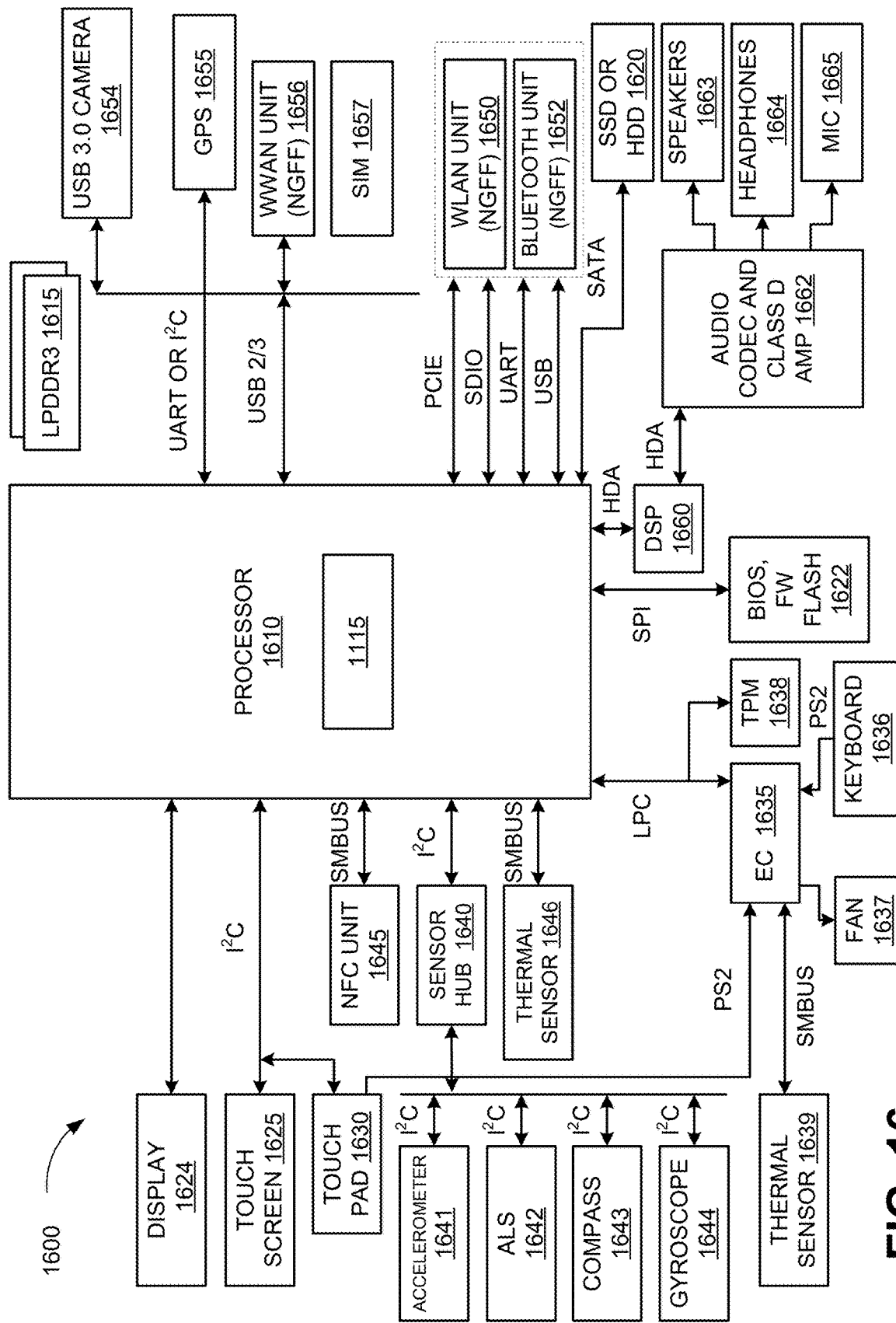
FIG. 16 is a block diagram illustrating a computer system, according to at least one embodiment.

FIG. 16 is a block diagram illustrating an electronic device 1600 for utilizing a processor 1610, according to at least one embodiment. In at least one embodiment, electronic device 1600 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 1600 may include, without limitation, processor 1610 communicatively coupled to any suitable number or kind of components, peripherals, modules, or devices. In at least one embodiment, processor 1610 is coupled using a bus or interface, such as a $I^2C$ bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3, etc.), or a Universal Asynchronous Receiver/Transmitter ("UART") bus. In at least one embodiment, FIG. 16 illustrates a system, which includes interconnected hardware devices or "chips", whereas in other embodiments, FIG. 16 may illustrate an exemplary SoC. In at least one embodiment, devices illustrated in FIG. 16 may be interconnected with proprietary interconnects, standardized interconnects (e.g., PCIe) or some combination thereof. In at least one embodiment, one or more components of FIG. 16 are interconnected using compute express link (CXL) interconnects.

In at least one embodiment, FIG. 16 may include a display 1624, a touch screen 1625, a touch pad 1630, a Near Field Communications unit ("NFC") 1645, a sensor hub 1640, a thermal sensor 1646, an Express Chipset ("EC") 1635, a Trusted Platform Module ("TPM") 1638, BIOS/firmware/flash memory ("BIOS, FW Flash") 1622, a DSP 1660, a drive 1620 such as a Solid State Disk ("SSD") or a Hard Disk Drive ("HDD"), a wireless local area network unit ("WLAN") 1650, a Bluetooth unit 1652, a Wireless Wide Area Network unit ("WWAN") 1656, a Global Positioning System (GPS) unit 1655, a camera ("USB 3.0 camera") 1654 such as a USB 3.0 camera, and/or a Low Power Double Data Rate ("LPDDR") memory unit ("LPDDR3") 1615 implemented in, for example, an LPDDR3 standard. These components may each be implemented in any suitable manner.

In at least one embodiment, other components may be communicatively coupled to processor 1610 through components described herein. In at least one embodiment, an accelerometer 1641, an ambient light sensor ("ALS") 1642, a compass 1643, and a gyroscope 1644 may be communicatively coupled to sensor hub 1640. In at least one embodiment, a thermal sensor 1639, a fan 1637, a keyboard 1636, and touch pad 1630 may be communicatively coupled to EC 1635. In at least one embodiment, speakers 1663, headphones 1664, and a microphone ("mic") 1665 may be communicatively coupled to an audio unit ("audio codec and class D amp") 1662, which may in turn be communicatively coupled to DSP 1660. In at least one embodiment, audio unit 1662 may include, for example and without limitation, an audio coder/decoder ("codec") and a class D amplifier. In at least one embodiment, a SIM card ("SIM") 1657 may be communicatively coupled to WWAN unit 1656. In at least one embodiment, components such as WLAN unit 1650 and Bluetooth unit 1652, as well as WWAN unit 1656 may be implemented in a Next Generation Form Factor ("NGFF").

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in system FIG. 16 for inferencing or predicting operations based, at least in part, on weight parameters calculated using neural network training operations, neural network functions and/or architectures, or neural network use cases described herein.

In at least one embodiment, the system 100 (see FIG. 1) may be implemented at least in part by the electronic device 1600. For example, the processor(s) 114 may be implemented by the processor 1610 and the upstream hardware 104 may be implemented by the camera 1654. By way of another non-limiting example, the instructions 118 (see FIG. 1) may be executed by the processor 1610 to obtain the optical flow map 110 (see FIGS. 1 and 2) from images captured by the camera 1654. As mentioned above, the system 100 (see FIG. 1) may be implemented by at least a portion of the inference and/or training logic 1115. Referring to FIG. 1, the electronic device 1600 (see FIG. 16) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

Figure 17:
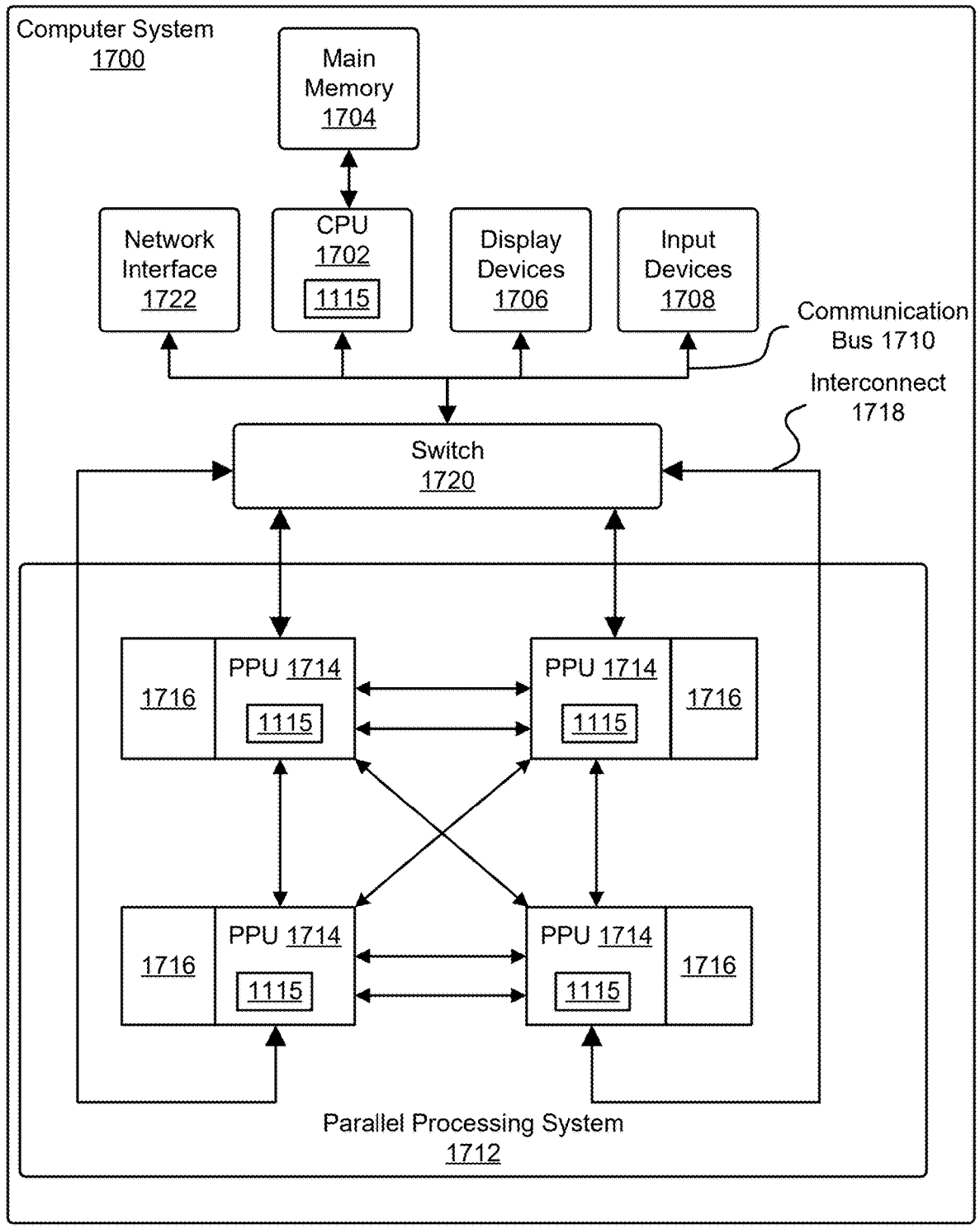
FIG. 17 illustrates a computer system, according to at least one embodiment.

FIG. 17 illustrates a computer system 1700, according to at least one embodiment. In at least one embodiment, computer system 1700 is configured to implement various processes and methods described throughout this disclosure.

In at least one embodiment, computer system 1700 comprises, without limitation, at least one central processing unit ("CPU") 1702 that is connected to a communication bus 1710 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 1700 includes, without limitation, a main memory 1704 and control logic (e.g., implemented as hardware, software, or a combination thereof) and data are stored in main memory 1704, which may take form of random access memory ("RAM"). In at least one embodiment, a network interface subsystem ("network interface") 1722 provides an interface to other computing devices and networks for receiving data from and transmitting data to other systems with computer system 1700.

In at least one embodiment, computer system 1700, in at least one embodiment, includes, without limitation, input devices 1708, a parallel processing system 1712, and display devices 1706 that can be implemented using a conventional cathode ray tube ("CRT"), a liquid crystal display ("LCD"), a light emitting diode ("LED") display, a plasma display, or other suitable display technologies. In at least one embodiment, user input is received from input devices 1708 such as keyboard, mouse, touchpad, microphone, etc. In at least one embodiment, each module described herein can be situated on a single semiconductor platform to form a processing system.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in system FIG. 17 for inferencing or predicting operations based, at least in part, on weight parameters calculated using neural network training operations, neural network functions and/or architectures, or neural network use cases described herein.

In at least one embodiment, the system 100 (see FIG. 1) may be implemented at least in part by the computer system 1700. For example, the processor(s) 114 may be implemented by the CPU 1702 and/or one or more of the PPUs 1714, the interface(s) 115 may be implemented at least in part by the network interface 1722, the memory 116 may be implemented at least in part by the main memory 1704, and the bus(es) 117 may be implemented at least in part by the communication bus 1710, the interconnect 1718, and/or the switch 1720. By way of another non-limiting example, the instructions 118 (see FIG. 1) may be stored by the main memory 1704, executed by the CPU 1702 and/or one or more of the PPUs 1714, and used to obtain the optical flow map 110 (see FIGS. 1 and 2). The upstream hardware 104 may be implemented by a camera or storage device.

As mentioned above, the system 100 (see FIG. 1) may be implemented by at least a portion of the inference and/or training logic 1115. Referring to FIG. 1, the computer system 1700 (see FIG. 17) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

Figure 18:
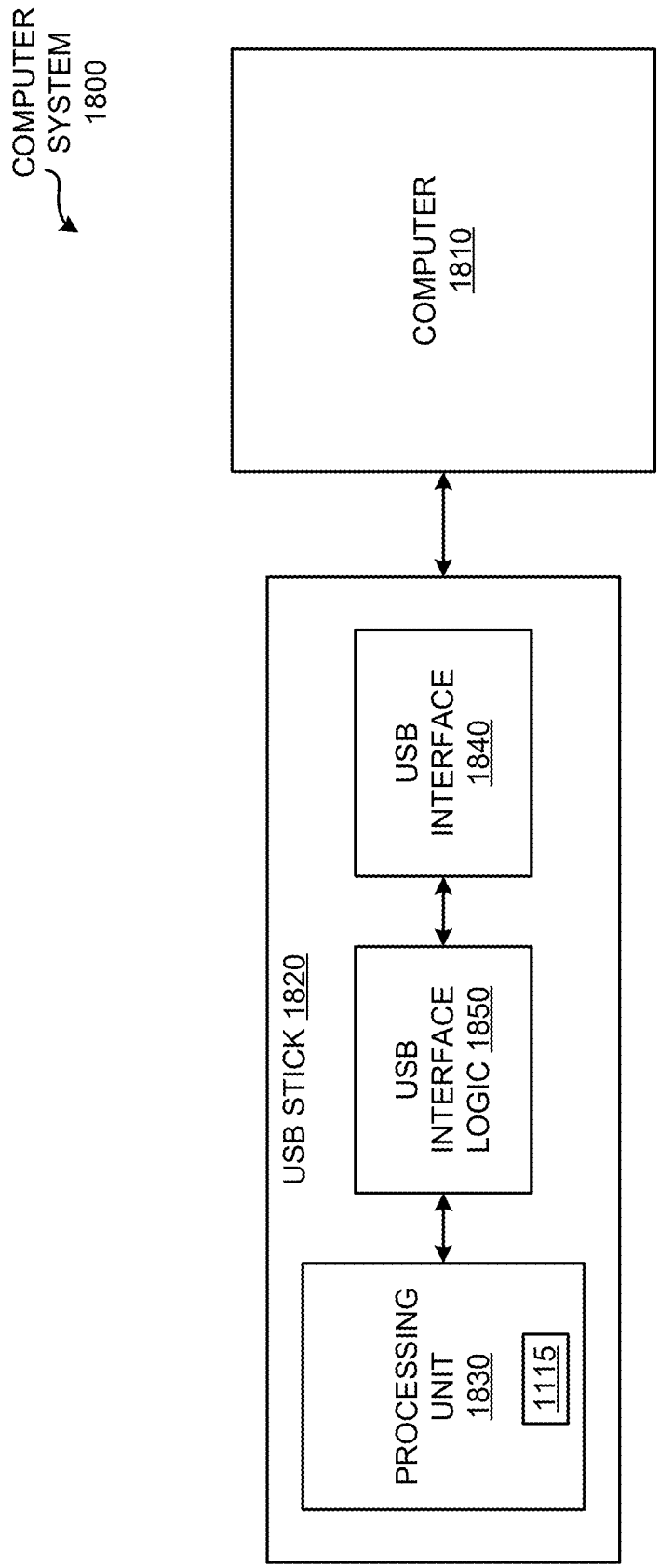
FIG. 18 illustrates a computer system, according to at least one embodiment.

FIG. 18 illustrates a computer system 1800, according to at least one embodiment. In at least one embodiment, computer system 1800 includes, without limitation, a computer 1810 and a USB stick 1820. In at least one embodiment, computer 1810 may include, without limitation, any number and type of processor(s) (not shown) and a memory (not shown). In at least one embodiment, computer 1810 includes, without limitation, a server, a cloud instance, a laptop, and a desktop computer.

In at least one embodiment, USB stick 1820 includes, without limitation, a processing unit 1830, a USB interface 1840, and USB interface logic 1850. In at least one embodiment, processing unit 1830 may be any instruction execution system, apparatus, or device capable of executing instructions. In at least one embodiment, processing unit 1830 may include, without limitation, any number and type of processing cores (not shown). In at least one embodiment, processing unit 1830 comprises an application specific integrated circuit ("ASIC") that is optimized to perform any amount and type of operations associated with machine learning. For instance, in at least one embodiment, processing unit 1830 is a tensor processing unit ("TPC") that is optimized to perform machine learning inference operations. In at least one embodiment, processing unit 1830 is a vision processing unit ("VPU") that is optimized to perform machine vision and machine learning inference operations.

In at least one embodiment, USB interface 1840 may be any type of USB connector or USB socket. For instance, in at least one embodiment, USB interface 1840 is a USB 3.0 Type-C socket for data and power. In at least one embodiment, USB interface 1840 is a USB 3.0 Type-A connector. In at least one embodiment, USB interface logic 1850 may include any amount and type of logic that enables processing unit 1830 to interface with devices (e.g., computer 1810) via USB connector 1840.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in system FIG. 18 for inferencing or predicting operations based, at least in part, on weight parameters calculated using neural network training operations, neural network functions and/or architectures, or neural network use cases described herein.

In at least one embodiment, the system 100 (see FIG. 1) may be implemented at least in part by the computer system 1800. For example, the processor(s) 114 may be a component of the computer 1810 and/or may be implemented by the processing unit 1830, the memory 116 may be implemented by the computer 1810 and/or the USB stick 1820, and the bus(es) 117 may be implemented at least in part by the USB interface 1840 and USB interface logic 1850. By way of another non-limiting example, the instructions 118 (see FIG. 1) may be stored by the computer 1810 and/or the USB stick 1820, executed by the computer 1810 and/or the processing unit 1830, and used to obtain the optical flow map 110 (see FIGS. 1 and 2). The upstream hardware 104 may be implemented by a camera or storage device.

As mentioned above, the system 100 (see FIG. 1) may be implemented by at least a portion of the inference and/or training logic 1115. Referring to FIG. 1, the computer system 1800 (see FIG. 18) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

Figure 19A:
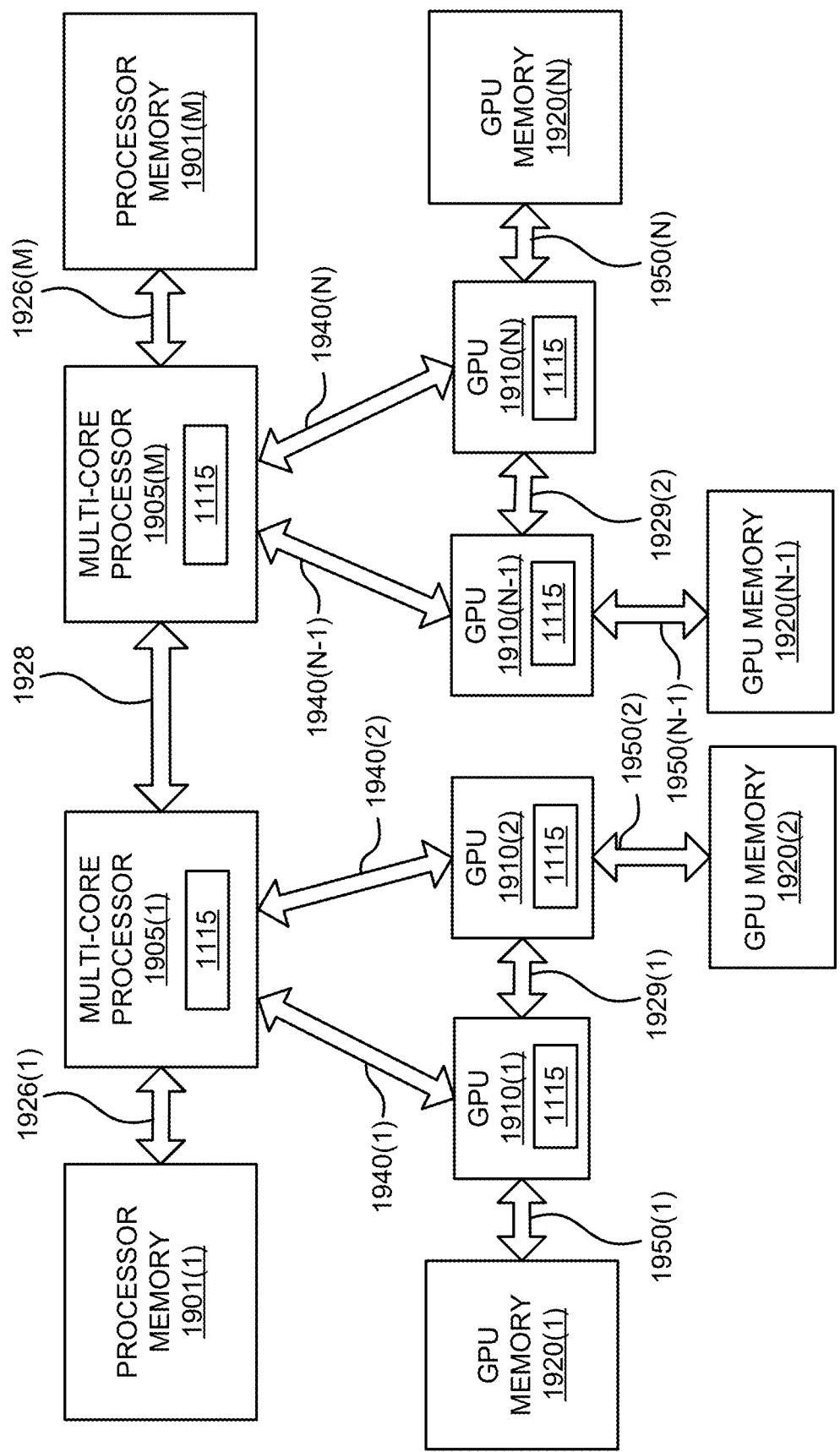
FIG. 19A illustrates a computer system, according to at least one embodiment.

FIG. 19A illustrates an exemplary architecture in which a plurality of GPUs 1910(1)-1910(N) is communicatively coupled to a plurality of multi-core processors 1905(1)-1905(M) over high-speed links 1940(1)-1940(N) (e.g., buses, point-to-point interconnects, etc.). In at least one embodiment, high-speed links 1940(1)-1940(N) support a communication throughput of 4 GB/s, 30 GB/s, 80 GB/s or higher. In at least one embodiment, various interconnect protocols may be used including, but not limited to, PCIe 4.0 or 5.0 and NVLink 2.0. In various figures, "N" and "M" represent positive integers, values of which may be different from figure to figure.

In addition, and in at least one embodiment, two or more of GPUs 1910 are interconnected over high-speed links 1929(1)-1929(2), which may be implemented using similar or different protocols/links than those used for high-speed links 1940(1)-1940(N). Similarly, two or more of multi-core processors 1905 may be connected over a high-speed link 1928 which may be symmetric multi-processor (SMP) buses operating at 20 GB/s, 30 GB/s, 120 GB/s or higher. Alternatively, all communication between various system components shown in FIG. 19A may be accomplished using similar protocols/links (e.g., over a common interconnection fabric).

In at least one embodiment, each multi-core processor 1905 is communicatively coupled to a processor memory 1901(1)-1901(M), via memory interconnects 1926(1)-1926(M), respectively, and each GPU 1910(1)-1910(N) is communicatively coupled to GPU memory 1920(1)-1920(N) over GPU memory interconnects 1950(1)-1950(N), respectively. In at least one embodiment, memory interconnects 1926 and 1950 may utilize similar or different memory access technologies. By way of example, and not limitation, processor memories 1901(1)-1901(M) and GPU memories 1920 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In at least one embodiment, some portion of processor memories 1901 may be volatile memory and another portion may be non-volatile memory (e.g., using a two-level memory (2LM) hierarchy).

As described herein, although various multi-core processors 1905 and GPUs 1910 may be physically coupled to a particular memory 1901, 1920, respectively, and/or a unified memory architecture may be implemented in which a virtual system address space (also referred to as "effective address" space) is distributed among various physical memories. For example, processor memories 1901(1)-1901(M) may each comprise 64 GB of system memory address space and GPU memories 1920(1)-1920(N) may each comprise 32 GB of system memory address space resulting in a total of 256 GB addressable memory when M=2 and N=4. Other values for N and M are possible.

Figure 19B:
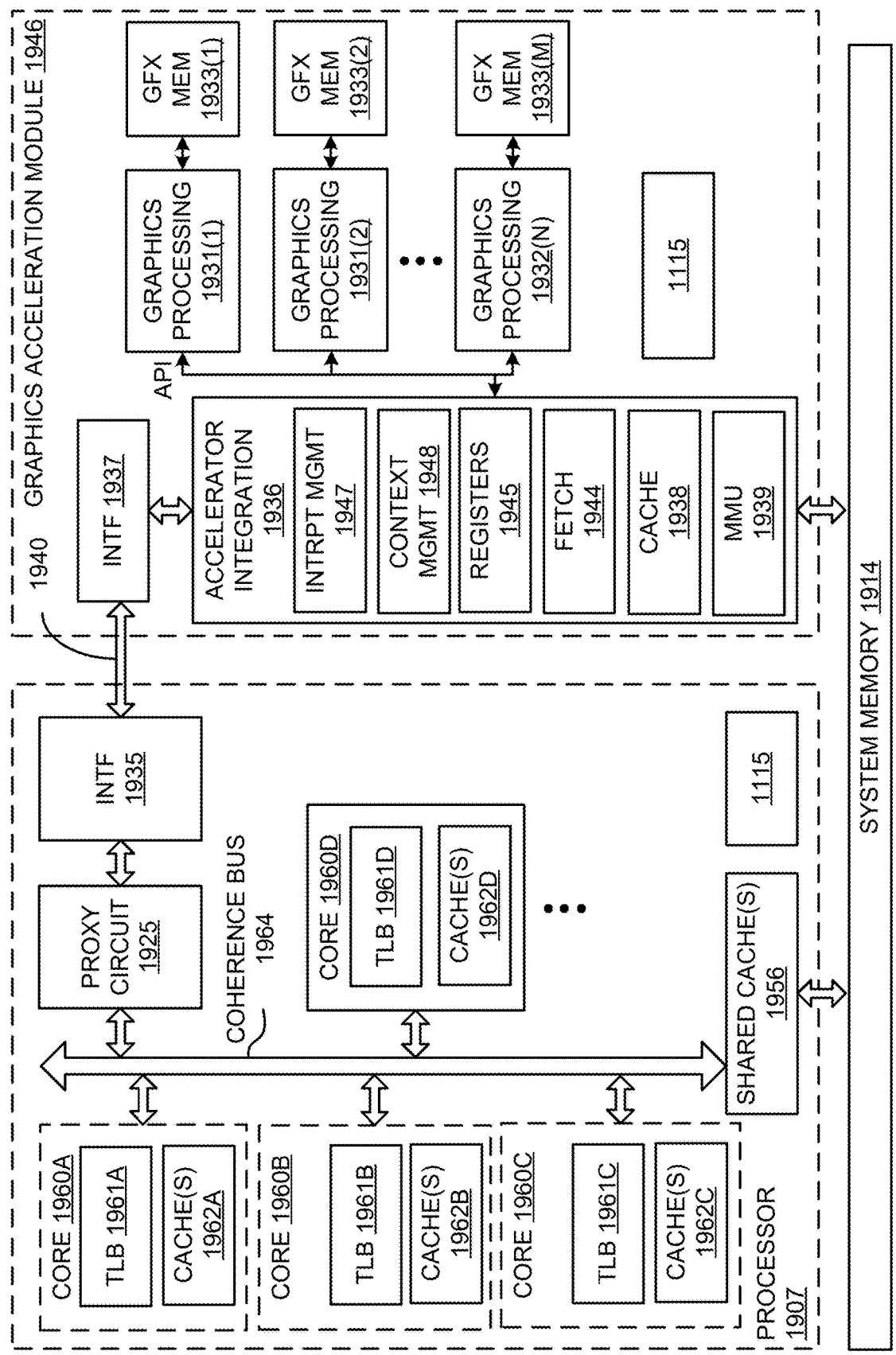
FIG. 19B illustrates a computer system, according to at least one embodiment.

FIG. 19B illustrates additional details for an interconnection between a multi-core processor 1907 and a graphics acceleration module 1946 in accordance with one exemplary embodiment. In at least one embodiment, graphics acceleration module 1946 may include one or more GPU chips integrated on a line card which is coupled to processor 1907 via high-speed link 1940 (e.g., a PCIe bus, NVLink, etc.). In at least one embodiment, graphics acceleration module 1946 may alternatively be integrated on a package or chip with processor 1907.

In at least one embodiment, processor 1907 includes a plurality of cores 1960A-1960D, each with a translation lookaside buffer ("TLB") 1961A-1961D and one or more caches 1962A-1962D. In at least one embodiment, cores 1960A-1960D may include various other components for executing instructions and processing data that are not illustrated. In at least one embodiment, caches 1962A-1962D may comprise Level 1 (L1) and Level 2 (L2) caches. In addition, one or more shared caches 1956 may be included in caches 1962A-1962D and shared by sets of cores 1960A-1960D. For example, one embodiment of processor 1907 includes 24 cores, each with its own L1 cache, twelve shared L2 caches, and twelve shared L3 caches. In this embodiment, one or more L2 and L3 caches are shared by two adjacent cores. In at least one embodiment, processor 1907 and graphics acceleration module 1946 connect with system memory 1914, which may include processor memories 1901(1)-1901(M) of FIG. 19A.

In at least one embodiment, coherency is maintained for data and instructions stored in various caches 1962A-1962D, 1956 and system memory 1914 via inter-core communication over a coherence bus 1964. In at least one embodiment, for example, each cache may have cache coherency logic/circuitry associated therewith to communicate to over coherence bus 1964 in response to detected reads or writes to particular cache lines. In at least one embodiment, a cache snooping protocol is implemented over coherence bus 1964 to snoop cache accesses.

In at least one embodiment, a proxy circuit 1925 communicatively couples graphics acceleration module 1946 to coherence bus 1964, allowing graphics acceleration module 1946 to participate in a cache coherence protocol as a peer of cores 1960A-1960D. In particular, in at least one embodiment, an interface 1935 provides connectivity to proxy circuit 1925 over high-speed link 1940 and an interface 1937 connects graphics acceleration module 1946 to high-speed link 1940.

In at least one embodiment, an accelerator integration circuit 1936 provides cache management, memory access, context management, and interrupt management services on behalf of a plurality of graphics processing engines 1931(1)-1931(N) of graphics acceleration module 1946. In at least one embodiment, graphics processing engines 1931(1)-1931(N) may each comprise a separate graphics processing unit (GPU). In at least one embodiment, graphics processing engines 1931(1)-1931(N) alternatively may comprise different types of graphics processing engines within a GPU, such as graphics execution units, media processing engines (e.g., video encoders/decoders), samplers, and blit engines. In at least one embodiment, graphics acceleration module 1946 may be a GPU with a plurality of graphics processing engines 1931(1)-1931(N) or graphics processing engines 1931(1)-1931(N) may be individual GPUs integrated on a common package, line card, or chip.

In at least one embodiment, accelerator integration circuit 1936 includes a memory management unit (MMU) 1939 for performing various memory management functions such as virtual-to-physical memory translations (also referred to as effective-to-real memory translations) and memory access protocols for accessing system memory 1914. In at least one embodiment, MMU 1939 may also include a translation lookaside buffer (TLB) (not shown) for caching virtual/effective to physical/real address translations. In at least one embodiment, a cache 1938 can store commands and data for efficient access by graphics processing engines 1931(1)-1931(N). In at least one embodiment, data stored in cache 1938 and graphics memories 1933(1)-1933(M) is kept coherent with core caches 1962A-1962D, 1956 and system memory 1914, possibly using a fetch unit 1944. As mentioned, this may be accomplished via proxy circuit 1925 on behalf of cache 1938 and memories 1933(1)-1933(M) (e.g., sending updates to cache 1938 related to modifications/accesses of cache lines on processor caches 1962A-1962D, 1956 and receiving updates from cache 1938).

In at least one embodiment, a set of registers 1945 store context data for threads executed by graphics processing engines 1931(1)-1931(N) and a context management circuit 1948 manages thread contexts. For example, context management circuit 1948 may perform save and restore operations to save and restore contexts of various threads during contexts switches (e.g., where a first thread is saved and a second thread is stored so that a second thread can be execute by a graphics processing engine). For example, on a context switch, context management circuit 1948 may store current register values to a designated region in memory (e.g., identified by a context pointer). It may then restore register values when returning to a context. In at least one embodiment, an interrupt management circuit 1947 receives and processes interrupts received from system devices.

In at least one embodiment, virtual/effective addresses from a graphics processing engine 1931 are translated to real/physical addresses in system memory 1914 by MMU 1939. In at least one embodiment, accelerator integration circuit 1936 supports multiple (e.g., 4, 8, 16) graphics accelerator modules 1946 and/or other accelerator devices. In at least one embodiment, graphics accelerator module 1946 may be dedicated to a single application executed on processor 1907 or may be shared between multiple applications. In at least one embodiment, a virtualized graphics execution environment is presented in which resources of graphics processing engines 1931(1)-1931(N) are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 1936 performs as a bridge to a system for graphics acceleration module 1946 and provides address translation and system memory cache services. In addition, in at least one embodiment, accelerator integration circuit 1936 may provide virtualization facilities for a host processor to manage virtualization of graphics processing engines 1931(1)-1931(N), interrupts, and memory management.

In at least one embodiment, because hardware resources of graphics processing engines 1931(1)-1931(N) are mapped explicitly to a real address space seen by host processor 1907, any host processor can address these resources directly using an effective address value. In at least one embodiment, one function of accelerator integration circuit 1936 is physical separation of graphics processing engines 1931(1)-1931(N) so that they appear to a system as independent units.

In at least one embodiment, one or more graphics memories 1933(1)-1933(M) are coupled to each of graphics processing engines 1931(1)-1931(N), respectively and N=M. In at least one embodiment, graphics memories 1933(1)-1933(M) store instructions and data being processed by each of graphics processing engines 1931(1)-1931(N). In at least one embodiment, graphics memories 1933(1)-1933(M) may be volatile memories such as DRAMs (including stacked DRAMs), GDDR memory (e.g., GDDR5, GDDR6), or HBM, and/or may be non-volatile memories such as 3D XPoint or Nano-Ram.

In at least one embodiment, to reduce data traffic over high-speed link 1940, biasing techniques can be used to ensure that data stored in graphics memories 1933(1)-1933 (M) is data that will be used most frequently by graphics processing engines 1931(1)-1931(N) and preferably not used by cores 1960A-1960D (at least not frequently). Similarly, in at least one embodiment, a biasing mechanism attempts to keep data needed by cores (and preferably not graphics processing engines 1931(1)-1931(N)) within caches 1962A-1962D, 1956 and system memory 1914.

Figure 19C:
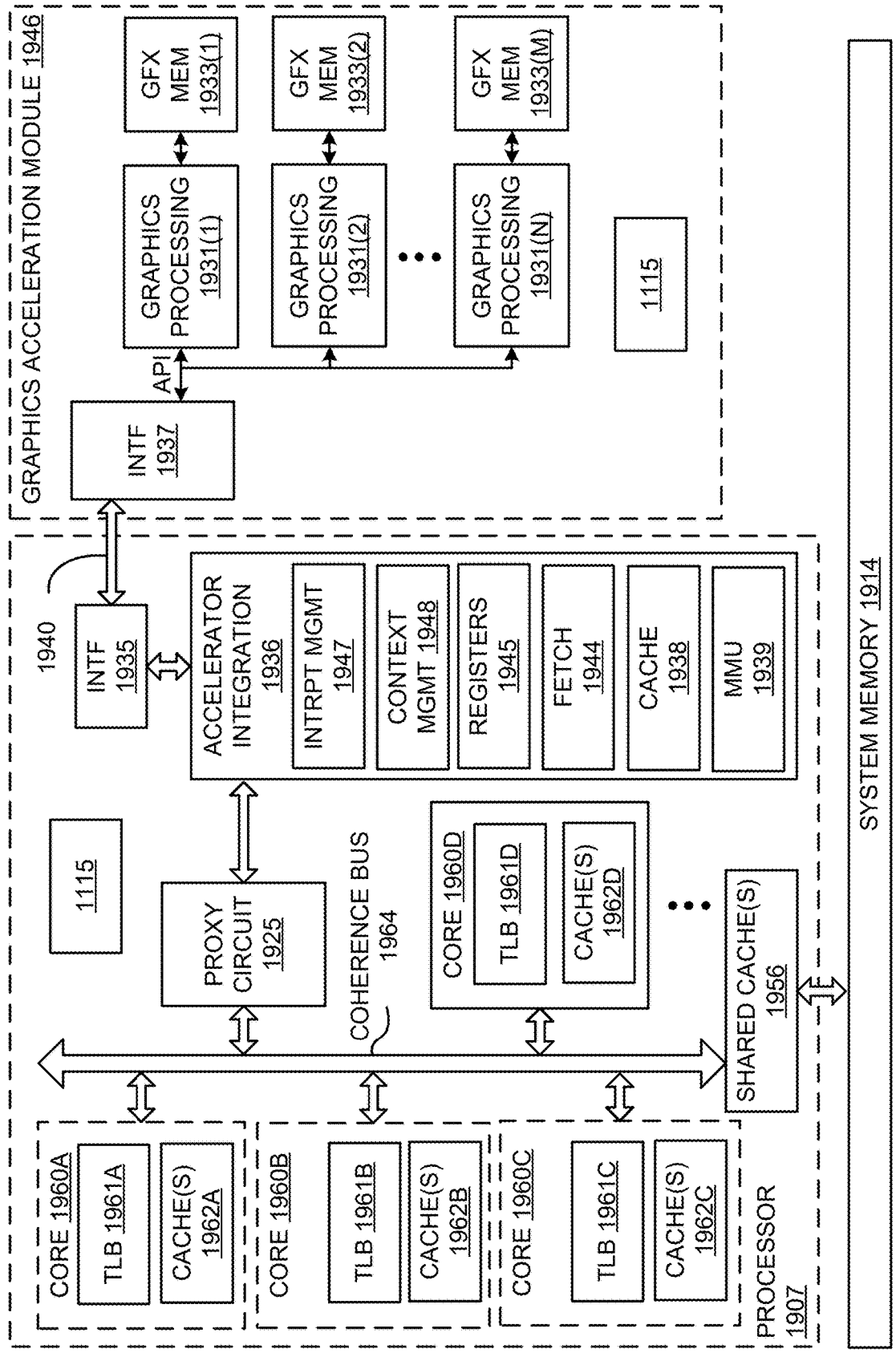
FIG. 19C illustrates a computer system, according to at least one embodiment.

FIG. 19C illustrates another exemplary embodiment in which accelerator integration circuit 1936 is integrated within processor 1907. In this embodiment, graphics processing engines 1931(1)-1931(N) communicate directly over high-speed link 1940 to accelerator integration circuit 1936 via interface 1937 and interface 1935 (which, again, may be any form of bus or interface protocol). In at least one embodiment, accelerator integration circuit 1936 may perform similar operations as those described with respect to FIG. 19B, but potentially at a higher throughput given its close proximity to coherence bus 1964 and caches 1962A-1962D, 1956. In at least one embodiment, an accelerator integration circuit supports different programming models including a dedicated-process programming model (no graphics acceleration module virtualization) and shared programming models (with virtualization), which may include programming models which are controlled by accelerator integration circuit 1936 and programming models which are controlled by graphics acceleration module 1946.

In at least one embodiment, graphics processing engines 1931(1)-1931(N) are dedicated to a single application or process under a single operating system. In at least one embodiment, a single application can funnel other application requests to graphics processing engines 1931(1)-1931 (N), providing virtualization within a VM/partition.

In at least one embodiment, graphics processing engines 1931(1)-1931(N), may be shared by multiple VM/application partitions. In at least one embodiment, shared models may use a system hypervisor to virtualize graphics processing engines 1931(1)-1931(N) to allow access by each operating system. In at least one embodiment, for single-partition systems without a hypervisor, graphics processing engines 1931(1)-1931(N) are owned by an operating system. In at least one embodiment, an operating system can virtualize graphics processing engines 1931(1)-1931(N) to provide access to each process or application.

In at least one embodiment, graphics acceleration module 1946 or an individual graphics processing engine 1931(1)- 1931(N) selects a process element using a process handle. In at least one embodiment, process elements are stored in system memory 1914 and are addressable using an effective address to real address translation technique described herein. In at least one embodiment, a process handle may be an implementation-specific value provided to a host process when registering its context with graphics processing engine 1931(1)-1931(N) (that is, calling system software to add a process element to a process element linked list). In at least one embodiment, a lower 16-bits of a process handle may be an offset of a process element within a process element linked list.

Figure 19D:
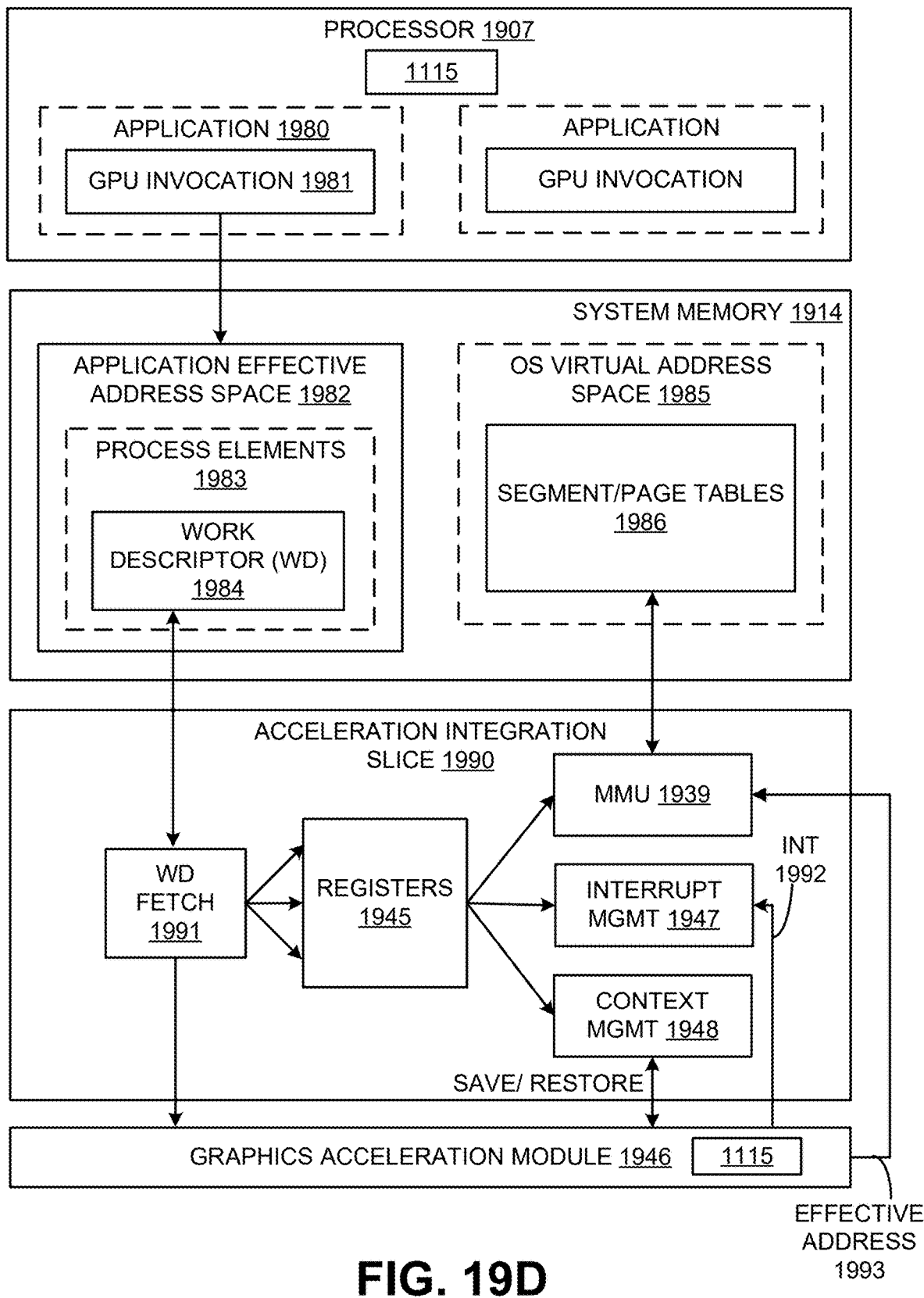
FIG. 19D illustrates a computer system, according to at least one embodiment.

FIG. 19D illustrates an exemplary accelerator integration slice 1990. In at least one embodiment, a "slice" comprises a specified portion of processing resources of accelerator integration circuit 1936. In at least one embodiment, an application is effective address space 1982 within system memory 1914 stores process elements 1983. In at least one embodiment, process elements 1983 are stored in response to GPU invocations 1981 from applications 1980 executed on processor 1907. In at least one embodiment, a process element 1983 contains process state for corresponding application 1980. In at least one embodiment, a work descriptor (WD) 1984 contained in process element 1983 can be a single job requested by an application or may contain a pointer to a queue of jobs. In at least one embodiment, WD 1984 is a pointer to a job request queue in an application's effective address space 1982.

In at least one embodiment, graphics acceleration module 1946 and/or individual graphics processing engines 1931 (1)-1931(N) can be shared by all or a subset of processes in a system. In at least one embodiment, an infrastructure for setting up process states and sending a WD 1984 to a graphics acceleration module 1946 to start a job in a virtualized environment may be included.

In at least one embodiment, a dedicated-process programming model is implementation-specific. In at least one embodiment, in this model, a single process owns graphics acceleration module 1946 or an individual graphics processing engine 1931. In at least one embodiment, when graphics acceleration module 1946 is owned by a single process, a hypervisor initializes accelerator integration circuit 1936 for an owning partition and an operating system initializes accelerator integration circuit 1936 for an owning process when graphics acceleration module 1946 is assigned.

In at least one embodiment, in operation, a WD fetch unit 1991 in accelerator integration slice 1990 fetches next WD 1984, which includes an indication of work to be done by one or more graphics processing engines of graphics acceleration module 1946. In at least one embodiment, data from WD 1984 may be stored in registers 1945 and used by MMU 1939, interrupt management circuit 1947 and/or context management circuit 1948 as illustrated. For example, one embodiment of MMU 1939 includes segment/page walk circuitry for accessing segment/page tables 1986 within an OS virtual address space 1985. In at least one embodiment, interrupt management circuit 1947 may process interrupt events 1992 received from graphics acceleration module 1946. In at least one embodiment, when performing graphics operations, an effective address 1993 generated by a graphics processing engine 1931(1)-1931(N) is translated to a real address by MMU 1939.

In at least one embodiment, registers 1945 are duplicated for each graphics processing engine 1931(1)-1931(N) and/or graphics acceleration module 1946 and may be initialized by a hypervisor or an operating system. In at least one embodiment, each of these duplicated registers may be included in an accelerator integration slice 1990. Exemplary registers that may be initialized by a hypervisor are shown in Table 1.

TABLE 1

| Hypervisor Initialized Registers | |
| --- | --- |
| Register # | Description |
| 1 | Slice Control Register |
| 2 | Real Address (RA) Scheduled Processes Area Pointer |

TABLE 1-continued

Hypervisor Initialized Registers

| Register # | Description |
|---|---|
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

Operating System Initialized Registers

| Register # | Description |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In at least one embodiment, each WD 1984 is specific to a particular graphics acceleration module 1946 and/or graphics processing engines 1931(1)-1931(N). In at least one embodiment, it contains all information required by a graphics processing engine 1931(1)-1931(N) to do work, or it can be a pointer to a memory location where an application has set up a command queue of work to be completed.

Figure 19E:
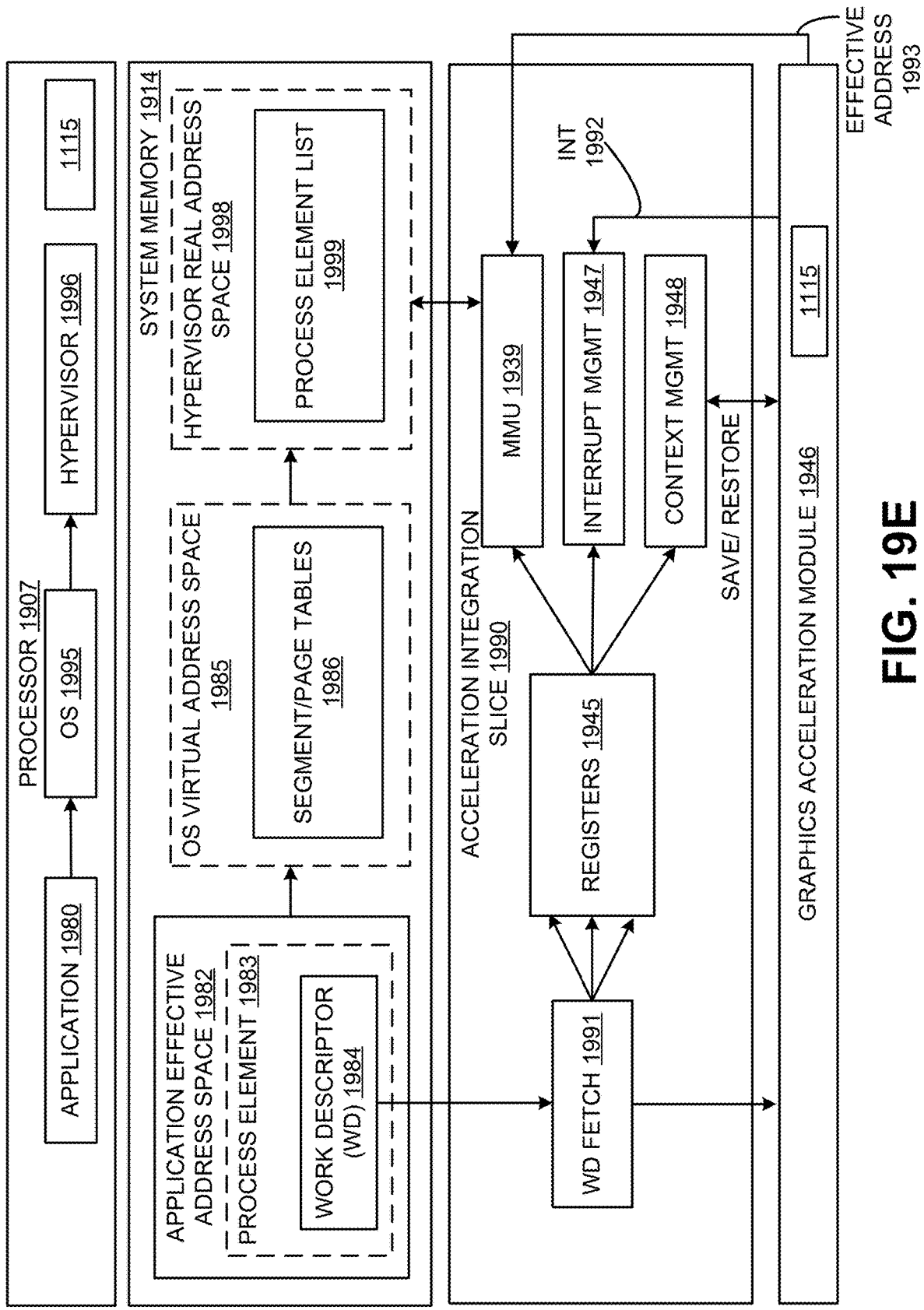
FIGS. 19E and 19F illustrate a shared programming model, according to at least one embodiment.

FIG. 19E illustrates additional details for one exemplary embodiment of a shared model. This embodiment includes a hypervisor real address space 1998 in which a process element list 1999 is stored. In at least one embodiment, hypervisor real address space 1998 is accessible via a hypervisor 1996 which virtualizes graphics acceleration module engines for operating system 1995.

In at least one embodiment, shared programming models allow for all or a subset of processes from all or a subset of partitions in a system to use a graphics acceleration module 1946. In at least one embodiment, there are two programming models where graphics acceleration module 1946 is shared by multiple processes and partitions, namely time-sliced shared and graphics directed shared.

In at least one embodiment, in this model, system hypervisor 1996 owns graphics acceleration module 1946 and makes its function available to all operating systems 1995. In at least one embodiment, for a graphics acceleration module 1946 to support virtualization by system hypervisor 1996, graphics acceleration module 1946 may adhere to certain requirements, such as (1) an application's job request must be autonomous (that is, state does not need to be maintained between jobs), or graphics acceleration module 1946 must provide a context save and restore mechanism, (2) an application's job request is guaranteed by graphics acceleration module 1946 to complete in a specified amount of time, including any translation faults, or graphics acceleration module 1946 provides an ability to preempt processing of a job, and (3) graphics acceleration module 1946 must be guaranteed fairness between processes when operating in a directed shared programming model.

In at least one embodiment, application 1980 is required to make an operating system 1995 system call with a graphics acceleration module type, a work descriptor (WD), an authority mask register (AMR) value, and a context save/restore area pointer (CSRP). In at least one embodiment, graphics acceleration module type describes a targeted acceleration function for a system call. In at least one embodiment, graphics acceleration module type may be a system-specific value. In at least one embodiment, WD is formatted specifically for graphics acceleration module 1946 and can be in a form of a graphics acceleration module 1946 command, an effective address pointer to a user-defined structure, an effective address pointer to a queue of commands, or any other data structure to describe work to be done by graphics acceleration module 1946.

In at least one embodiment, an AMR value is an AMR state to use for a current process. In at least one embodiment, a value passed to an operating system is similar to an application setting an AMR. In at least one embodiment, if accelerator integration circuit 1936 (not shown) and graphics acceleration module 1946 implementations do not support a User Authority Mask Override Register (UAMOR), an operating system may apply a current UAMOR value to an AMR value before passing an AMR in a hypervisor call. In at least one embodiment, hypervisor 1996 may optionally apply a current Authority Mask Override Register (AMOR) value before placing an AMR into process element 1983. In at least one embodiment, CSRP is one of registers 1945 containing an effective address of an area in an application's effective address space 1982 for graphics acceleration module 1946 to save and restore context state. In at least one embodiment, this pointer is optional if no state is required to be saved between jobs or when a job is preempted. In at least one embodiment, context save/restore area may be pinned system memory.

Upon receiving a system call, operating system 1995 may verify that application 1980 has registered and been given authority to use graphics acceleration module 1946. In at least one embodiment, operating system 1995 then calls hypervisor 1996 with information shown in Table 3.

TABLE 3

OS to Hypervisor Call Parameters

| Parameter # | Description |
|---|---|
| 1 | A work descriptor (WD) |
| 2 | An Authority Mask Register (AMR) value (potentially masked) |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |

In at least one embodiment, upon receiving a hypervisor call, hypervisor 1996 verifies that operating system 1995 has registered and been given authority to use graphics acceleration module 1946. In at least one embodiment, hypervisor 1996 then puts process element 1983 into a process element linked list for a corresponding graphics acceleration module 1946 type. In at least one embodiment, a process element may include information shown in Table 4.

TABLE 4

Process Element Information

| Element # | Description |
| --- | --- |
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |
| 8 | Interrupt vector table, derived from hypervisor call parameters |
| 9 | A state register (SR) value |
| 10 | A logical partition ID (LPID) |
| 11 | A real address (RA) hypervisor accelerator utilization record pointer |
| 12 | Storage Descriptor Register (SDR) |

In at least one embodiment, hypervisor initializes a plurality of accelerator integration slice 1990 registers 1945.

Figure 19F:
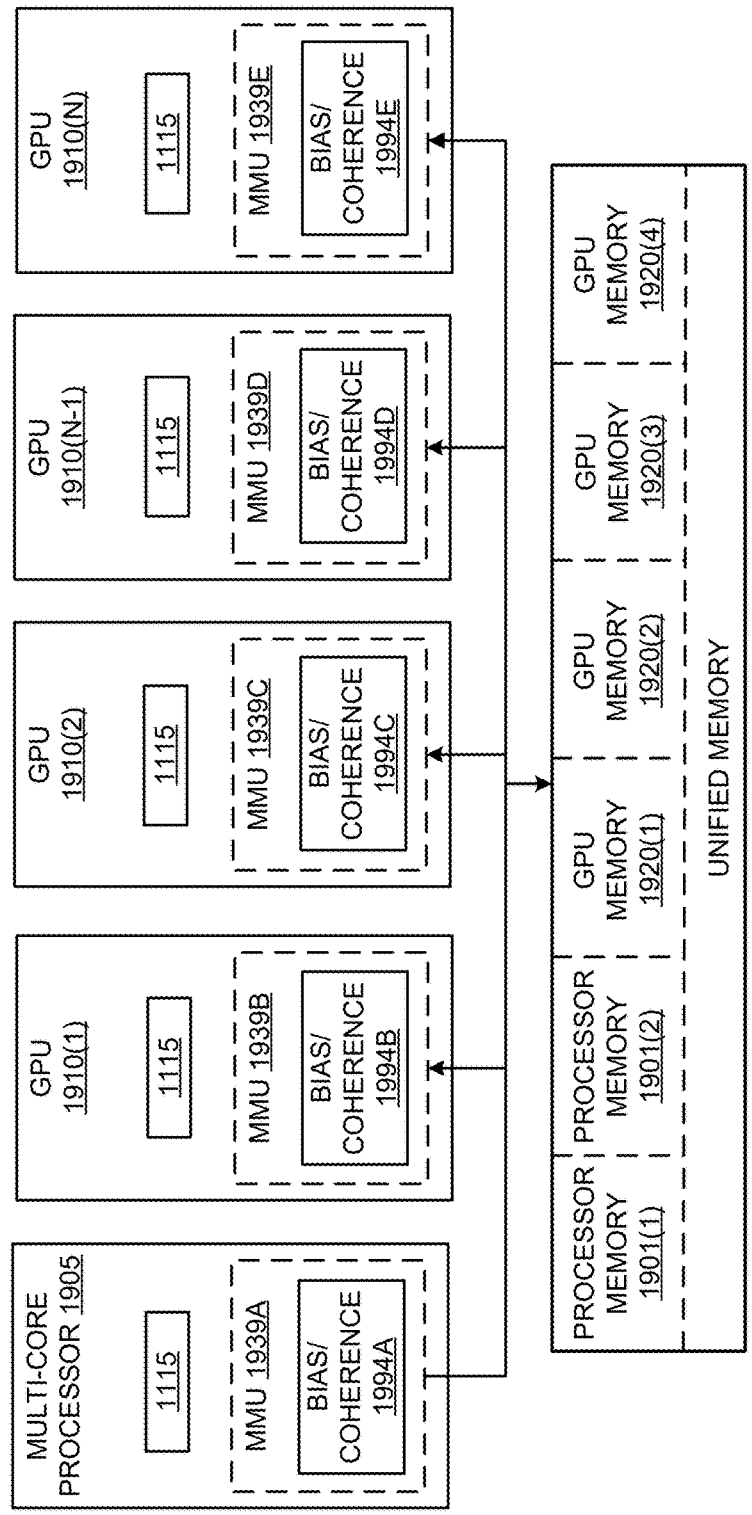

As illustrated in FIG. 19F, in at least one embodiment, a unified memory is used, addressable via a common virtual memory address space used to access physical processor memories 1901(1)-1901(N) and GPU memories 1920(1)-1920(N). In this implementation, operations executed on GPUs 1910(1)-1910(N) utilize a same virtual/effective memory address space to access processor memories 1901(1)-1901(M) and vice versa, thereby simplifying programmability. In at least one embodiment, a first portion of a virtual/effective address space is allocated to processor memory 1901(1), a second portion to second processor memory 1901(N), a third portion to GPU memory 1920(1), and so on. In at least one embodiment, an entire virtual/effective memory space (sometimes referred to as an effective address space) is thereby distributed across each of processor memories 1901 and GPU memories 1920, allowing any processor or GPU to access any physical memory with a virtual address mapped to that memory.

In at least one embodiment, bias/coherence management circuitry 1994A-1994E within one or more of MMUs 1939A-1939E ensures cache coherence between caches of one or more host processors (e.g., 1905) and GPUs 1910 and implements biasing techniques indicating physical memories in which certain types of data should be stored. In at least one embodiment, while multiple instances of bias/coherence management circuitry 1994A-1994E are illustrated in FIG. 19F, bias/coherence circuitry may be implemented within an MMU of one or more host processors 1905 and/or within accelerator integration circuit 1936.

One embodiment allows GPU memories 1920 to be mapped as part of system memory, and accessed using shared virtual memory (SVM) technology, but without suffering performance drawbacks associated with full system cache coherence. In at least one embodiment, an ability for GPU memories 1920 to be accessed as system memory without onerous cache coherence overhead provides a beneficial operating environment for GPU offload. In at least one embodiment, this arrangement allows software of host processor 1905 to setup operands and access computation results, without overhead of tradition I/O DMA data copies. In at least one embodiment, such traditional copies involve driver calls, interrupts and memory mapped I/O (MMIO) accesses that are all inefficient relative to simple memory accesses. In at least one embodiment, an ability to access GPU memories 1920 without cache coherence overheads can be critical to execution time of an offloaded computation. In at least one embodiment, in cases with substantial streaming write memory traffic, for example, cache coherence overhead can significantly reduce an effective write bandwidth seen by a GPU 1910. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. In at least one embodiment, a bias table may be used, for example, which may be a page-granular structure (e.g., controlled at a granularity of a memory page) that includes 1 or 2 bits per GPU-attached memory page. In at least one embodiment, a bias table may be implemented in a stolen memory range of one or more GPU memories 1920, with or without a bias cache in a GPU 1910 (e.g., to cache frequently/recently used entries of a bias table). Alternatively, in at least one embodiment, an entire bias table may be maintained within a GPU.

In at least one embodiment, a bias table entry associated with each access to a GPU attached memory 1920 is accessed prior to actual access to a GPU memory, causing following operations. In at least one embodiment, local requests from a GPU 1910 that find their page in GPU bias are forwarded directly to a corresponding GPU memory 1920. In at least one embodiment, local requests from a GPU that find their page in host bias are forwarded to processor 1905 (e.g., over a high-speed link as described herein). In at least one embodiment, requests from processor 1905 that find a requested page in host processor bias complete a request like a normal memory read. Alternatively, requests directed to a GPU-biased page may be forwarded to a GPU 1910. In at least one embodiment, a GPU may then transition a page to a host processor bias if it is not currently using a page. In at least one embodiment, a bias state of a page can be changed either by a software-based mechanism, a hardware-assisted software-based mechanism, or, for a limited set of cases, a purely hardware-based mechanism.

In at least one embodiment, one mechanism for changing bias state employs an API call (e.g., OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, a cache flushing operation is used for a transition from host processor 1905 bias to GPU bias, but is not for an opposite transition.

In at least one embodiment, cache coherency is maintained by temporarily rendering GPU-biased pages uncacheable by host processor 1905. In at least one embodiment, to access these pages, processor 1905 may request access from GPU 1910, which may or may not grant access right away. In at least one embodiment, thus, to reduce communication between processor 1905 and GPU 1910 it is beneficial to ensure that GPU-biased pages are those which are required by a GPU but not host processor 1905 and vice versa.

In at least one embodiment, the processor(s) 114 may be implemented by one or more of the multi-core processors 1905, one or more of the GPUs 1910, the multi-core processor 1907 and/or the graphics acceleration module 1946, the memory 116 may be implemented by the processor memory 1901, the system memory 1914, and/or the GPU memory 1920, and the bus(es) 117 may be implemented at least in part by the memory interconnects 1926, the high-speed links 1940, the high-speed links 1929, and/or the GPU memory interconnects 1950. By way of another non-limiting example, the instructions 118 (see FIG. 1) may be stored by the processor memory 1901, the system memory 1914, and/or the GPU memory 1920, executed by at least one of the multi-core processors 1905, the GPUs 1910, the multi-core processor 1907 and/or the graphics acceleration module 1946, and used to obtain the optical flow map 110 (see FIGS. 1 and 2).

As mentioned above, the system 100 (see FIG. 1) may be implemented by at least a portion of the inference and/or training logic 1115. Referring to FIG. 1, the one or more of the multi-core processors 1905, one or more of the GPUs 1910, the multi-core processor 1907 and/or the graphics acceleration module 1946 (see FIGS. 19A-D) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

Figure 20:
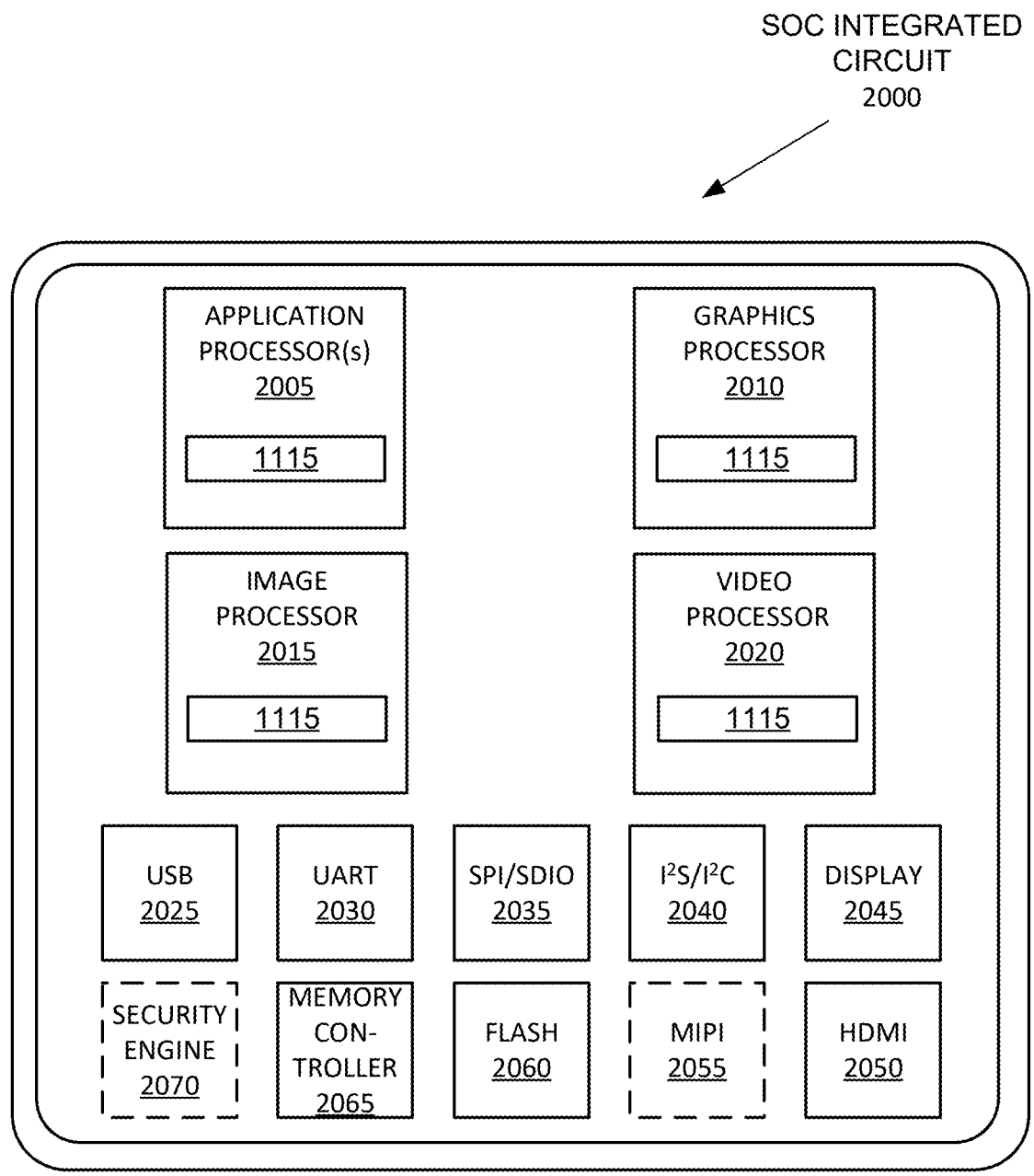
FIG. 20 illustrates exemplary integrated circuits and associated graphics processors, according to at least one embodiment.

FIG. 20 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 20 is a block diagram illustrating an exemplary system on a chip integrated circuit 2000 that may be fabricated using one or more IP cores, according to at least one embodiment. In at least one embodiment, integrated circuit 2000 includes one or more application processor(s) 2005 (e.g., CPUs), at least one graphics processor 2010, and may additionally include an image processor 2015 and/or a video processor 2020, any of which may be a modular IP core. In at least one embodiment, integrated circuit 2000 includes peripheral or bus logic including a USB controller 2025, a UART controller 2030, an SPI/SDIO controller 2035, and an I$^2$S/I$^2$C controller 2040. In at least one embodiment, integrated circuit 2000 can include a display device 2045 coupled to one or more of a high-definition multimedia interface (HDMI) controller 2050 and a mobile industry processor interface (MIPI) display interface 2055. In at least one embodiment, storage may be provided by a flash memory subsystem 2060 including flash memory and a flash memory controller. In at least one embodiment, a memory interface may be provided via a memory controller 2065 for access to SDRAM or SRAM memory devices. In at least one embodiment, some integrated circuits additionally include an embedded security engine 2070.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in integrated circuit 2000 for inferencing or predicting operations based, at least in part, on weight parameters calculated using neural network training operations, neural network functions and/or architectures, or neural network use cases described herein.

In at least one embodiment, the system 100 (see FIG. 1) may be implemented at least in part by the system on a chip integrated circuit 2000. In at least one embodiment, the processor(s) 114 may be implemented by one or more of the processor 2005-2020, and the memory 116 may be implemented by SDRAM or SRAM memory devices. By way of another non-limiting example, the instructions 118 (see FIG. 1) may be stored by the SDRAM or SRAM memory devices, executed by at least one of the processor 2005-2020, and used to obtain the optical flow map 110 (see FIGS. 1 and 2). As mentioned above, the system 100 (see FIG. 1) may be implemented by at least a portion of the inference and/or training logic 1115. Referring to FIG. 1, the system on a chip integrated circuit 2000 (see FIG. 20) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

Figure 21A:
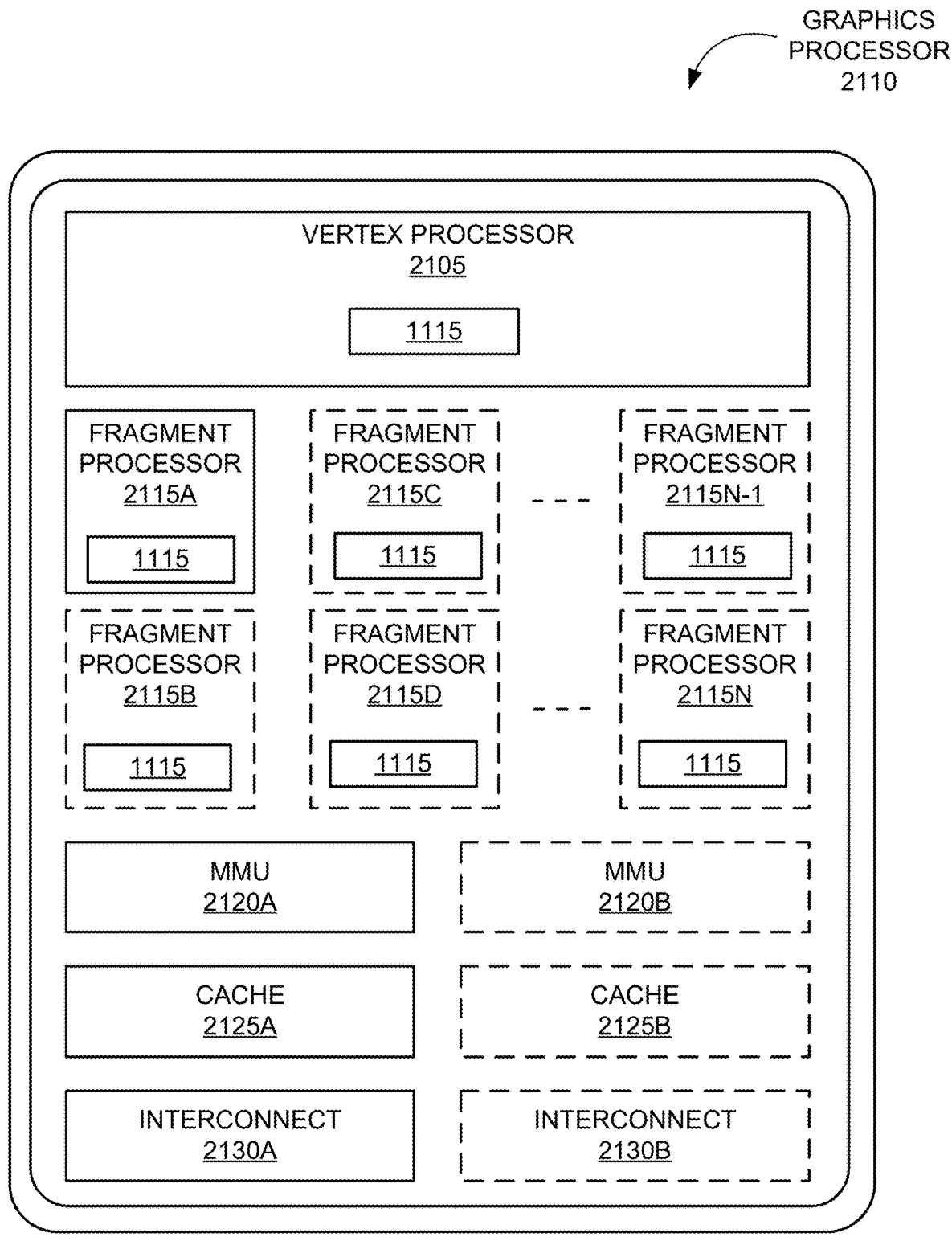
FIGS. 21A-21B illustrate exemplary integrated circuits and associated graphics processors, according to at least one embodiment.
Figure 21B:
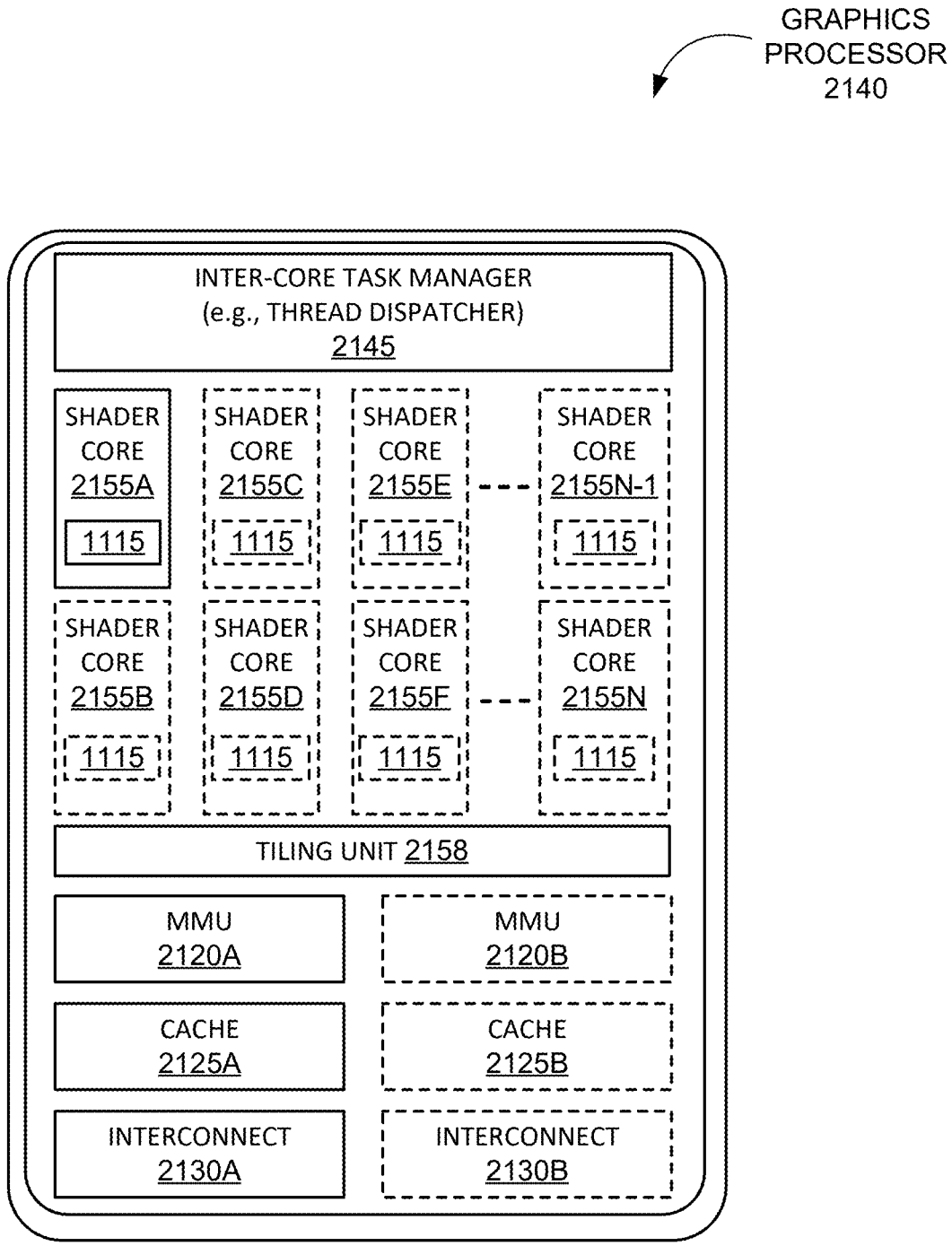

FIGS. 21A-21B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 21A-21B are block diagrams illustrating exemplary graphics processors for use within an SoC, according to embodiments described herein. FIG. 21A illustrates an exemplary graphics processor 2110 of a system on a chip integrated circuit that may be fabricated using one or more IP cores, according to at least one embodiment. FIG. 21B illustrates an additional exemplary graphics processor 2140 of a system on a chip integrated circuit that may be fabricated using one or more IP cores, according to at least one embodiment. In at least one embodiment, graphics processor 2110 of FIG. 21A is a low power graphics processor core. In at least one embodiment, graphics processor 2140 of FIG. 21B is a higher performance graphics processor core. In at least one embodiment, each of graphics processors 2110, 2140 can be variants of graphics processor 2010 of FIG. 20.

In at least one embodiment, graphics processor 2110 includes a vertex processor 2105 and one or more fragment processor(s) 2115A-2115N (e.g., 2115A, 21151B, 2115C, 2115D, through 2115N-1, and 2115N). In at least one embodiment, graphics processor 2110 can execute different shader programs via separate logic, such that vertex processor 2105 is optimized to execute operations for vertex shader programs, while one or more fragment processor(s) 2115A-2115N execute fragment (e.g., pixel) shading operations for fragment or pixel shader programs. In at least one embodiment, vertex processor 2105 performs a vertex processing stage of a 3D graphics pipeline and generates primitives and vertex data. In at least one embodiment, fragment processor(s) 2115A-2115N use primitive and vertex data generated by vertex processor 2105 to produce a framebuffer that is displayed on a display device. In at least one embodiment, fragment processor(s) 2115A-2115N are optimized to execute fragment shader programs as provided for in an OpenGL API, which may be used to perform similar operations as a pixel shader program as provided for in a Direct 3D API.

In at least one embodiment, graphics processor 2110 additionally includes one or more memory management units (MMUs) 2120A-2120B, cache(s) 2125A-2125B, and circuit interconnect(s) 2130A-2130B. In at least one embodiment, one or more MMU(s) 2120A-2120B provide for virtual to physical address mapping for graphics processor 2110, including for vertex processor 2105 and/or fragment processor(s) 2115A-2115N, which may reference vertex or image/texture data stored in memory, in addition to vertex or image/texture data stored in one or more cache(s) 2125A-2125B. In at least one embodiment, one or more MMU(s) 2120A-2120B may be synchronized with other MMUs within a system, including one or more MMUs associated with one or more application processor(s) 2005, image processors 2015, and/or video processors 2020 of FIG. 20, such that each processor 2005-2020 can participate in a shared or unified virtual memory system. In at least one embodiment, one or more circuit interconnect(s) 2130A-2130B enable graphics processor 2110 to interface with other IP cores within SoC, either via an internal bus of SoC or via a direct connection.

In at least one embodiment, graphics processor 2140 includes one or more shader core(s) 2155A-2155N (e.g., 2155A, 2155B, 2155C, 2155D, 2155E, 2155F, through 2155N-1, and 2155N) as shown in FIG. 21B, which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 2140 includes an inter-core task manager 2145, which acts as a thread dispatcher to dispatch execution threads to one or more shader cores 2155A-2155N and a tiling unit 2158 to accelerate tiling operations for tile-based rendering, in which rendering operations for a scene are subdivided in image space, for example to exploit local spatial coherence within a scene or to optimize use of internal caches.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in integrated circuit 21A and/or 21B for inferencing or predicting operations based, at least in part, on weight parameters calculated using neural network training operations, neural network functions and/or architectures, or neural network use cases described herein.

In at least one embodiment, the processor(s) 114 may be implemented at least in part by the graphics processor 2110 and/or the graphics processor 2140. By way of another non-limiting example, the instructions 118 (see FIG. 1) may be executed by the graphics processor 2110 and/or the graphics processor 2140, and used to obtain the optical flow map 110 (see FIGS. 1 and 2). As mentioned above, the system 100 (see FIG. 1) may be implemented by at least a portion of the inference and/or training logic 1115. Referring to FIG. 1, the graphics processor 2110 and/or the graphics processor 2140 (see FIGS. 21A and 21B) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

Figure 22A:
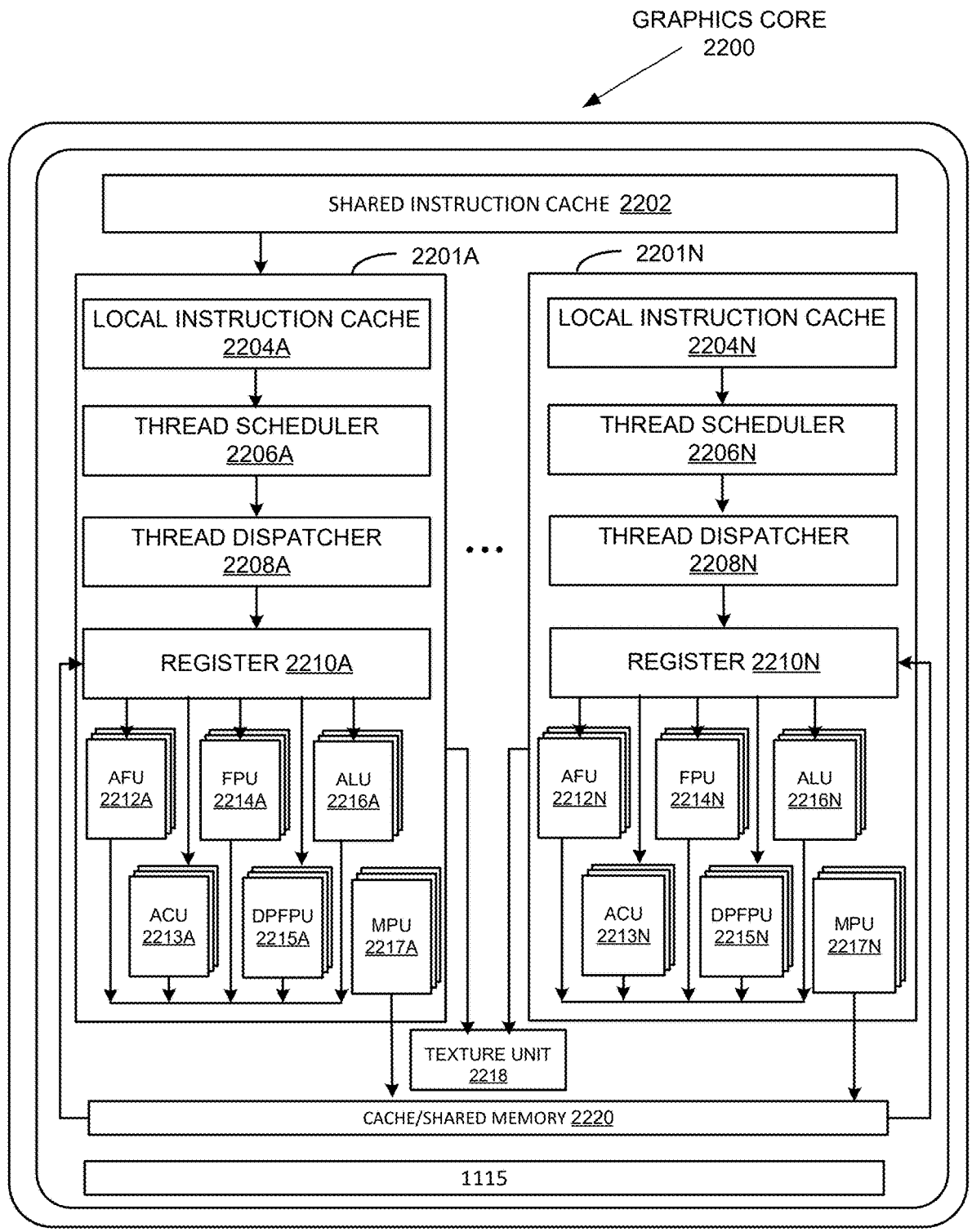
FIGS. 22A-22B illustrate additional exemplary graphics processor logic according to at least one embodiment.
Figure 22B:
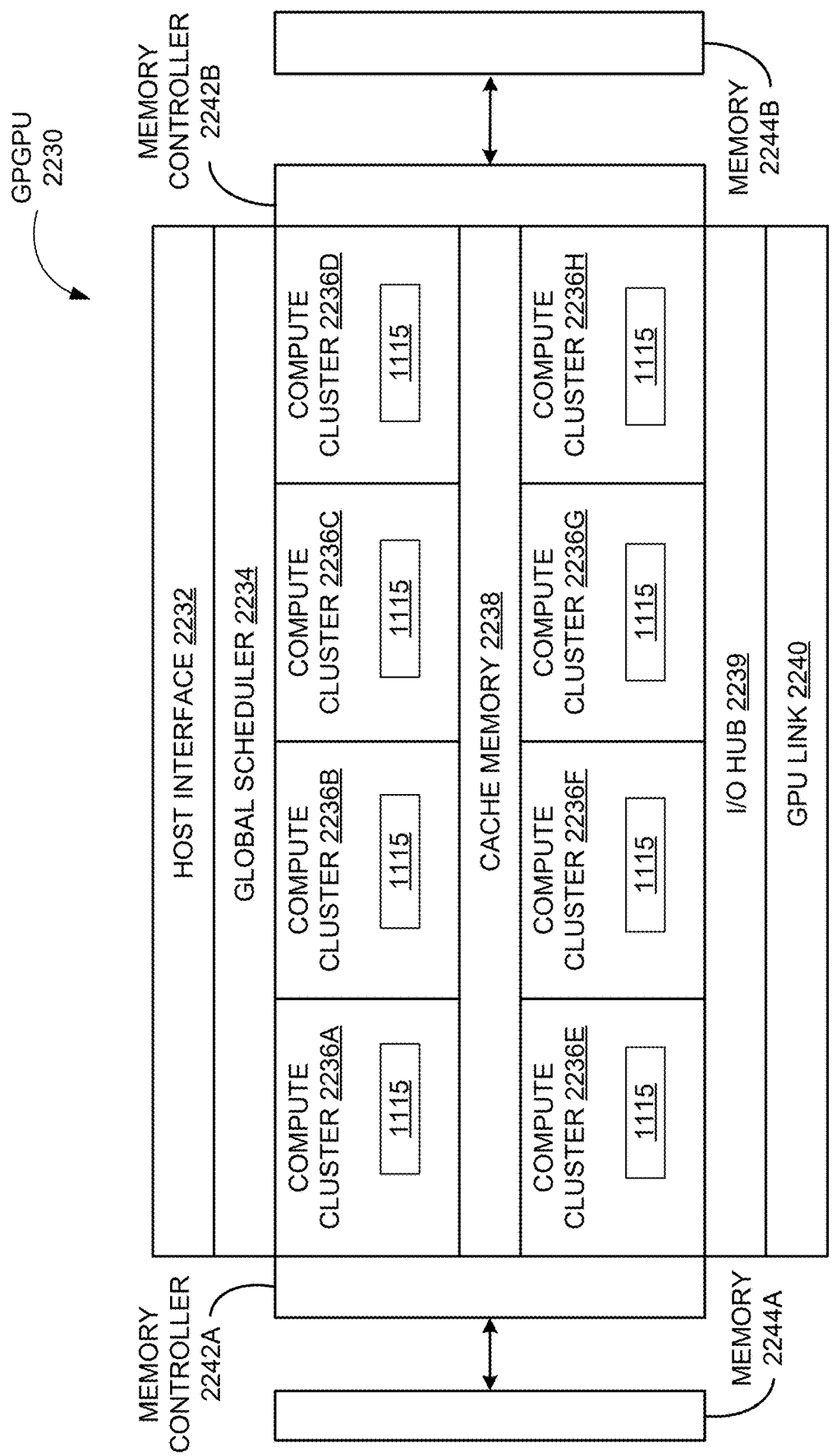

FIGS. 22A-22B illustrate additional exemplary graphics processor logic according to embodiments described herein. FIG. 22A illustrates a graphics core 2200 that may be included within graphics processor 2010 of FIG. 20, in at least one embodiment, and may be a unified shader core 2155A-2155N as in FIG. 21B in at least one embodiment. FIG. 22B illustrates a highly-parallel general-purpose graphics processing unit ("GPGPU") 2230 suitable for deployment on a multi-chip module in at least one embodiment.

In at least one embodiment, graphics core 2200 includes a shared instruction cache 2202, a texture unit 2218, and a cache/shared memory 2220 that are common to execution resources within graphics core 2200. In at least one embodiment, graphics core 2200 can include multiple slices 2201A-2201N or a partition for each core, and a graphics processor can include multiple instances of graphics core 2200. In at least one embodiment, slices 2201A-2201N can include support logic including a local instruction cache 2204A-2204N, a thread scheduler 2206A-2206N, a thread dispatcher 2208A-2208N, and a set of registers 2210A-2210N. In at least one embodiment, slices 2201A-2201N can include a set of additional function units (AFUs 2212A-2212N), floating-point units (FPUs 2214A-2214N), integer arithmetic logic units (ALUs 2216A-2216N), address computational units (ACUs 2213A-2213N), double-precision floating-point units (DPFPUs 2215A-2215N), and matrix processing units (MPUs 2217A-2217N).

In at least one embodiment, FPUs 2214A-2214N can perform single-precision (32-bit) and half-precision (16-bit) floating point operations, while DPFPUs 2215A-2215N perform double precision (64-bit) floating point operations. In at least one embodiment, ALUs 2216A-2216N can perform variable precision integer operations at 8-bit, 16-bit, and 32-bit precision, and can be configured for mixed precision operations. In at least one embodiment, MPUs 2217A-2217N can also be configured for mixed precision matrix operations, including half-precision floating point and 8-bit integer operations. In at least one embodiment, MPUs 2217-2217N can perform a variety of matrix operations to accelerate machine learning application frameworks, including enabling support for accelerated general matrix to matrix multiplication (GEMM). In at least one embodiment, AFUs 2212A-2212N can perform additional logic operations not supported by floating-point or integer units, including trigonometric operations (e.g., sine, cosine, etc.).

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in graphics core 2200 for inferencing or predicting operations based, at least in part, on weight parameters calculated using neural network training operations, neural network functions and/or architectures, or neural network use cases described herein.

In at least one embodiment, the processor(s) 114 may be implemented at least in part by the graphics core 2200. By way of another non-limiting example, the instructions 118 (see FIG. 1) may be executed by the graphics core 2200, and used to obtain the optical flow map 110 (see FIGS. 1 and 2). As mentioned above, the system 100 (see FIG. 1) may be implemented by at least a portion of the inference and/or training logic 1115. Referring to FIG. 1, the graphics core 2200 (see FIG. 22A) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

FIG. 22B illustrates a general-purpose processing unit (GPGPU) 2230 that can be configured to enable highly-parallel compute operations to be performed by an array of graphics processing units, in at least one embodiment. In at least one embodiment, GPGPU 2230 can be linked directly to other instances of GPGPU 2230 to create a multi-GPU cluster to improve training speed for deep neural networks. In at least one embodiment, GPGPU 2230 includes a host interface 2232 to enable a connection with a host processor. In at least one embodiment, host interface 2232 is a PCI Express interface. In at least one embodiment, host interface 2232 can be a vendor-specific communications interface or communications fabric. In at least one embodiment, GPGPU 2230 receives commands from a host processor and uses a global scheduler 2234 to distribute execution threads associated with those commands to a set of compute clusters 2236A-2236H. In at least one embodiment, compute clusters 2236A-2236H share a cache memory 2238. In at least one embodiment, cache memory 2238 can serve as a higher-level cache for cache memories within compute clusters 2236A-2236H.

In at least one embodiment, GPGPU 2230 includes memory 2244A-2244B coupled with compute clusters 2236A-2236H via a set of memory controllers 2242A-2242B. In at least one embodiment, memory 2244A-2244B can include various types of memory devices including dynamic random access memory (DRAM) or graphics random access memory, such as synchronous graphics random access memory (SGRAM), including graphics double data rate (GDDR) memory.

In at least one embodiment, compute clusters 2236A-2236H each include a set of graphics cores, such as graphics core 2200 of FIG. 22A, which can include multiple types of integer and floating point logic units that can perform computational operations at a range of precisions including suited for machine learning computations. For example, in at least one embodiment, at least a subset of floating point units in each of compute clusters 2236A-2236H can be configured to perform 16-bit or 32-bit floating point operations, while a different subset of floating point units can be configured to perform 64-bit floating point operations.

In at least one embodiment, multiple instances of GPGPU 2230 can be configured to operate as a compute cluster. In at least one embodiment, communication used by compute clusters 2236A-2236H for synchronization and data exchange varies across embodiments. In at least one embodiment, multiple instances of GPGPU 2230 communicate over host interface 2232. In at least one embodiment, GPGPU 2230 includes an I/O hub 2239 that couples GPGPU 2230 with a GPU link 2240 that enables a direct connection to other instances of GPGPU 2230. In at least one embodiment, GPU link 2240 is coupled to a dedicated GPU-to-GPU bridge that enables communication and synchronization between multiple instances of GPGPU 2230. In at least one embodiment, GPU link 2240 couples with a high-speed interconnect to transmit and receive data to other GPGPUs or parallel processors. In at least one embodiment, multiple instances of GPGPU 2230 are located in separate data processing systems and communicate via a network device that is accessible via host interface 2232. In at least one embodiment GPU link 2240 can be configured to enable a connection to a host processor in addition to or as an alternative to host interface 2232.

In at least one embodiment, GPGPU 2230 can be configured to train neural networks. In at least one embodiment, GPGPU 2230 can be used within an inferencing platform. In at least one embodiment, in which GPGPU 2230 is used for inferencing, GPGPU 2230 may include fewer compute clusters 2236A-2236H relative to when GPGPU 2230 is used for training a neural network. In at least one embodiment, memory technology associated with memory 2244A-2244B may differ between inferencing and training configurations, with higher bandwidth memory technologies devoted to training configurations. In at least one embodiment, an inferencing configuration of GPGPU 2230 can support inferencing specific instructions. For example, in at least one embodiment, an inferencing configuration can provide support for one or more 8-bit integer dot product instructions, which may be used during inferencing operations for deployed neural networks.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in GPGPU 2230 for inferencing or predicting operations based, at least in part, on weight parameters calculated using neural network training operations, neural network functions and/or architectures, or neural network use cases described herein.

In at least one embodiment, the processor(s) 114 may be implemented at least in part by the GPGPU 2230 and the memory 116 may be implemented at least in part by the memory 2244A-2244B. By way of another non-limiting example, the instructions 118 (see FIG. 1) may be stored by the memory 2244A-2244B, executed by the GPGPU 2230, and used to obtain the optical flow map 110 (see FIGS. 1 and 2). As mentioned above, the system 100 (see FIG. 1) may be implemented by at least a portion of the inference and/or training logic 1115. Referring to FIG. 1, the GPGPU 2230 (see FIG. 22B) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

Figure 23:
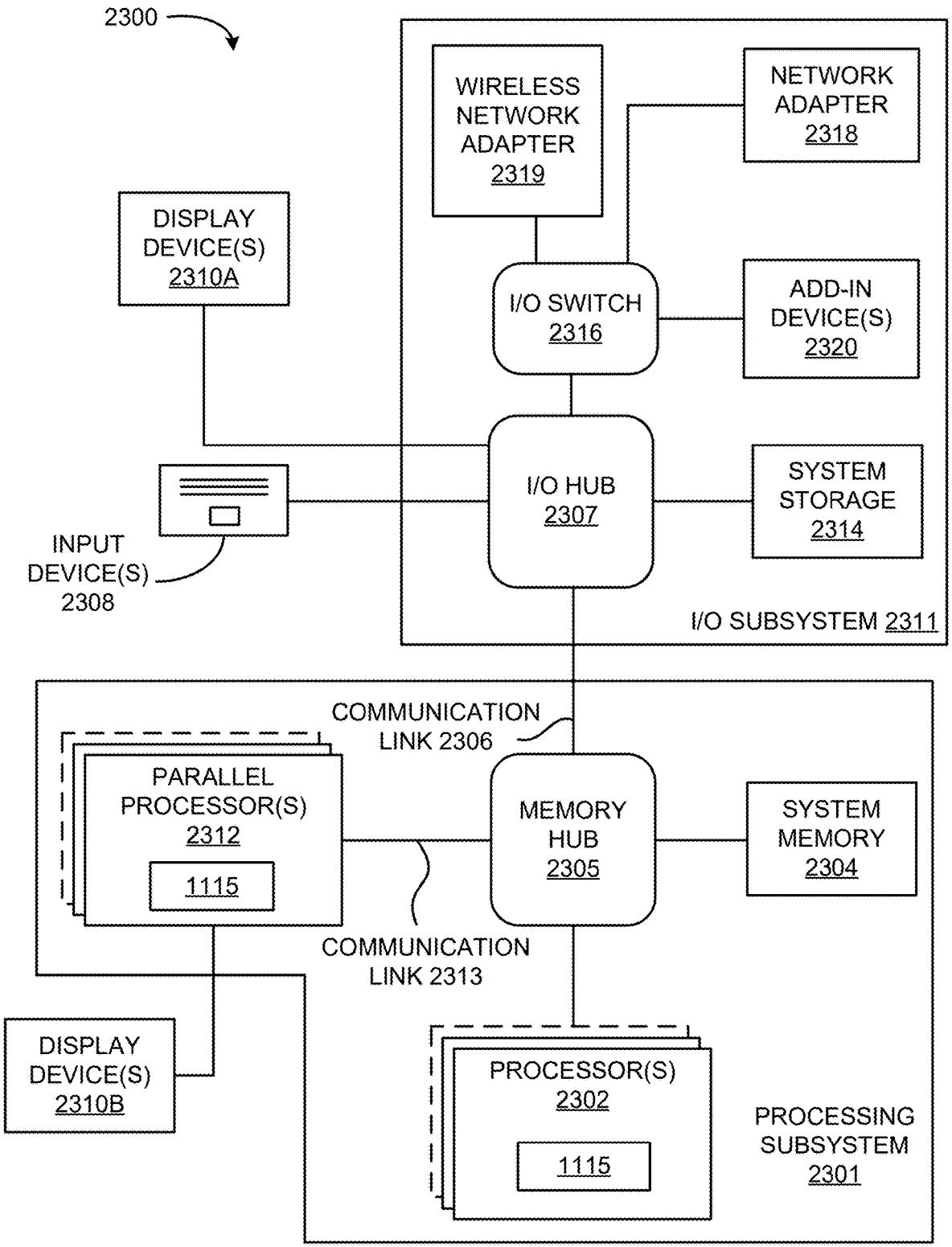
FIG. 23 illustrates a computer system, according to at least one embodiment.

FIG. 23 is a block diagram illustrating a computing system 2300 according to at least one embodiment. In at least one embodiment, computing system 2300 includes a processing subsystem 2301 having one or more processor(s) 2302 and a system memory 2304 communicating via an interconnection path that may include a memory hub 2305. In at least one embodiment, memory hub 2305 may be a separate component within a chipset component or may be integrated within one or more processor(s) 2302. In at least one embodiment, memory hub 2305 couples with an I/O subsystem 2311 via a communication link 2306. In at least one embodiment, I/O subsystem 2311 includes an I/O hub 2307 that can enable computing system 2300 to receive input from one or more input device(s) 2308. In at least one embodiment, I/O hub 2307 can enable a display controller, which may be included in one or more processor(s) 2302, to provide outputs to one or more display device(s) 2310A. In at least one embodiment, one or more display device(s) 2310A coupled with I/O hub 2307 can include a local, internal, or embedded display device.

In at least one embodiment, processing subsystem 2301 includes one or more parallel processor(s) 2312 coupled to memory hub 2305 via a bus or other communication link 2313. In at least one embodiment, communication link 2313 may use one of any number of standards based communication link technologies or protocols, such as, but not limited to PCI Express, or may be a vendor-specific communications interface or communications fabric. In at least one embodiment, one or more parallel processor(s) 2312 form a computationally focused parallel or vector processing system that can include a large number of processing cores and/or processing clusters, such as a many-integrated core (MIC) processor. In at least one embodiment, some or all of parallel processor(s) 2312 form a graphics processing subsystem that can output pixels to one of one or more display device(s) 2310A coupled via I/O Hub 2307. In at least one embodiment, parallel processor(s) 2312 can also include a display controller and display interface (not shown) to enable a direct connection to one or more display device(s) 2310B.

In at least one embodiment, a system storage unit 2314 can connect to I/O hub 2307 to provide a storage mechanism for computing system 2300. In at least one embodiment, an I/O switch 2316 can be used to provide an interface mechanism to enable connections between I/O hub 2307 and other components, such as a network adapter 2318 and/or a wireless network adapter 2319 that may be integrated into platform, and various other devices that can be added via one or more add-in device(s) 2320. In at least one embodiment, network adapter 2318 can be an Ethernet adapter or another wired network adapter. In at least one embodiment, wireless network adapter 2319 can include one or more of a Wi-Fi, Bluetooth, near field communication (NFC), or other network device that includes one or more wireless radios.

In at least one embodiment, computing system 2300 can include other components not explicitly shown, including USB or other port connections, optical storage drives, video capture devices, and like, may also be connected to I/O hub 2307. In at least one embodiment, communication paths interconnecting various components in FIG. 23 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, parallel processor(s) 2312 incorporate circuitry optimized for graphics and video processing, including, for example, video output circuitry, and constitutes a graphics processing unit (GPU). In at least one embodiment, parallel processor(s) 2312 incorporate circuitry optimized for general purpose processing. In at least embodiment, components of computing system 2300 may be integrated with one or more other system elements on a single integrated circuit. For example, in at least one embodiment, parallel processor(s) 2312, memory hub 2305, processor(s) 2302, and I/O hub 2307 can be integrated into a system on chip (SoC) integrated circuit. In at least one embodiment, components of computing system 2300 can be integrated into a single package to form a system in package (SIP) configuration. In at least one embodiment, at least a portion of components of computing system 2300 can be integrated into a multi-chip module (MCM), which can be interconnected with other multi-chip modules into a modular computing system.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in system FIG. 2300 for inferencing or predicting operations based, at least in part, on weight parameters calculated using neural network training operations, neural network functions and/or architectures, or neural network use cases described herein.

In at least one embodiment, the system 100 (see FIG. 1) may be implemented at least in part by the computing system 2300. For example, the processor(s) 114 may be implemented by one or more of the processor(s) 2302 and/or one or more of the parallel processor(s) 2312, the memory 116 may be a component of the system memory 2304, the interface(s) 115 may be implemented at least in part by the I/O hub 2307, and the bus(es) 117 may be implemented at least in part by the communication links 2306 and/or 2313. By way of another non-limiting example, the instructions 118 (see FIG. 1) may be executed by at least one of the processor(s) 2302 and the parallel processor(s) 2312, and used to obtain the optical flow map 110 (see FIGS. 1 and 2). The upstream hardware 104 may be implemented as one of the input device(s) 2308

As mentioned above, the system 100 (see FIG. 1) may be implemented by at least a portion of the inference and/or training logic 1115. Referring to FIG. 1, the computing system 2300 (see FIG. 23) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

Processors

Figure 24A:
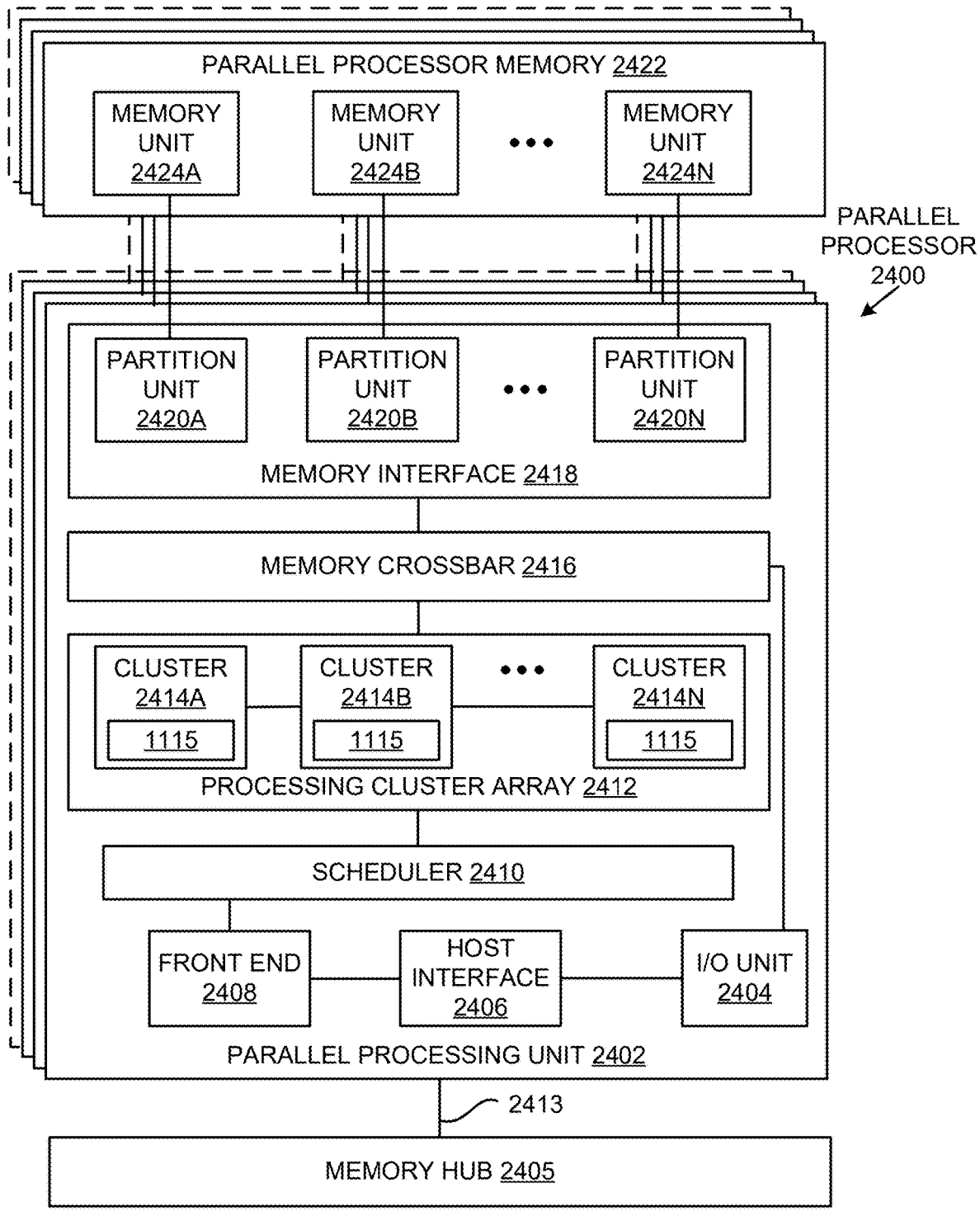
FIG. 24A illustrates a parallel processor, according to at least one embodiment.

FIG. 24A illustrates a parallel processor 2400 according to at least one embodiment. In at least one embodiment, various components of parallel processor 2400 may be implemented using one or more integrated circuit devices, such as programmable processors, application specific integrated circuits (ASICs), or field programmable gate arrays (FPGA). In at least one embodiment, illustrated parallel processor 2400 is a variant of one or more parallel processor(s) 2312 shown in FIG. 23 according to an exemplary embodiment.

In at least one embodiment, parallel processor 2400 includes a parallel processing unit 2402. In at least one embodiment, parallel processing unit 2402 includes an I/O unit 2404 that enables communication with other devices, including other instances of parallel processing unit 2402. In at least one embodiment, I/O unit 2404 may be directly connected to other devices. In at least one embodiment, I/O unit 2404 connects with other devices via use of a hub or switch interface, such as a memory hub 2405. In at least one embodiment, connections between memory hub 2405 and I/O unit 2404 form a communication link 2413. In at least one embodiment, I/O unit 2404 connects with a host interface 2406 and a memory crossbar 2416, where host interface 2406 receives commands directed to performing processing operations and memory crossbar 2416 receives commands directed to performing memory operations.

In at least one embodiment, when host interface 2406 receives a command buffer via I/O unit 2404, host interface 2406 can direct work operations to perform those commands to a front end 2408. In at least one embodiment, front end 2408 couples with a scheduler 2410, which is configured to distribute commands or other work items to a processing cluster array 2412. In at least one embodiment, scheduler 2410 ensures that processing cluster array 2412 is properly configured and in a valid state before tasks are distributed to a cluster of processing cluster array 2412. In at least one embodiment, scheduler 2410 is implemented via firmware logic executing on a microcontroller. In at least one embodiment, microcontroller implemented scheduler 2410 is configurable to perform complex scheduling and work distribution operations at coarse and fine granularity, enabling rapid preemption and context switching of threads executing on processing array 2412. In at least one embodiment, host software can prove workloads for scheduling on processing cluster array 2412 via one of multiple graphics processing paths. In at least one embodiment, workloads can then be automatically distributed across processing array cluster 2412 by scheduler 2410 logic within a microcontroller including scheduler 2410.

In at least one embodiment, processing cluster array 2412 can include up to "N" processing clusters (e.g., cluster 2414A, cluster 2414B, through cluster 2414N), where "N" represents a positive integer (which may be a different integer "N" than used in other figures). In at least one embodiment, each cluster 2414A-2414N of processing cluster array 2412 can execute a large number of concurrent threads. In at least one embodiment, scheduler 2410 can allocate work to clusters 2414A-2414N of processing cluster array 2412 using various scheduling and/or work distribution algorithms, which may vary depending on workload arising for each type of program or computation. In at least one embodiment, scheduling can be handled dynamically by scheduler 2410, or can be assisted in part by compiler logic during compilation of program logic configured for execution by processing cluster array 2412. In at least one embodiment, different clusters 2414A-2414N of processing cluster array 2412 can be allocated for processing different types of programs or for performing different types of computations.

In at least one embodiment, processing cluster array 2412 can be configured to perform various types of parallel processing operations. In at least one embodiment, processing cluster array 2412 is configured to perform general-purpose parallel compute operations. For example, in at least one embodiment, processing cluster array 2412 can include logic to execute processing tasks including filtering of video and/or audio data, performing modeling operations, including physics operations, and performing data transformations.

In at least one embodiment, processing cluster array 2412 is configured to perform parallel graphics processing operations. In at least one embodiment, processing cluster array 2412 can include additional logic to support execution of such graphics processing operations, including but not limited to, texture sampling logic to perform texture operations, as well as tessellation logic and other vertex processing logic. In at least one embodiment, processing cluster array 2412 can be configured to execute graphics processing related shader programs such as, but not limited to, vertex shaders, tessellation shaders, geometry shaders, and pixel shaders. In at least one embodiment, parallel processing unit 2402 can transfer data from system memory via I/O unit 2404 for processing. In at least one embodiment, during processing, transferred data can be stored to on-chip memory (e.g., parallel processor memory 2422) during processing, then written back to system memory.

In at least one embodiment, when parallel processing unit 2402 is used to perform graphics processing, scheduler 2410 can be configured to divide a processing workload into approximately equal sized tasks, to better enable distribution of graphics processing operations to multiple clusters 2414A-2414N of processing cluster array 2412. In at least one embodiment, portions of processing cluster array 2412 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2414A-2414N may be stored in buffers to allow intermediate data to be transmitted between clusters 2414A-2414N for further processing.

In at least one embodiment, processing cluster array 2412 can receive processing tasks to be executed via scheduler 2410, which receives commands defining processing tasks from front end 2408. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 2410 may be configured to fetch indices corresponding to tasks or may receive indices from front end 2408. In at least one embodiment, front end 2408 can be configured to ensure processing cluster array 2412 is configured to a valid state before a workload specified by incoming command buffers (e.g., batch-buffers, push buffers, etc.) is initiated.

In at least one embodiment, each of one or more instances of parallel processing unit 2402 can couple with a parallel processor memory 2422. In at least one embodiment, parallel processor memory 2422 can be accessed via memory crossbar 2416, which can receive memory requests from processing cluster array 2412 as well as I/O unit 2404. In at least one embodiment, memory crossbar 2416 can access parallel processor memory 2422 via a memory interface 2418. In at least one embodiment, memory interface 2418 can include multiple partition units (e.g., partition unit 2420A, partition unit 2420B, through partition unit 2420N) that can each couple to a portion (e.g., memory unit) of parallel processor memory 2422. In at least one embodiment, a number of partition units 2420A-2420N is configured to be equal to a number of memory units, such that a first partition unit 2420A has a corresponding first memory unit 2424A, a second partition unit 2420B has a corresponding memory unit 2424B, and an N-th partition unit 2420N has a corresponding N-th memory unit 2424N. In at least one embodiment, a number of partition units 2420A-2420N may not be equal to a number of memory units.

In at least one embodiment, memory units 2424A-2424N can include various types of memory devices, including dynamic random access memory (DRAM) or graphics random access memory, such as synchronous graphics random access memory (SGRAM), including graphics double data rate (GDDR) memory. In at least one embodiment, memory units 2424A-2424N may also include 3D stacked memory, including but not limited to high bandwidth memory (HBM). In at least one embodiment, render targets, such as frame buffers or texture maps may be stored across memory units 2424A-2424N, allowing partition units 2420A-2420N to write portions of each render target in parallel to efficiently use available bandwidth of parallel processor memory 2422. In at least one embodiment, a local instance of parallel processor memory 2422 may be excluded in favor of a unified memory design that utilizes system memory in conjunction with local cache memory.

In at least one embodiment, any one of clusters 2414A-2414N of processing cluster array 2412 can process data that will be written to any of memory units 2424A-2424N within parallel processor memory 2422. In at least one embodiment, memory crossbar 2416 can be configured to transfer an output of each cluster 2414A-2414N to any partition unit 2420A-2420N or to another cluster 2414A-2414N, which can perform additional processing operations on an output. In at least one embodiment, each cluster 2414A-2414N can communicate with memory interface 2418 through memory crossbar 2416 to read from or write to various external memory devices. In at least one embodiment, memory crossbar 2416 has a connection to memory interface 2418 to communicate with I/O unit 2404, as well as a connection to a local instance of parallel processor memory 2422, enabling processing units within different processing clusters 2414A-2414N to communicate with system memory or other memory that is not local to parallel processing unit 2402. In at least one embodiment, memory crossbar 2416 can use virtual channels to separate traffic streams between clusters 2414A-2414N and partition units 2420A-2420N.

In at least one embodiment, multiple instances of parallel processing unit 2402 can be provided on a single add-in card, or multiple add-in cards can be interconnected. In at least one embodiment, different instances of parallel processing unit 2402 can be configured to interoperate even if different instances have different numbers of processing cores, different amounts of local parallel processor memory, and/or other configuration differences. For example, in at least one embodiment, some instances of parallel processing unit 2402 can include higher precision floating point units relative to other instances. In at least one embodiment, systems incorporating one or more instances of parallel processing unit 2402 or parallel processor 2400 can be implemented in a variety of configurations and form factors, including but not limited to desktop, laptop, or handheld personal computers, servers, workstations, game consoles, and/or embedded systems.

Figure 24B:
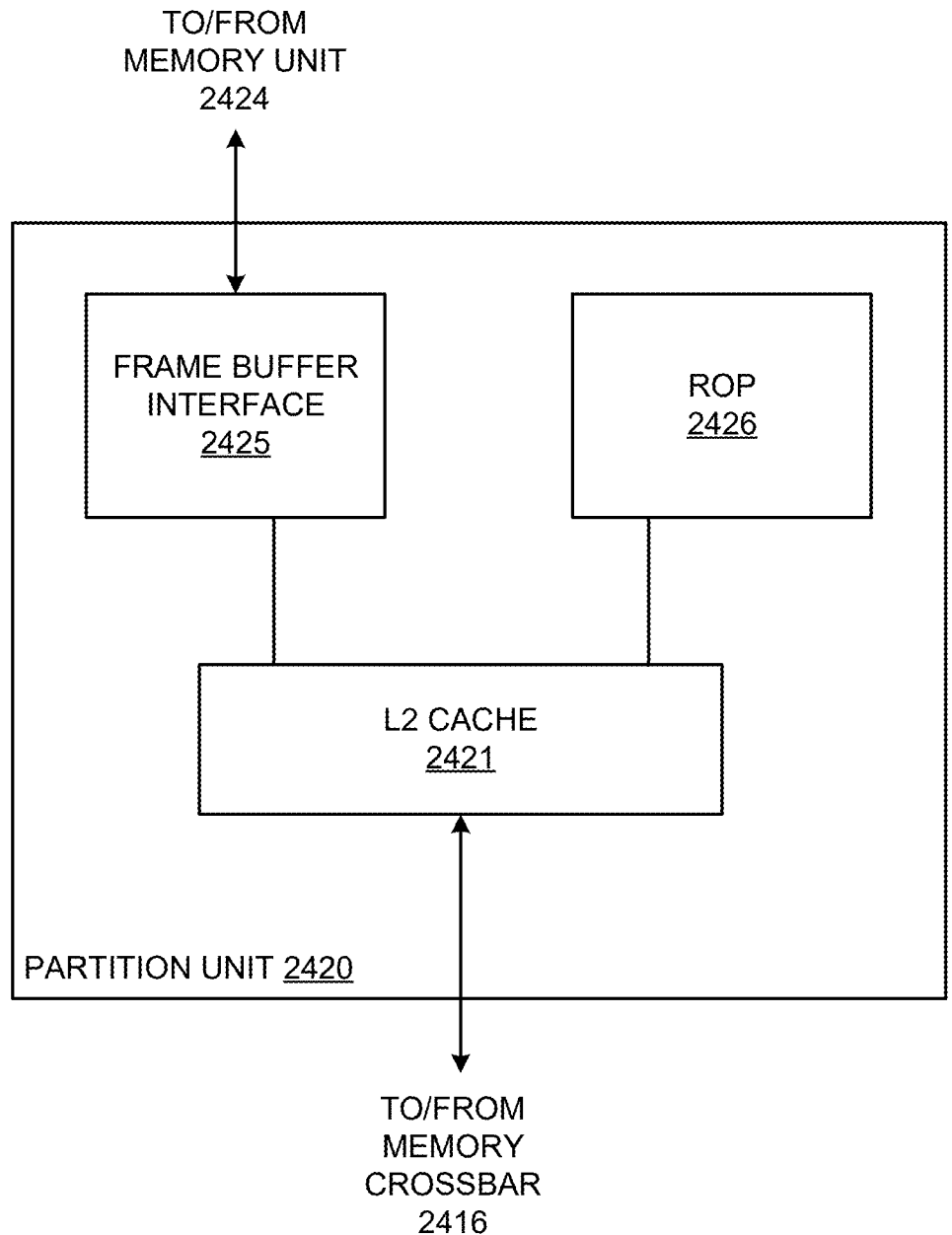
FIG. 24B illustrates a partition unit, according to at least one embodiment.

FIG. 24B is a block diagram of a partition unit 2420 according to at least one embodiment. In at least one embodiment, partition unit 2420 is an instance of one of partition units 2420A-2420N of FIG. 24A. In at least one embodiment, partition unit 2420 includes an L2 cache 2421, a frame buffer interface 2425, and a ROP 2426 (raster operations unit). In at least one embodiment, L2 cache 2421 is a read/write cache that is configured to perform load and store operations received from memory crossbar 2416 and ROP 2426. In at least one embodiment, read misses and urgent write-back requests are output by L2 cache 2421 to frame buffer interface 2425 for processing. In at least one embodiment, updates can also be sent to a frame buffer via frame buffer interface 2425 for processing. In at least one embodiment, frame buffer interface 2425 interfaces with one of memory units in parallel processor memory, such as memory units 2424A-2424N of FIG. 24 (e.g., within parallel processor memory 2422).

In at least one embodiment, ROP 2426 is a processing unit that performs raster operations such as stencil, z test, blending, etc. In at least one embodiment, ROP 2426 then outputs processed graphics data that is stored in graphics memory. In at least one embodiment, ROP 2426 includes compression logic to compress depth or color data that is written to memory and decompress depth or color data that is read from memory. In at least one embodiment, compression logic can be lossless compression logic that makes use of one or more of multiple compression algorithms. In at least one embodiment, a type of compression that is performed by ROP 2426 can vary based on statistical characteristics of data to be compressed. For example, in at least one embodiment, delta color compression is performed on depth and color data on a per-tile basis.

In at least one embodiment, ROP 2426 is included within each processing cluster (e.g., cluster 2414A-2414N of FIG. 24A) instead of within partition unit 2420. In at least one embodiment, read and write requests for pixel data are transmitted over memory crossbar 2416 instead of pixel fragment data. In at least one embodiment, processed graphics data may be displayed on a display device, such as one of one or more display device(s) 2310 of FIG. 23, routed for further processing by processor(s) 2302, or routed for further processing by one of processing entities within parallel processor 2400 of FIG. 24A.

Figure 24C:
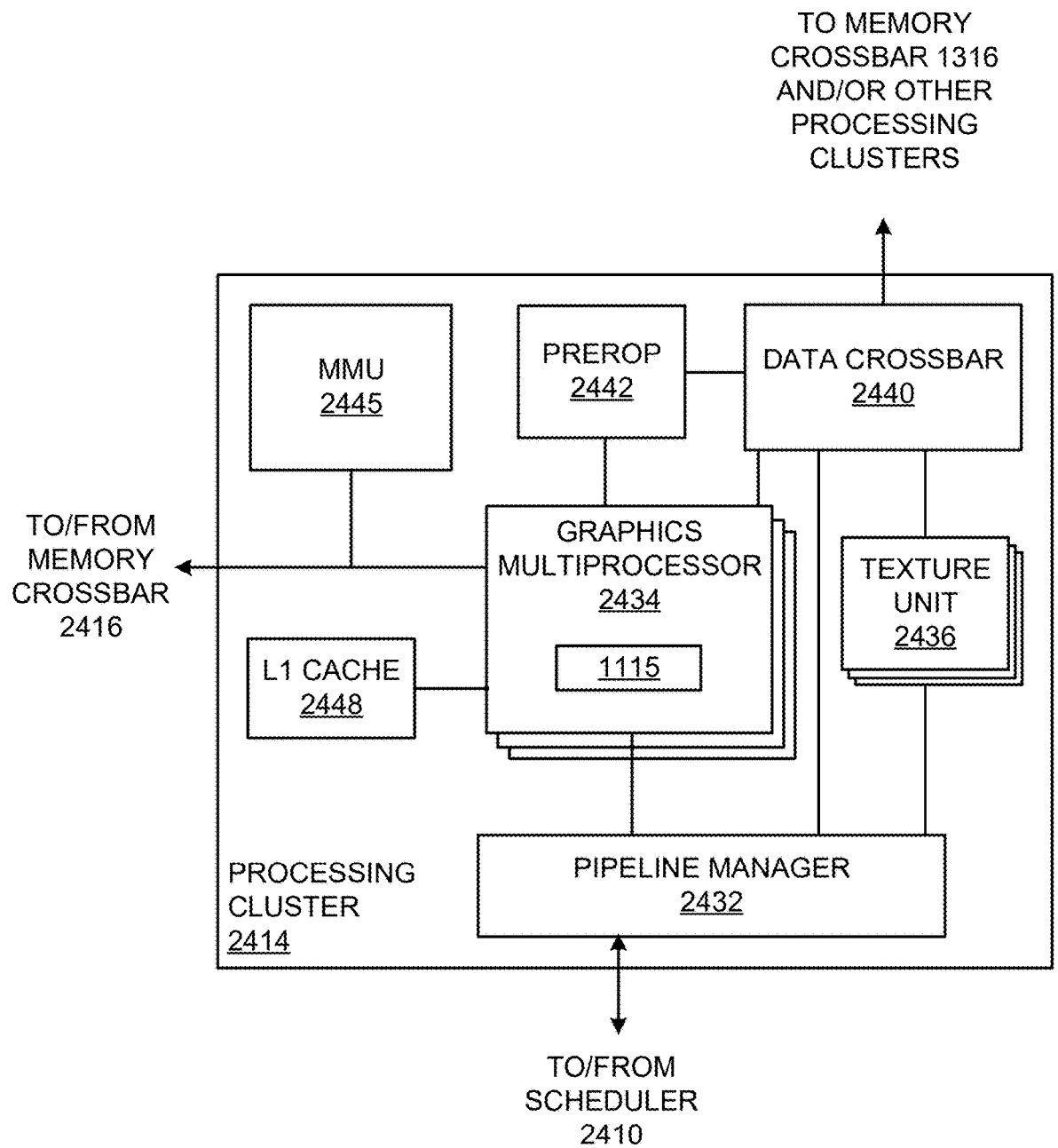
FIG. 24C illustrates a processing cluster, according to at least one embodiment.

FIG. 24C is a block diagram of a processing cluster 2414 within a parallel processing unit according to at least one embodiment. In at least one embodiment, a processing cluster is an instance of one of processing clusters 2414A-2414N of FIG. 24A. In at least one embodiment, processing cluster 2414 can be configured to execute many threads in parallel, where "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 2414 can be controlled via a pipeline manager 2432 that distributes processing tasks to SIMT parallel processors. In at least one embodiment, pipeline manager 2432 receives instructions from scheduler 2410 of FIG. 24A and manages execution of those instructions via a graphics multiprocessor 2434 and/or a texture unit 2436. In at least one embodiment, graphics multiprocessor 2434 is an exemplary instance of a SIMT parallel processor. However, in at least one embodiment, various types of SIMT parallel processors of differing architectures may be included within processing cluster 2414. In at least one embodiment, one or more instances of graphics multiprocessor 2434 can be included within a processing cluster 2414. In at least one embodiment, graphics multiprocessor 2434 can process data and a data crossbar 2440 can be used to distribute processed data to one of multiple possible destinations, including other shader units. In at least one embodiment, pipeline manager 2432 can facilitate distribution of processed data by specifying destinations for processed data to be distributed via data crossbar 2440.

In at least one embodiment, each graphics multiprocessor 2434 within processing cluster 2414 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 2414 constitute a thread. In at least one embodiment, a set of threads executing across a set of parallel processing engines is a thread group. In at least one embodiment, a thread group executes a common program on different input data. In at least one embodiment, each thread within a thread group can be assigned to a different processing engine within a graphics multiprocessor 2434. In at least one embodiment, a thread group may include fewer threads than a number of processing engines within graphics multiprocessor 2434. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 2434. In at least one embodiment, when a thread group includes more threads than number of processing engines within graphics multiprocessor 2434, processing can be performed over consecutive clock cycles. In at least one embodiment, multiple thread groups can be executed concurrently on a graphics multiprocessor 2434.

In at least one embodiment, graphics multiprocessor 2434 includes an internal cache memory to perform load and store operations. In at least one embodiment, graphics multiprocessor 2434 can forego an internal cache and use a cache memory (e.g., L1 cache 2448) within processing cluster 2414. In at least one embodiment, each graphics multiprocessor 2434 also has access to L2 caches within partition units (e.g., partition units 2420A-2420N of FIG. 24A) that are shared among all processing clusters 2414 and may be used to transfer data between threads. In at least one embodiment, graphics multiprocessor 2434 may also access off-chip global memory, which can include one or more of local parallel processor memory and/or system memory. In at least one embodiment, any memory external to parallel processing unit 2402 may be used as global memory. In at least one embodiment, processing cluster 2414 includes multiple instances of graphics multiprocessor 2434 and can share common instructions and data, which may be stored in L1 cache 2448.

In at least one embodiment, each processing cluster 2414 may include an MMU 2445 (memory management unit) that is configured to map virtual addresses into physical addresses. In at least one embodiment, one or more instances of MMU 2445 may reside within memory interface 2418 of FIG. 24A. In at least one embodiment, MMU 2445 includes a set of page table entries (PTEs) used to map a virtual address to a physical address of a tile and optionally a cache line index. In at least one embodiment, MMU 2445 may include address translation lookaside buffers (TLB) or caches that may reside within graphics multiprocessor 2434 or L1 2448 cache or processing cluster 2414. In at least one embodiment, a physical address is processed to distribute surface data access locally to allow for efficient request interleaving among partition units. In at least one embodiment, a cache line index may be used to determine whether a request for a cache line is a hit or miss.

In at least one embodiment, a processing cluster 2414 may be configured such that each graphics multiprocessor 2434 is coupled to a texture unit 2436 for performing texture mapping operations, e.g., determining texture sample positions, reading texture data, and filtering texture data. In at least one embodiment, texture data is read from an internal texture L1 cache (not shown) or from an L1 cache within graphics multiprocessor 2434 and is fetched from an L2 cache, local parallel processor memory, or system memory, as needed. In at least one embodiment, each graphics multiprocessor 2434 outputs processed tasks to data crossbar 2440 to provide processed task to another processing cluster 2414 for further processing or to store processed task in an L2 cache, local parallel processor memory, or system memory via memory crossbar 2416. In at least one embodiment, a preROP 2442 (pre-raster operations unit) is configured to receive data from graphics multiprocessor 2434, and direct data to ROP units, which may be located with partition units as described herein (e.g., partition units 2420A-2420N of FIG. 24A). In at least one embodiment, preROP 2442 unit can perform optimizations for color blending, organizing pixel color data, and performing address translations.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in graphics processing cluster 2414 for inferencing or predicting operations based, at least in part, on weight parameters calculated using neural network training operations, neural network functions and/or architectures, or neural network use cases described herein.

Figure 24D:
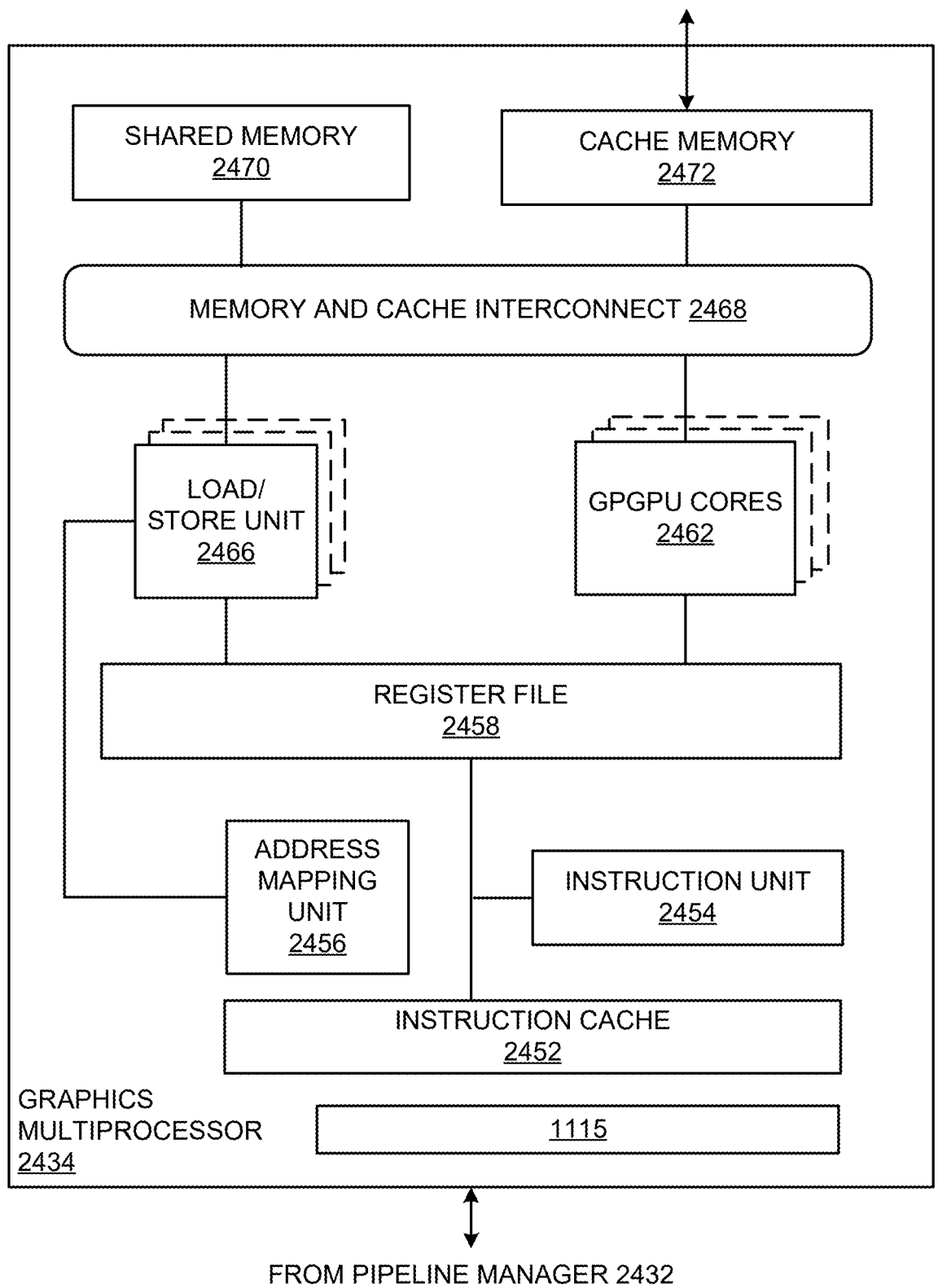
FIG. 24D illustrates a graphics multiprocessor, according to at least one embodiment.

FIG. 24D shows a graphics multiprocessor 2434 according to at least one embodiment. In at least one embodiment, graphics multiprocessor 2434 couples with pipeline manager 2432 of processing cluster 2414. In at least one embodiment, graphics multiprocessor 2434 has an execution pipeline including but not limited to an instruction cache 2452, an instruction unit 2454, an address mapping unit 2456, a register file 2458, one or more general purpose graphics processing unit (GPGPU) cores 2462, and one or more load/store units 2466. In at least one embodiment, GPGPU cores 2462 and load/store units 2466 are coupled with cache memory 2472 and shared memory 2470 via a memory and cache interconnect 2468.

In at least one embodiment, instruction cache 2452 receives a stream of instructions to execute from pipeline manager 2432. In at least one embodiment, instructions are cached in instruction cache 2452 and dispatched for execution by an instruction unit 2454. In at least one embodiment, instruction unit 2454 can dispatch instructions as thread groups (e.g., warps), with each thread of thread group assigned to a different execution unit within GPGPU cores 2462. In at least one embodiment, an instruction can access any of a local, shared, or global address space by specifying an address within a unified address space. In at least one embodiment, address mapping unit 2456 can be used to translate addresses in a unified address space into a distinct memory address that can be accessed by load/store units 2466.

In at least one embodiment, register file 2458 provides a set of registers for functional units of graphics multiprocessor 2434. In at least one embodiment, register file 2458 provides temporary storage for operands connected to data paths of functional units (e.g., GPGPU cores 2462, load/store units 2466) of graphics multiprocessor 2434. In at least one embodiment, register file 2458 is divided between each of functional units such that each functional unit is allocated a dedicated portion of register file 2458. In at least one embodiment, register file 2458 is divided between different warps being executed by graphics multiprocessor 2434.

In at least one embodiment, GPGPU cores 2462 can each include floating point units (FPUs) and/or integer arithmetic logic units (ALUs) that are used to execute instructions of graphics multiprocessor 2434. In at least one embodiment, GPGPU cores 2462 can be similar in architecture or can differ in architecture. In at least one embodiment, a first portion of GPGPU cores 2462 include a single precision FPU and an integer ALU while a second portion of GPGPU cores include a double precision FPU. In at least one embodiment, FPUs can implement IEEE 754-2008 standard floating point arithmetic or enable variable precision floating point arithmetic. In at least one embodiment, graphics multiprocessor 2434 can additionally include one or more fixed function or special function units to perform specific functions such as copy rectangle or pixel blending operations. In at least one embodiment, one or more of GPGPU cores 2462 can also include fixed or special function logic.

In at least one embodiment, GPGPU cores 2462 include SIMD logic capable of performing a single instruction on multiple sets of data. In at least one embodiment, GPGPU cores 2462 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 2468 is an interconnect network that connects each functional unit of graphics multiprocessor 2434 to register file 2458 and to shared memory 2470. In at least one embodiment, memory and cache interconnect 2468 is a crossbar interconnect that allows load/store unit 2466 to implement load and store operations between shared memory 2470 and register file 2458. In at least one embodiment, register file 2458 can operate at a same frequency as GPGPU cores 2462, thus data transfer between GPGPU cores 2462 and register file 2458 can have very low latency. In at least one embodiment, shared memory 2470 can be used to enable communication between threads that execute on functional units within graphics multiprocessor 2434. In at least one embodiment, cache memory 2472 can be used as a data cache for example, to cache texture data communicated between functional units and texture unit 2436. In at least one embodiment, shared memory 2470 can also be used as a program managed cache. In at least one embodiment, threads executing on GPGPU cores 2462 can programmatically store data within shared memory in addition to automatically cached data that is stored within cache memory 2472.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high-speed interconnect such as PCIe or NVLink). In at least one embodiment, a GPU may be integrated on a package or chip as cores and communicatively coupled to cores over an internal processor bus/interconnect internal to a package or chip. In at least one embodiment, regardless a manner in which a GPU is connected, processor cores may allocate work to such GPU in a form of sequences of commands/instructions contained in a work descriptor. In at least one embodiment, that GPU then uses dedicated circuitry/logic for efficiently processing these commands/instructions.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in graphics multiprocessor 2434 for inferencing or predicting operations based, at least in part, on weight parameters calculated using neural network training operations, neural network functions and/or architectures, or neural network use cases described herein.

In at least one embodiment, the processor(s) 114 may be implemented at least in part by the parallel processor 2400 and/or the graphics multiprocessor 2434, and the memory 116 may be implemented at least in part by the shared memory 2470 and/or the parallel processor memory 2422. By way of another non-limiting example, the instructions 118 (see FIG. 1) may be executed by the parallel processor 2400 and/or the graphics multiprocessor 2434, and used to obtain the optical flow map 110 (see FIGS. 1 and 2). As mentioned above, the system 100 (see FIG. 1) may be implemented by at least a portion of the inference and/or training logic 1115. Referring to FIG. 1, the parallel processor 2400 and/or the graphics multiprocessor 2434 (see FIG. 24) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

Figure 25:
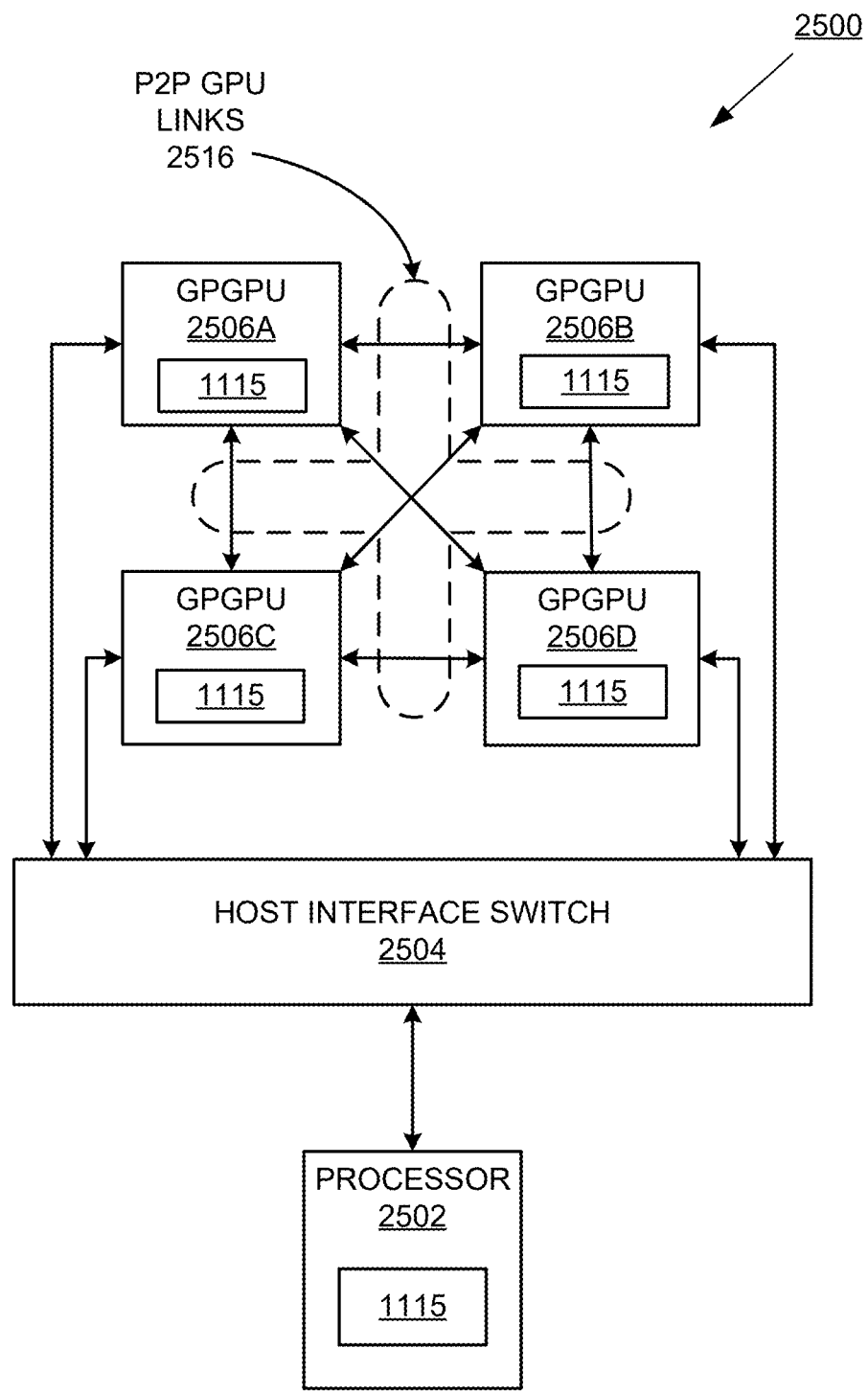
FIG. 25 illustrates a multi-graphics processing unit (GPU) system, according to at least one embodiment.

FIG. 25 illustrates a multi-GPU computing system 2500, according to at least one embodiment. In at least one embodiment, multi-GPU computing system 2500 can include a processor 2502 coupled to multiple general purpose graphics processing units (GPGPUs) 2506A-D via a host interface switch 2504. In at least one embodiment, host interface switch 2504 is a PCI express switch device that couples processor 2502 to a PCI express bus over which processor 2502 can communicate with GPGPUs 2506A-D. In at least one embodiment, GPGPUs 2506A-D can interconnect via a set of high-speed point-to-point GPU-to-GPU links 2516. In at least one embodiment, GPU-to-GPU links 2516 connect to each of GPGPUs 2506A-D via a dedicated GPU link. In at least one embodiment, P2P GPU links 2516 enable direct communication between each of GPGPUs 2506A-D without requiring communication over host interface switch 2504 to which processor 2502 is connected. In at least one embodiment, with GPU-to-GPU traffic directed to P2P GPU links 2516, host interface switch 2504 remains available for system memory access or to communicate with other instances of multi-GPU computing system 2500, for example, via one or more network devices. While in at least one embodiment GPGPUs 2506A-D connect to processor 2502 via host interface switch 2504, in at least one embodiment processor 2502 includes direct support for P2P GPU links 2516 and can connect directly to GPGPUs 2506A-D.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in multi-GPU computing system 2500 for inferencing or predicting operations based, at least in part, on weight parameters calculated using neural network training operations, neural network functions and/or architectures, or neural network use cases described herein.

In at least one embodiment, the system 100 (see FIG. 1) may be implemented at least in part by the multi-GPU computing system 2500. In at least one embodiment, the processor(s) 114 may be implemented at least in part by the processor 2502 and/or one or more of the GPGPUs 2506A-D. By way of another non-limiting example, the instructions 118 (see FIG. 1) may be executed by the processor 2502 and/or one or more of the GPGPUs 2506A-D, and used to obtain the optical flow map 110 (see FIGS. 1 and 2). As mentioned above, the system 100 (see FIG. 1) may be implemented by at least a portion of the inference and/or training logic 1115. Referring to FIG. 1, the multi-GPU computing system 2500 (see FIG. 25) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

Figure 26:
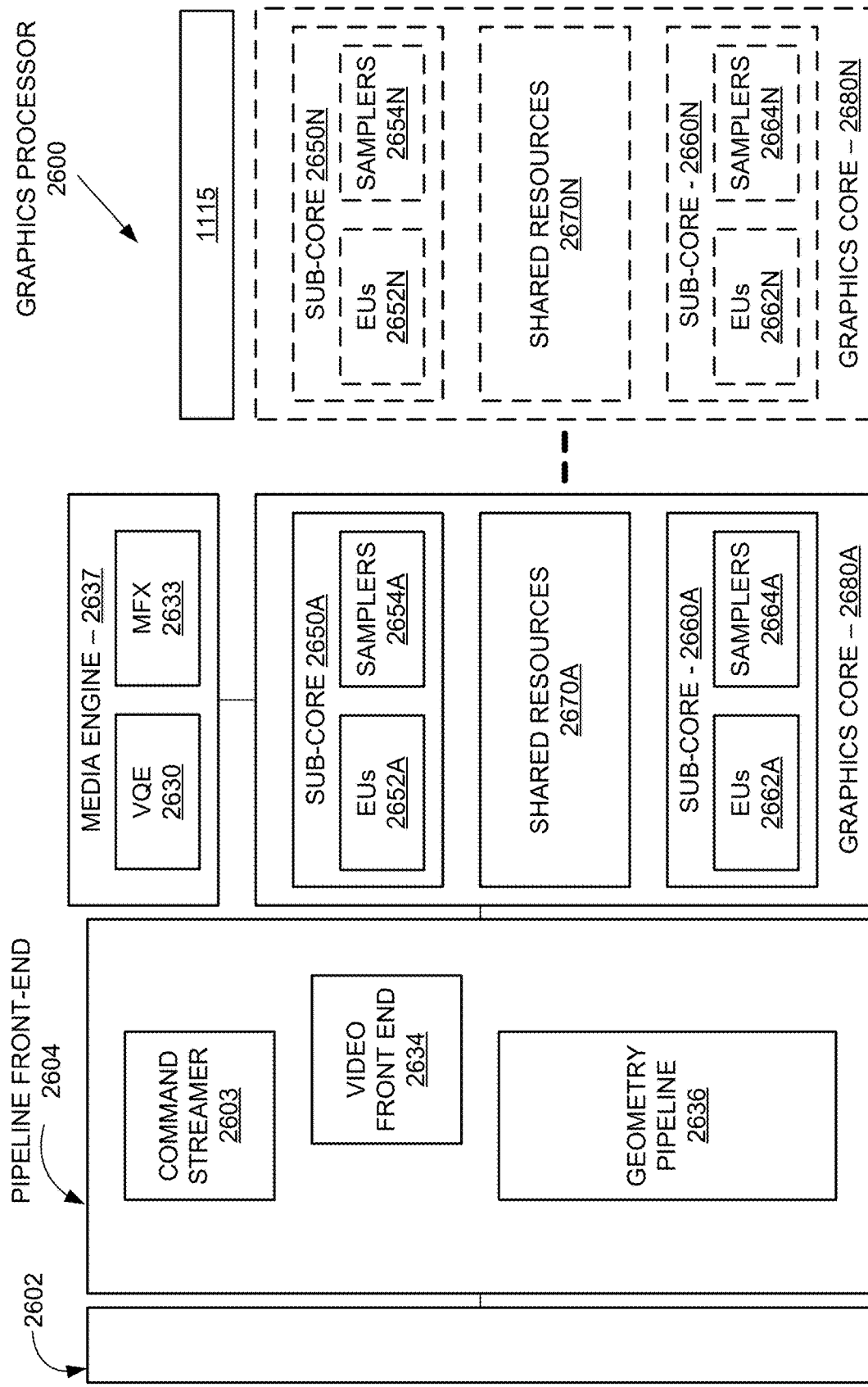
FIG. 26 illustrates a graphics processor, according to at least one embodiment.

FIG. 26 is a block diagram of a graphics processor 2600, according to at least one embodiment. In at least one embodiment, graphics processor 2600 includes a ring interconnect 2602, a pipeline front-end 2604, a media engine 2637, and graphics cores 2680A-2680N. In at least one embodiment, ring interconnect 2602 couples graphics processor 2600 to other processing units, including other graphics processors or one or more general-purpose processor cores. In at least one embodiment, graphics processor 2600 is one of many processors integrated within a multi-core processing system.

In at least one embodiment, graphics processor 2600 receives batches of commands via ring interconnect 2602. In at least one embodiment, incoming commands are interpreted by a command streamer 2603 in pipeline front-end 2604. In at least one embodiment, graphics processor 2600 includes scalable execution logic to perform 3D geometry processing and media processing via graphics core(s) 2680A-2680N. In at least one embodiment, for 3D geometry processing commands, command streamer 2603 supplies commands to geometry pipeline 2636. In at least one embodiment, for at least some media processing commands, command streamer 2603 supplies commands to a video front end 2634, which couples with media engine 2637. In at least one embodiment, media engine 2637 includes a Video Quality Engine (VQE) 2630 for video and image post-processing and a multi-format encode/decode (MFX) 2633 engine to provide hardware-accelerated media data encoding and decoding. In at least one embodiment, geometry pipeline 2636 and media engine 2637 each generate execution threads for thread execution resources provided by at least one graphics core 2680.

In at least one embodiment, graphics processor 2600 includes scalable thread execution resources featuring graphics cores 2680A-2680N (which can be modular and are sometimes referred to as core slices), each having multiple sub-cores 2650A-50N, 2660A-2660N (sometimes referred to as core sub-slices). In at least one embodiment, graphics processor 2600 can have any number of graphics cores 2680A. In at least one embodiment, graphics processor 2600 includes a graphics core 2680A having at least a first sub-core 2650A and a second sub-core 2660A. In at least one embodiment, graphics processor 2600 is a low power processor with a single sub-core (e.g., 2650A). In at least one embodiment, graphics processor 2600 includes multiple graphics cores 2680A-2680N, each including a set of first sub-cores 2650A-2650N and a set of second sub-cores 2660A-2660N. In at least one embodiment, each sub-core in first sub-cores 2650A-2650N includes at least a first set of execution units 2652A-2652N and media/texture samplers 2654A-2654N. In at least one embodiment, each sub-core in second sub-cores 2660A-2660N includes at least a second set of execution units 2662A-2662N and samplers 2664A-2664N. In at least one embodiment, each sub-core 2650A-2650N, 2660A-2660N shares a set of shared resources 2670A-2670N. In at least one embodiment, shared resources include shared cache memory and pixel operation logic.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, inference and/or training logic 1115 may be used in graphics processor 2600 for inferencing or predicting operations based, at least in part, on weight parameters calculated using neural network training operations, neural network functions and/or architectures, or neural network use cases described herein.

In at least one embodiment, the processor(s) 114 may be implemented at least in part by the graphics processor 2600. For example, the instructions 118 (see FIG. 1) may be executed by the graphics processor 2600, and used to obtain the optical flow map 110 (see FIGS. 1 and 2). As mentioned above, the system 100 (see FIG. 1) may be implemented by at least a portion of the inference and/or training logic 1115. Referring to FIG. 1, the graphics processor 2600 (see FIG. 26) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

Figure 27:
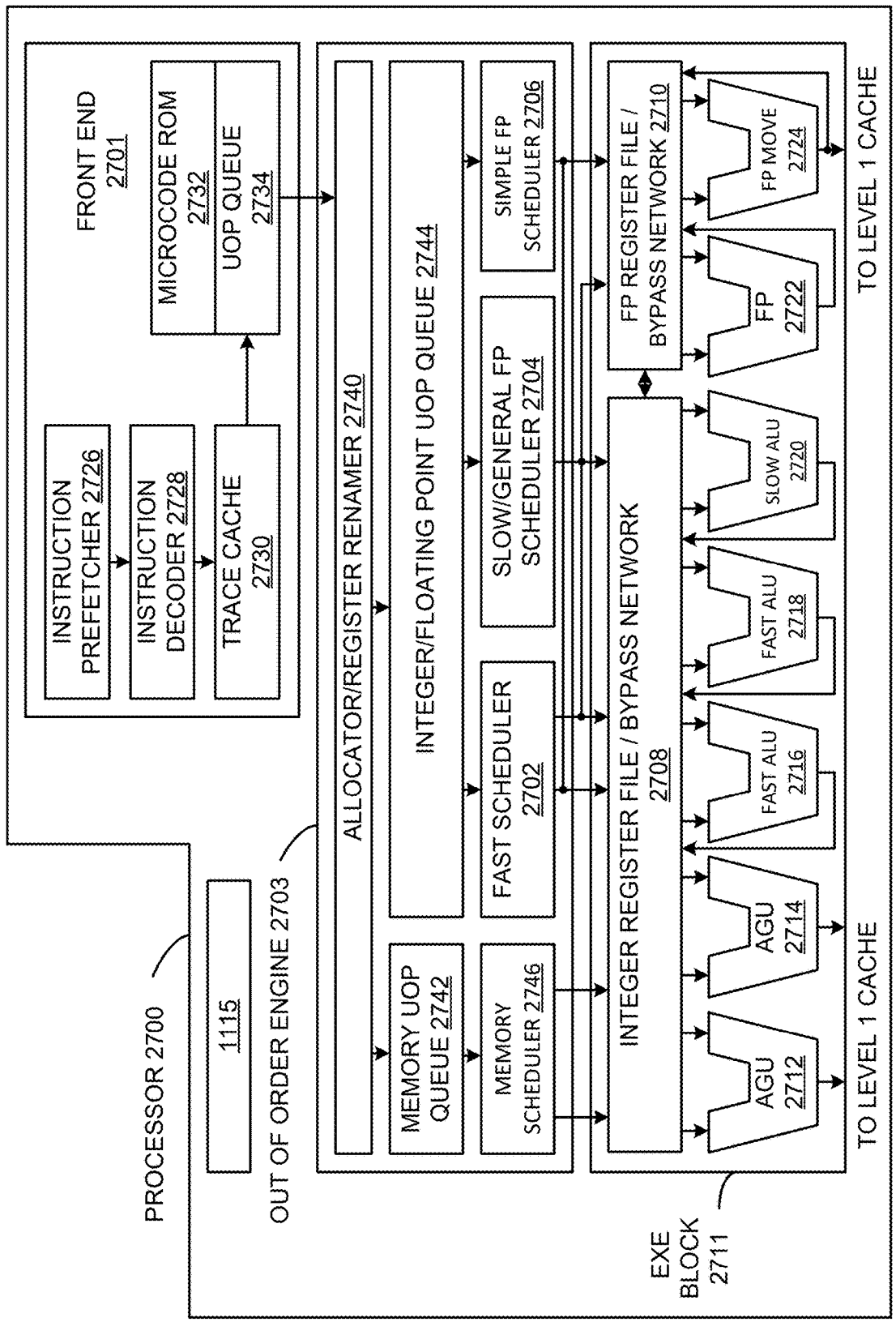
FIG. 27 is a block diagram illustrating a processor microarchitecture for a processor, according to at least one embodiment.

FIG. 27 is a block diagram illustrating micro-architecture for a processor 2700 that may include logic circuits to perform instructions, according to at least one embodiment. In at least one embodiment, processor 2700 may perform instructions, including x86 instructions, ARM instructions, specialized instructions for application-specific integrated circuits (ASICs), etc. In at least one embodiment, processor 2700 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany single instruction, multiple data ("SIMD") and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processor 2700 may perform instructions to accelerate machine learning or deep learning algorithms, training, or inferencing.

In at least one embodiment, processor 2700 includes an in-order front end ("front end") 2701 to fetch instructions to be executed and prepare instructions to be used later in a processor pipeline. In at least one embodiment, front end 2701 may include several units. In at least one embodiment, an instruction prefetcher 2726 fetches instructions from memory and feeds instructions to an instruction decoder 2728 which in turn decodes or interprets instructions. For example, in at least one embodiment, instruction decoder 2728 decodes a received instruction into one or more operations called "micro-instructions" or "micro-operations" (also called "micro ops" or "uops") that a machine may execute. In at least one embodiment, instruction decoder 2728 parses an instruction into an opcode and corresponding data and control fields that may be used by micro-architecture to perform operations in accordance with at least one embodiment. In at least one embodiment, a trace cache 2730 may assemble decoded uops into program ordered sequences or traces in a uop queue 2734 for execution. In at least one embodiment, when trace cache 2730 encounters a complex instruction, a microcode ROM 2732 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 2728 may access microcode ROM 2732 to perform that instruction. In at least one embodiment, an instruction may be decoded into a small number of micro-ops for processing at instruction decoder 2728. In at least one embodiment, an instruction may be stored within microcode ROM 2732 should a number of micro-ops be needed to accomplish such operation. In at least one embodiment, trace cache 2730 refers to an entry point programmable logic array ("PLA") to determine a correct micro-instruction pointer for reading microcode sequences to complete one or more instructions from microcode ROM 2732 in accordance with at least one embodiment. In at least one embodiment, after microcode ROM 2732 finishes sequencing micro-ops for an instruction, front end 2701 of a machine may resume fetching micro-ops from trace cache 2730.

In at least one embodiment, out-of-order execution engine ("out of order engine") 2703 may prepare instructions for execution. In at least one embodiment, out-of-order execution logic has a number of buffers to smooth out and re-order flow of instructions to optimize performance as they go down a pipeline and get scheduled for execution. In at least one embodiment, out-of-order execution engine 2703 includes, without limitation, an allocator/register renamer 2740, a memory uop queue 2742, an integer/floating point uop queue 2744, a memory scheduler 2746, a fast scheduler 2702, a slow/general floating point scheduler ("slow/general FP scheduler") 2704, and a simple floating point scheduler ("simple FP scheduler") 2706. In at least one embodiment, fast schedule 2702, slow/general floating point scheduler 2704, and simple floating point scheduler 2706 are also collectively referred to herein as "uop schedulers 2702, 2704, 2706." In at least one embodiment, allocator/register renamer 2740 allocates machine buffers and resources that each uop needs in order to execute. In at least one embodiment, allocator/register renamer 2740 renames logic registers onto entries in a register file. In at least one embodiment, allocator/register renamer 2740 also allocates an entry for each uop in one of two uop queues, memory uop queue 2742 for memory operations and integer/floating point uop queue 2744 for non-memory operations, in front of memory scheduler 2746 and uop schedulers 2702, 2704, 2706. In at least one embodiment, uop schedulers 2702, 2704, 2706, determine when a uop is ready to execute based on readiness of their dependent input register operand sources and availability of execution resources uops need to complete their operation. In at least one embodiment, fast scheduler 2702 may schedule on each half of a main clock cycle while slow/general floating point scheduler 2704 and simple floating point scheduler 2706 may schedule once per main processor clock cycle. In at least one embodiment, uop schedulers 2702, 2704, 2706 arbitrate for dispatch ports to schedule uops for execution.

In at least one embodiment, execution block 2711 includes, without limitation, an integer register file/bypass network 2708, a floating point register file/bypass network ("FP register file/bypass network") 2710, address generation units ("AGUs") 2712 and 2714, fast Arithmetic Logic Units (ALUs) ("fast ALUs") 2716 and 2718, a slow Arithmetic Logic Unit ("slow ALU") 2720, a floating point ALU ("FP") 2722, and a floating point move unit ("FP move") 2724. In at least one embodiment, integer register file/bypass network 2708 and floating point register file/bypass network 2710 are also referred to herein as "register files 2708, 2710." In at least one embodiment, AGUSs 2712 and 2714, fast ALUs 2716 and 2718, slow ALU 2720, floating point ALU 2722, and floating point move unit 2724 are also referred to herein as "execution units 2712, 2714, 2716, 2718, 2720, 2722, and 2724." In at least one embodiment, execution block 2711 may include, without limitation, any number (including zero) and type of register files, bypass networks, address generation units, and execution units, in any combination.

In at least one embodiment, register networks 2708, 2710 may be arranged between uop schedulers 2702, 2704, 2706, and execution units 2712, 2714, 2716, 2718, 2720, 2722, and 2724. In at least one embodiment, integer register file/bypass network 2708 performs integer operations. In at least one embodiment, floating point register file/bypass network 2710 performs floating point operations. In at least one embodiment, each of register networks 2708, 2710 may include, without limitation, a bypass network that may bypass or forward just completed results that have not yet been written into a register file to new dependent uops. In at least one embodiment, register networks 2708, 2710 may communicate data with each other. In at least one embodiment, integer register file/bypass network 2708 may include, without limitation, two separate register files, one register file for a low-order thirty-two bits of data and a second register file for a high order thirty-two bits of data. In at least one embodiment, floating point register file/bypass network 2710 may include, without limitation, 128-bit wide entries because floating point instructions typically have operands from 64 to 128 bits in width.

In at least one embodiment, execution units 2712, 2714, 2716, 2718, 2720, 2722, 2724 may execute instructions. In at least one embodiment, register networks 2708, 2710 store integer and floating point data operand values that microinstructions need to execute. In at least one embodiment, processor 2700 may include, without limitation, any number and combination of execution units 2712, 2714, 2716, 2718, 2720, 2722, 2724. In at least one embodiment, floating point ALU 2722 and floating point move unit 2724, may execute floating point, MMX, SIMD, AVX and SSE, or other operations, including specialized machine learning instructions. In at least one embodiment, floating point ALU 2722 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 2716, 2718. In at least one embodiment, fast ALUS 2716, 2718 may execute fast operations with an effective latency of half a clock cycle. In at least one embodiment, most complex integer operations go to slow ALU 2720 as slow ALU 2720 may include, without limitation, integer execution hardware for long-latency type of operations, such as a multiplier, shifts, flag logic, and branch processing. In at least one embodiment, memory load/store operations may be executed by AGUs 2712, 2714. In at least one embodiment, fast ALU 2716, fast ALU 2718, and slow ALU 2720 may perform integer operations on 64-bit data operands. In at least one embodiment, fast ALU 2716, fast ALU 2718, and slow ALU 2720 may be implemented to support a variety of data bit sizes including sixteen, thirty-two, 128, 256, etc. In at least one embodiment, floating point ALU 2722 and floating point move unit 2724 may be implemented to support a range of operands having bits of various widths, such as 128-bit wide packed data operands in conjunction with SIMD and multimedia instructions.

In at least one embodiment, uop schedulers 2702, 2704, 2706 dispatch dependent operations before a parent load has finished executing. In at least one embodiment, as uops may be speculatively scheduled and executed in processor 2700, processor 2700 may also include logic to handle memory misses. In at least one embodiment, if a data load misses in a data cache, there may be dependent operations in flight in a pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and a replay mechanism of at least one embodiment of a processor may also be designed to catch instruction sequences for text string comparison operations.

In at least one embodiment, "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment portions or all of inference and/or training logic 1115 may be incorporated into execution block 2711 and other memory or registers shown or not shown. For example, in at least one embodiment, training and/or inferencing techniques described herein may use one or more of ALUs illustrated in execution block 2711. Moreover, weight parameters may be stored in on-chip or off-chip memory and/or registers (shown or not shown) that configure ALUs of execution block 2711 to perform one or more machine learning algorithms, neural network architectures, use cases, or training techniques described herein.

In at least one embodiment, the processor(s) 114 may be implemented at least in part by the processor 2700. For example, the instructions 118 (see FIG. 1) may be executed by the processor 2700, and used to obtain the optical flow map 110 (see FIGS. 1 and 2). As mentioned above, the system 100 (see FIG. 1) may be implemented by at least a portion of the inference and/or training logic 1115. Referring to FIG. 1, the processor 2700 (see FIG. 27) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

Figure 28:
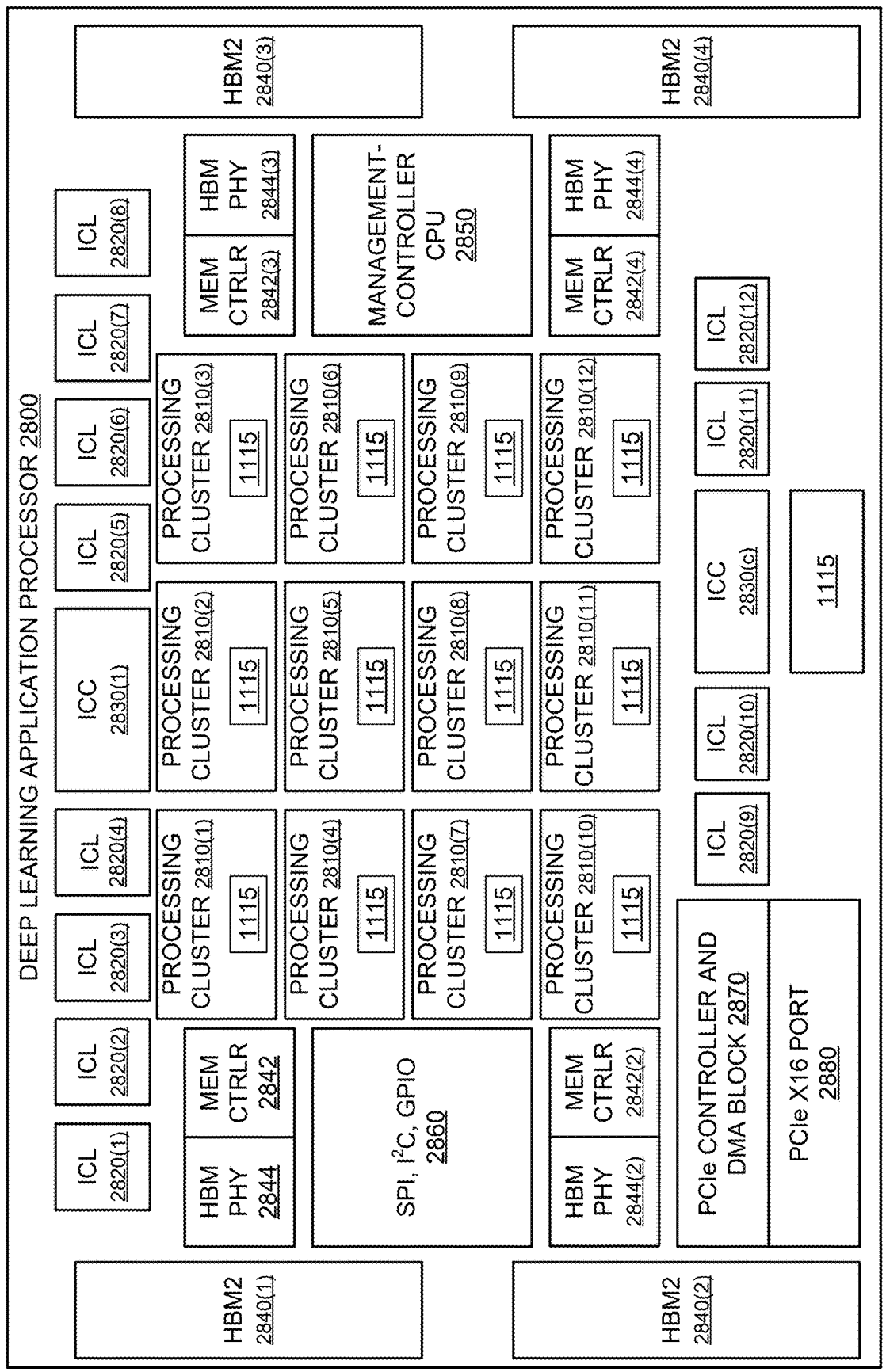
FIG. 28 illustrates a deep learning application processor, according to at least one embodiment.

FIG. 28 illustrates a deep learning application processor 2800, according to at least one embodiment. In at least one embodiment, deep learning application processor 2800 uses instructions that, if executed by deep learning application processor 2800, cause deep learning application processor 2800 to perform some or all of processes and techniques described throughout this disclosure. In at least one embodiment, deep learning application processor 2800 is an application-specific integrated circuit (ASIC). In at least one embodiment, application processor 2800 performs matrix multiply operations either "hard-wired" into hardware as a result of performing one or more instructions or both. In at least one embodiment, deep learning application processor 2800 includes, without limitation, processing clusters 2810(1)-2810(12), Inter-Chip Links ("ICLs") 2820(1)-2820(12), Inter-Chip Controllers ("ICCs") 2830(1)-2830(2), high-bandwidth memory second generation ("HBM2") 2840(1)-2840(4), memory controllers ("Mem Ctrlrs") 2842(1)-2842(4), high bandwidth memory physical layer ("HBM PHY") 2844(1)-2844(4), a management-controller central processing unit ("management-controller CPU") 2850, a Serial Peripheral Interface, Inter-Integrated Circuit, and General Purpose Input/Output block ("SPI, I²C, GPIO") 2860, a peripheral component interconnect express controller and direct memory access block ("PCIe Controller and DMA") 2870, and a sixteen-lane peripheral component interconnect express port ("PCI Express×16") 2880.

In at least one embodiment, processing clusters 2810 may perform deep learning operations, including inference or prediction operations based on weight parameters calculated one or more training techniques, including those described herein. In at least one embodiment, each processing cluster 2810 may include, without limitation, any number and type of processors. In at least one embodiment, deep learning application processor 2800 may include any number and type of processing clusters 2810. In at least one embodiment, Inter-Chip Links 2820 are bi-directional. In at least one embodiment, Inter-Chip Links 2820 and Inter-Chip Controllers 2830 enable multiple deep learning application processors 2800 to exchange information, including activation information resulting from performing one or more machine learning algorithms embodied in one or more neural networks. In at least one embodiment, deep learning application processor 2800 may include any number (including zero) and type of ICLs 2820 and ICCs 2830.

In at least one embodiment, HBM2s 2840 provide a total of 32 Gigabytes (GB) of memory. In at least one embodiment, HBM2 2840(*i*) is associated with both memory controller 2842(*i*) and HBM PHY 2844(*i*) where "i" is an arbitrary integer. In at least one embodiment, any number of HBM2s 2840 may provide any type and total amount of high bandwidth memory and may be associated with any number (including zero) and type of memory controllers 2842 and HBM PHYs 2844. In at least one embodiment, SPI, I²C, GPIO 2860, PCIe Controller and DMA 2870, and/or PCIe 2880 may be replaced with any number and type of blocks that enable any number and type of communication standards in any technically feasible fashion.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, deep learning application processor is used to train a machine learning model, such as a neural network, to predict or infer information provided to deep learning application processor 2800. In at least one embodiment, deep learning application processor 2800 is used to infer or predict information based on a trained machine learning model (e.g., neural network)

that has been trained by another processor or system or by deep learning application processor 2800. In at least one embodiment, processor 2800 may be used to perform one or more neural network use cases described herein.

In at least one embodiment, the processor(s) 114 may be implemented at least in part by the deep learning application processor 2800. For example, the instructions 118 (see FIG. 1) may be executed by the deep learning application processor 2800, and used to obtain the optical flow map 110 (see FIGS. 1 and 2). As mentioned above, the system 100 (see FIG. 1) may be implemented by at least a portion of the inference and/or training logic 1115. Referring to FIG. 1, the deep learning application processor 2800 (see FIG. 28) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

Figure 29:
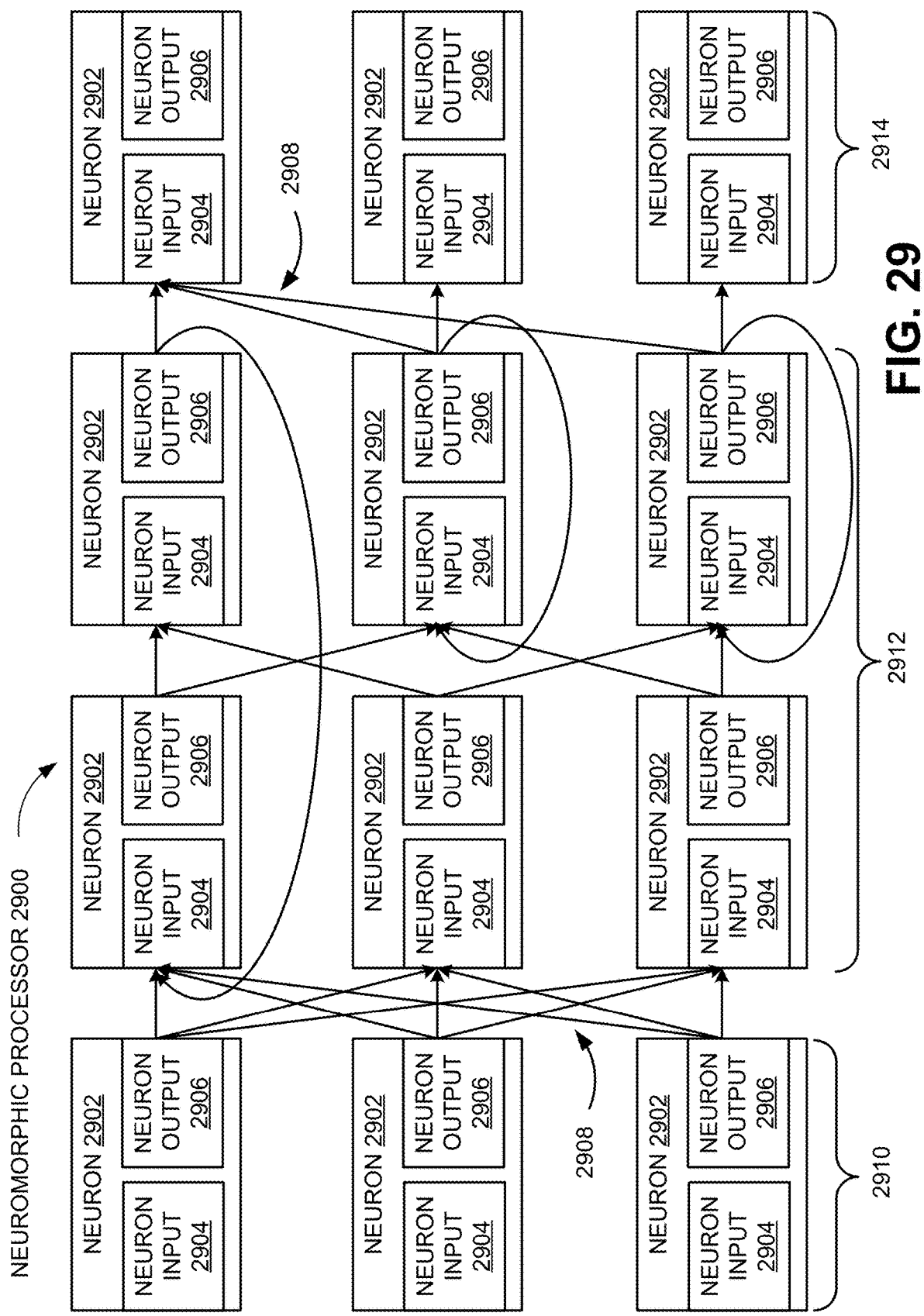
FIG. 29 is a block diagram illustrating an example neuromorphic processor, according to at least one embodiment.

FIG. 29 is a block diagram of a neuromorphic processor 2900, according to at least one embodiment. In at least one embodiment, neuromorphic processor 2900 may receive one or more inputs from sources external to neuromorphic processor 2900. In at least one embodiment, these inputs may be transmitted to one or more neurons 2902 within neuromorphic processor 2900. In at least one embodiment, neurons 2902 and components thereof may be implemented using circuitry or logic, including one or more arithmetic logic units (ALUs). In at least one embodiment, neuromorphic processor 2900 may include, without limitation, thousands or millions of instances of neurons 2902, but any suitable number of neurons 2902 may be used. In at least one embodiment, each instance of neuron 2902 may include a neuron input 2904 and a neuron output 2906. In at least one embodiment, neurons 2902 may generate outputs that may be transmitted to inputs of other instances of neurons 2902. For example, in at least one embodiment, neuron inputs 2904 and neuron outputs 2906 may be interconnected via synapses 2908.

In at least one embodiment, neurons 2902 and synapses 2908 may be interconnected such that neuromorphic processor 2900 operates to process or analyze information received by neuromorphic processor 2900. In at least one embodiment, neurons 2902 may transmit an output pulse (or "fire" or "spike") when inputs received through neuron input 2904 exceed a threshold. In at least one embodiment, neurons 2902 may sum or integrate signals received at neuron inputs 2904. For example, in at least one embodiment, neurons 2902 may be implemented as leaky integrate-and-fire neurons, wherein if a sum (referred to as a "membrane potential") exceeds a threshold value, neuron 2902 may generate an output (or "fire") using a transfer function such as a sigmoid or threshold function. In at least one embodiment, a leaky integrate-and-fire neuron may sum signals received at neuron inputs 2904 into a membrane potential and may also apply a decay factor (or leak) to reduce a membrane potential. In at least one embodiment, a leaky integrate-and-fire neuron may fire if multiple input signals are received at neuron inputs 2904 rapidly enough to exceed a threshold value (i.e., before a membrane potential decays too low to fire). In at least one embodiment, neurons 2902 may be implemented using circuits or logic that receive inputs, integrate inputs into a membrane potential, and decay a membrane potential. In at least one embodiment, inputs may be averaged, or any other suitable transfer function may be used. Furthermore, in at least one embodiment, neurons 2902 may include, without limitation, comparator circuits or logic that generate an output spike at neuron output 2906 when result of applying a transfer function to neuron input 2904 exceeds a threshold. In at least one embodiment, once neuron 2902 fires, it may disregard previously received input information by, for example, resetting a membrane potential to 0 or another suitable default value. In at least one embodiment, once membrane potential is reset to 0, neuron 2902 may resume normal operation after a suitable period of time (or refractory period).

In at least one embodiment, neurons 2902 may be interconnected through synapses 2908. In at least one embodiment, synapses 2908 may operate to transmit signals from an output of a first neuron 2902 to an input of a second neuron 2902. In at least one embodiment, neurons 2902 may transmit information over more than one instance of synapse 2908. In at least one embodiment, one or more instances of neuron output 2906 may be connected, via an instance of synapse 2908, to an instance of neuron input 2904 in same neuron 2902. In at least one embodiment, an instance of neuron 2902 generating an output to be transmitted over an instance of synapse 2908 may be referred to as a "presynaptic neuron" with respect to that instance of synapse 2908. In at least one embodiment, an instance of neuron 2902 receiving an input transmitted over an instance of synapse 2908 may be referred to as a "post-synaptic neuron" with respect to that instance of synapse 2908. Because an instance of neuron 2902 may receive inputs from one or more instances of synapse 2908, and may also transmit outputs over one or more instances of synapse 2908, a single instance of neuron 2902 may therefore be both a "presynaptic neuron" and "post-synaptic neuron," with respect to various instances of synapses 2908, in at least one embodiment.

In at least one embodiment, neurons 2902 may be organized into one or more layers. In at least one embodiment, each instance of neuron 2902 may have one neuron output 2906 that may fan out through one or more synapses 2908 to one or more neuron inputs 2904. In at least one embodiment, neuron outputs 2906 of neurons 2902 in a first layer 2910 may be connected to neuron inputs 2904 of neurons 2902 in a second layer 2912. In at least one embodiment, layer 2910 may be referred to as a "feed-forward layer." In at least one embodiment, each instance of neuron 2902 in an instance of first layer 2910 may fan out to each instance of neuron 2902 in second layer 2912. In at least one embodiment, first layer 2910 may be referred to as a "fully connected feed-forward layer." In at least one embodiment, each instance of neuron 2902 in an instance of second layer 2912 may fan out to fewer than all instances of neuron 2902 in a third layer 2914. In at least one embodiment, second layer 2912 may be referred to as a "sparsely connected feed-forward layer." In at least one embodiment, neurons 2902 in second layer 2912 may fan out to neurons 2902 in multiple other layers, including to neurons 2902 also in second layer 2912. In at least one embodiment, second layer 2912 may be referred to as a "recurrent layer." In at least one embodiment, neuromorphic processor 2900 may include, without limitation, any suitable combination of recurrent layers and feed-forward layers, including, without limitation, both sparsely connected feed-forward layers and fully connected feed-forward layers.

In at least one embodiment, neuromorphic processor 2900 may include, without limitation, a reconfigurable interconnect architecture or dedicated hard-wired interconnects to connect synapse 2908 to neurons 2902. In at least one embodiment, neuromorphic processor 2900 may include, without limitation, circuitry or logic that allows synapses to be allocated to different neurons 2902 as needed based on neural network topology and neuron fan-in/out. For example, in at least one embodiment, synapses 2908 may be connected to neurons 2902 using an interconnect fabric, such as network-on-chip, or with dedicated connections. In at least one embodiment, synapse interconnections and components thereof may be implemented using circuitry or logic.

In at least one embodiment, the processor(s) 114 may be implemented at least in part by the neuromorphic processor 2900. For example, the instructions 118 (see FIG. 1) may be executed by the neuromorphic processor 2900, and used to obtain the optical flow map 110 (see FIGS. 1 and 2). As mentioned above, the system 100 (see FIG. 1) may be implemented by at least a portion of the inference and/or training logic 1115. Referring to FIG. 1, the neuromorphic processor 2900 (see FIG. 29) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

Figure 30:
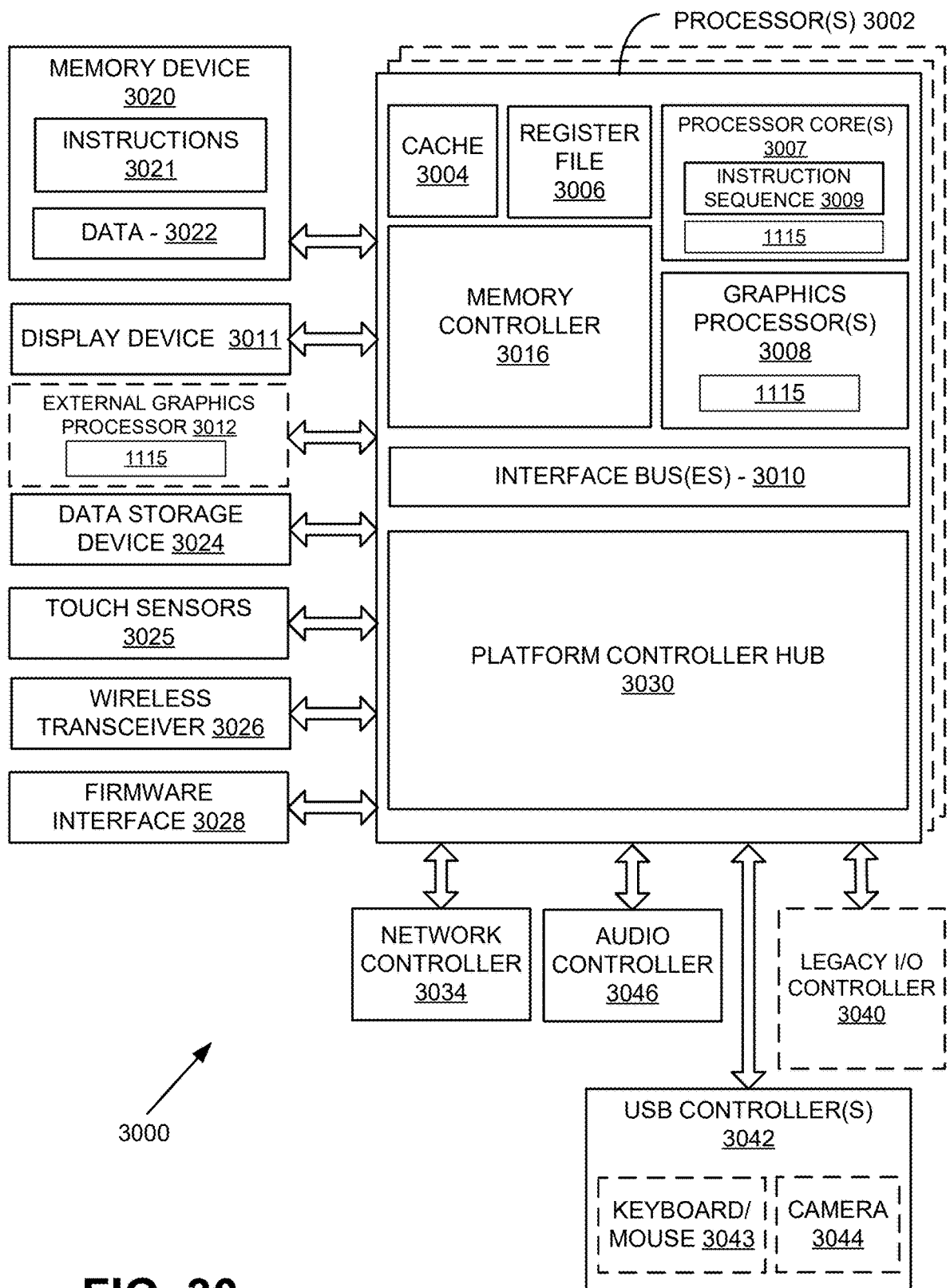
FIG. 30 illustrates at least portions of a graphics processor, according to one or more embodiments.

FIG. 30 is a block diagram of a processing system, according to at least one embodiment. In at least one embodiment, system 3000 includes one or more processors 3002 and one or more graphics processors 3008, and may be a single processor desktop system, a multiprocessor workstation system, or a server system having a large number of processors 3002 or processor cores 3007. In at least one embodiment, system 3000 is a processing platform incorporated within a system-on-a-chip (SoC) integrated circuit for use in mobile, handheld, or embedded devices.

In at least one embodiment, system 3000 can include, or be incorporated within a server-based gaming platform, a game console, including a game and media console, a mobile gaming console, a handheld game console, or an online game console. In at least one embodiment, system 3000 is a mobile phone, a smart phone, a tablet computing device or a mobile Internet device. In at least one embodiment, processing system 3000 can also include, couple with, or be integrated within a wearable device, such as a smart watch wearable device, a smart eyewear device, an augmented reality device, or a virtual reality device. In at least one embodiment, processing system 3000 is a television or set top box device having one or more processors 3002 and a graphical interface generated by one or more graphics processors 3008.

In at least one embodiment, one or more processors 3002 each include one or more processor cores 3007 to process instructions which, when executed, perform operations for system and user software. In at least one embodiment, each of one or more processor cores 3007 is configured to process a specific instruction sequence 3009. In at least one embodiment, instruction sequence 3009 may facilitate Complex Instruction Set Computing (CISC), Reduced Instruction Set Computing (RISC), or computing via a Very Long Instruction Word (VLIW). In at least one embodiment, processor cores 3007 may each process a different instruction sequence 3009, which may include instructions to facilitate emulation of other instruction sequences. In at least one embodiment, processor core 3007 may also include other processing devices, such a Digital Signal Processor (DSP).

In at least one embodiment, processor 3002 includes a cache memory 3004. In at least one embodiment, processor 3002 can have a single internal cache or multiple levels of internal cache. In at least one embodiment, cache memory is shared among various components of processor 3002. In at least one embodiment, processor 3002 also uses an external cache (e.g., a Level-3 (L3) cache or Last Level Cache (LLC)) (not shown), which may be shared among processor cores 3007 using known cache coherency techniques. In at least one embodiment, a register file 3006 is additionally included in processor 3002, which may include different types of registers for storing different types of data (e.g., integer registers, floating point registers, status registers, and an instruction pointer register). In at least one embodiment, register file 3006 may include general-purpose registers or other registers.

In at least one embodiment, one or more processor(s) 3002 are coupled with one or more interface bus(es) 3010 to transmit communication signals such as address, data, or control signals between processor 3002 and other components in system 3000. In at least one embodiment, interface bus 3010 can be a processor bus, such as a version of a Direct Media Interface (DMI) bus. In at least one embodiment, interface bus 3010 is not limited to a DMI bus, and may include one or more Peripheral Component Interconnect buses (e.g., PCI, PCI Express), memory busses, or other types of interface busses. In at least one embodiment processor(s) 3002 include an integrated memory controller 3016 and a platform controller hub 3030. In at least one embodiment, memory controller 3016 facilitates communication between a memory device and other components of system 3000, while platform controller hub (PCH) 3030 provides connections to I/O devices via a local I/O bus.

In at least one embodiment, a memory device 3020 can be a dynamic random access memory (DRAM) device, a static random access memory (SRAM) device, flash memory device, phase-change memory device, or some other memory device having suitable performance to serve as process memory. In at least one embodiment, memory device 3020 can operate as system memory for system 3000, to store data 3022 and instructions 3021 for use when one or more processors 3002 executes an application or process. In at least one embodiment, memory controller 3016 also couples with an optional external graphics processor 3012, which may communicate with one or more graphics processors 3008 in processors 3002 to perform graphics and media operations. In at least one embodiment, a display device 3011 can connect to processor(s) 3002. In at least one embodiment, display device 3011 can include one or more of an internal display device, as in a mobile electronic device or a laptop device, or an external display device attached via a display interface (e.g., DisplayPort, etc.). In at least one embodiment, display device 3011 can include a head mounted display (HMD) such as a stereoscopic display device for use in virtual reality (VR) applications or augmented reality (AR) applications.

In at least one embodiment, platform controller hub 3030 enables peripherals to connect to memory device 3020 and processor 3002 via a high-speed I/O bus. In at least one embodiment, I/O peripherals include, but are not limited to, an audio controller 3046, a network controller 3034, a firmware interface 3028, a wireless transceiver 3026, touch sensors 3025, a data storage device 3024 (e.g., hard disk drive, flash memory, etc.). In at least one embodiment, data storage device 3024 can connect via a storage interface (e.g., SATA) or via a peripheral bus, such as a Peripheral Component Interconnect bus (e.g., PCI, PCI Express). In at least one embodiment, touch sensors 3025 can include touch screen sensors, pressure sensors, or fingerprint sensors. In at least one embodiment, wireless transceiver 3026 can be a Wi-Fi transceiver, a Bluetooth transceiver, or a mobile network transceiver such as a 3G, 4G, or Long Term Evolution (LTE) transceiver. In at least one embodiment, firmware interface 3028 enables communication with system firmware, and can be, for example, a unified extensible firmware interface (UEFI). In at least one embodiment, network controller 3034 can enable a network connection to a wired network. In at least one embodiment, a high-performance network controller (not shown) couples with interface bus 3010. In at least one embodiment, audio controller 3046 is a multi-channel high definition audio controller. In at least one embodiment, system 3000 includes an optional legacy I/O controller 3040 for coupling legacy (e.g., Personal System 2 (PS/2)) devices to system 3000. In at least one embodiment, platform controller hub 3030 can also connect to one or more Universal Serial Bus (USB) controllers 3042 connect input devices, such as keyboard and mouse 3043 combinations, a camera 3044, or other USB input devices.

In at least one embodiment, an instance of memory controller 3016 and platform controller hub 3030 may be integrated into a discreet external graphics processor, such as external graphics processor 3012. In at least one embodiment, platform controller hub 3030 and/or memory controller 3016 may be external to one or more processor(s) 3002. For example, in at least one embodiment, system 3000 can include an external memory controller 3016 and platform controller hub 3030, which may be configured as a memory controller hub and peripheral controller hub within a system chipset that is in communication with processor(s) 3002.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment portions or all of inference and/or training logic 1115 may be incorporated into graphics processor(s) 3008. For example, in at least one embodiment, training and/or inferencing techniques described herein may use one or more of ALUs embodied in a 3D pipeline. Moreover, in at least one embodiment, inferencing and/or training operations described herein may be done using logic other than logic illustrated in FIG. 11A or 11B. In at least one embodiment, weight parameters may be stored in on-chip or off-chip memory and/or registers (shown or not shown) that configure ALUs of graphics processor(s) 3008 to perform one or more machine learning algorithms, neural network architectures, use cases, or training techniques described herein.

In at least one embodiment, the system 100 (see FIG. 1) may be implemented at least in part by the system 3000. In at least one embodiment, the processor(s) 114 may be implemented at least in part by the processors 3002, the processor cores 3007, the graphics processors 3008, and/or the optional external graphics processor 3012, and the memory 116 may be implemented at least in part by the memory device 3020. For example, the instructions 118 (see FIG. 1) may be executed by the processors 3002, the processor cores 3007, the graphics processors 3008, and/or optional external graphics processor 3012, and used to obtain the optical flow map 110 (see FIGS. 1 and 2). As mentioned above, the system 100 (see FIG. 1) may be implemented by at least a portion of the inference and/or training logic 1115. Referring to FIG. 1, the processors 3002, the processor cores 3007, the graphics processors 3008, and/or the optional external graphics processor 3012 (see FIG. 30) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

Figure 31:
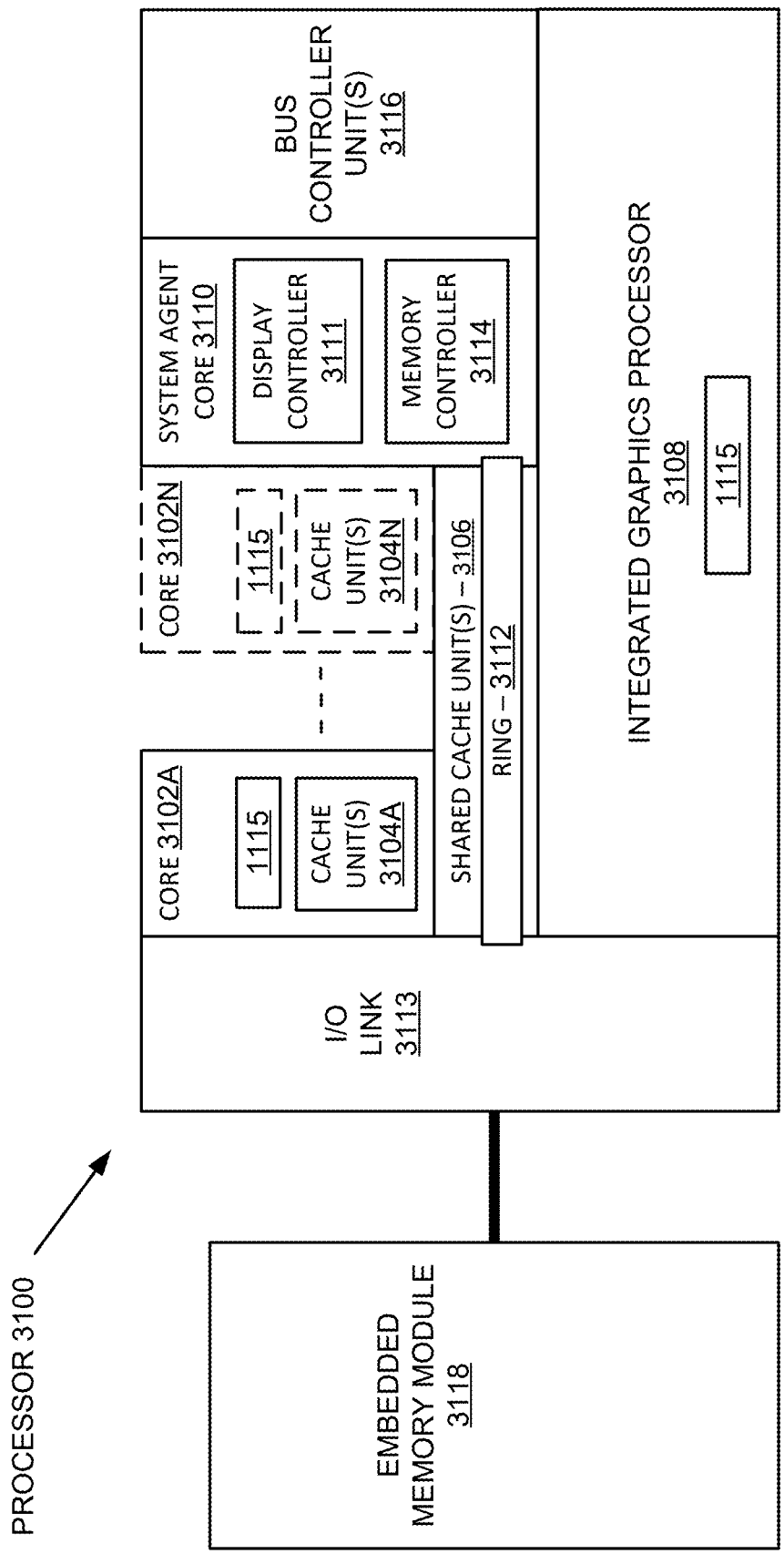
FIG. 31 illustrates at least portions of a graphics processor, according to one or more embodiments.

FIG. 31 is a block diagram of a processor 3100 having one or more processor cores 3102A-3102N, an integrated memory controller 3114, and an integrated graphics processor 3108, according to at least one embodiment. In at least one embodiment, processor 3100 can include additional cores up to and including additional core 3102N represented by dashed lined boxes. In at least one embodiment, each of processor cores 3102A-3102N includes one or more internal cache units 3104A-3104N. In at least one embodiment, each processor core also has access to one or more shared cached units 3106.

In at least one embodiment, internal cache units 3104A-3104N and shared cache units 3106 represent a cache memory hierarchy within processor 3100. In at least one embodiment, cache memory units 3104A-3104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 3106 and 3104A-3104N.

In at least one embodiment, processor 3100 may also include a set of one or more bus controller units 3116 and a system agent core 3110. In at least one embodiment, bus controller units 3116 manage a set of peripheral buses, such as one or more PCI or PCI express busses. In at least one embodiment, system agent core 3110 provides management functionality for various processor components. In at least one embodiment, system agent core 3110 includes one or more integrated memory controllers 3114 to manage access to various external memory devices (not shown).

In at least one embodiment, one or more of processor cores 3102A-3102N include support for simultaneous multi-threading. In at least one embodiment, system agent core 3110 includes components for coordinating and operating cores 3102A-3102N during multi-threaded processing. In at least one embodiment, system agent core 3110 may additionally include a power control unit (PCU), which includes logic and components to regulate one or more power states of processor cores 3102A-3102N and graphics processor 3108.

In at least one embodiment, processor 3100 additionally includes graphics processor 3108 to execute graphics processing operations. In at least one embodiment, graphics processor 3108 couples with shared cache units 3106, and system agent core 3110, including one or more integrated memory controllers 3114. In at least one embodiment, system agent core 3110 also includes a display controller 3111 to drive graphics processor output to one or more coupled displays. In at least one embodiment, display controller 3111 may also be a separate module coupled with graphics processor 3108 via at least one interconnect, or may be integrated within graphics processor 3108.

In at least one embodiment, a ring-based interconnect unit 3112 is used to couple internal components of processor 3100. In at least one embodiment, an alternative interconnect unit may be used, such as a point-to-point interconnect, a switched interconnect, or other techniques. In at least one embodiment, graphics processor 3108 couples with ring interconnect 3112 via an I/O link 3113.

In at least one embodiment, I/O link 3113 represents at least one of multiple varieties of I/O interconnects, including an on package I/O interconnect which facilitates communication between various processor components and a high-performance embedded memory module 3118, such as an eDRAM module. In at least one embodiment, each of processor cores 3102A-3102N and graphics processor 3108 use embedded memory module 3118 as a shared Last Level Cache.

In at least one embodiment, processor cores 3102A-3102N are homogeneous cores executing a common instruction set architecture. In at least one embodiment, processor cores 3102A-3102N are heterogeneous in terms of instruction set architecture (ISA), where one or more of processor cores 3102A-3102N execute a common instruction set, while one or more other cores of processor cores 3102A-3102N executes a subset of a common instruction set or a different instruction set. In at least one embodiment, processor cores 3102A-3102N are heterogeneous in terms of microarchitecture, where one or more cores having a relatively higher power consumption couple with one or more power cores having a lower power consumption. In at least one embodiment, processor 3100 can be implemented on one or more chips or as an SoC integrated circuit.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment portions or all of inference and/or training logic 1115 may be incorporated into processor 3100. For example, in at least one embodiment, training and/or inferencing techniques described herein may use one or more of ALUs embodied in a 3D pipeline, graphics core(s) 3102, shared function logic, or other logic in FIG. 31. Moreover, in at least one embodiment, inferencing and/or training operations described herein may be done using logic other than logic illustrated in FIG. 11A or 11B. In at least one embodiment, weight parameters may be stored in on-chip or off-chip memory and/or registers (shown or not shown) that configure ALUs of processor 3100 to perform one or more machine learning algorithms, neural network architectures, use cases, or training techniques described herein.

In at least one embodiment, the system 100 (see FIG. 1) may be implemented at least in part by the processor 3100. In at least one embodiment, the processor(s) 114 may be implemented at least in part by the processor 3100. For example, the instructions 118 (see FIG. 1) may be executed by the processor 3100, and used to obtain the optical flow map 110 (see FIGS. 1 and 2). As mentioned above, the system 100 (see FIG. 1) may be implemented by at least a portion of the inference and/or training logic 1115. Referring to FIG. 1, the processor 3100 (see FIG. 31) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

Figure 32:
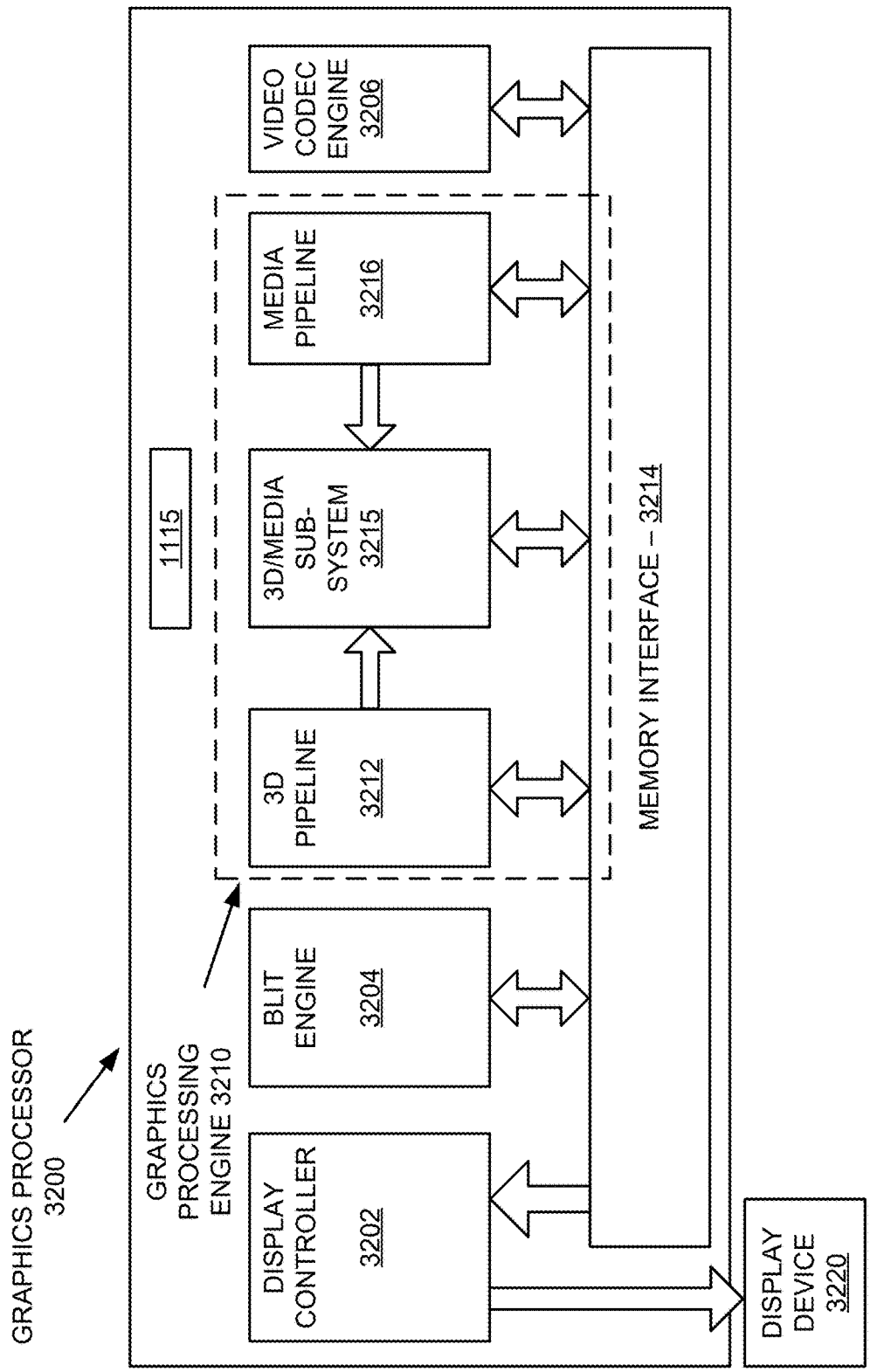
FIG. 32 illustrates at least portions of a graphics processor, according to one or more embodiments.

FIG. 32 is a block diagram of a graphics processor 3200, which may be a discrete graphics processing unit, or may be a graphics processor integrated with a plurality of processing cores. In at least one embodiment, graphics processor 3200 communicates via a memory mapped I/O interface to registers on graphics processor 3200 and with commands placed into memory. In at least one embodiment, graphics processor 3200 includes a memory interface 3214 to access memory. In at least one embodiment, memory interface 3214 is an interface to local memory, one or more internal caches, one or more shared external caches, and/or to system memory.

In at least one embodiment, graphics processor 3200 also includes a display controller 3202 to drive display output data to a display device 3220. In at least one embodiment, display controller 3202 includes hardware for one or more overlay planes for display device 3220 and composition of multiple layers of video or user interface elements. In at least one embodiment, display device 3220 can be an internal or external display device. In at least one embodiment, display device 3220 is a head mounted display device, such as a virtual reality (VR) display device or an augmented reality (AR) display device. In at least one embodiment, graphics processor 3200 includes a video codec engine 3206 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In at least one embodiment, graphics processor 3200 includes a block image transfer (BLIT) engine 3204 to perform two-dimensional (2D) rasterizer operations including, for example, bit-boundary block transfers. However, in at least one embodiment, 2D graphics operations are performed using one or more components of a graphics processing engine (GPE) 3210. In at least one embodiment, GPE 3210 is a compute engine for performing graphics operations, including three-dimensional (3D) graphics operations and media operations.

In at least one embodiment, GPE 3210 includes a 3D pipeline 3212 for performing 3D operations, such as rendering three-dimensional images and scenes using processing functions that act upon 3D primitive shapes (e.g., rectangle, triangle, etc.). In at least one embodiment, 3D pipeline 3212 includes programmable and fixed function elements that perform various tasks and/or spawn execution threads to a 3D/Media sub-system 3215. While 3D pipeline 3212 can be used to perform media operations, in at least one embodiment, GPE 3210 also includes a media pipeline 3216 that is used to perform media operations, such as video post-processing and image enhancement.

In at least one embodiment, media pipeline 3216 includes fixed function or programmable logic units to perform one or more specialized media operations, such as video decode acceleration, video de-interlacing, and video encode acceleration in place of, or on behalf of, video codec engine 3206. In at least one embodiment, media pipeline 3216 additionally includes a thread spawning unit to spawn threads for execution on 3D/Media sub-system 3215. In at least one embodiment, spawned threads perform computations for media operations on one or more graphics execution units included in 3D/Media sub-system 3215.

In at least one embodiment, 3D/Media subsystem 3215 includes logic for executing threads spawned by 3D pipeline 3212 and media pipeline 3216. In at least one embodiment, 3D pipeline 3212 and media pipeline 3216 send thread execution requests to 3D/Media subsystem 3215, which includes thread dispatch logic for arbitrating and dispatching various requests to available thread execution resources. In at least one embodiment, execution resources include an array of graphics execution units to process 3D and media threads. In at least one embodiment, 3D/Media subsystem 3215 includes one or more internal caches for thread instructions and data. In at least one embodiment, subsystem 3215 also includes shared memory, including registers and addressable memory, to share data between threads and to store output data.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment portions or all of inference and/or training logic 1115 may be incorporated into graphics processor 3200. For example, in at least one embodiment, training and/or inferencing techniques described herein may use one or more of ALUs embodied in 3D pipeline 3212. Moreover, in at least one embodiment, inferencing and/or training operations described herein may be done using logic other than logic illustrated in FIG. 11A or 11B. In at least one embodiment, weight parameters may be stored in on-chip or off-chip memory and/or registers (shown or not shown) that configure ALUs of graphics processor 3200 to perform one or more machine learning algorithms, neural network architectures, use cases, or training techniques described herein.

In at least one embodiment, the system 100 (see FIG. 1) may be implemented at least in part by the graphics processor 3200. In at least one embodiment, the processor(s) 114 may be implemented at least in part by the graphics processor 3200. For example, the instructions 118 (see FIG. 1) may be executed by the graphics processor 3200, and used to obtain the optical flow map 110 (see FIGS. 1 and 2). As mentioned above, the system 100 (see FIG. 1) may be implemented by at least a portion of the inference and/or training logic 1115. Referring to FIG. 1, the graphics processor 3200 (see FIG. 32) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

Figure 33:
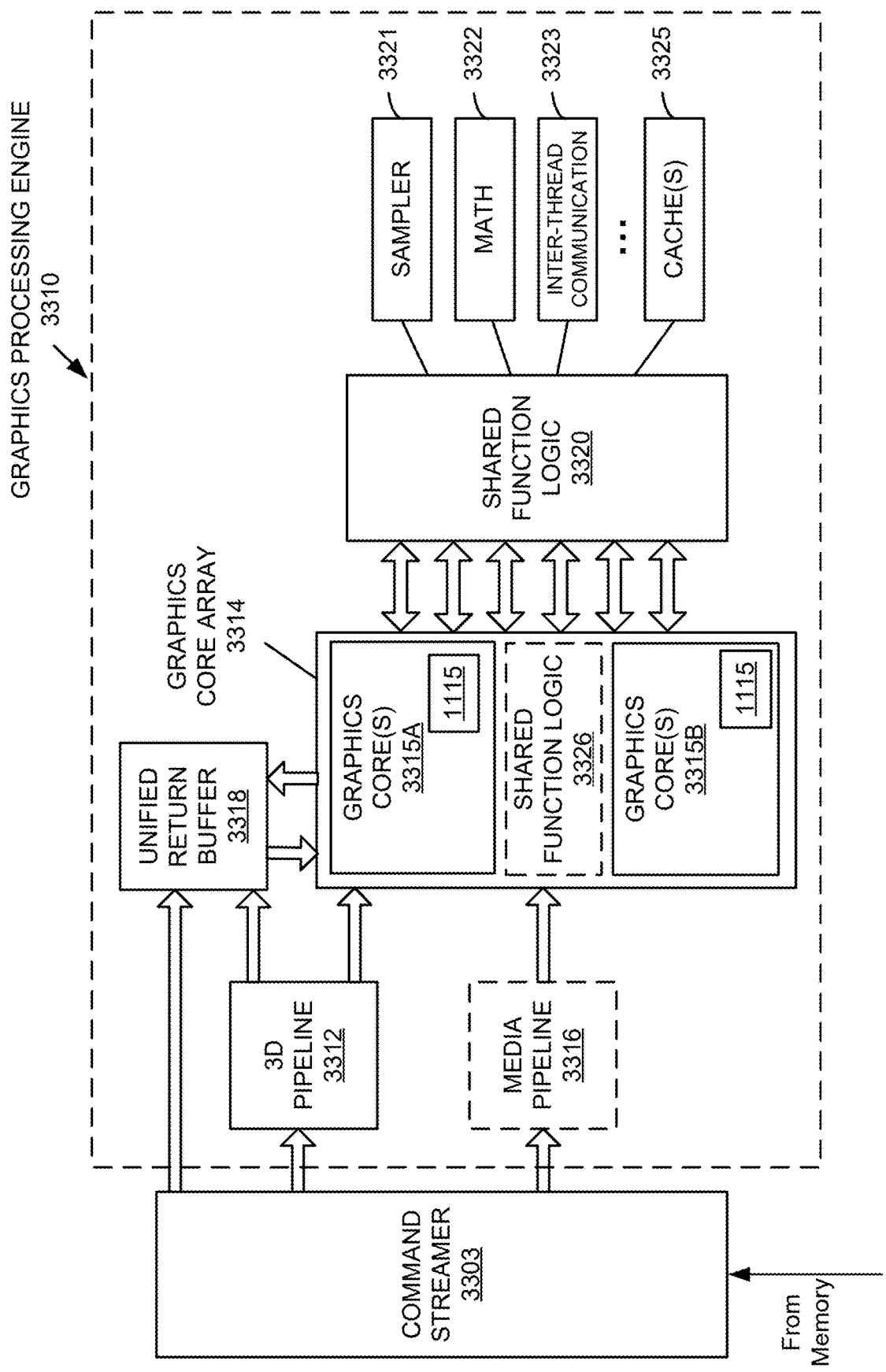
FIG. 33 is a block diagram of a graphics processing engine of a graphics processor in accordance with at least one embodiment.

FIG. 33 is a block diagram of a graphics processing engine 3310 of a graphics processor in accordance with at least one embodiment. In at least one embodiment, graphics processing engine (GPE) 3310 is aversion of GPE 3210 shown in FIG. 32. In at least one embodiment, a media pipeline 3316 is optional and may not be explicitly included within GPE 3310. In at least one embodiment, a separate media and/or image processor is coupled to GPE 3310.

In at least one embodiment, GPE 3310 is coupled to or includes a command streamer 3303, which provides a command stream to a 3D pipeline 3312 and/or media pipeline 3316. In at least one embodiment, command streamer 3303 is coupled to memory, which can be system memory, or one or more of internal cache memory and shared cache memory. In at least one embodiment, command streamer 3303 receives commands from memory and sends commands to 3D pipeline 3312 and/or media pipeline 3316. In at least one embodiment, commands are instructions, primitives, or micro-operations fetched from a ring buffer, which stores commands for 3D pipeline 3312 and media pipeline 3316. In at least one embodiment, a ring buffer can additionally include batch command buffers storing batches of multiple commands. In at least one embodiment, commands for 3D pipeline 3312 can also include references to data stored in memory, such as, but not limited to, vertex and geometry data for 3D pipeline 3312 and/or image data and memory objects for media pipeline 3316. In at least one embodiment, 3D pipeline 3312 and media pipeline 3316 process commands and data by performing operations or by dispatching one or more execution threads to a graphics core array 3314. In at least one embodiment, graphics core array 3314 includes one or more blocks of graphics cores (e.g., graphics core(s) 3315A, graphics core(s) 3315B), each block including one or more graphics cores. In at least one embodiment, each graphics core includes a set of graphics execution resources that includes general-purpose and graphics specific execution logic to perform graphics and compute operations, as well as fixed function texture processing and/or machine learning and artificial intelligence acceleration logic, including inference and/or training logic 1115 in FIG. 11A and FIG. 11B.

In at least one embodiment, 3D pipeline 3312 includes fixed function and programmable logic to process one or more shader programs, such as vertex shaders, geometry shaders, pixel shaders, fragment shaders, compute shaders, or other shader programs, by processing instructions and dispatching execution threads to graphics core array 3314. In at least one embodiment, graphics core array 3314 provides a unified block of execution resources for use in processing shader programs. In at least one embodiment, a multi-purpose execution logic (e.g., execution units) within graphics core(s) 3315A-3315B of graphic core array 3314 includes support for various 3D API shader languages and can execute multiple simultaneous execution threads associated with multiple shaders.

In at least one embodiment, graphics core array 3314 also includes execution logic to perform media functions, such as video and/or image processing. In at least one embodiment, execution units additionally include general-purpose logic that is programmable to perform parallel general-purpose computational operations, in addition to graphics processing operations.

In at least one embodiment, output data generated by threads executing on graphics core array 3314 can output data to memory in a unified return buffer (URB) 3318. In at least one embodiment, URB 3318 can store data for multiple threads. In at least one embodiment, URB 3318 may be used to send data between different threads executing on graphics core array 3314. In at least one embodiment, URB 3318 may additionally be used for synchronization between threads on graphics core array 3314 and fixed function logic within shared function logic 3320.

In at least one embodiment, graphics core array 3314 is scalable, such that graphics core array 3314 includes a variable number of graphics cores, each having a variable number of execution units based on a target power and performance level of GPE 3310. In at least one embodiment, execution resources are dynamically scalable, such that execution resources may be enabled or disabled as needed.

In at least one embodiment, graphics core array 3314 is coupled to shared function logic 3320 that includes multiple resources that are shared between graphics cores in graphics core array 3314. In at least one embodiment, shared functions performed by shared function logic 3320 are embodied in hardware logic units that provide specialized supplemental functionality to graphics core array 3314. In at least one embodiment, shared function logic 3320 includes but is not limited to a sampler unit 3321, a math unit 3322, and inter-thread communication (ITC) logic 3323. In at least one embodiment, one or more cache(s) 3325 are included in, or coupled to, shared function logic 3320.

In at least one embodiment, a shared function is used if demand for a specialized function is insufficient for inclusion within graphics core array 3314. In at least one embodiment, a single instantiation of a specialized function is used in shared function logic 3320 and shared among other execution resources within graphics core array 3314. In at least one embodiment, specific shared functions within shared function logic 3320 that are used extensively by graphics core array 3314 may be included within shared function logic 3326 within graphics core array 3314. In at least one embodiment, shared function logic 3326 within graphics core array 3314 can include some or all logic within shared function logic 3320. In at least one embodiment, all logic elements within shared function logic 3320 may be duplicated within shared function logic 3326 of graphics core array 3314. In at least one embodiment, shared function logic 3320 is excluded in favor of shared function logic 3326 within graphics core array 3314.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment portions or all of inference and/or training logic 1115 may be incorporated into graphics processor 3310. For example, in at least one embodiment, training and/or inferencing techniques described herein may use one or more of ALUs embodied in 3D pipeline 3312, graphics core(s) 3315, shared function logic 3326, shared function logic 3320, or other logic in FIG. 33. Moreover, in at least one embodiment, inferencing and/or training operations described herein may be done using logic other than logic illustrated in FIG. 11A or 11B. In at least one embodiment, weight parameters may be stored in on-chip or off-chip memory and/or registers (shown or not shown) that configure ALUs of graphics processor 3310 to perform one or more machine learning algorithms, neural network architectures, use cases, or training techniques described herein.

In at least one embodiment, the system 100 (see FIG. 1) may be implemented at least in part by the GPE 3310 (e.g., incorporated in the graphics processor 3200). In at least one embodiment, the processor(s) 114 may be implemented at least in part by the GPE 3310. For example, the instructions 118 (see FIG. 1) may be executed by the GPE 3310, and used to obtain the optical flow map 110 (see FIGS. 1 and 2). As mentioned above, the system 100 (see FIG. 1) may be implemented by at least a portion of the inference and/or training logic 1115. Referring to FIG. 1, the GPE 3310 (see FIG. 33) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

Figure 34:
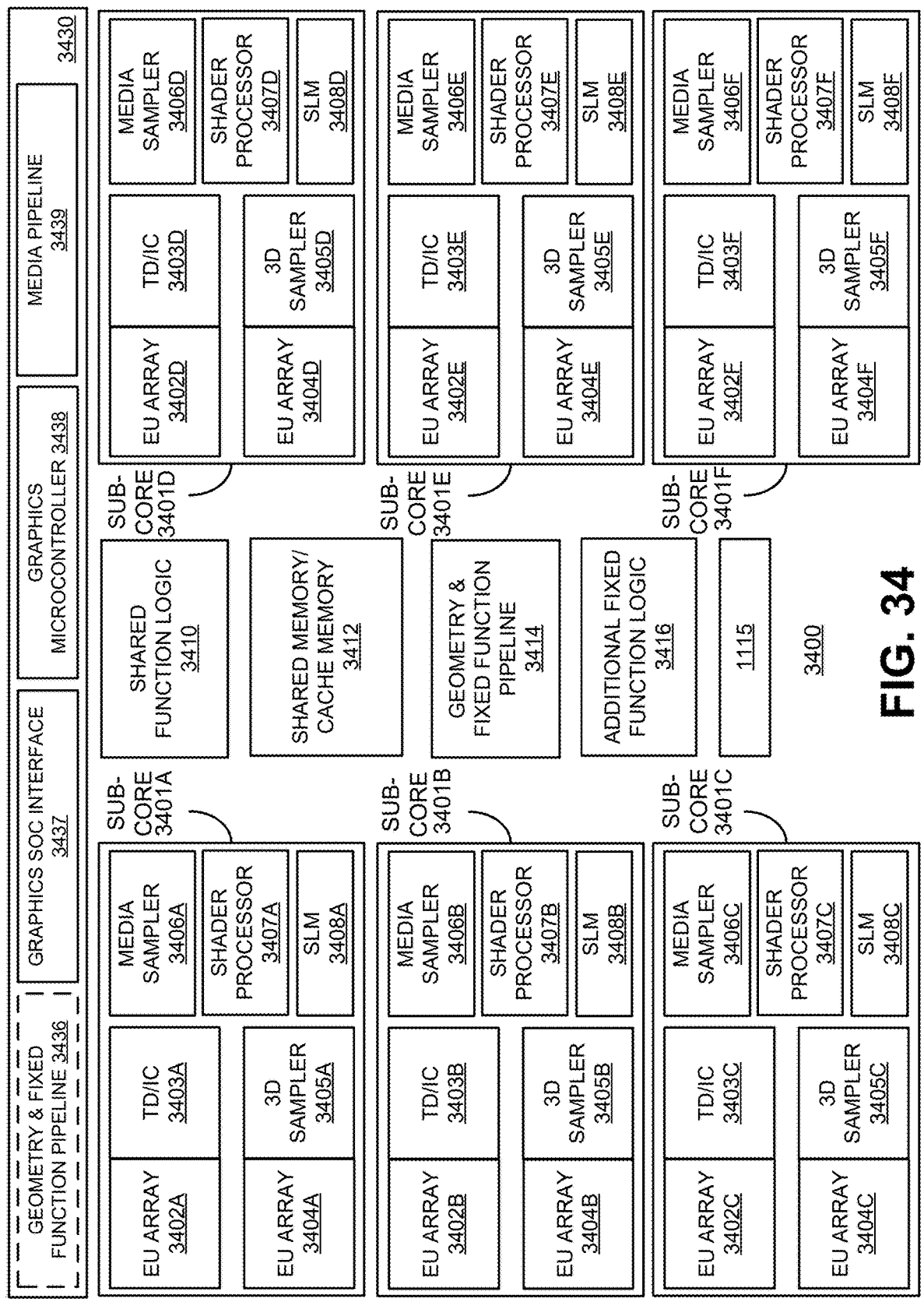
FIG. 34 is a block diagram of at least portions of a graphics processor core, according to at least one embodiment.

FIG. 34 is a block diagram of hardware logic of a graphics processor core 3400, according to at least one embodiment described herein. In at least one embodiment, graphics processor core 3400 is included within a graphics core array. In at least one embodiment, graphics processor core 3400, sometimes referred to as a core slice, can be one or multiple graphics cores within a modular graphics processor. In at least one embodiment, graphics processor core 3400 is exemplary of one graphics core slice, and a graphics processor as described herein may include multiple graphics core slices based on target power and performance envelopes. In at least one embodiment, each graphics core 3400 can include a fixed function block 3430 coupled with multiple sub-cores 3401A-3401F, also referred to as sub-slices, that include modular blocks of general-purpose and fixed function logic.

In at least one embodiment, fixed function block 3430 includes a geometry and fixed function pipeline 3436 that can be shared by all sub-cores in graphics processor 3400, for example, in lower performance and/or lower power graphics processor implementations. In at least one embodiment, geometry and fixed function pipeline 3436 includes a 3D fixed function pipeline, a video front-end unit, a thread spawner and thread dispatcher, and a unified return buffer manager, which manages unified return buffers.

In at least one embodiment, fixed function block 3430 also includes a graphics SoC interface 3437, a graphics microcontroller 3438, and a media pipeline 3439. In at least one embodiment, graphics SoC interface 3437 provides an interface between graphics core 3400 and other processor cores within a system on a chip integrated circuit. In at least one embodiment, graphics microcontroller 3438 is a programmable sub-processor that is configurable to manage various functions of graphics processor 3400, including thread dispatch, scheduling, and preemption. In at least one embodiment, media pipeline 3439 includes logic to facilitate decoding, encoding, pre-processing, and/or post-processing of multimedia data, including image and video data. In at least one embodiment, media pipeline 3439 implements media operations via requests to compute or sampling logic within sub-cores 3401A-3401F.

In at least one embodiment, SoC interface 3437 enables graphics core 3400 to communicate with general-purpose application processor cores (e.g., CPUs) and/or other components within an SoC, including memory hierarchy elements such as a shared last level cache memory, system RAM, and/or embedded on-chip or on-package DRAM. In at least one embodiment, SoC interface 3437 can also enable communication with fixed function devices within an SoC, such as camera imaging pipelines, and enables use of and/or implements global memory atomics that may be shared between graphics core 3400 and CPUs within an SoC. In at least one embodiment, graphics SoC interface 3437 can also implement power management controls for graphics processor core 3400 and enable an interface between a clock domain of graphics processor core 3400 and other clock domains within an SoC. In at least one embodiment, SoC interface 3437 enables receipt of command buffers from a command streamer and global thread dispatcher that are configured to provide commands and instructions to each of one or more graphics cores within a graphics processor. In at least one embodiment, commands and instructions can be dispatched to media pipeline 3439, when media operations are to be performed, or a geometry and fixed function pipeline (e.g., geometry and fixed function pipeline 3436, and/or a geometry and fixed function pipeline 3414) when graphics processing operations are to be performed.

In at least one embodiment, graphics microcontroller 3438 can be configured to perform various scheduling and management tasks for graphics core 3400. In at least one embodiment, graphics microcontroller 3438 can perform graphics and/or compute workload scheduling on various graphics parallel engines within execution unit (EU) arrays 3402A-3402F, 3404A-3404F within sub-cores 3401A-3401F. In at least one embodiment, host software executing on a CPU core of an SoC including graphics core 3400 can submit workloads to one of multiple graphic processor paths, which invokes a scheduling operation on an appropriate graphics engine. In at least one embodiment, scheduling operations include determining which workload to run next, submitting a workload to a command streamer, preempting existing workloads running on an engine, monitoring progress of a workload, and notifying host software when a workload is complete. In at least one embodiment, graphics microcontroller 3438 can also facilitate low-power or idle states for graphics core 3400, providing graphics core 3400 with an ability to save and restore registers within graphics core 3400 across low-power state transitions independently from an operating system and/or graphics driver software on a system.

In at least one embodiment, graphics core 3400 may have greater than or fewer than illustrated sub-cores 3401A-3401F, up to N modular sub-cores. For each set of N sub-cores, in at least one embodiment, graphics core 3400 can also include shared function logic 3410, shared and/or cache memory 3412, geometry/fixed function pipeline 3414, as well as additional fixed function logic 3416 to accelerate various graphics and compute processing operations. In at least one embodiment, shared function logic 3410 can include logic units (e.g., sampler, math, and/or inter-thread communication logic) that can be shared by each N sub-cores within graphics core 3400. In at least one embodiment, shared and/or cache memory 3412 can be a last-level cache for N sub-cores 3401A-3401F within graphics core 3400 and can also serve as shared memory that is accessible by multiple sub-cores. In at least one embodiment, geometry/fixed function pipeline 3414 can be included instead of geometry/fixed function pipeline 3436 within fixed function block 3430 and can include similar logic units.

In at least one embodiment, graphics core 3400 includes additional fixed function logic 3416 that can include various fixed function acceleration logic for use by graphics core 3400. In at least one embodiment, additional fixed function logic 3416 includes an additional geometry pipeline for use in position-only shading. In position-only shading, at least two geometry pipelines exist, whereas in a full geometry pipeline within geometry and fixed function pipelines 3414, 3436, and a cull pipeline, which is an additional geometry pipeline that may be included within additional fixed function logic 3416. In at least one embodiment, a cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 3416 can execute position shaders in parallel with a main application and generally generates critical results faster than a full pipeline, as a cull pipeline fetches and shades position attributes of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 3416 can also include machine-learning acceleration logic, such as fixed function matrix multiplication logic, for implementations including optimizations for machine learning training or inferencing.

In at least one embodiment, within each graphics sub-core 3401A-3401F includes a set of execution resources that may be used to perform graphics, media, and compute operations in response to requests by graphics pipeline, media pipeline, or shader programs. In at least one embodiment, graphics sub-cores 3401A-3401F include multiple EU arrays 3402A-3402F, 3404A-3404F, thread dispatch and inter-thread communication (TD/IC) logic 3403A-3403F, a 3D (e.g., texture) sampler 3405A-3405F, a media sampler 3406A-3406F, a shader processor 3407A-3407F, and shared local memory (SLM) 3408A-3408F. In at least one embodiment, EU arrays 3402A-3402F, 3404A-3404F each include multiple execution units, which are general-purpose graphics processing units capable of performing floating-point and integer/fixed-point logic operations in service of a graphics, media, or compute operation, including graphics, media, or compute shader programs. In at least one embodiment, TD/IC logic 3403A-3403F performs local thread dispatch and thread control operations for execution units within a sub-core and facilitates communication between threads executing on execution units of a sub-core. In at least one embodiment, 3D samplers 3405A-3405F can read texture or other 3D graphics related data into memory. In at least one embodiment, 3D samplers can read texture data differently based on a configured sample state and texture format associated with a given texture. In at least one embodiment, media samplers 3406A-3406F can perform similar read operations based on a type and format associated with media data. In at least one embodiment, each graphics sub-core 3401A-3401F can alternately include a unified 3D and media sampler. In at least one embodiment, threads executing on execution units within each of sub-cores 3401A-3401F can make use of shared local memory 3408A-3408F within each sub-core, to enable threads executing within a thread group to execute using a common pool of on-chip memory.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, portions or all of inference and/or training logic 1115 may be incorporated into graphics processor 3400. For example, in at least one embodiment, training and/or inferencing techniques described herein may use one or more of ALUs embodied in a 3D pipeline, graphics microcontroller 3438, geometry and fixed function pipeline 3414 and 3436, or other logic in FIG. 34. Moreover, in at least one embodiment, inferencing and/or training operations described herein may be done using logic other than logic illustrated in FIG. 11A or 11B. In at least one embodiment, weight parameters may be stored in on-chip or off-chip memory and/or registers (shown or not shown) that configure ALUs of graphics processor 3400 to perform one or more machine learning algorithms, neural network architectures, use cases, or training techniques described herein.

In at least one embodiment, the system 100 (see FIG. 1) may be implemented at least in part by the graphics processor core 3400. In at least one embodiment, the processor(s) 114 may be implemented at least in part by the graphics processor core 3400. For example, the instructions 118 (see FIG. 1) may be executed by the graphics processor core 3400, and used to obtain the optical flow map 110 (see FIGS. 1 and 2). As mentioned above, the system 100 (see FIG. 1) may be implemented by at least a portion of the inference and/or training logic 1115. Referring to FIG. 1, the GPE 3310 (see FIG. 33) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

Figure 35A:
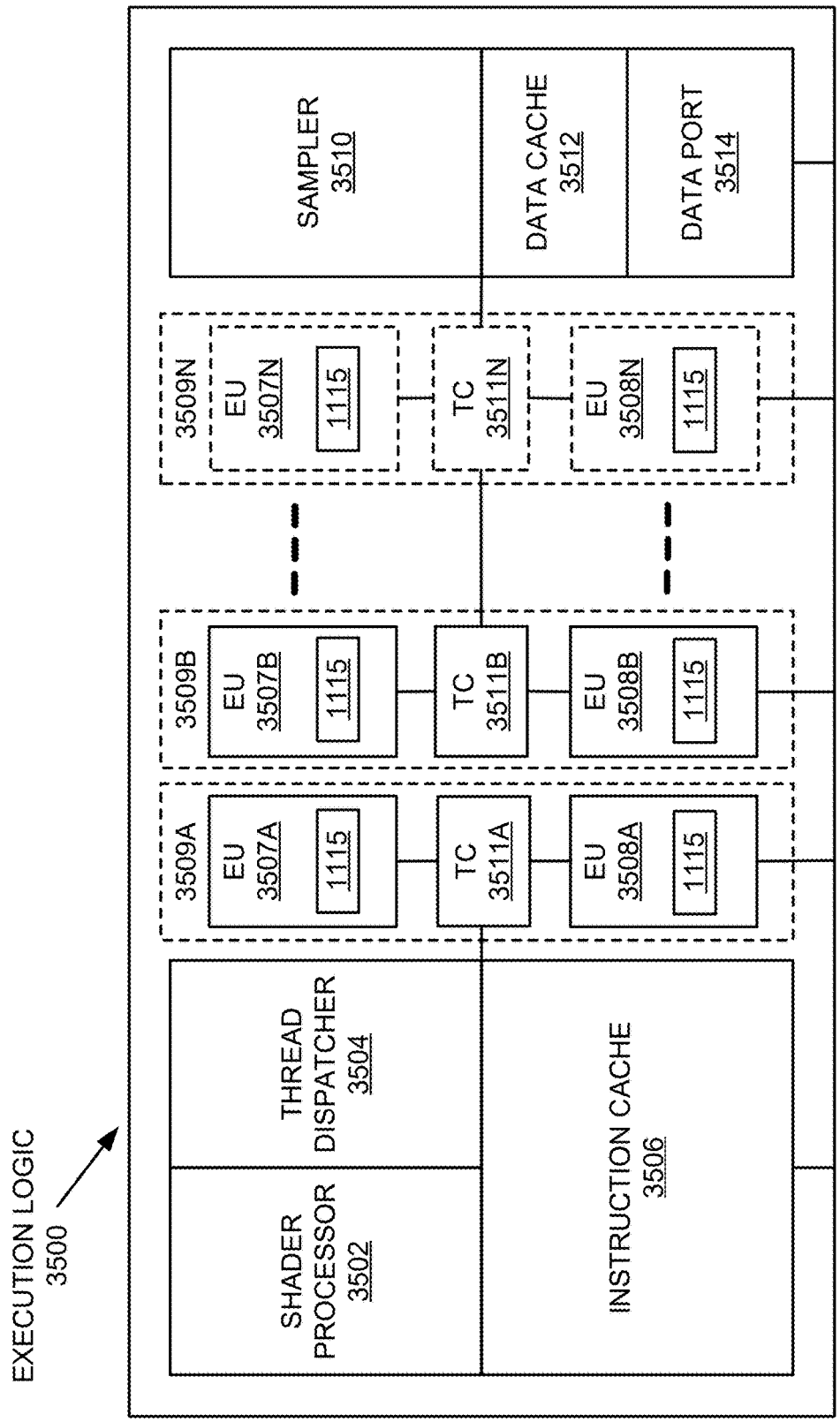
FIGS. 35A-35B illustrate thread execution logic including an array of processing elements of a graphics processor core according to at least one embodiment.
Figure 35B:
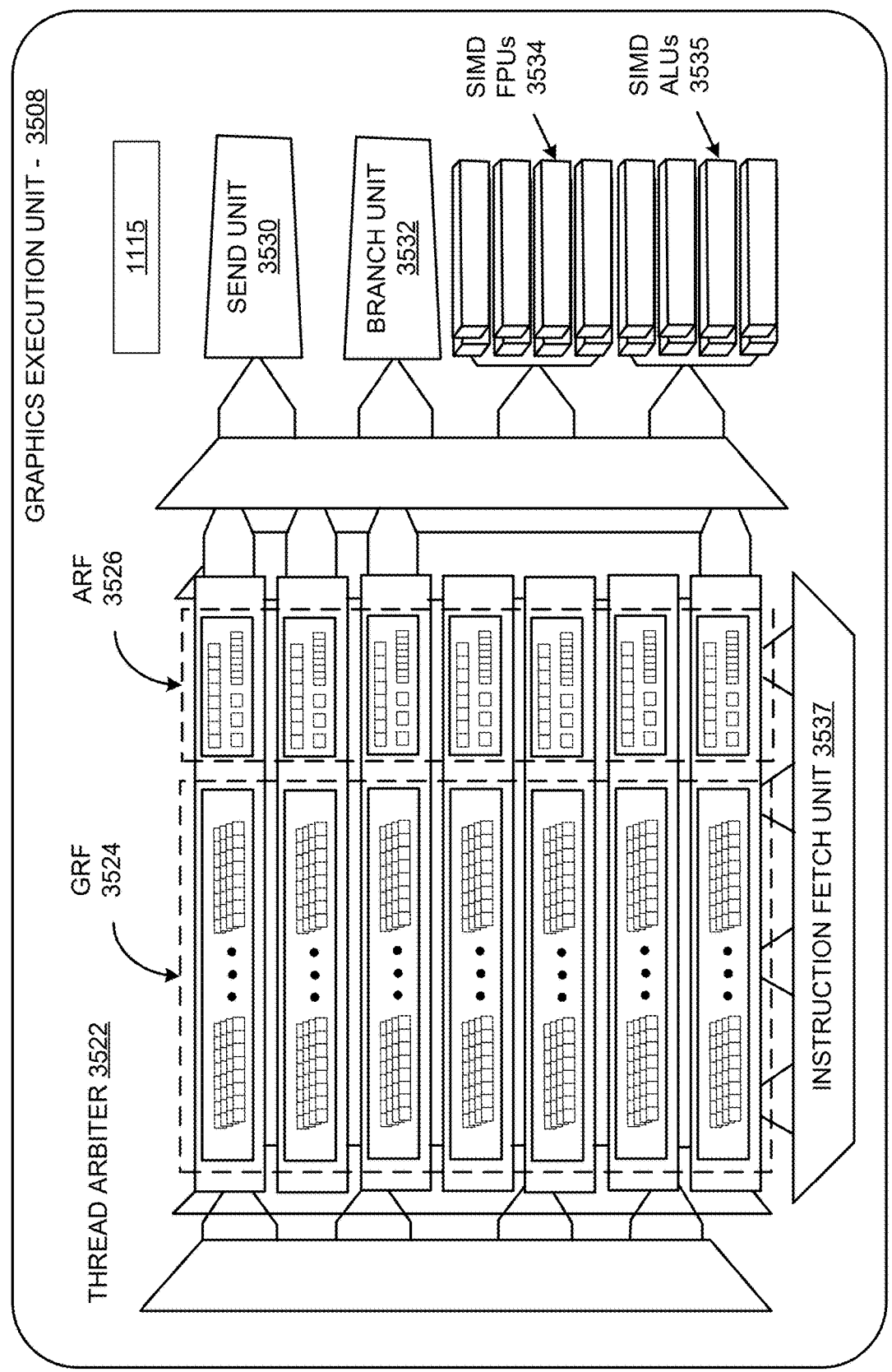

FIGS. 35A-35B illustrate thread execution logic 3500 including an array of processing elements of a graphics processor core according to at least one embodiment. FIG. 35A illustrates at least one embodiment, in which thread execution logic 3500 is used. FIG. 35B illustrates exemplary internal details of a graphics execution unit 3508, according to at least one embodiment.

As illustrated in FIG. 35A, in at least one embodiment, thread execution logic 3500 includes a shader processor 3502, a thread dispatcher 3504, an instruction cache 3506, a scalable execution unit array including a plurality of execution units 3507A-3507N and 3508A-3508N, a sampler 3510, a data cache 3512, and a data port 3514. In at least one embodiment, a scalable execution unit array can dynamically scale by enabling or disabling one or more execution units (e.g., any of execution unit 3508A-N or 3507A-N) based on computational requirements of a workload, for example. In at least one embodiment, scalable execution units are interconnected via an interconnect fabric that links to each execution unit. In at least one embodiment, thread execution logic 3500 includes one or more connections to memory, such as system memory or cache memory, through one or more of instruction cache 3506, data port 3514, sampler 3510, and execution units 3507 or 3508. In at least one embodiment, each execution unit (e.g., 3507A) is a stand-alone programmable general-purpose computational unit that is capable of executing multiple simultaneous hardware threads while processing multiple data elements in parallel for each thread. In at least one embodiment, array of execution units 3507 and/or 3508 is scalable to include any number individual execution units.

In at least one embodiment, execution units 3507 and/or 3508 are primarily used to execute shader programs. In at least one embodiment, shader processor 3502 can process various shader programs and dispatch execution threads associated with shader programs via a thread dispatcher 3504. In at least one embodiment, thread dispatcher 3504 includes logic to arbitrate thread initiation requests from graphics and media pipelines and instantiate requested threads on one or more execution units in execution units 3507 and/or 3508. For example, in at least one embodiment, a geometry pipeline can dispatch vertex, tessellation, or geometry shaders to thread execution logic for processing. In at least one embodiment, thread dispatcher 3504 can also process runtime thread spawning requests from executing shader programs.

In at least one embodiment, execution units 3507 and/or 3508 support an instruction set that includes native support for many standard 3D graphics shader instructions, such that shader programs from graphics libraries (e.g., Direct 3D and OpenGL) are executed with a minimal translation. In at least one embodiment, execution units support vertex and geometry processing (e.g., vertex programs, geometry programs, and/or vertex shaders), pixel processing (e.g., pixel shaders, fragment shaders) and general-purpose processing (e.g., compute and media shaders). In at least one embodiment, each of execution units 3507 and/or 3508, which include one or more arithmetic logic units (ALUs), is capable of multi-issue single instruction multiple data (SIMD) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIMD branch capability, logical operations, transcendental operations, and other miscellaneous operations. In at least one embodiment, while waiting for data from memory or one of shared functions, dependency logic within execution units 3507 and/or 3508 causes a waiting thread to sleep until requested data has been returned. In at least one embodiment, while an awaiting thread is sleeping, hardware resources may be devoted to processing other threads. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 3507 and/or 3508 operates on arrays of data elements. In at least one embodiment, a number of data elements is an "execution size," or number of channels for an instruction. In at least one embodiment, an execution channel is a logical unit of execution for data element access, masking, and flow control within instructions. In at least one embodiment, a number of channels may be independent of a number of physical arithmetic logic units (ALUs) or floating point units (FPUs) for a particular graphics processor. In at least one embodiment, execution units 3507 and/or 3508 support integer and floating-point data types.

In at least one embodiment, an execution unit instruction set includes SIMD instructions. In at least one embodiment, various data elements can be stored as a packed data type in a register and execution unit will process various elements based on data size of elements. For example, in at least one embodiment, when operating on a 256-bit wide vector, 256 bits of a vector are stored in a register and an execution unit operates on a vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, in at least one embodiment, different vector widths and register sizes are possible.

In at least one embodiment, one or more execution units can be combined into a fused execution unit 3509A-3509N having thread control logic (3511A-3511N) that is common to fused EUs such as execution unit 3507A fused with execution unit 3508A into fused execution unit 3509A. In at least one embodiment, multiple EUs can be fused into an EU group. In at least one embodiment, each EU in a fused EU group can be configured to execute a separate SIMD hardware thread, with a number of EUs in a fused EU group possibly varying according to various embodiments. In at least one embodiment, various SIMD widths can be performed per-EU, including but not limited to SIMD8, SIMD16, and SIMD32. In at least one embodiment, each fused graphics execution unit 3509A-3509N includes at least two execution units. For example, in at least one embodiment, fused execution unit 3509A includes a first EU 3507A, second EU 3508A, and thread control logic 3511A that is common to first EU 3507A and second EU 3508A. In at least one embodiment, thread control logic 3511A controls threads executed on fused graphics execution unit 3509A, allowing each EU within fused execution units 3509A-3509N to execute using a common instruction pointer register.

In at least one embodiment, one or more internal instruction caches (e.g., 3506) are included in thread execution logic 3500 to cache thread instructions for execution units. In at least one embodiment, one or more data caches (e.g.,

3512) are included to cache thread data during thread execution. In at least one embodiment, sampler 3510 is included to provide texture sampling for 3D operations and media sampling for media operations. In at least one embodiment, sampler 3510 includes specialized texture or media sampling functionality to process texture or media data during sampling process before providing sampled data to an execution unit.

During execution, in at least one embodiment, graphics and media pipelines send thread initiation requests to thread execution logic 3500 via thread spawning and dispatch logic. In at least one embodiment, once a group of geometric objects has been processed and rasterized into pixel data, pixel processor logic (e.g., pixel shader logic, fragment shader logic, etc.) within shader processor 3502 is invoked to further compute output information and cause results to be written to output surfaces (e.g., color buffers, depth buffers, stencil buffers, etc.). In at least one embodiment, a pixel shader or a fragment shader calculates values of various vertex attributes that are to be interpolated across a rasterized object. In at least one embodiment, pixel processor logic within shader processor 3502 then executes an application programming interface (API)-supplied pixel or fragment shader program. In at least one embodiment, to execute a shader program, shader processor 3502 dispatches threads to an execution unit (e.g., 3508A) via thread dispatcher 3504. In at least one embodiment, shader processor 3502 uses texture sampling logic in sampler 3510 to access texture data in texture maps stored in memory. In at least one embodiment, arithmetic operations on texture data and input geometry data compute pixel color data for each geometric fragment, or discards one or more pixels from further processing.

In at least one embodiment, data port 3514 provides a memory access mechanism for thread execution logic 3500 to output processed data to memory for further processing on a graphics processor output pipeline. In at least one embodiment, data port 3514 includes or couples to one or more cache memories (e.g., data cache 3512) to cache data for memory access via a data port.

As illustrated in FIG. 35B, in at least one embodiment, a graphics execution unit 3508 can include an instruction fetch unit 3537, a general register file array (GRF) 3524, an architectural register file array (ARF) 3526, a thread arbiter 3522, a send unit 3530, a branch unit 3532, a set of SIMD floating point units (FPUs) 3534, and a set of dedicated integer SIMD ALUs 3535. In at least one embodiment, GRF 3524 and ARF 3526 includes a set of general register files and architecture register files associated with each simultaneous hardware thread that may be active in graphics execution unit 3508. In at least one embodiment, per thread architectural state is maintained in ARF 3526, while data used during thread execution is stored in GRF 3524. In at least one embodiment, execution state of each thread, including instruction pointers for each thread, can be held in thread-specific registers in ARF 3526.

In at least one embodiment, graphics execution unit 3508 has an architecture that is a combination of Simultaneous Multi-Threading (SMT) and fine-grained Interleaved Multi-Threading (IMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, graphics execution unit 3508 can co-issue multiple instructions, which may each be different instructions. In at least one embodiment, thread arbiter 3522 of graphics execution unit thread 3508 can dispatch instructions to one of send unit 3530, branch unit 3532, or SIMD FPU(s) 3534 for execution. In at least one embodiment, each execution thread can access 128 general-purpose registers within GRF 3524, where each register can store 32 bytes, accessible as a SIMD 8-element vector of 32-bit data elements. In at least one embodiment, each execution unit thread has access to 4 kilobytes within GRF 3524, although embodiments are not so limited, and greater or fewer register resources may be provided in other embodiments. In at least one embodiment, up to seven threads can execute simultaneously, although a number of threads per execution unit can also vary according to embodiments. In at least one embodiment, in which seven threads may access 4 kilobytes, GRF 3524 can store a total of 28 kilobytes. In at least one embodiment, flexible addressing modes can permit registers to be addressed together to build effectively wider registers or to represent strided rectangular block data structures.

In at least one embodiment, memory operations, sampler operations, and other longer-latency system communications are dispatched via "send" instructions that are executed by message passing to send unit 3530. In at least one embodiment, branch instructions are dispatched to branch unit 3532 to facilitate SIMD divergence and eventual convergence.

In at least one embodiment, graphics execution unit 3508 includes one or more SIMD floating point units (FPU(s)) 3534 to perform floating-point operations. In at least one embodiment, FPU(s) 3534 also support integer computation. In at least one embodiment, FPU(s) 3534 can SIMD execute up to M number of 32-bit floating-point (or integer) operations, or SIMD execute up to 2M 16-bit integer or 16-bit floating-point operations. In at least one embodiment, at least one FPU provides extended math capability to support high-throughput transcendental math functions and double precision 64-bit floating-point. In at least one embodiment, a set of 8-bit integer SIMD ALUs 3535 are also present, and may be specifically optimized to perform operations associated with machine learning computations.

In at least one embodiment, arrays of multiple instances of graphics execution unit 3508 can be instantiated in a graphics sub-core grouping (e.g., a sub-slice). In at least one embodiment, execution unit 3508 can execute instructions across a plurality of execution channels. In at least one embodiment, each thread executed on graphics execution unit 3508 is executed on a different channel.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, portions or all of inference and/or training logic 1115 may be incorporated into thread execution logic 3500. Moreover, in at least one embodiment, inferencing and/or training operations described herein may be done using logic other than logic illustrated in FIG. 11A or 11B. In at least one embodiment, weight parameters may be stored in on-chip or off-chip memory and/or registers (shown or not shown) that configure ALUs thread of execution logic 3500 to perform one or more machine learning algorithms, neural network architectures, use cases, or training techniques described herein.

In at least one embodiment, the system 100 (see FIG. 1) may be implemented at least in part using the thread execution logic 3500. In at least one embodiment, the processor(s) 114 may be implemented at least in part by the graphics execution unit 3508. For example, the instructions 118 (see FIG. 1) may be executed by the graphics execution unit 3508, and used to obtain the optical flow map 110 (see FIGS. 1 and 2). As mentioned above, the system 100 (see FIG. 1) may be implemented by at least a portion of the inference and/or training logic 1115. Referring to FIG. 1, the thread execution logic 3500 and/or the graphics execution unit 3508 (see FIGS. 35A and 35B) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

Figure 36:
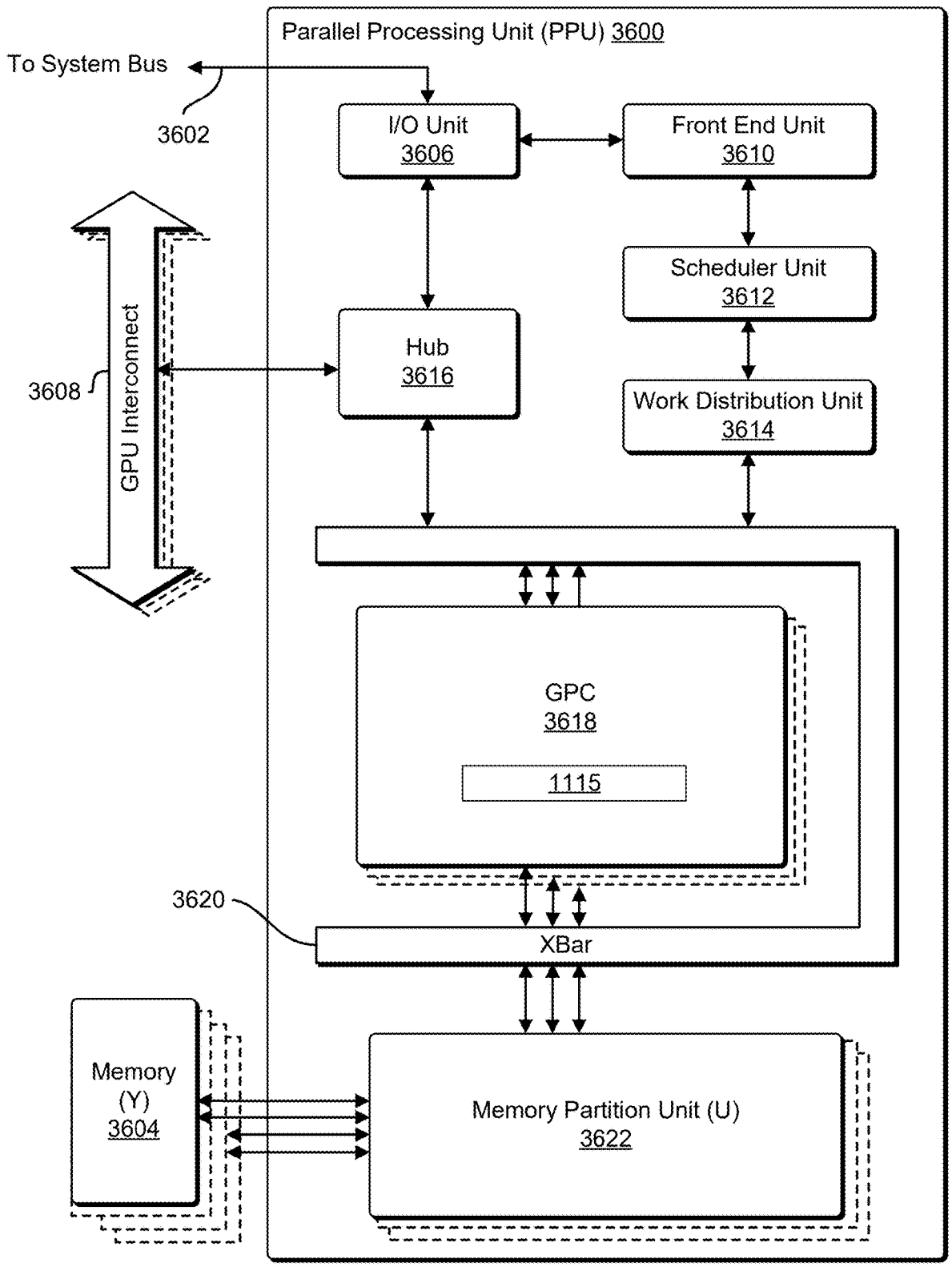
FIG. 36 illustrates a parallel processing unit ("PPU"), according to at least one embodiment.

FIG. 36 illustrates a parallel processing unit ("PPU") 3600, according to at least one embodiment. In at least one embodiment, PPU 3600 is configured with machine-readable code that, if executed by PPU 3600, causes PPU 3600 to perform some or all of processes and techniques described throughout this disclosure. In at least one embodiment, PPU 3600 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 3600. In at least one embodiment, PPU 3600 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 3600 is utilized to perform computations such as linear algebra operations and machine-learning operations. FIG. 36 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 3600 are configured to accelerate High Performance Computing ("HPC"), data center, and machine learning applications. In at least one embodiment, PPU 3600 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 3600 includes, without limitation, an Input/Output ("I/O") unit 3606, a front-end unit 3610, a scheduler unit 3612, a work distribution unit 3614, a hub 3616, a crossbar ("XBar") 3620, one or more general processing clusters ("GPCs") 3618, and one or more partition units ("memory partition units") 3622. In at least one embodiment, PPU 3600 is connected to a host processor or other PPUs 3600 via one or more high-speed GPU interconnects ("GPU interconnects") 3608. In at least one embodiment, PPU 3600 is connected to a host processor or other peripheral devices via a system bus 3602. In at least one embodiment, PPU 3600 is connected to a local memory comprising one or more memory devices ("memory") 3604.

In at least one embodiment, memory devices 3604 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 3608 may refer to a wire-based multi-lane communications link that is used by systems to scale and include one or more PPUs 3600 combined with one or more central processing units ("CPUs"), supports cache coherence between PPUs 3600 and CPUs, and CPU mastering. In at least one embodiment, data and/or commands are transmitted by high-speed GPU interconnect 3608 through hub 3616 to/from other units of PPU 3600 such as one or more copy engines, video encoders, video decoders, power management units, and other components which may not be explicitly illustrated in FIG. 36.

In at least one embodiment, I/O unit 3606 is configured to transmit and receive communications (e.g., commands, data) from a host processor (not illustrated in FIG. 36) over system bus 3602. In at least one embodiment, I/O unit 3606 communicates with host processor directly via system bus 3602 or through one or more intermediate devices such as a memory bridge. In at least one embodiment, I/O unit 3606 may communicate with one or more other processors, such as one or more of PPUs 3600 via system bus 3602. In at least one embodiment, I/O unit 3606 implements a Peripheral Component Interconnect Express ("PCIe") interface for communications over a PCIe bus. In at least one embodiment, I/O unit 3606 implements interfaces for communicating with external devices.

In at least one embodiment, I/O unit 3606 decodes packets received via system bus 3602. In at least one embodiment, at least some packets represent commands configured to cause PPU 3600 to perform various operations. In at least one embodiment, I/O unit 3606 transmits decoded commands to various other units of PPU 3600 as specified by commands. In at least one embodiment, commands are transmitted to front-end unit 3610 and/or transmitted to hub 3616 or other units of PPU 3600 such as one or more copy engines, a video encoder, a video decoder, a power management unit, etc. (not explicitly illustrated in FIG. 36). In at least one embodiment, I/O unit 3606 is configured to route communications between and among various logical units of PPU 3600.

In at least one embodiment, a program executed by host processor encodes a command stream in a buffer that provides workloads to PPU 3600 for processing. In at least one embodiment, a workload comprises instructions and data to be processed by those instructions. In at least one embodiment, a buffer is a region in a memory that is accessible (e.g., read/write) by both a host processor and PPU 3600—a host interface unit may be configured to access that buffer in a system memory connected to system bus 3602 via memory requests transmitted over system bus 3602 by I/O unit 3606. In at least one embodiment, a host processor writes a command stream to a buffer and then transmits a pointer to a start of a command stream to PPU 3600 such that front-end unit 3610 receives pointers to one or more command streams and manages one or more command streams, reading commands from command streams and forwarding commands to various units of PPU 3600.

In at least one embodiment, front-end unit 3610 is coupled to scheduler unit 3612 that configures various GPCs 3618 to process tasks defined by one or more command streams. In at least one embodiment, scheduler unit 3612 is configured to track state information related to various tasks managed by scheduler unit 3612 where state information may indicate which of GPCs 3618 a task is assigned to, whether task is active or inactive, a priority level associated with task, and so forth. In at least one embodiment, scheduler unit 3612 manages execution of a plurality of tasks on one or more of GPCs 3618.

In at least one embodiment, scheduler unit 3612 is coupled to work distribution unit 3614 that is configured to dispatch tasks for execution on GPCs 3618. In at least one embodiment, work distribution unit 3614 tracks a number of scheduled tasks received from scheduler unit 3612 and work distribution unit 3614 manages a pending task pool and an active task pool for each of GPCs 3618. In at least one embodiment, pending task pool comprises a number of slots (e.g., 32 slots) that contain tasks assigned to be processed by a particular GPC 3618; an active task pool may comprise a number of slots (e.g., 4 slots) for tasks that are actively being processed by GPCs 3618 such that as one of GPCs 3618 completes execution of a task, that task is evicted from that active task pool for GPC 3618 and another task from a pending task pool is selected and scheduled for execution on GPC 3618. In at least one embodiment, if an active task is idle on GPC 3618, such as while waiting for a data dependency to be resolved, then that active task is evicted from GPC 3618 and returned to that pending task pool while another task in that pending task pool is selected and scheduled for execution on GPC 3618.

In at least one embodiment, work distribution unit 3614 communicates with one or more GPCs 3618 via XBar 3620. In at least one embodiment, XBar 3620 is an interconnect network that couples many of units of PPU 3600 to other units of PPU 3600 and can be configured to couple work distribution unit 3614 to a particular GPC 3618. In at least one embodiment, one or more other units of PPU 3600 may also be connected to XBar 3620 via hub 3616.

In at least one embodiment, tasks are managed by scheduler unit 3612 and dispatched to one of GPCs 3618 by work distribution unit 3614. In at least one embodiment, GPC 3618 is configured to process task and generate results. In at least one embodiment, results may be consumed by other tasks within GPC 3618, routed to a different GPC 3618 via XBar 3620, or stored in memory 3604. In at least one embodiment, results can be written to memory 3604 via partition units 3622, which implement a memory interface for reading and writing data to/from memory 3604. In at least one embodiment, results can be transmitted to another PPU 3600 or CPU via high-speed GPU interconnect 3608. In at least one embodiment, PPU 3600 includes, without limitation, a number U of partition units 3622 that is equal to a number of separate and distinct memory devices 3604 coupled to PPU 3600, as described in more detail herein in conjunction with FIG. 38.

In at least one embodiment, a host processor executes a driver kernel that implements an application programming interface ("API") that enables one or more applications executing on a host processor to schedule operations for execution on PPU 3600. In at least one embodiment, multiple compute applications are simultaneously executed by PPU 3600 and PPU 3600 provides isolation, quality of service ("QoS"), and independent address spaces for multiple compute applications. In at least one embodiment, an application generates instructions (e.g., in form of API calls) that cause a driver kernel to generate one or more tasks for execution by PPU 3600 and that driver kernel outputs tasks to one or more streams being processed by PPU 3600. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail in conjunction with FIG. 38.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, deep learning application processor is used to train a machine learning model, such as a neural network, to predict or infer information provided to PPU 3600. In at least one embodiment, PPU 3600 is used to infer or predict information based on a trained machine learning model (e.g., neural network) that has been trained by another processor or system or by PPU 3600. In at least one embodiment, PPU 3600 may be used to perform one or more neural network use cases described herein.

In at least one embodiment, the system 100 (see FIG. 1) may be implemented at least in part using the PPU 3600. In at least one embodiment, the processor(s) 114 may be implemented at least in part by the PPU 3600 and the memory 116 may be implemented at least in part by the memory 3604. For example, the instructions 118 (see FIG. 1) may be stored by the memory 3604, executed by the PPU 3600, and used to obtain the optical flow map 110 (see FIGS. 1 and 2). As mentioned above, the system 100 (see FIG. 1) may be implemented by at least a portion of the inference and/or training logic 1115. Referring to FIG. 1, the PPU 3600 (see FIG. 36) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

Figure 37:
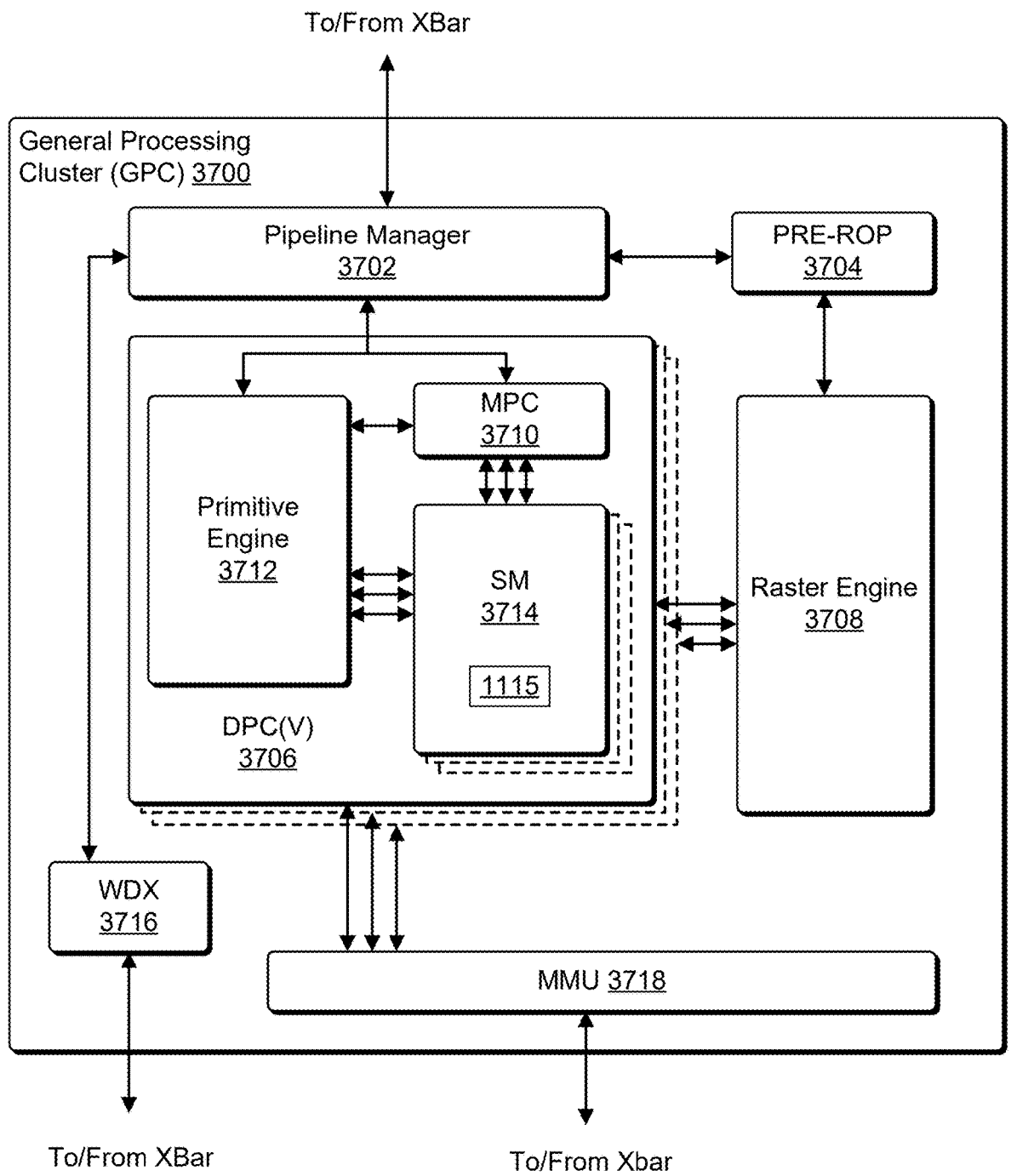
FIG. 37 illustrates a general processing cluster ("GPC"), according to at least one embodiment.

FIG. 37 illustrates a general processing cluster ("GPC") 3700, according to at least one embodiment. In at least one embodiment, GPC 3700 is GPC 3618 of FIG. 36. In at least one embodiment, each GPC 3700 includes, without limitation, a number of hardware units for processing tasks and each GPC 3700 includes, without limitation, a pipeline manager 3702, a pre-raster operations unit ("preROP") 3704, a raster engine 3708, a work distribution crossbar ("WDX") 3716, a memory management unit ("MMU") 3718, one or more Data Processing Clusters ("DPCs") 3706, and any suitable combination of parts.

In at least one embodiment, operation of GPC 3700 is controlled by pipeline manager 3702. In at least one embodiment, pipeline manager 3702 manages configuration of one or more DPCs 3706 for processing tasks allocated to GPC 3700. In at least one embodiment, pipeline manager 3702 configures at least one of one or more DPCs 3706 to implement at least a portion of a graphics rendering pipeline. In at least one embodiment, DPC 3706 is configured to execute a vertex shader program on a programmable streaming multi-processor ("SM") 3714. In at least one embodiment, pipeline manager 3702 is configured to route packets received from a work distribution unit to appropriate logical units within GPC 3700, in at least one embodiment, and some packets may be routed to fixed function hardware units in preROP 3704 and/or raster engine 3708 while other packets may be routed to DPCs 3706 for processing by a primitive engine 3712 or SM 3714. In at least one embodiment, pipeline manager 3702 configures at least one of DPCs 3706 to implement a neural network model and/or a computing pipeline.

In at least one embodiment, preROP unit 3704 is configured, in at least one embodiment, to route data generated by raster engine 3708 and DPCs 3706 to a Raster Operations ("ROP") unit in partition unit 3622, described in more detail above in conjunction with FIG. 36. In at least one embodiment, preROP unit 3704 is configured to perform optimizations for color blending, organize pixel data, perform address translations, and more. In at least one embodiment, raster engine 3708 includes, without limitation, a number of fixed function hardware units configured to perform various raster operations, in at least one embodiment, and raster engine 3708 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to a coarse raster engine to generate coverage information (e.g., an x, y coverage mask for a tile) for primitive; output of a coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, an output of raster engine 3708 comprises fragments to be processed by any suitable entity, such as by a fragment shader implemented within DPC 3706.

In at least one embodiment, each DPC 3706 included in GPC 3700 comprises, without limitation, an M-Pipe Controller ("MPC") 3710; primitive engine 3712; one or more SMs 3714; and any suitable combination thereof. In at least one embodiment, MPC 3710 controls operation of DPC 3706, routing packets received from pipeline manager 3702 to appropriate units in DPC 3706. In at least one embodiment, packets associated with a vertex are routed to primitive engine 3712, which is configured to fetch vertex attributes associated with a vertex from memory; in contrast, packets associated with a shader program may be transmitted to SM 3714.

In at least one embodiment, SM 3714 comprises, without limitation, a programmable streaming processor that is configured to process tasks represented by a number of threads. In at least one embodiment, SM 3714 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp) is configured to process a different set of data based on same set of instructions. In at least one embodiment, all threads in group of threads execute a common set of instructions. In at least one embodiment, SM 3714 implements a Single-Instruction, Multiple Thread ("SIMT") architecture wherein each thread in a group of threads is configured to process a different set of data based on that common set of instructions, but where individual threads in a group of threads are allowed to diverge during execution. In at least one embodiment, a program counter, call stack, and execution state is maintained for each warp, enabling concurrency between warps and serial execution within warps when threads within a warp diverge. In another embodiment, a program counter, call stack, and execution state is maintained for each individual thread, enabling equal concurrency between all threads, within and between warps. In at least one embodiment, execution state is maintained for each individual thread and threads executing common instructions may be converged and executed in parallel for better efficiency. At least one embodiment of SM 3714 is described in more detail herein.

In at least one embodiment, MMU 3718 provides an interface between GPC 3700 and a memory partition unit (e.g., partition unit 3622 of FIG. 36) and MMU 3718 provides translation of virtual addresses into physical addresses, memory protection, and arbitration of memory requests. In at least one embodiment, MMU 3718 provides one or more translation lookaside buffers ("TLBs") for performing translation of virtual addresses into physical addresses in memory.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, deep learning application processor is used to train a machine learning model, such as a neural network, to predict or infer information provided to GPC 3700. In at least one embodiment, GPC 3700 is used to infer or predict information based on a trained machine learning model (e.g., neural network) that has been trained by another processor or system or by GPC 3700. In at least one embodiment, GPC 3700 may be used to perform one or more neural network use cases described herein.

In at least one embodiment, the system 100 (see FIG. 1) may be implemented at least in part by the GPC 3700. In at least one embodiment, the processor(s) 114 may be implemented at least in part by the GPC 3700. For example, the instructions 118 (see FIG. 1) may be executed by the GPC 3700, and used to obtain the optical flow map 110 (see FIGS. 1 and 2). As mentioned above, the system 100 (see FIG. 1) may be implemented by at least a portion of the inference and/or training logic 1115. Referring to FIG. 1, the GPC 3700 (see FIG. 37) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

Figure 38:
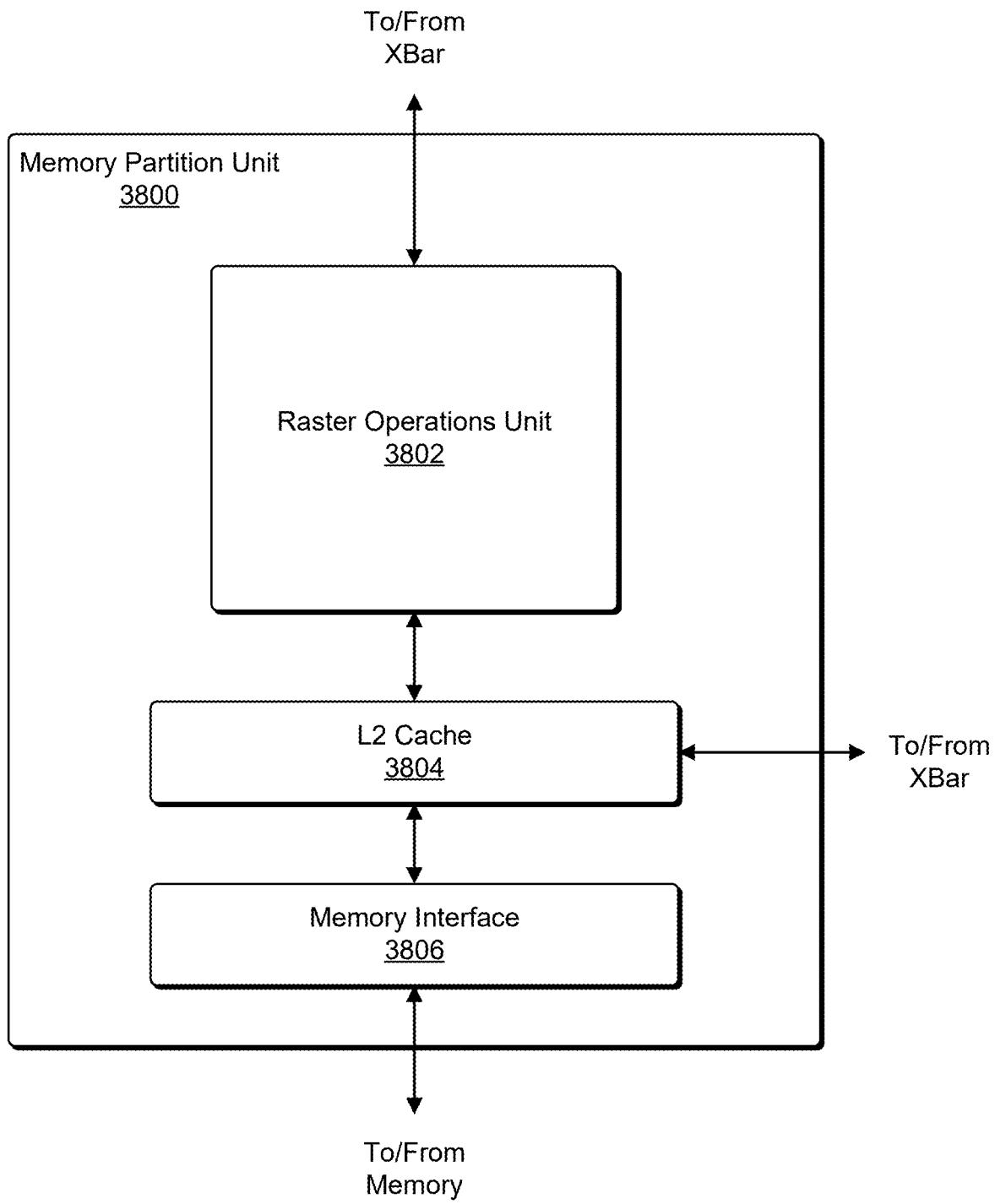
FIG. 38 illustrates a memory partition unit of a parallel processing unit ("PPU"), according to at least one embodiment.

FIG. 38 illustrates a memory partition unit 3800 of a parallel processing unit ("PPU"), in accordance with at least one embodiment. In at least one embodiment, memory partition unit 3800 includes, without limitation, a Raster Operations ("ROP") unit 3802, a level two ("L2") cache 3804, a memory interface 3806, and any suitable combination thereof. In at least one embodiment, memory interface 3806 is coupled to memory. In at least one embodiment, memory interface 3806 may implement 32, 64, 128, 1024-bit data buses, or like, for high-speed data transfer. In at least one embodiment, PPU incorporates U memory interfaces 3806 where U is a positive integer, with one memory interface 3806 per pair of partition units 3800, where each pair of partition units 3800 is connected to a corresponding memory device. For example, in at least one embodiment, PPU may be connected to up to Y memory devices, such as high bandwidth memory stacks or graphics double-data-rate, version 5, synchronous dynamic random access memory ("GDDR5 SDRAM").

In at least one embodiment, memory interface 3806 implements a high bandwidth memory second generation ("HBM2") memory interface and Y equals half of U. In at least one embodiment, HBM2 memory stacks are located on a physical package with a PPU, providing substantial power and area savings compared with conventional GDDR5 SDRAM systems. In at least one embodiment, each HBM2 stack includes, without limitation, four memory dies with Y=4, with each HBM2 stack including two 128-bit channels per die for a total of 8 channels and a data bus width of 1024 bits. In at least one embodiment, that memory supports Single-Error Correcting Double-Error Detecting ("SECDED") Error Correction Code ("ECC") to protect data. In at least one embodiment, ECC can provide higher reliability for compute applications that are sensitive to data corruption.

In at least one embodiment, PPU implements a multi-level memory hierarchy. In at least one embodiment, memory partition unit 3800 supports a unified memory to provide a single unified virtual address space for central processing unit ("CPU") and PPU memory, enabling data sharing between virtual memory systems. In at least one embodiment frequency of accesses by a PPU to a memory located on other processors is traced to ensure that memory pages are moved to physical memory of PPU that is accessing pages more frequently. In at least one embodiment, high-speed GPU interconnect 3608 supports address translation services allowing PPU to directly access a CPU's page tables and providing full access to CPU memory by a PPU.

In at least one embodiment, copy engines transfer data between multiple PPUs or between PPUs and CPUs. In at least one embodiment, copy engines can generate page faults for addresses that are not mapped into page tables and memory partition unit 3800 then services page faults, mapping addresses into page table, after which copy engine performs a transfer. In at least one embodiment, memory is pinned (i.e., non-pageable) for multiple copy engine operations between multiple processors, substantially reducing available memory. In at least one embodiment, with hardware page faulting, addresses can be passed to copy engines without regard as to whether memory pages are resident, and a copy process is transparent.

Data from memory 3604 of FIG. 36 or other system memory is fetched by memory partition unit 3800 and stored in L2 cache 3804, which is located on-chip and is shared between various GPCs, in accordance with at least one embodiment. Each memory partition unit 3800, in at least one embodiment, includes, without limitation, at least a portion of L2 cache associated with a corresponding memory device. In at least one embodiment, lower level caches are implemented in various units within GPCs. In at least one embodiment, each of SMs 3714 in FIG. 37 may implement a Level 1 ("L1") cache wherein that L1 cache is private memory that is dedicated to a particular SM 3714 and data from L2 cache 3804 is fetched and stored in each L1 cache for processing in functional units of SMs 3714. In at least one embodiment, L2 cache 3804 is coupled to memory interface 3806 and XBar 3620 shown in FIG. 36.

ROP unit 3802 performs graphics raster operations related to pixel color, such as color compression, pixel blending, and more, in at least one embodiment. ROP unit 3802, in at least one embodiment, implements depth testing in conjunction with raster engine 3708, receiving a depth for a sample location associated with a pixel fragment from a culling engine of raster engine 3708. In at least one embodiment, depth is tested against a corresponding depth in a depth buffer for a sample location associated with a fragment. In at least one embodiment, if that fragment passes that depth test for that sample location, then ROP unit 3802 updates depth buffer and transmits a result of that depth test to raster engine 3708. It will be appreciated that a number of partition units 3800 may be different than a number of GPCs and, therefore, each ROP unit 3802 can, in at least one embodiment, be coupled to each GPC. In at least one embodiment, ROP unit 3802 tracks packets received from different GPCs and determines whether a result generated by ROP unit 3802 is to be routed to through XBar 3620.

Figure 39:
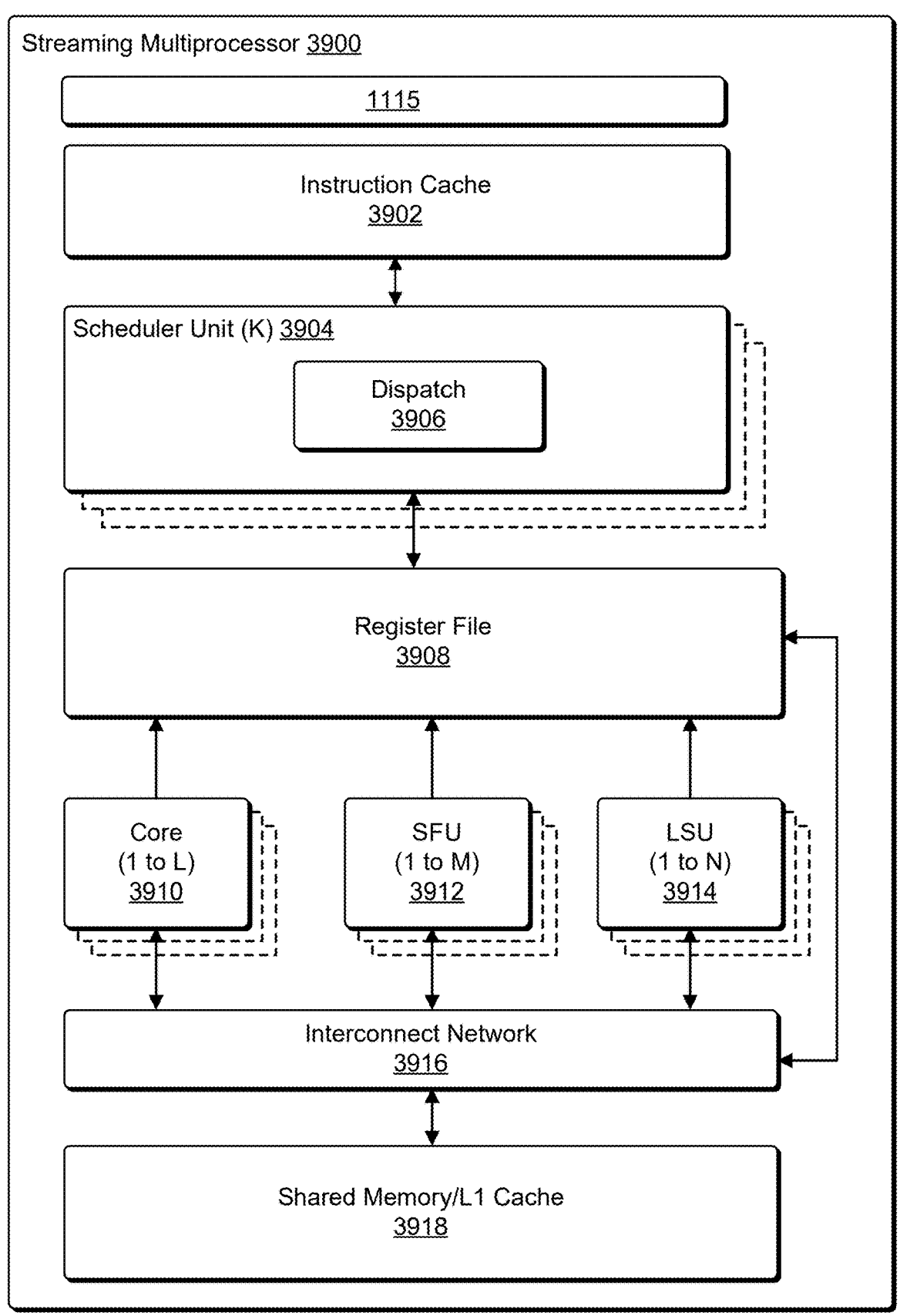
FIG. 39 illustrates a streaming multi-processor, according to at least one embodiment.

FIG. 39 illustrates a streaming multi-processor ("SM") 3900, according to at least one embodiment. In at least one embodiment, SM 3900 is SM of FIG. 37. In at least one embodiment, SM 3900 includes, without limitation, an instruction cache 3902, one or more scheduler units 3904, a register file 3908, one or more processing cores ("cores") 3910, one or more special function units ("SFUs") 3912, one or more load/store units ("LSUs") 3914, an interconnect network 3916, a shared memory/level one ("L1") cache 3918, and/or any suitable combination thereof.

In at least one embodiment, a work distribution unit dispatches tasks for execution on general processing clusters ("GPCs") of parallel processing units ("PPUs") and each task is allocated to a particular Data Processing Cluster ("DPC") within a GPC and, if a task is associated with a shader program, that task is allocated to one of SMs 3900. In at least one embodiment, scheduler unit 3904 receives tasks from a work distribution unit and manages instruction scheduling for one or more thread blocks assigned to SM 3900. In at least one embodiment, scheduler unit 3904 schedules thread blocks for execution as warps of parallel threads, wherein each thread block is allocated at least one warp. In at least one embodiment, each warp executes threads. In at least one embodiment, scheduler unit 3904 manages a plurality of different thread blocks, allocating warps to different thread blocks and then dispatching instructions from plurality of different cooperative groups to various functional units (e.g., processing cores 3910, SFUs 3912, and LSUs 3914) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads ( ) function). However, in at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (i.e., as small as a single thread) and multi-block granularities, and to perform collective operations such as synchronization on threads in a cooperative group. In at least one embodiment, that programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 3906 is configured to transmit instructions to one or more functional units and scheduler unit 3904 and includes, without limitation, two dispatch units 3906 that enable two different instructions from a common warp to be dispatched during each clock cycle. In at least one embodiment, each scheduler unit 3904 includes a single dispatch unit 3906 or additional dispatch units 3906.

In at least one embodiment, each SM 3900, in at least one embodiment, includes, without limitation, register file 3908 that provides a set of registers for functional units of SM 3900. In at least one embodiment, register file 3908 is divided between each functional unit such that each functional unit is allocated a dedicated portion of register file 3908. In at least one embodiment, register file 3908 is divided between different warps being executed by SM 3900 and register file 3908 provides temporary storage for operands connected to data paths of functional units. In at least one embodiment, each SM 3900 comprises, without limitation, a plurality of L processing cores 3910, where L is a positive integer. In at least one embodiment, SM 3900 includes, without limitation, a large number (e.g., 128 or more) of distinct processing cores 3910. In at least one embodiment, each processing core 3910 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 3910 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 3910. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation, D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA 9 C++ API, exposes specialized matrix load, matrix multiply and accumulate, and matrix store operations to efficiently use tensor cores from a CUDA-C++ program.

In at least one embodiment, at a CUDA level, a warp-level interface assumes 16×16 size matrices spanning all 32 threads of warp.

In at least one embodiment, each SM 3900 comprises, without limitation, M SFUs 3912 that perform special functions (e.g., attribute evaluation, reciprocal square root, and like). In at least one embodiment, SFUs 3912 include, without limitation, a tree traversal unit configured to traverse a hierarchical tree data structure. In at least one embodiment, SFUs 3912 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 3900. In at least one embodiment, texture maps are stored in shared memory/L1 cache 3918. In at least one embodiment, texture units implement texture operations such as filtering operations using mip-maps (e.g., texture maps of varying levels of detail), in accordance with at least one embodiment. In at least one embodiment, each SM 3900 includes, without limitation, two texture units.

Each SM 3900 comprises, without limitation, N LSUs 3914 that implement load and store operations between shared memory/L1 cache 3918 and register file 3908, in at least one embodiment. Interconnect network 3916 connects each functional unit to register file 3908 and LSU 3914 to register file 3908 and shared memory/L1 cache 3918 in at least one embodiment. In at least one embodiment, interconnect network 3916 is a crossbar that can be configured to connect any functional units to any registers in register file 3908 and connect LSUs 3914 to register file 3908 and memory locations in shared memory/L1 cache 3918.

In at least one embodiment, shared memory/L1 cache 3918 is an array of on-chip memory that allows for data storage and communication between SM 3900 and primitive engine and between threads in SM 3900, in at least one embodiment. In at least one embodiment, shared memory/L1 cache 3918 comprises, without limitation, 128 KB of storage capacity and is in a path from SM 3900 to a partition unit. In at least one embodiment, shared memory/L1 cache 3918, in at least one embodiment, is used to cache reads and writes. In at least one embodiment, one or more of shared memory/L1 cache 3918, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of a capacity, and texture and load/store operations can use remaining capacity. Integration within shared memory/L1 cache 3918 enables shared memory/L1 cache 3918 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In a general purpose parallel computation configuration, a work distribution unit assigns and distributes blocks of threads directly to DPCs, in at least one embodiment. In at least one embodiment, threads in a block execute a common program, using a unique thread ID in calculation to ensure each thread generates unique results, using SM 3900 to execute program and perform calculations, shared memory/L1 cache 3918 to communicate between threads, and LSU 3914 to read and write global memory through shared memory/L1 cache 3918 and memory partition unit. In at least one embodiment, when configured for general purpose parallel computation, SM 3900 writes commands that scheduler unit 3904 can use to launch new work on DPCs.

In at least one embodiment, a PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, a PPU is embodied on a single semiconductor substrate. In at least one embodiment, a PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, a PPU may be included on a graphics card that includes one or more memory devices. In at least one embodiment, that graphics card may be configured to interface with a PCIe slot on a motherboard of a desktop computer. In at least one embodiment, that PPU may be an integrated graphics processing unit ("iGPU") included in chipset of a motherboard.

Inference and/or training logic 1115 are used to perform inferencing and/or training operations associated with one or more embodiments. Details regarding inference and/or training logic 1115 are provided herein in conjunction with FIGS. 11A and/or 11B. In at least one embodiment, deep learning application processor is used to train a machine learning model, such as a neural network, to predict or infer information provided to SM 3900. In at least one embodiment, SM 3900 is used to infer or predict information based on a trained machine learning model (e.g., neural network) that has been trained by another processor or system or by SM 3900. In at least one embodiment, SM 3900 may be used to perform one or more neural network use cases described herein.

Embodiments are disclosed related a virtualized computing platform for advanced computing, such as image inferencing and image processing in medical applications. Without limitation, embodiments may include radiography, magnetic resonance imaging (MRI), nuclear medicine, ultrasound, sonography, elastography, photoacoustic imaging, tomography, echocardiography, functional near-infrared spectroscopy, and magnetic particle imaging, or a combination thereof. In at least one embodiment, a virtualized computing platform and associated processes described herein may additionally or alternatively be used, without limitation, in forensic science analysis, sub-surface detection and imaging (e.g., oil exploration, archaeology, paleontology, etc.), topography, oceanography, geology, osteology, meteorology, intelligent area or object tracking and monitoring, sensor data processing (e.g., RADAR, SONAR, LIDAR, etc.), and/or genomics and gene sequencing.

Figure 40:
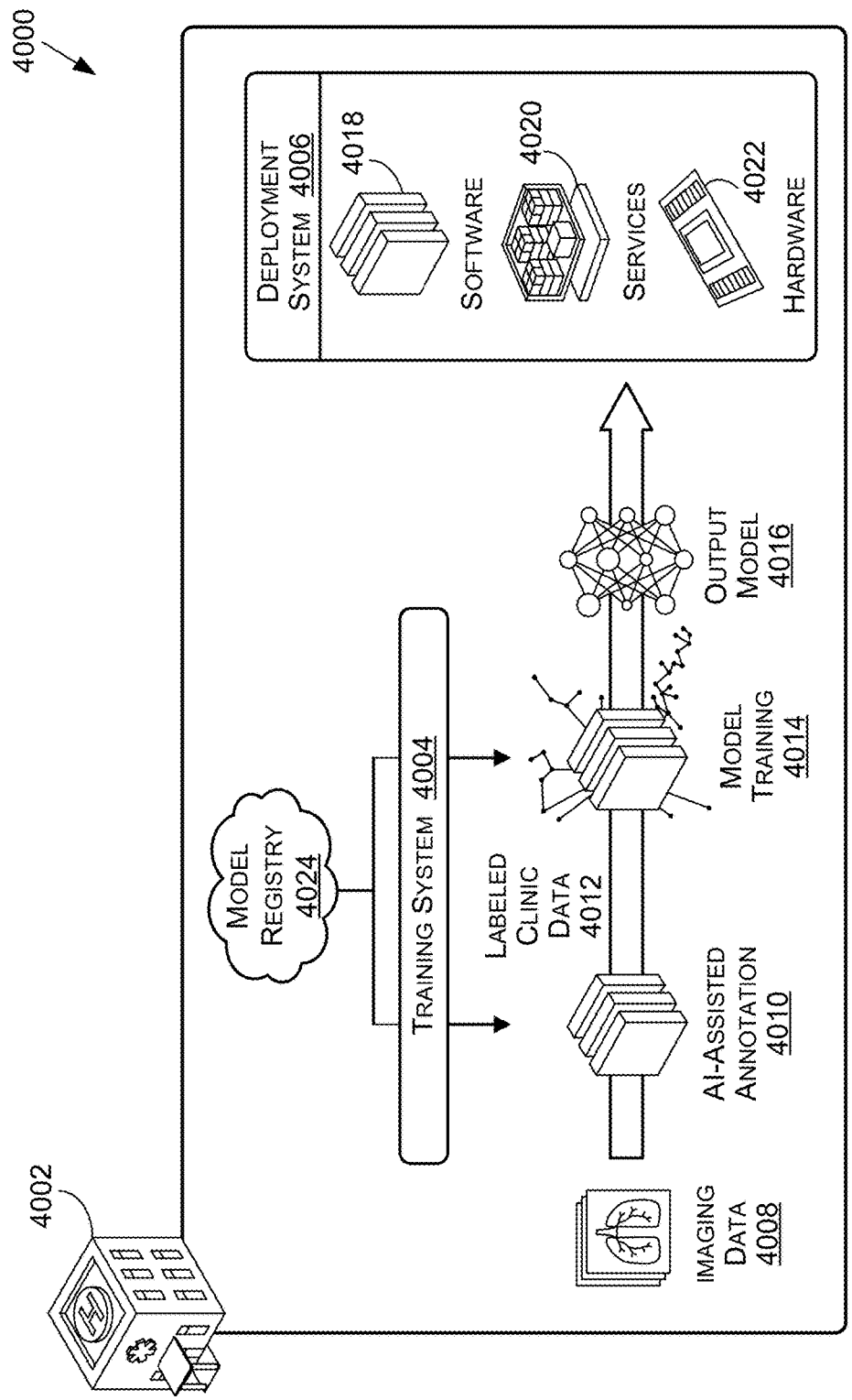
FIG. 40 is an example data flow diagram for an advanced computing pipeline, in accordance with at least one embodiment.

With reference to FIG. 40, FIG. 40 is an example data flow diagram for a process 4000 of generating and deploying an image processing and inferencing pipeline, in accordance with at least one embodiment. In at least one embodiment, process 4000 may be deployed for use with imaging devices, processing devices, genomics devices, gene sequencing devices, radiology devices, and/or other device types at one or more facilities 4002, such as medical facilities, hospitals, healthcare institutes, clinics, research or diagnostic labs, etc. In at least one embodiment, process 4000 may be deployed to perform genomics analysis and inferencing on sequencing data. Examples of genomic analyses that may be performed using systems and processes described herein include, without limitation, variant calling, mutation detection, and gene expression quantification.

In at least one embodiment, process 4000 may be executed within a training system 4004 and/or a deployment system 4006. In at least one embodiment, training system 4004 may be used to perform training, deployment, and implementation of machine learning models (e.g., neural networks, object detection algorithms, computer vision algorithms, etc.) for use in deployment system 4006. In at least one embodiment, deployment system 4006 may be configured to offload processing and compute resources among a distributed computing environment to reduce infrastructure requirements at facility 4002. In at least one embodiment, deployment system 4006 may provide a streamlined platform for selecting, customizing, and implementing virtual instruments for use with imaging devices (e.g., MRI, CT Scan, X-Ray, Ultrasound, etc.) or sequencing devices at facility 4002. In at least one embodiment, virtual instruments may include software-defined applications for performing one or more processing operations with respect to imaging data generated by imaging devices, sequencing devices, radiology devices, and/or other device types. In at least one embodiment, one or more applications in a pipeline may use or call upon services (e.g., inference, visualization, compute, AI, etc.) of deployment system 4006 during execution of applications.

In at least one embodiment, some of applications used in advanced processing and inferencing pipelines may use machine learning models or other AI to perform one or more processing steps. In at least one embodiment, machine learning models may be trained at facility 4002 using data 4008 (such as imaging data) generated at facility 4002 (and stored on one or more picture archiving and communication system (PACS) servers at facility 4002), may be trained using imaging or sequencing data 4008 from another facility or facilities (e.g., a different hospital, lab, clinic, etc.), or a combination thereof. In at least one embodiment, training system 4004 may be used to provide applications, services, and/or other resources for generating working, deployable machine learning models for deployment system 4006.

In at least one embodiment, a model registry 4024 may be backed by object storage that may support versioning and object metadata. In at least one embodiment, object storage may be accessible through, for example, a cloud storage (e.g., a cloud 4126 of FIG. 41) compatible application programming interface (API) from within a cloud platform. In at least one embodiment, machine learning models within model registry 4024 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 4104 (FIG. 41) may include a scenario where facility 4002 is training their own machine learning model, or has an existing machine learning model that needs to be optimized or updated. In at least one embodiment, imaging data 4008 generated by imaging device(s), sequencing devices, and/or other device types may be received. In at least one embodiment, once imaging data 4008 is received, AI-assisted annotation 4010 may be used to aid in generating annotations corresponding to imaging data 4008 to be used as ground truth data for a machine learning model. In at least one embodiment, AI-assisted annotation 4010 may include one or more machine learning models (e.g., convolutional neural networks (CNNs)) that may be trained to generate annotations corresponding to certain types of imaging data 4008 (e.g., from certain devices) and/or certain types of anomalies in imaging data 4008. In at least one embodiment, AI-assisted annotations 4010 may then be used directly, or may be adjusted or fine-tuned using an annotation tool (e.g., by a researcher, a clinician, a doctor, a scientist, etc.), to generate ground truth data. In at least one embodiment, in some examples, labeled clinic data 4012 (e.g., annotations provided by a clinician, doctor, scientist, technician, etc.) may be used as ground truth data for training a machine learning model. In at least one embodiment, AI-assisted annotations 4010, labeled clinic data 4012, or a combination thereof may be used as ground truth data for training a machine learning model. In at least one embodiment, a trained machine learning model may be referred to as an output model 4016, and may be used by deployment system 4006, as described herein.

In at least one embodiment, training pipeline 4104 (FIG. 41) may include a scenario where facility 4002 needs a machine learning model for use in performing one or more processing tasks for one or more applications in deployment system 4006, but facility 4002 may not currently have such a machine learning model (or may not have a model that is optimized, efficient, or effective for such purposes). In at least one embodiment, an existing machine learning model may be selected from model registry 4024. In at least one embodiment, model registry 4024 may include machine learning models trained to perform a variety of different inference tasks on imaging data. In at least one embodiment, machine learning models in model registry 4024 may have been trained on imaging data from different facilities than facility 4002 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 4024. In at least one embodiment, a machine learning model may then be retrained, or updated, at any number of other facilities, and a retrained or updated model may be made available in model registry 4024. In at least one embodiment, a machine learning model may then be selected from model registry 4024—and referred to as output model 4016—and may be used in deployment system 4006 to perform one or more processing tasks for one or more applications of a deployment system.

In at least one embodiment, training pipeline 4104 (FIG. 41) may be used in a scenario that includes facility 4002 requiring a machine learning model for use in performing one or more processing tasks for one or more applications in deployment system 4006, but facility 4002 may not currently have such a machine learning model (or may not have a model that is optimized, efficient, or effective for such purposes). In at least one embodiment, a machine learning model selected from model registry 4024 might not be fine-tuned or optimized for imaging data 4008 generated at facility 4002 because of differences in populations, genetic variations, robustness of training data used to train a machine learning model, diversity in anomalies of training data, and/or other issues with training data. In at least one embodiment, AI-assisted annotation 4010 may be used to aid in generating annotations corresponding to imaging data 4008 to be used as ground truth data for retraining or updating a machine learning model. In at least one embodiment, labeled clinic data 4012 (e.g., annotations provided by a clinician, doctor, scientist, etc.) may be used as ground truth data for training a machine learning model. In at least one embodiment, retraining or updating a machine learning model may be referred to as model training 4014. In at least one embodiment, model training 4014—e.g., AI-assisted annotations 4010, labeled clinic data 4012, or a combination thereof—may be used as ground truth data for retraining or updating a machine learning model.

In at least one embodiment, deployment system 4006 may include software 4018, services 4020, hardware 4022, and/or other components, features, and functionality. In at least one embodiment, deployment system 4006 may include a software "stack," such that software 4018 may be built on top of services 4020 and may use services 4020 to perform some or all of processing tasks, and services 4020 and software 4018 may be built on top of hardware 4022 and use hardware 4022 to execute processing, storage, and/or other compute tasks of deployment system 4006.

In at least one embodiment, software 4018 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of imaging device (e.g., CT, MRI, X-Ray, ultrasound, sonography, echocardiography, etc.), sequencing device, radiology device, genomics device, etc., there may be any number of containers that may perform a data processing task with respect to imaging data 4008 (or other data types, such as those described herein) generated by a device. In at least one embodiment, an advanced processing and inferencing pipeline may be defined based on selections of different containers that are desired or required for processing imaging data 4008, in addition to containers that receive and configure imaging data for use by each container and/or for use by facility 4002 after processing through a pipeline (e.g., to convert outputs back to a usable data type, such as digital imaging and communications in medicine (DICOM) data, radiology information system (RIS) data, clinical information system (CIS) data, remote procedure call (RPC) data, data substantially compliant with a representation state transfer (REST) interface, data substantially compliant with a file-based interface, and/or raw data, for storage and display at facility 4002). In at least one embodiment, a combination of containers within software 4018 (e.g., that make up a pipeline) may be referred to as a virtual instrument (as described in more detail herein), and a virtual instrument may leverage services 4020 and hardware 4022 to execute some or all processing tasks of applications instantiated in containers.

In at least one embodiment, a data processing pipeline may receive input data (e.g., imaging data 4008) in a DICOM, RIS, CIS, REST compliant, RPC, raw, and/or other format in response to an inference request (e.g., a request from a user of deployment system 4006, such as a clinician, a doctor, a radiologist, etc.). In at least one embodiment, input data may be representative of one or more images, video, and/or other data representations generated by one or more imaging devices, sequencing devices, radiology devices, genomics devices, and/or other device types. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 4016 of training system 4004.

In at least one embodiment, tasks of data processing pipeline may be encapsulated in a container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 4024 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 4020 as a system (e.g., system 4100 of FIG. 41). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming DICOM data. In at least one embodiment, once validated by system 4100 (e.g., for accuracy, safety, patient privacy, etc.), an application may be available in a container registry for selection and/or implementation by a user (e.g., a hospital, clinic, lab, healthcare provider, etc.) to perform one or more processing tasks with respect to data at a facility (e.g., a second facility) of a user.

Figure 41:
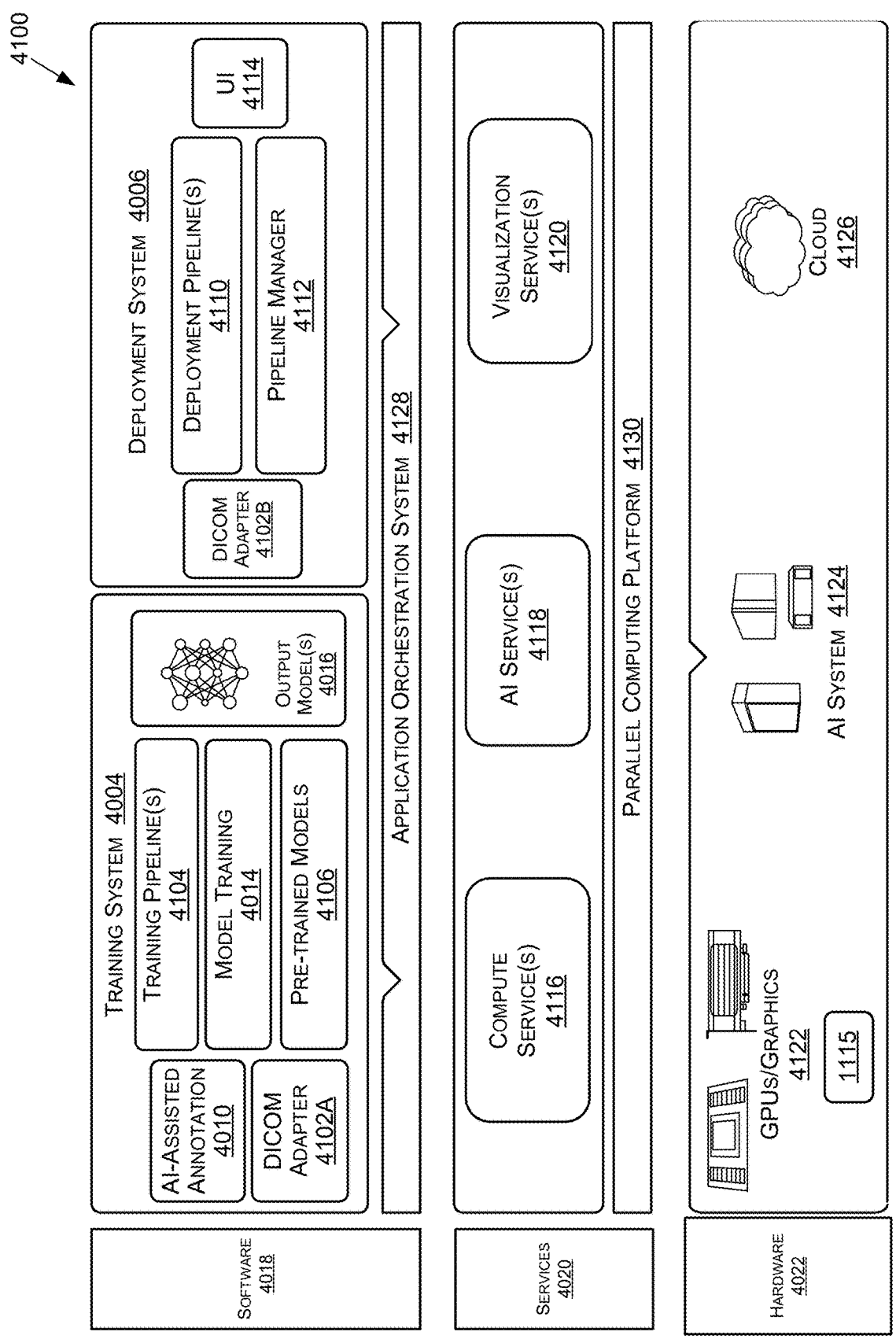
FIG. 41 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 4100 of FIG. 41). In at least one embodiment, completed and validated applications or containers may be stored in a container registry and associated machine learning models may be stored in model registry 4024. In at least one embodiment, a requesting entity (e.g., a user at a medical facility)—who provides an inference or image processing request—may browse a container registry and/or model registry 4024 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 4006 (e.g., a cloud) to perform processing of data processing pipeline. In at least one embodiment, processing by deployment system 4006 may include referencing selected elements (e.g., applications, containers, models, etc.) from a container registry and/or model registry 4024. In at least one embodiment, once results are generated by a pipeline, results may be returned to a user for reference (e.g., for viewing in a viewing application suite executing on a local, on-premises workstation or terminal). In at least one embodiment, a radiologist may receive results from an data processing pipeline including any number of application and/or containers, where results may include anomaly detection in X-rays, CT scans, MRIs, etc.

In at least one embodiment, to aid in processing or execution of applications or containers in pipelines, services 4020 may be leveraged. In at least one embodiment, services 4020 may include compute services, artificial intelligence (AI) services, visualization services, and/or other service types. In at least one embodiment, services 4020 may provide functionality that is common to one or more applications in software 4018, so functionality may be abstracted to a service that may be called upon or leveraged by applications. In at least one embodiment, functionality provided by services 4020 may run dynamically and more efficiently, while also scaling well by allowing applications to process data in parallel (e.g., using a parallel computing platform 4130 (FIG. 41)). In at least one embodiment, rather than each application that shares a same functionality offered by a service 4020 being required to have a respective instance of service 4020, service 4020 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 4020 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 4018 implementing advanced processing and inferencing pipeline that includes segmentation application and anomaly detection application may be streamlined because each application may call upon a same inference service to perform one or more inferencing tasks.

In at least one embodiment, hardware 4022 may include GPUs, CPUs, graphics cards, an AI/deep learning system (e.g., an AI supercomputer, such as NVIDIA's DGX supercomputer system), a cloud platform, or a combination thereof. In at least one embodiment, different types of hardware 4022 may be used to provide efficient, purpose-built support for software 4018 and services 4020 in deployment system 4006. In at least one embodiment, use of GPU processing may be implemented for processing locally (e.g., at facility 4002), within an AI/deep learning system, in a cloud system, and/or in other processing components of deployment system 4006 to improve efficiency, accuracy, and efficacy of image processing, image reconstruction, segmentation, MRI exams, stroke or heart attack detection (e.g., in real-time), image quality in rendering, etc. In at least one embodiment, a facility may include imaging devices, genomics devices, sequencing devices, and/or other device types on-premises that may leverage GPUs to generate imaging data representative of a subject's anatomy.

In at least one embodiment, software 4018 and/or services 4020 may be optimized for GPU processing with respect to deep learning, machine learning, and/or high-performance computing, as non-limiting examples. In at least one embodiment, at least some of computing environment of deployment system 4006 and/or training system 4004 may be executed in a datacenter one or more supercomputers or high performance computing systems, with GPU optimized software (e.g., hardware and software combination of NVIDIA's DGX system). In at least one embodiment, datacenters may be compliant with provisions of HIPAA, such that receipt, processing, and transmission of imaging data and/or other patient data is securely handled with respect to privacy of patient data. In at least one embodiment, hardware 4022 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX systems) as a hardware abstraction and scaling platform. In at least one embodiment, cloud platform may integrate an application container clustering system or orchestration system (e.g., KUBERNETES) on multiple GPUs to enable seamless scaling and load balancing.

In at least one embodiment, the system 100 (see FIG. 1) may be implemented at least in part by the SM 3900 and/or using the process 4000. In at least one embodiment, the processor(s) 114 may be implemented at least in part by the SM 3900. For example, the instructions 118 (see FIG. 1) may be executed by the SM 3900, and used to obtain the optical flow map 110 (see FIGS. 1 and 2). As mentioned above, the system 100 (see FIG. 1) may be implemented by at least a portion of the inference and/or training logic 1115.

Referring to FIG. 1, the SM 3900 (see FIG. 39) may perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

FIG. 41 is a system diagram for an example system 4100 for generating and deploying an imaging deployment pipeline, in accordance with at least one embodiment. In at least one embodiment, system 4100 may be used to implement process 4000 of FIG. 40 and/or other processes including advanced processing and inferencing pipelines. In at least one embodiment, system 4100 may include training system 4004 and deployment system 4006. In at least one embodiment, training system 4004 and deployment system 4006 may be implemented using software 4018, services 4020, and/or hardware 4022, as described herein.

In at least one embodiment, system 4100 (e.g., training system 4004 and/or deployment system 4006) may implemented in a cloud computing environment (e.g., using cloud 4126). In at least one embodiment, system 4100 may be implemented locally with respect to a healthcare services facility, or as a combination of both cloud and local computing resources. In at least one embodiment, in embodiments where cloud computing is implemented, patient data may be separated from, or unprocessed by, by one or more components of system 4100 that would render processing non-compliant with HIPAA and/or other data handling and privacy regulations or laws. In at least one embodiment, access to APIs in cloud 4126 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 4100, may be restricted to a set of public IPs that have been vetted or authorized for interaction.

In at least one embodiment, various components of system 4100 may communicate between and among one another using any of a variety of different network types, including but not limited to local area networks (LANs) and/or wide area networks (WANs) via wired and/or wireless communication protocols. In at least one embodiment, communication between facilities and components of system 4100 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 4004 may execute training pipelines 4104, similar to those described herein with respect to FIG. 40. In at least one embodiment, where one or more machine learning models are to be used in deployment pipelines 4110 by deployment system 4006, training pipelines 4104 may be used to train or retrain one or more (e.g., pre-trained) models, and/or implement one or more of pre-trained models 4106 (e.g., without a need for retraining or updating). In at least one embodiment, as a result of training pipelines 4104, output model(s) 4016 may be generated. In at least one embodiment, training pipelines 4104 may include any number of processing steps, such as but not limited to imaging data (or other input data) conversion or adaption (e.g., using DICOM adapter 4102A to convert DICOM images to another format suitable for processing by respective machine learning models, such as Neuroimaging Informatics Technology Initiative (NIfTI)

format), AI-assisted annotation 4010, labeling or annotating of imaging data 4008 to generate labeled clinic data 4012, model selection from a model registry, model training 4014, training, retraining, or updating models, and/or other processing steps. In at least one embodiment, for different machine learning models used by deployment system 4006, different training pipelines 4104 may be used. In at least one embodiment, training pipeline 4104 similar to a first example described with respect to FIG. 40 may be used for a first machine learning model, training pipeline 4104 similar to a second example described with respect to FIG. 40 may be used for a second machine learning model, and training pipeline 4104 similar to a third example described with respect to FIG. 40 may be used for a third machine learning model. In at least one embodiment, any combination of tasks within training system 4004 may be used depending on what is required for each respective machine learning model. In at least one embodiment, one or more of machine learning models may already be trained and ready for deployment so machine learning models may not undergo any processing by training system 4004, and may be implemented by deployment system 4006.

In at least one embodiment, output model(s) 4016 and/or pre-trained model(s) 4106 may include any types of machine learning models depending on implementation or embodiment. In at least one embodiment, and without limitation, machine learning models used by system 4100 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipelines 4104 may include AI-assisted annotation, as described in more detail herein with respect to at least FIG. 44B. In at least one embodiment, labeled clinic data 4012 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 4008 (or other data type used by machine learning models), there may be corresponding ground truth data generated by training system 4004. In at least one embodiment, AI-assisted annotation may be performed as part of deployment pipelines 4110; either in addition to, or in lieu of AI-assisted annotation included in training pipelines 4104. In at least one embodiment, system 4100 may include a multi-layer platform that may include a software layer (e.g., software 4018) of diagnostic applications (or other application types) that may perform one or more medical imaging and diagnostic functions. In at least one embodiment, system 4100 may be communicatively coupled to (e.g., via encrypted links) PACS server networks of one or more facilities. In at least one embodiment, system 4100 may be configured to access and referenced data (e.g., DICOM data, RIS data, raw data, CIS data, REST compliant data, RPC data, raw data, etc.) from PACS servers (e.g., via a DICOM adapter 4102, or another data type adapter such as RIS, CIS, REST compliant, RPC, raw, etc.) to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 4002). In at least one embodiment, applications may then call or execute one or more services 4020 for performing compute, AI, or visualization tasks associated with respective applications, and software 4018 and/or services 4020 may leverage hardware 4022 to perform processing tasks in an effective and efficient manner.

In at least one embodiment, deployment system 4006 may execute deployment pipelines 4110. In at least one embodiment, deployment pipelines 4110 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 4110 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 4110 depending on information desired from data generated by a device. In at least one embodiment, where detections of anomalies are desired from an MRI machine, there may be a first deployment pipeline 4110, and where image enhancement is desired from output of an MRI machine, there may be a second deployment pipeline 4110.

In at least one embodiment, applications available for deployment pipelines 4110 may include any application that may be used for performing processing tasks on imaging data or other data from devices. In at least one embodiment, different applications may be responsible for image enhancement, segmentation, reconstruction, anomaly detection, object detection, feature detection, treatment planning, dosimetry, beam planning (or other radiation treatment procedures), and/or other analysis, image processing, or inferencing tasks. In at least one embodiment, deployment system 4006 may define constructs for each of applications, such that users of deployment system 4006 (e.g., medical facilities, labs, clinics, etc.) may understand constructs and adapt applications for implementation within their respective facility. In at least one embodiment, an application for image reconstruction may be selected for inclusion in deployment pipeline 4110, but data type generated by an imaging device may be different from a data type used within an application. In at least one embodiment, DICOM adapter 4102B (and/or a DICOM reader) or another data type adapter or reader (e.g., RIS, CIS, REST compliant, RPC, raw, etc.) may be used within deployment pipeline 4110 to convert data to a form useable by an application within deployment system 4006. In at least one embodiment, access to DICOM, RIS, CIS, REST compliant, RPC, raw, and/or other data type libraries may be accumulated and pre-processed, including decoding, extracting, and/or performing any convolutions, color corrections, sharpness, gamma, and/or other augmentations to data. In at least one embodiment, DICOM, RIS, CIS, REST compliant, RPC, and/or raw data may be unordered and a pre-pass may be executed to organize or sort collected data. In at least one embodiment, because various applications may share common image operations, in some embodiments, a data augmentation library (e.g., as one of services 4020) may be used to accelerate these operations. In at least one embodiment, to avoid bottlenecks of conventional processing approaches that rely on CPU processing, parallel computing platform 4130 may be used for GPU acceleration of these processing tasks.

In at least one embodiment, an image reconstruction application may include a processing task that includes use of a machine learning model. In at least one embodiment, a user may desire to use their own machine learning model, or to select a machine learning model from model registry 4024. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 4100—such as services 4020 and hardware 4022—deployment pipelines 4110 may be even more user friendly, provide for easier integration, and produce more accurate, efficient, and timely results.

In at least one embodiment, deployment system 4006 may include a user interface 4114 (e.g., a graphical user interface, a web interface, etc.) that may be used to select applications for inclusion in deployment pipeline(s) 4110, arrange applications, modify or change applications or parameters or constructs thereof, use and interact with deployment pipeline(s) 4110 during set-up and/or deployment, and/or to otherwise interact with deployment system 4006. In at least one embodiment, although not illustrated with respect to training system 4004, user interface 4114 (or a different user interface) may be used for selecting models for use in deployment system 4006, for selecting models for training, or retraining, in training system 4004, and/or for otherwise interacting with training system 4004.

Figure 42:
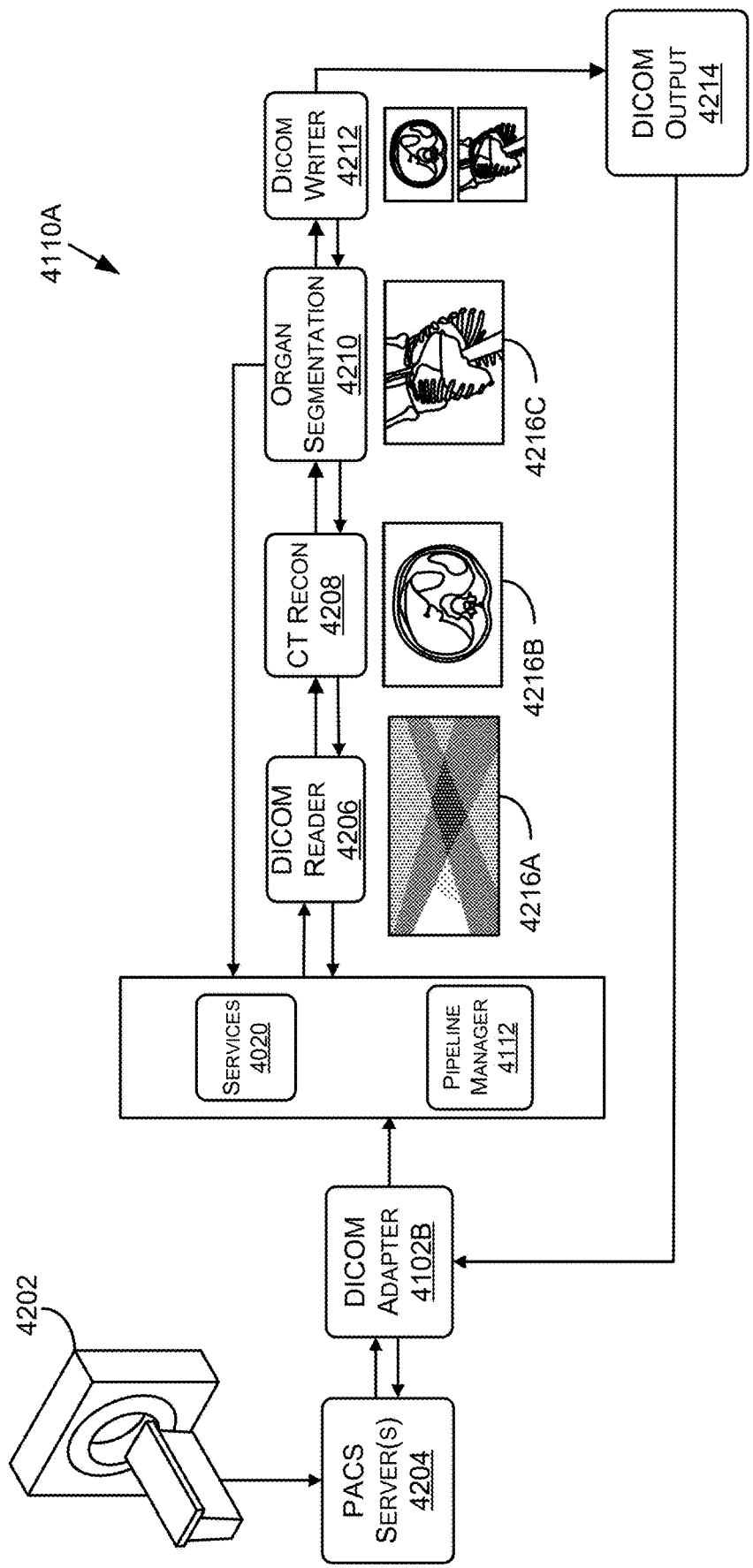
FIG. 42 includes an example illustration of an advanced computing pipeline 4110A for processing imaging data, in accordance with at least one embodiment.

In at least one embodiment, pipeline manager 4112 may be used, in addition to an application orchestration system 4128, to manage interaction between applications or containers of deployment pipeline(s) 4110 and services 4020 and/or hardware 4022. In at least one embodiment, pipeline manager 4112 may be configured to facilitate interactions from application to application, from application to service 4020, and/or from application or service to hardware 4022. In at least one embodiment, although illustrated as included in software 4018, this is not intended to be limiting, and in some examples (e.g., as illustrated in FIG. 42) pipeline manager 4112 may be included in services 4020. In at least one embodiment, application orchestration system 4128 (e.g., Kubernetes, DOCKER, etc.) may include a container orchestration system that may group applications into containers as logical units for coordination, management, scaling, and deployment. In at least one embodiment, by associating applications from deployment pipeline(s) 4110 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 4112 and application orchestration system 4128. In at least one embodiment, so long as an expected input and/or output of each container or application is known by a system (e.g., based on constructs of applications or containers), application orchestration system 4128 and/or pipeline manager 4112 may facilitate communication among and between, and sharing of resources among and between, each of applications or containers. In at least one embodiment, because one or more of applications or containers in deployment pipeline(s) 4110 may share same services and resources, application orchestration system 4128 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 4128) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 4020 leveraged by and shared by applications or containers in deployment system 4006 may include compute services 4116, AI services 4118, visualization services 4120, and/or other service types. In at least one embodiment, applications may call (e.g., execute) one or more of services 4020 to perform processing operations for an application. In at least one embodiment, compute services 4116 may be leveraged by applications to perform super-computing or other high-performance computing (HPC) tasks. In at least one embodiment, compute service(s) 4116 may be leveraged to perform parallel processing (e.g., using a parallel computing platform 4130) for processing data through one or more of applications and/or one or more tasks of a single application, substantially simultaneously. In at least one embodiment, parallel computing platform 4130 (e.g., NVIDIA's CUDA) may enable general purpose computing on GPUs (GPGPU) (e.g., GPUs 4122). In at least one embodiment, a software layer of parallel computing platform 4130 may provide access to virtual instruction sets and parallel computational elements of GPUs, for execution of compute kernels. In at least one embodiment, parallel computing platform 4130 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 4130 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 4118 may be leveraged to perform inferencing services for executing machine learning model(s) associated with applications (e.g., tasked with performing one or more processing tasks of an application). In at least one embodiment, AI services 4118 may leverage AI system 4124 to execute machine learning model(s) (e.g., neural networks, such as CNNs) for segmentation, reconstruction, object detection, feature detection, classification, and/or other inferencing tasks. In at least one embodiment, applications of deployment pipeline(s) 4110 may use one or more of output models 4016 from training system 4004 and/or other models of applications to perform inference on imaging data (e.g., DICOM data, RIS data, CIS data, REST compliant data, RPC data, raw data, etc.). In at least one embodiment, two or more examples of inferencing using application orchestration system 4128 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 4128 may distribute resources (e.g., services 4020 and/or hardware 4022) based on priority paths for different inferencing tasks of AI services 4118.

In at least one embodiment, shared storage may be mounted to AI services 4118 within system 4100. In at least one embodiment, shared storage may operate as a cache (or other storage device type) and may be used to process inference requests from applications. In at least one embodiment, when an inference request is submitted, a request may be received by a set of API instances of deployment system 4006, and one or more instances may be selected (e.g., for best fit, for load balancing, etc.) to process a request. In at least one embodiment, to process a request, a request may be entered into a database, a machine learning model may be located from model registry 4024 if not already in a cache, a validation step may ensure appropriate machine learning model is loaded into a cache (e.g., shared storage), and/or a copy of a model may be saved to a cache. In at least one embodiment, a scheduler (e.g., of pipeline manager 4112) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT less than one minute) priority while others may have lower priority (e.g., TAT less than 10 minutes). In at least one embodiment, model execution times may be measured from requesting institution or entity and may include partner network traversal time, as well as execution on an inference service.

In at least one embodiment, transfer of requests between services 4020 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 4126, and an inference service may perform inferencing on a GPU.

In at least one embodiment, visualization services 4120 may be leveraged to generate visualizations for viewing outputs of applications and/or deployment pipeline(s) 4110. In at least one embodiment, GPUs 4122 may be leveraged by visualization services 4120 to generate visualizations. In at least one embodiment, rendering effects, such as ray-tracing, may be implemented by visualization services 4120 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 4120 may include an internal visualizer, cinematics, and/or other rendering or image processing capabilities or functionality (e.g., ray tracing, rasterization, internal optics, etc.).

In at least one embodiment, hardware 4022 may include GPUs 4122, AI system 4124, cloud 4126, and/or any other hardware used for executing training system 4004 and/or deployment system 4006. In at least one embodiment, GPUs 4122 (e.g., NVIDIA's TESLA and/or QUADRO GPUs) may include any number of GPUs that may be used for executing processing tasks of compute services 4116, AI services 4118, visualization services 4120, other services, and/or any of features or functionality of software 4018. For example, with respect to AI services 4118, GPUs 4122 may be used to perform pre-processing on imaging data (or other data types used by machine learning models), post-processing on outputs of machine learning models, and/or to perform inferencing (e.g., to execute machine learning models). In at least one embodiment, cloud 4126, AI system 4124, and/or other components of system 4100 may use GPUs 4122. In at least one embodiment, cloud 4126 may include a GPU-optimized platform for deep learning tasks. In at least one embodiment, AI system 4124 may use GPUs, and cloud 4126—or at least a portion tasked with deep learning or inferencing—may be executed using one or more AI systems 4124. As such, although hardware 4022 is illustrated as discrete components, this is not intended to be limiting, and any components of hardware 4022 may be combined with, or leveraged by, any other components of hardware 4022.

In at least one embodiment, AI system 4124 may include a purpose-built computing system (e.g., a super-computer or an HPC) configured for inferencing, deep learning, machine learning, and/or other artificial intelligence tasks. In at least one embodiment, AI system 4124 (e.g., NVIDIA's DGX) may include GPU-optimized software (e.g., a software stack) that may be executed using a plurality of GPUs 4122, in addition to CPUs, RAM, storage, and/or other components, features, or functionality. In at least one embodiment, one or more AI systems 4124 may be implemented in cloud 4126 (e.g., in a data center) for performing some or all of AI-based processing tasks of system 4100.

In at least one embodiment, cloud 4126 may include a GPU-accelerated infrastructure (e.g., NVIDIA's NGC) that may provide a GPU-optimized platform for executing processing tasks of system 4100. In at least one embodiment, cloud 4126 may include an AI system(s) 4124 for performing one or more of AI-based tasks of system 4100 (e.g., as a hardware abstraction and scaling platform). In at least one embodiment, cloud 4126 may integrate with application orchestration system 4128 leveraging multiple GPUs to enable seamless scaling and load balancing between and among applications and services 4020. In at least one embodiment, cloud 4126 may tasked with executing at least some of services 4020 of system 4100, including compute services 4116, AI services 4118, and/or visualization services 4120, as described herein. In at least one embodiment, cloud 4126 may perform small and large batch inference (e.g., executing NVIDIA's TENSOR RT), provide an accelerated parallel computing API and platform 4130 (e.g., NVIDIA's CUDA), execute application orchestration system 4128 (e.g., KUBERNETES), provide a graphics rendering API and platform (e.g., for ray-tracing, 2D graphics, 3D graphics, and/or other rendering techniques to produce higher quality cinematics), and/or may provide other functionality for system 4100.

In at least one embodiment, in an effort to preserve patient confidentiality (e.g., where patient data or records are to be used off-premises), cloud 4126 may include a registry—such as a deep learning container registry. In at least one embodiment, a registry may store containers for instantiations of applications that may perform pre-processing, post-processing, or other processing tasks on patient data. In at least one embodiment, cloud 4126 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

In at least one embodiment, the system 100 (see FIG. 1) may be implemented at least in part by the system 4100. As mentioned above, the system 100 (see FIG. 1) may be implemented by at least a portion of the inference and/or training logic 1115. Referring to FIG. 1, the system 4100 (see FIG. 41) may be used to perform inferencing and/or training operations (e.g., at least a portion of the inference and/or training logic 1115) with respect to any of the denoise process 120, the edge detection process 122, the object detection process 124, the optional thresholding process 126, the decision logic 128, the extraction process 130, and the SGM process 132.

FIG. 42 includes an example illustration of a deployment pipeline 4110A for processing imaging data, in accordance with at least one embodiment. In at least one embodiment, system 4100—and specifically deployment system 4006 (see FIG. 40)—may be used to customize, update, and/or integrate deployment pipeline(s) 4110A into one or more production environments. In at least one embodiment, deployment pipeline 4110A of FIG. 42 includes a non-limiting example of a deployment pipeline 4110A that may be custom defined by a particular user (or team of users) at a facility (e.g., at a hospital, clinic, lab, research environment, etc.). In at least one embodiment, to define deployment pipelines 4110A for a CT scanner 4202, a user may select—from a container registry, for example—one or more applications that perform specific functions or tasks with respect to imaging data generated by CT scanner 4202. In at least one embodiment, applications may be applied to deployment pipeline 4110A as containers that may leverage services 4020 and/or hardware 4022 of system 4100. In addition, deployment pipeline 4110A may include additional processing tasks or applications that may be implemented to prepare data for use by applications (e.g., DICOM adapter 4102B and DICOM reader 4206 may be used in deployment pipeline 4110A to prepare data for use by CT reconstruction 4208, organ segmentation 4210, etc.). In at least one embodiment, deployment pipeline 4110A may be customized or selected for consistent deployment, one time use, or for another frequency or interval. In at least one embodiment, a user may desire to have CT reconstruction 4208 and organ segmentation 4210 for several subjects over a specific interval, and thus may deploy pipeline 4110A for that period of time. In at least one embodiment, a user may select, for each request from system 4100, applications that a user wants to perform processing on that data for that request. In at least one embodiment, deployment pipeline 4110A may be adjusted at any interval and, because of adaptability and scalability of a container structure within system 4100, this may be a seamless process.

In at least one embodiment, deployment pipeline 4110A of FIG. 42 may include CT scanner 4202 generating imaging data of a patient or subject. In at least one embodiment, imaging data from CT scanner 4202 may be stored on a PACS server(s) 4204 associated with a facility housing CT scanner 4202. In at least one embodiment, PACS server(s) 4204 may include software and/or hardware components that may directly interface with imaging modalities (e.g., CT scanner 4202) at a facility. In at least one embodiment, DICOM adapter 4102B may enable sending and receipt of DICOM objects using DICOM protocols. In at least one embodiment, DICOM adapter 4102B may aid in preparation or configuration of DICOM data from PACS server(s) 4204 for use by deployment pipeline 4110A. In at least one embodiment, once DICOM data is processed through DICOM adapter 4102B, pipeline manager 4112 may route data through to deployment pipeline 4110A. In at least one embodiment, DICOM reader 4206 may extract image files and any associated metadata from DICOM data (e.g., raw sinogram data, as illustrated in visualization 4216A). In at least one embodiment, working files that are extracted may be stored in a cache for faster processing by other applications in deployment pipeline 4110A. In at least one embodiment, once DICOM reader 4206 has finished extracting and/or storing data, a signal of completion may be communicated to pipeline manager 4112. In at least one embodiment, pipeline manager 4112 may then initiate or call upon one or more other applications or containers in deployment pipeline 4110A.

In at least one embodiment, CT reconstruction 4208 application and/or container may be executed once data (e.g., raw sinogram data) is available for processing by CT reconstruction 4208 application. In at least one embodiment, CT reconstruction 4208 may read raw sinogram data from a cache, reconstruct an image file out of raw sinogram data (e.g., as illustrated in visualization 4216B), and store resulting image file in a cache. In at least one embodiment, at completion of reconstruction, pipeline manager 4112 may be signaled that reconstruction task is complete. In at least one embodiment, once reconstruction is complete, and a reconstructed image file may be stored in a cache (or other storage device), organ segmentation 4210 application and/or container may be triggered by pipeline manager 4112. In at least one embodiment, organ segmentation 4210 application and/or container may read an image file from a cache, normalize or convert an image file to format suitable for inference (e.g., convert an image file to an input resolution of a machine learning model), and run inference against a normalized image. In at least one embodiment, to run inference on a normalized image, organ segmentation 4210 application and/or container may rely on services 4020, and pipeline manager 4112 and/or application orchestration system 4128 may facilitate use of services 4020 by organ segmentation 4210 application and/or container. In at least one embodiment, for example, organ segmentation 4210 application and/or container may leverage AI services 4118 to perform inference on a normalized image, and AI services 4118 may leverage hardware 4022 (e.g., AI system 4124) to execute AI services 4118. In at least one embodiment, a result of an inference may be a mask file (e.g., as illustrated in visualization 4216C) that may be stored in a cache (or other storage device).

In at least one embodiment, once applications that process DICOM data and/or data extracted from DICOM data have completed processing, a signal may be generated for pipeline manager 4112. In at least one embodiment, pipeline manager 4112 may then execute DICOM writer 4212 to read results from a cache (or other storage device), package results into a DICOM format (e.g., as DICOM output 4214) for use by users at a facility who generated a request. In at least one embodiment, DICOM output 4214 may then be transmitted to DICOM adapter 4102B to prepare DICOM output 4214 for storage on PACS server(s) 4204 (e.g., for viewing by a DICOM viewer at a facility). In at least one embodiment, in response to a request for reconstruction and segmentation, visualizations 4216B and 4216C may be generated and available to a user for diagnoses, research, and/or for other purposes.

Although illustrated as consecutive application in deployment pipeline 4110A, CT reconstruction 4208 and organ segmentation 4210 applications may be processed in parallel in at least one embodiment. In at least one embodiment, where applications do not have dependencies on one another, and data is available for each application (e.g., after DICOM reader 4206 extracts data), applications may be executed at a same time, substantially at a same time, or with some overlap. In at least one embodiment, where two or more applications require similar services 4020, a scheduler of system 4100 may be used to load balance and distribute compute or processing resources between and among various applications. In at least one embodiment, in some embodiments, parallel computing platform 4130 may be used to perform parallel processing for applications to decrease run-time of deployment pipeline 4110A to provide real-time results.

Figure 43A:
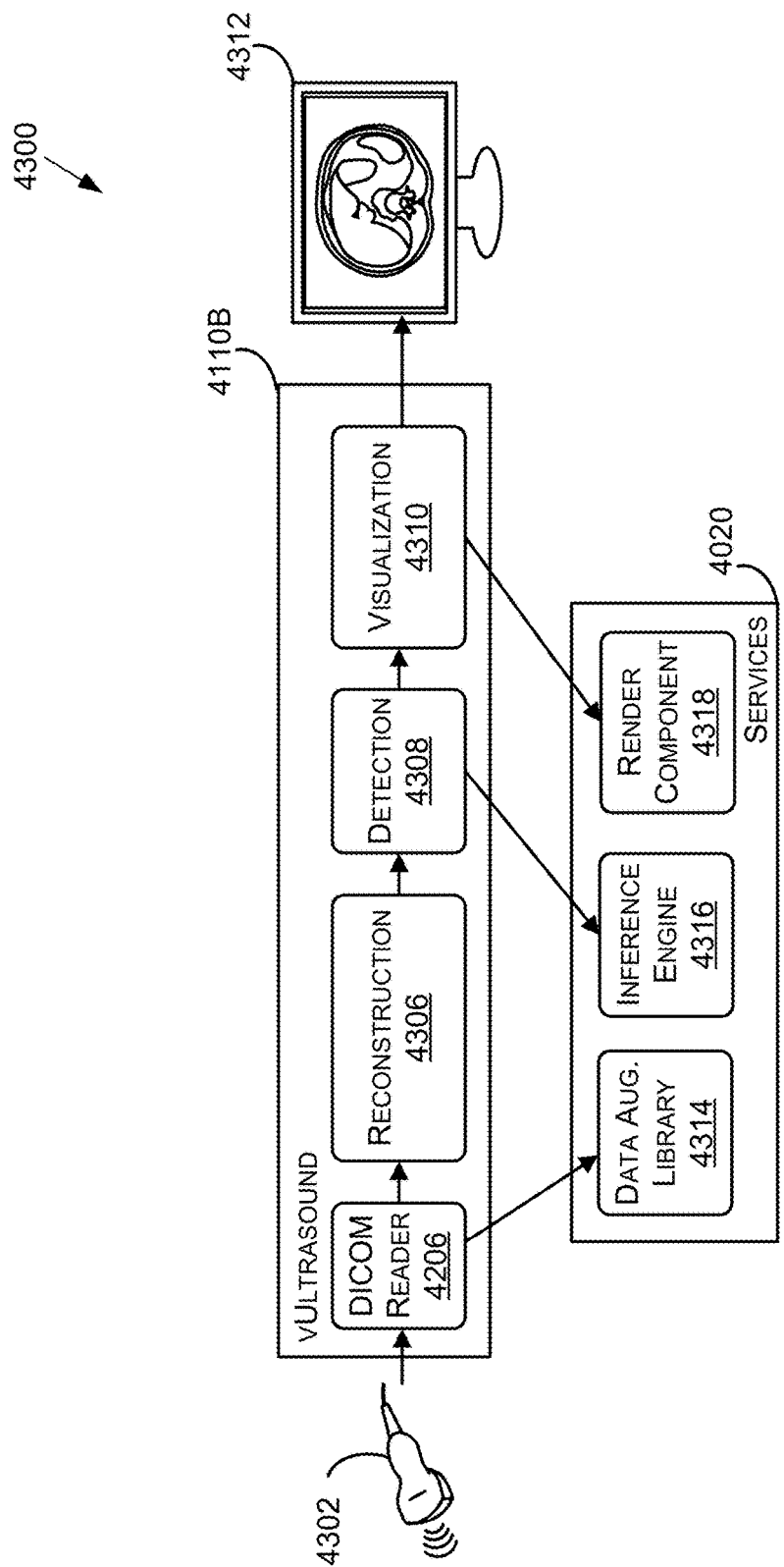
FIG. 43A includes an example data flow diagram of a virtual instrument supporting an ultrasound device, in accordance with at least one embodiment.
Figure 43B:
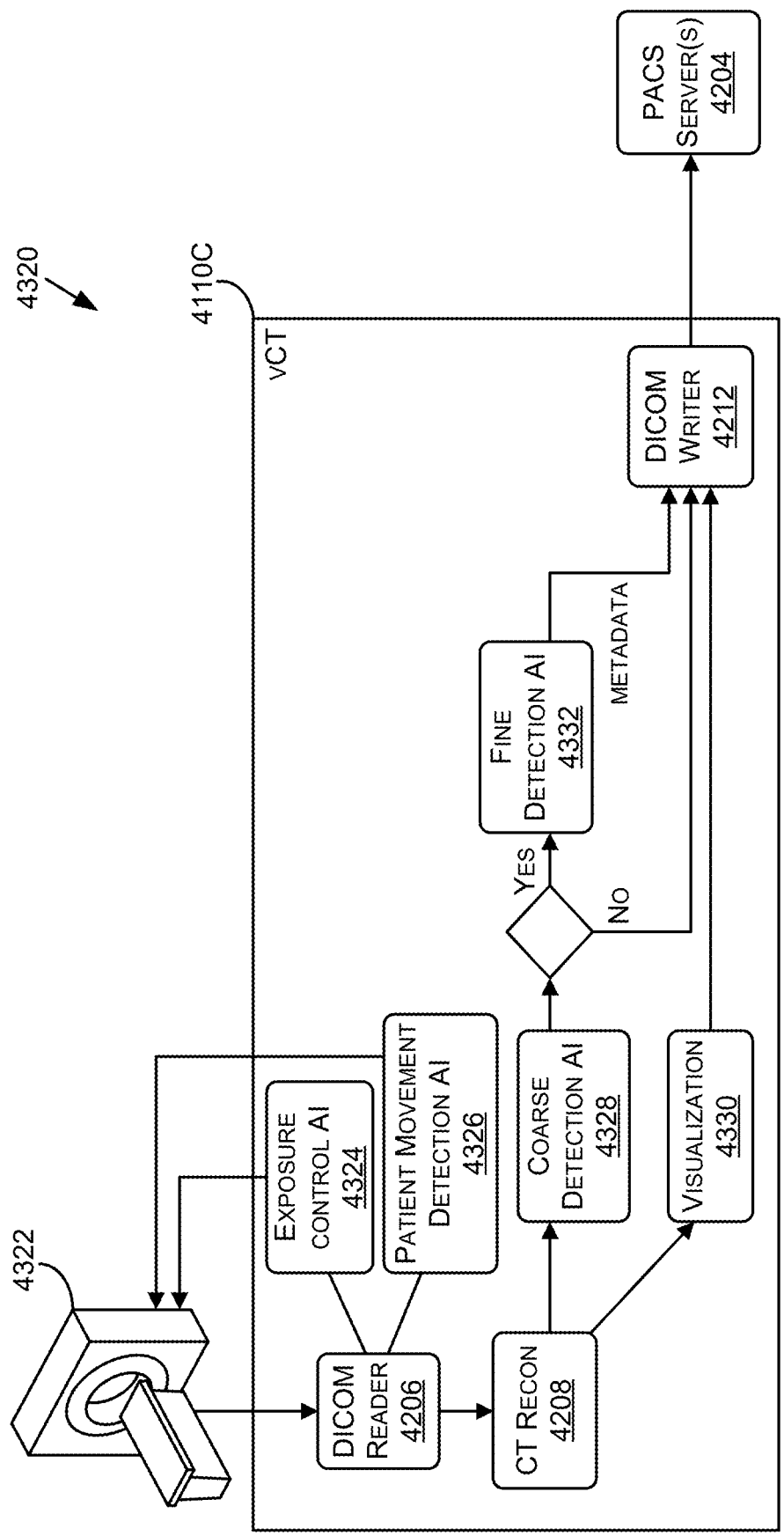
FIG. 43B includes an example data flow diagram of a virtual instrument supporting an CT scanner, in accordance with at least one embodiment.

In at least one embodiment, and with reference to FIGS. 43A-43B, deployment system 4006 may be implemented as one or more virtual instruments to perform different functionalities—such as image processing, segmentation, enhancement, AI, visualization, and inferencing—with imaging devices (e.g., CT scanners, X-ray machines, MRI machines, etc.), sequencing devices, genomics devices, and/or other device types. In at least one embodiment, system 4100 may allow for creation and provision of virtual instruments that may include a software-defined deployment pipeline 4110 that may receive raw/unprocessed input data generated by a device(s) and output processed/reconstructed data. In at least one embodiment, deployment pipelines 4110 (e.g., 4110A and 4110B) that represent virtual instruments may implement intelligence into a pipeline, such as by leveraging machine learning models, to provide containerized inference support to a system. In at least one embodiment, virtual instruments may execute any number of containers each including instantiations of applications. In at least one embodiment, such as where real-time processing is desired, deployment pipelines 4110 representing virtual instruments may be static (e.g., containers and/or applications may be set), while in other examples, container and/or applications for virtual instruments may be selected (e.g., on a per-request basis) from a pool of applications or resources (e.g., within a container registry).

In at least one embodiment, system 4100 may be instantiated or executed as one or more virtual instruments on-premise at a facility in, for example, a computing system deployed next to or otherwise in communication with a radiology machine, an imaging device, and/or another device type at a facility. In at least one embodiment, however, an on-premise installation may be instantiated or executed within a computing system of a device itself (e.g., a computing system integral to an imaging device), in a local datacenter (e.g., a datacenter on-premise), and/or in a cloud-environment (e.g., in cloud 4126). In at least one embodiment, deployment system 4006, operating as a virtual instrument, may be instantiated by a supercomputer or other HPC system in some examples. In at least one embodiment, on-premise installation may allow for high-bandwidth uses (via, for example, higher throughput local communication interfaces, such as RF over Ethernet) for real-time processing. In at least one embodiment, real-time or near real-time processing may be particularly useful where a virtual instrument supports an ultrasound device or other imaging modality where immediate visualizations are expected or required for accurate diagnoses and analyses. In at least one embodiment, a cloud-computing architecture may be capable of dynamic bursting to a cloud computing service provider, or other compute cluster, when local demand exceeds on-premise capacity or capability. In at least one embodiment, a cloud architecture, when implemented, may be tuned for training neural networks or other machine learning models, as described herein with respect to training system 4004. In at least one embodiment, with training pipelines in place, machine learning models may be continuously learn and improve as they process additional data from devices they support. In at least one embodiment, virtual instruments may be continually improved using additional data, new data, existing machine learning models, and/or new or updated machine learning models.

In at least one embodiment, a computing system may include some or all of hardware 4022 described herein, and hardware 4022 may be distributed in any of a number of ways including within a device, as part of a computing device coupled to and located proximate a device, in a local datacenter at a facility, and/or in cloud 4126. In at least one embodiment, because deployment system 4006 and associated applications or containers are created in software (e.g., as discrete containerized instantiations of applications), behavior, operation, and configuration of virtual instruments, as well as outputs generated by virtual instruments, may be modified or customized as desired, without having to change or alter raw output of a device that a virtual instrument supports.

In at least one embodiment, the system 100 (see FIG. 1) may be implemented at least in part by the deployment pipeline 4110A and/or may be implemented as a component of the deployment pipeline 4110A. For example, the deployment pipeline 4110A may implement the denoise process 120, the edge detection process 122, the object detection process 124, the optional thresholding process 126, the decision logic 128, the extraction process 130, and the SGM process 132. By way of a non-limiting example, the edge detection process 122 and/or the object detection process 124 may be implemented as the organ segmentation 4210.

FIG. 43A includes an example data flow diagram of a virtual instrument supporting an ultrasound device, in accordance with at least one embodiment. In at least one embodiment, deployment pipeline 4110B may leverage one or more of services 4020 of system 4100. In at least one embodiment, deployment pipeline 4110B and services 4020 may leverage hardware 4022 of a system either locally or in cloud 4126. In at least one embodiment, although not illustrated, process 4300 may be facilitated by pipeline manager 4112, application orchestration system 4128, and/or parallel computing platform 4130.

In at least one embodiment, process 4300 may include receipt of imaging data from an ultrasound device 4302. In at least one embodiment, imaging data may be stored on PACS server(s) in a DICOM format (or other format, such as RIS, CIS, REST compliant, RPC, raw, etc.), and may be received by system 4100 for processing through deployment pipeline 4110 selected or customized as a virtual instrument (e.g., a virtual ultrasound) for ultrasound device 4302. In at least one embodiment, imaging data may be received directly from an imaging device (e.g., ultrasound device 4302) and processed by a virtual instrument. In at least one embodiment, a transducer or other signal converter communicatively coupled between an imaging device and a virtual instrument may convert signal data generated by an imaging device to image data that may be processed by a virtual instrument. In at least one embodiment, raw data and/or image data may be applied to DICOM reader 4206 to extract data for use by applications or containers of deployment pipeline 4110B. In at least one embodiment, DICOM reader 4206 may leverage data augmentation library 4314 (e.g., NVIDIA's DALI) as a service 4020 (e.g., as one of compute service(s) 4116) for extracting, resizing, rescaling, and/or otherwise preparing data for use by applications or containers.

In at least one embodiment, once data is prepared, a reconstruction 4306 application and/or container may be executed to reconstruct data from ultrasound device 4302 into an image file. In at least one embodiment, after reconstruction 4306, or at a same time as reconstruction 4306, a detection 4308 application and/or container may be executed for anomaly detection, object detection, feature detection, and/or other detection tasks related to data. In at least one embodiment, an image file generated during reconstruction 4306 may be used during detection 4308 to identify anomalies, objects, features, etc. In at least one embodiment, detection 4308 application may leverage an inference engine 4316 (e.g., as one of AI service(s) 4118) to perform inference on data to generate detections. In at least one embodiment, one or more machine learning models (e.g., from training system 4004) may be executed or called by detection 4308 application.

In at least one embodiment, once reconstruction 4306 and/or detection 4308 is/are complete, data output from these application and/or containers may be used to generate visualizations 4310, such as visualization 4312 (e.g., a grayscale output) displayed on a workstation or display terminal. In at least one embodiment, visualization may allow a technician or other user to visualize results of deployment pipeline 4110B with respect to ultrasound device 4302. In at least one embodiment, visualization 4310 may be executed by leveraging a render component 4318 of system 4100 (e.g., one of visualization service(s) 4120). In at least one embodiment, render component 4318 may execute a 2D, OpenGL, or ray-tracing service to generate visualization 4312.

FIG. 43B includes an example data flow diagram of a virtual instrument supporting a CT scanner, in accordance with at least one embodiment. In at least one embodiment, deployment pipeline 4110C may leverage one or more of services 4020 of system 4100. In at least one embodiment, deployment pipeline 4110C and services 4020 may leverage hardware 4022 of a system either locally or in cloud 4126. In at least one embodiment, although not illustrated, process 4320 may be facilitated by pipeline manager 4112, application orchestration system 4128, and/or parallel computing platform 4130.

In at least one embodiment, process 4320 may include CT scanner 4322 generating raw data that may be received by DICOM reader 4206 (e.g., directly, via a PACS server 4204, after processing, etc.). In at least one embodiment, a Virtual CT (instantiated by deployment pipeline 4110C) may include a first, real-time pipeline for monitoring a patient (e.g., patient movement detection AI 4326) and/or for adjusting or optimizing exposure of CT scanner 4322 (e.g., using exposure control AI 4324). In at least one embodiment, one or more of applications (e.g., 4324 and 4326) may leverage a service 4020, such as AI service(s) 4118. In at least one embodiment, outputs of exposure control AI 4324 application (or container) and/or patient movement detection AI 4326 application (or container) may be used as feedback to CT scanner 4322 and/or a technician for adjusting exposure (or other settings of CT scanner 4322) and/or informing a patient to move less.

In at least one embodiment, deployment pipeline 4110C may include a non-real-time pipeline for analyzing data generated by CT scanner 4322. In at least one embodiment, a second pipeline may include CT reconstruction 4208 application and/or container, a coarse detection AI 4328 application and/or container, a fine detection AI 4332 application and/or container (e.g., where certain results are detected by coarse detection AI 4328), a visualization 4330 application and/or container, and a DICOM writer 4212 (and/or other data type writer, such as RIS, CIS, REST compliant, RPC, raw, etc.) application and/or container. In at least one embodiment, raw data generated by CT scanner 4322 may be passed through pipelines of deployment pipeline 4110C (instantiated as a virtual CT instrument) to generate results. In at least one embodiment, results from DICOM writer 4212 may be transmitted for display and/or may be stored on PACS server(s) 4204 for later retrieval, analysis, or display by a technician, practitioner, or other user.

In at least one embodiment, the system 100 (see FIG. 1) may be used to perform at least part of the process 4300 and/or the process 4320. Further, the instructions 118 (see FIG. 1) may be used to obtain the optical flow map 110 (see FIGS. 1 and 2) for images captured by the ultrasound device 4302.

Figure 44A:
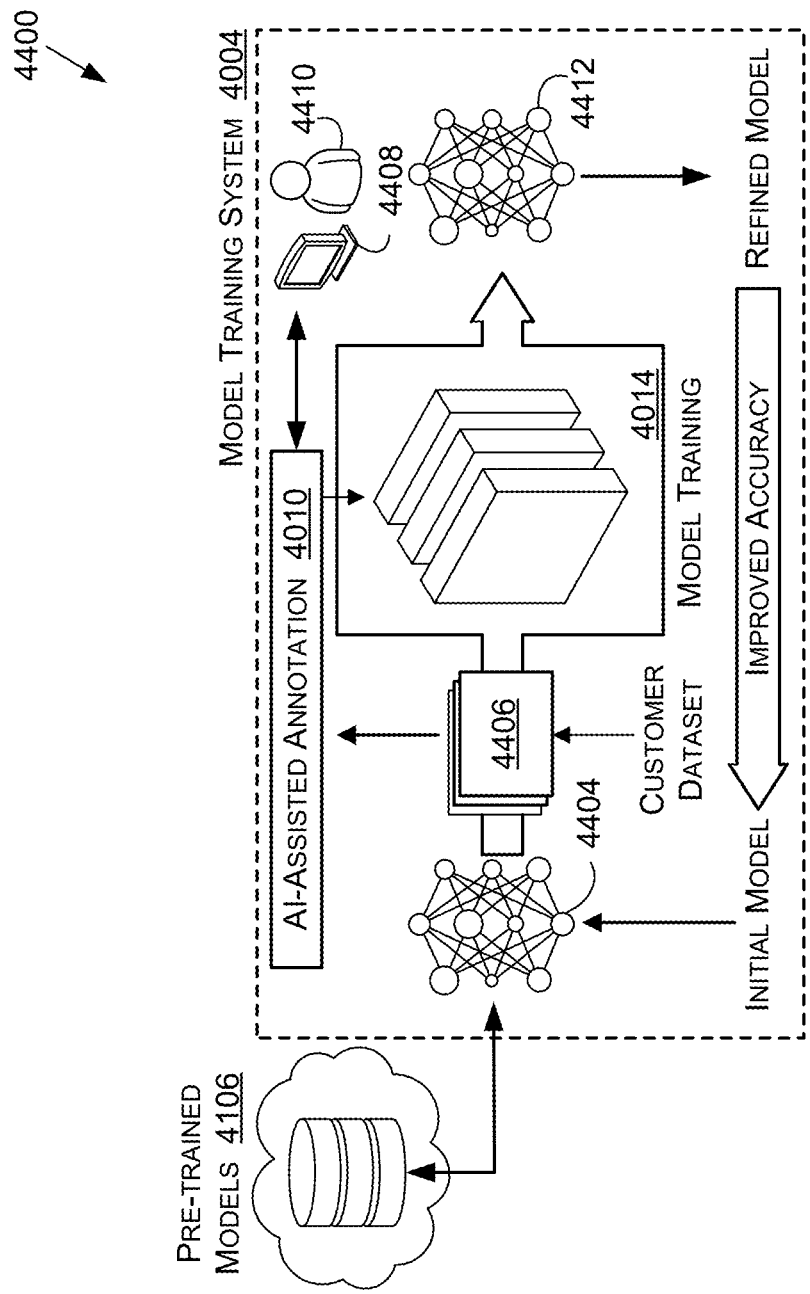
FIG. 44A illustrates a data flow diagram for a process to train a machine learning model, in accordance with at least one embodiment.

FIG. 44A illustrates a data flow diagram for a process 4400 to train, retrain, or update a machine learning model, in accordance with at least one embodiment. In at least one embodiment, process 4400 may be executed using, as a non-limiting example, system 4100 of FIG. 41. In at least one embodiment, process 4400 may leverage services 4020 and/or hardware 4022 of system 4100, as described herein. In at least one embodiment, refined models 4412 generated by process 4400 may be executed by deployment system 4006 for one or more containerized applications in deployment pipelines 4110.

In at least one embodiment, model training 4014 may include retraining or updating an initial model 4404 (e.g., a pre-trained model) using new training data (e.g., new input data, such as customer dataset 4406, and/or new ground truth data associated with input data). In at least one embodiment, to retrain, or update, initial model 4404, output or loss layer(s) of initial model 4404 may be reset, or deleted, and/or replaced with an updated or new output or loss layer(s). In at least one embodiment, initial model 4404 may have previously fine-tuned parameters (e.g., weights and/or biases) that remain from prior training, so training or retraining 4014 may not take as long or require as much processing as training a model from scratch. In at least one embodiment, during model training 4014, by having reset or replaced output or loss layer(s) of initial model 4404, parameters may be updated and re-tuned for a new data set based on loss calculations associated with accuracy of output or loss layer(s) at generating predictions on new, customer dataset 4406 (e.g., image data 4008 of FIG. 40).

In at least one embodiment, pre-trained models 4106 may be stored in a data store, or registry (e.g., model registry 4024 of FIG. 40). In at least one embodiment, pre-trained models 4106 may have been trained, at least in part, at one or more facilities other than a facility executing process 4400. In at least one embodiment, to protect privacy and rights of patients, subjects, or clients of different facilities, pre-trained models 4106 may have been trained, on-premise, using customer or patient data generated on-premise. In at least one embodiment, pre-trained models 4106 may be trained using cloud 4126 and/or other hardware 4022, but confidential, privacy protected patient data may not be transferred to, used by, or accessible to any components of cloud 4126 (or other off premise hardware). In at least one embodiment, where a pre-trained model 4106 is trained at using patient data from more than one facility, pre-trained model 4106 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 4106 on-premise and/or off premise, such as in a datacenter or other cloud computing infrastructure.

In at least one embodiment, when selecting applications for use in deployment pipelines 4110, a user may also select machine learning models to be used for specific applications. In at least one embodiment, a user may not have a model for use, so a user may select a pre-trained model 4106 to use with an application. In at least one embodiment, pre-trained model 4106 may not be optimized for generating accurate results on customer dataset 4406 of a facility of a user (e.g., based on patient diversity, demographics, types of medical imaging devices used, etc.). In at least one embodiment, prior to deploying pre-trained model 4106 into deployment pipeline 4110 for use with an application(s), pre-trained model 4106 may be updated, retrained, and/or fine-tuned for use at a respective facility.

In at least one embodiment, a user may select pre-trained model 4106 that is to be updated, retrained, and/or fine-tuned, and pre-trained model 4106 may be referred to as initial model 4404 for training system 4004 within process 4400. In at least one embodiment, customer dataset 4406 (e.g., imaging data, genomics data, sequencing data, or other data types generated by devices at a facility) may be used to perform model training 4014 (which may include, without limitation, transfer learning) on initial model 4404 to generate refined model 4412. In at least one embodiment, ground truth data corresponding to customer dataset 4406 may be generated by training system 4004. In at least one embodiment, ground truth data may be generated, at least in part, by clinicians, scientists, doctors, practitioners, at a facility (e.g., as labeled clinic data 4012 of FIG. 40).

In at least one embodiment, AI-assisted annotation 4010 may be used in some examples to generate ground truth data. In at least one embodiment, AI-assisted annotation 4010 (e.g., implemented using an AI-assisted annotation SDK) may leverage machine learning models (e.g., neural networks) to generate suggested or predicted ground truth data for a customer dataset. In at least one embodiment, user 4410 may use annotation tools within a user interface (a graphical user interface (GUI)) on computing device 4408.

In at least one embodiment, user 4410 may interact with a GUI via computing device 4408 to edit or fine-tune annotations or auto-annotations. In at least one embodiment, a polygon editing feature may be used to move vertices of a polygon to more accurate or fine-tuned locations.

In at least one embodiment, once customer dataset 4406 has associated ground truth data, ground truth data (e.g., from AI-assisted annotation, manual labeling, etc.) may be used by during model training 4014 to generate refined model 4412. In at least one embodiment, customer dataset 4406 may be applied to initial model 4404 any number of times, and ground truth data may be used to update parameters of initial model 4404 until an acceptable level of accuracy is attained for refined model 4412. In at least one embodiment, once refined model 4412 is generated, refined model 4412 may be deployed within one or more deployment pipelines 4110 at a facility for performing one or more processing tasks with respect to medical imaging data.

In at least one embodiment, refined model 4412 may be uploaded to pre-trained models 4106 in model registry 4024 to be selected by another facility. In at least one embodiment, his process may be completed at any number of facilities such that refined model 4412 may be further refined on new datasets any number of times to generate a more universal model.

FIG. 44B is an example illustration of a client-server architecture 4432 to enhance annotation tools with pre-trained annotation models, in accordance with at least one embodiment. In at least one embodiment, AI-assisted annotation tools 4436 may be instantiated based on a client-server architecture 4432. In at least one embodiment, annotation tools 4436 in imaging applications may aid radiologists, for example, identify organs and abnormalities. In at least one embodiment, imaging applications may include software tools that help user 4410 to identify, as a non-limiting example, a few extreme points on a particular organ of interest in raw images 4434 (e.g., in a 3D MRI or CT scan) and receive auto-annotated results for all 2D slices of a particular organ. In at least one embodiment, results may be stored in a data store as training data 4438 and used as (for example and without limitation) ground truth data for training. In at least one embodiment, when computing device 4408 sends extreme points for AI-assisted annotation 4010, a deep learning model, for example, may receive this data as input and return inference results of a segmented organ or abnormality. In at least one embodiment, pre-instantiated annotation tools, such as AI-Assisted Annotation Tool 4436B in FIG. 44B, may be enhanced by making API calls (e.g., API Call 4444) to a server, such as an Annotation Assistant Server 4440 that may include a set of pre-trained models 4442 stored in an annotation model registry, for example. In at least one embodiment, an annotation model registry may store pre-trained models 4442 (e.g., machine learning models, such as deep learning models) that are pre-trained to perform AI-assisted annotation on a particular organ or abnormality. In at least one embodiment, these models may be further updated by using training pipelines 4104. In at least one embodiment, pre-installed annotation tools may be improved over time as new labeled clinic data 4012 is added.

Inference and/or training logic 1115 are used to perform inferencing and/or training operations associated with one or more embodiments. Details regarding inference and/or training logic 1115 are provided herein in conjunction with FIGS. 11A and/or 11B.

In at least one embodiment, the system 100 (see FIG. 1) may be implemented at least in part using the process 4400. As mentioned above, the system 100 (see FIG. 1) may be implemented by at least a portion of the inference and/or training logic 1115. Referring to FIG. 1, the process 4400 (see FIG. 44) may be used to train, retrain, or update (e.g., at least a portion of the inference and/or training logic 1115) one or more machine learning models used with respect to any of the denoise process 120, the edge detection process 122, the object detection process 124, the optional thresholding process 126, the decision logic 128, the extraction process 130, and the SGM process 132.

Figure 45:
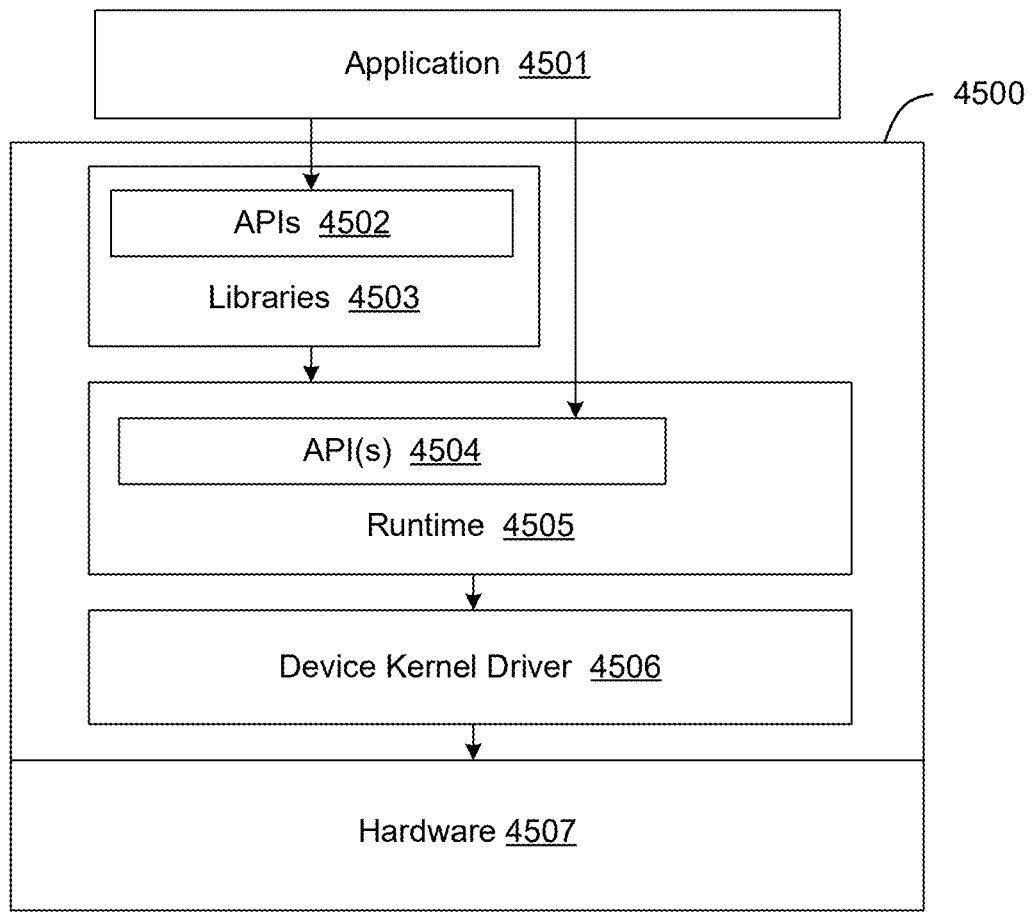
FIG. 45 illustrates a software stack of a programming platform, in accordance with at least one embodiment.

FIG. 45 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 4500 of a programming platform provides an execution environment for an application 4501. In at least one embodiment, application 4501 may include any computer software capable of being launched on software stack 4500. In at least one embodiment, application 4501 may include, but is not limited to, an artificial intelligence ("AI")/machine learning ("ML") application, a high performance computing ("HPC") application, a virtual desktop infrastructure ("VDI"), or a data center workload.

In at least one embodiment, application 4501 and software stack 4500 run on hardware 4507. Hardware 4507 may include one or more GPUs, CPUs, FPGAs, AI engines, and/or other types of compute devices that support a programming platform, in at least one embodiment. In at least one embodiment, such as with CUDA, software stack 4500 may be vendor specific and compatible with only devices from particular vendor(s). In at least one embodiment, such as in with OpenCL, software stack 4500 may be used with devices from different vendors. In at least one embodiment, hardware 4507 includes a host connected to one more devices that can be accessed to perform computational tasks via application programming interface ("API") calls. A device within hardware 4507 may include, but is not limited to, a GPU, FPGA, AI engine, or other compute device (but may also include a CPU) and its memory, as opposed to a host within hardware 4507 that may include, but is not limited to, a CPU (but may also include a compute device) and its memory, in at least one embodiment.

In at least one embodiment, software stack 4500 of a programming platform includes, without limitation, a number of libraries 4503, a runtime 4505, and a device kernel driver 4506. Each of libraries 4503 may include data and programming code that can be used by computer programs and leveraged during software development, in at least one embodiment. In at least one embodiment, libraries 4503 may include, but are not limited to, pre-written code and sub-routines, classes, values, type specifications, configuration data, documentation, help data, and/or message templates. In at least one embodiment, libraries 4503 include functions that are optimized for execution on one or more types of devices. In at least one embodiment, libraries 4503 may include, but are not limited to, functions for performing mathematical, deep learning, and/or other types of operations on devices. In at least one embodiment, libraries 4603 are associated with corresponding APIs 4602, which may include one or more APIs, that expose functions implemented in libraries 4603.

In at least one embodiment, application 4501 is written as source code that is compiled into executable code, as discussed in greater detail below in conjunction with FIG. 50. Executable code of application 4501 may run, at least in part, on an execution environment provided by software stack 4500, in at least one embodiment. In at least one embodiment, during execution of application 4501, code may be reached that needs to run on a device, as opposed to a host. In such a case, runtime 4505 may be called to load and launch requisite code on a device, in at least one embodiment. In at least one embodiment, runtime 4505 may include any technically feasible runtime system that is able to support execution of application S01.

In at least one embodiment, runtime 4505 is implemented as one or more runtime libraries associated with corresponding APIs, which are shown as API(s) 4504. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 4504 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 4506 is configured to facilitate communication with an underlying device. In at least one embodiment, device kernel driver 4506 may provide low-level functionalities upon which APIs, such as API(s) 4504, and/or other software relies. In at least one embodiment, device kernel driver 4506 may be configured to compile intermediate representation ("IR") code into binary code at runtime. For CUDA, device kernel driver 4506 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 4506 to compile IR code at runtime.

In at least one embodiment, the method 1000 (see FIG. 10) may be implemented at least in part using the software stack 4500. For example, the software stack 4500 may be used to implement the denoise process 120, the edge detection process 122, the object detection process 124, the optional thresholding process 126, the decision logic 128, the extraction process 130, and/or the SGM process 132.

Figure 46:
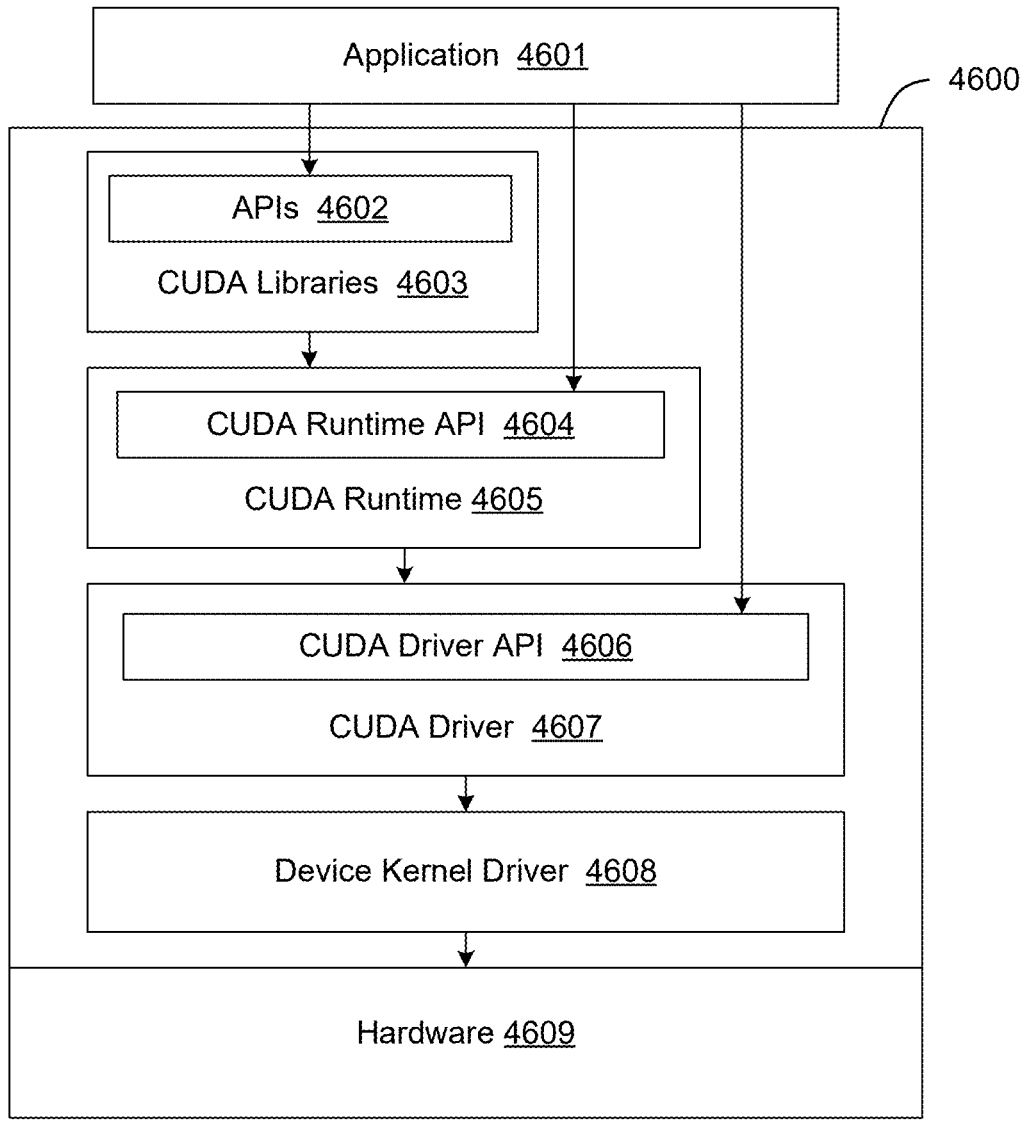
FIG. 46 illustrates a CUDA implementation of a software stack of FIG. 45, in accordance with at least one embodiment.

FIG. 46 illustrates a CUDA implementation of software stack 4500 of FIG. 45, in accordance with at least one embodiment. In at least one embodiment, a CUDA software stack 4600, on which an application 4601 may be launched, includes CUDA libraries 4603, a CUDA runtime 4605, a CUDA driver 4607, and a device kernel driver 4608. In at least one embodiment, CUDA software stack 4600 executes on hardware 4609, which may include a GPU that supports CUDA and is developed by NVIDIA Corporation of Santa Clara, CA.

In at least one embodiment, application 4601, CUDA runtime 4605, and device kernel driver 4608 may perform similar functionalities as application 4501, runtime 4505, and device kernel driver 4506, respectively, which are described above in conjunction with FIG. 45. In at least one embodiment, CUDA driver 4607 includes a library (libcuda.so) that implements a CUDA driver API 4606. Similar to a CUDA runtime API 4604 implemented by a CUDA runtime library (cudart), CUDA driver API 4606 may, without limitation, expose functions for memory management, execution control, device management, error handling, synchronization, and/or graphics interoperability, among other things, in at least one embodiment. In at least one embodiment, CUDA driver API 4606 differs from CUDA runtime API 4604 in that CUDA runtime API 4604 simplifies device code management by providing implicit initialization, context (analogous to a process) management, and module (analogous to dynamically loaded libraries) management. In contrast to high-level CUDA runtime API 4604, CUDA driver API 4606 is a low-level API providing more fine-grained control of a device, particularly with respect to contexts and module loading, in at least one embodiment. In at least one embodiment, CUDA driver API 4606 may expose functions for context management that are not exposed by CUDA runtime API 4604. In at least one embodiment, CUDA driver API 4606 is also language-independent and supports, e.g., OpenCL in addition to CUDA runtime API 4604. Further, in at least one embodiment, development libraries, including CUDA runtime 4605, may be considered as separate from driver components, including user-mode CUDA driver 4607 and kernel-mode device driver 4608 (also sometimes referred to as a "display" driver).

In at least one embodiment, CUDA libraries 4603 may include, but are not limited to, mathematical libraries, deep learning libraries, parallel algorithm libraries, and/or signal/image/video processing libraries, which parallel computing applications such as application 4601 may utilize. In at least one embodiment, CUDA libraries 4603 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 4603 may include deep learning libraries such as a cuDNN library of primitives for deep neural networks and a TensorRT platform for high-performance deep learning inference, among others.

In at least one embodiment, the method 1000 (see FIG. 10) may be implemented at least in part using the CUDA software stack 4600. For example, the CUDA software stack 4600 may be used to implement the denoise process 120, the edge detection process 122, the object detection process 124, the optional thresholding process 126, the decision logic 128, the extraction process 130, and/or the SGM process 132.

Figure 47:
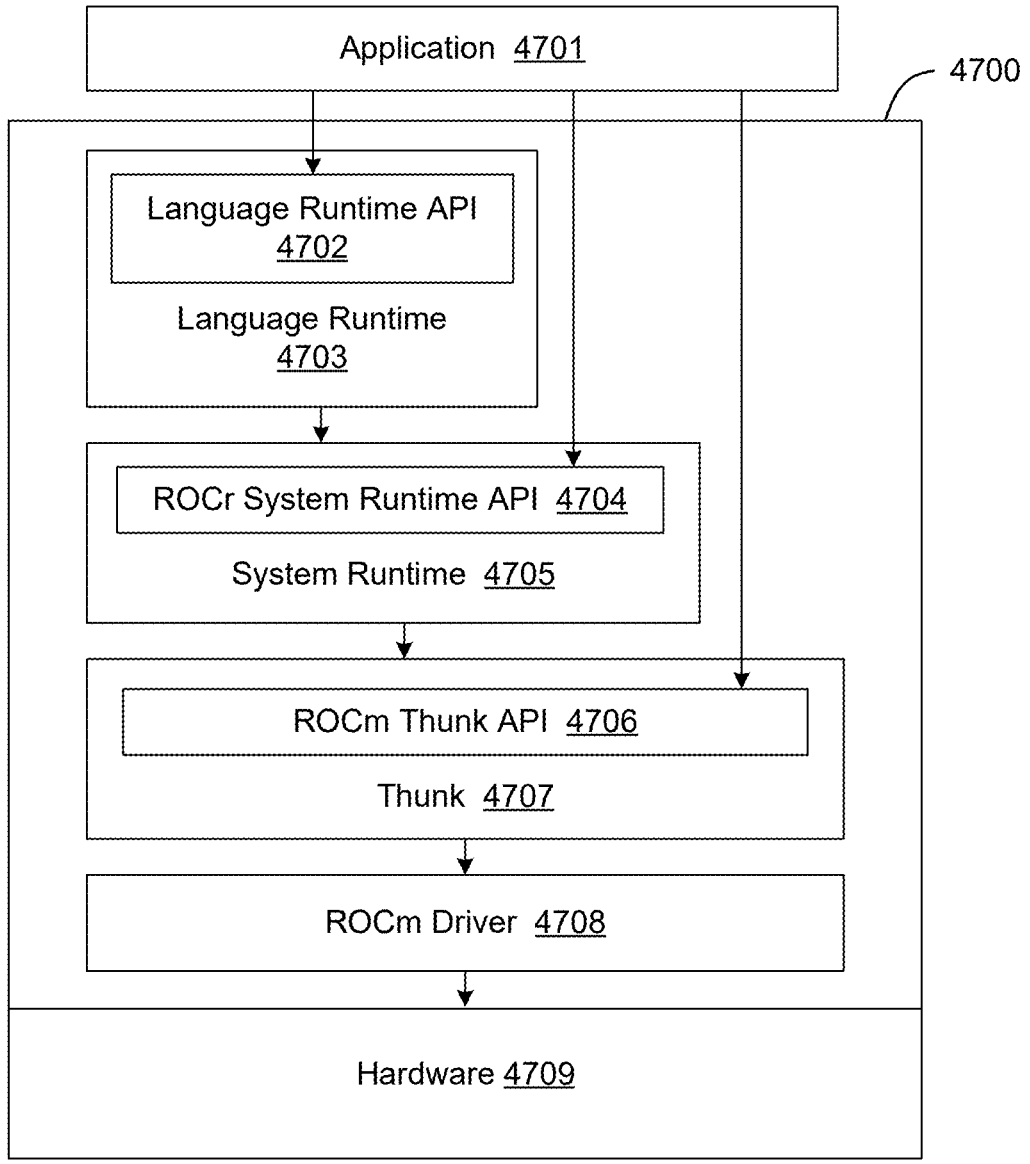
FIG. 47 illustrates a ROCm implementation of a software stack of FIG. 45, in accordance with at least one embodiment.

FIG. 47 illustrates a ROCm implementation of software stack 4500 of FIG. 45, in accordance with at least one embodiment. In at least one embodiment, a ROCm software stack 4700, on which an application 4701 may be launched, includes a language runtime 4703, a system runtime 4705, a thunk 4707, a ROCm kernel driver 4708, and a device kernel driver 4709. In at least one embodiment, ROCm software stack 4700 executes on hardware 4710, which may include a GPU that supports ROCm and is developed by AMD Corporation of Santa Clara, CA.

In at least one embodiment, application 4701 may perform similar functionalities as application 4501 discussed above in conjunction with FIG. 45. In addition, language runtime 4703 and system runtime 4705 may perform similar functionalities as runtime 4505 discussed above in conjunction with FIG. 45, in at least one embodiment. In at least one embodiment, language runtime 4703 and system runtime 4705 differ in that system runtime 4705 is a language-independent runtime that implements a ROCr system runtime API 4704 and makes use of a Heterogeneous System Architecture ("HAS") Runtime API. HAS runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 4705, language runtime 4703 is an implementation of a language-specific runtime API 4702 layered on top of ROCr system runtime API 4704, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 4604 discussed above in conjunction with FIG. 46, such as functions for memory management, execution control, device management, error handling, and synchronization, among other things.

In at least one embodiment, thunk (ROCt) 4707 is an interface that can be used to interact with underlying ROCm driver 4708. In at least one embodiment, ROCm driver 4708 is a ROCk driver, which is a combination of an AMDGPU driver and a HAS kernel driver (amdkfd). In at least one embodiment, AMDGPU driver is a device kernel driver for GPUs developed by AMD that performs similar functionalities as device kernel driver 4506 discussed above in conjunction with FIG. 45. In at least one embodiment, HAS kernel driver is a driver permitting different types of processors to share system resources more effectively via hardware features.

In at least one embodiment, various libraries (not shown) may be included in ROCm software stack 4700 above language runtime 4703 and provide functionality similarity to CUDA libraries 4603, discussed above in conjunction with FIG. 46. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

In at least one embodiment, the method 1000 (see FIG. 10) may be implemented at least in part using the ROCm software stack 4700. For example, the ROCm software stack 4700 may be used to implement the denoise process 120, the edge detection process 122, the object detection process 124, the optional thresholding process 126, the decision logic 128, the extraction process 130, and/or the SGM process 132.

Figure 48:
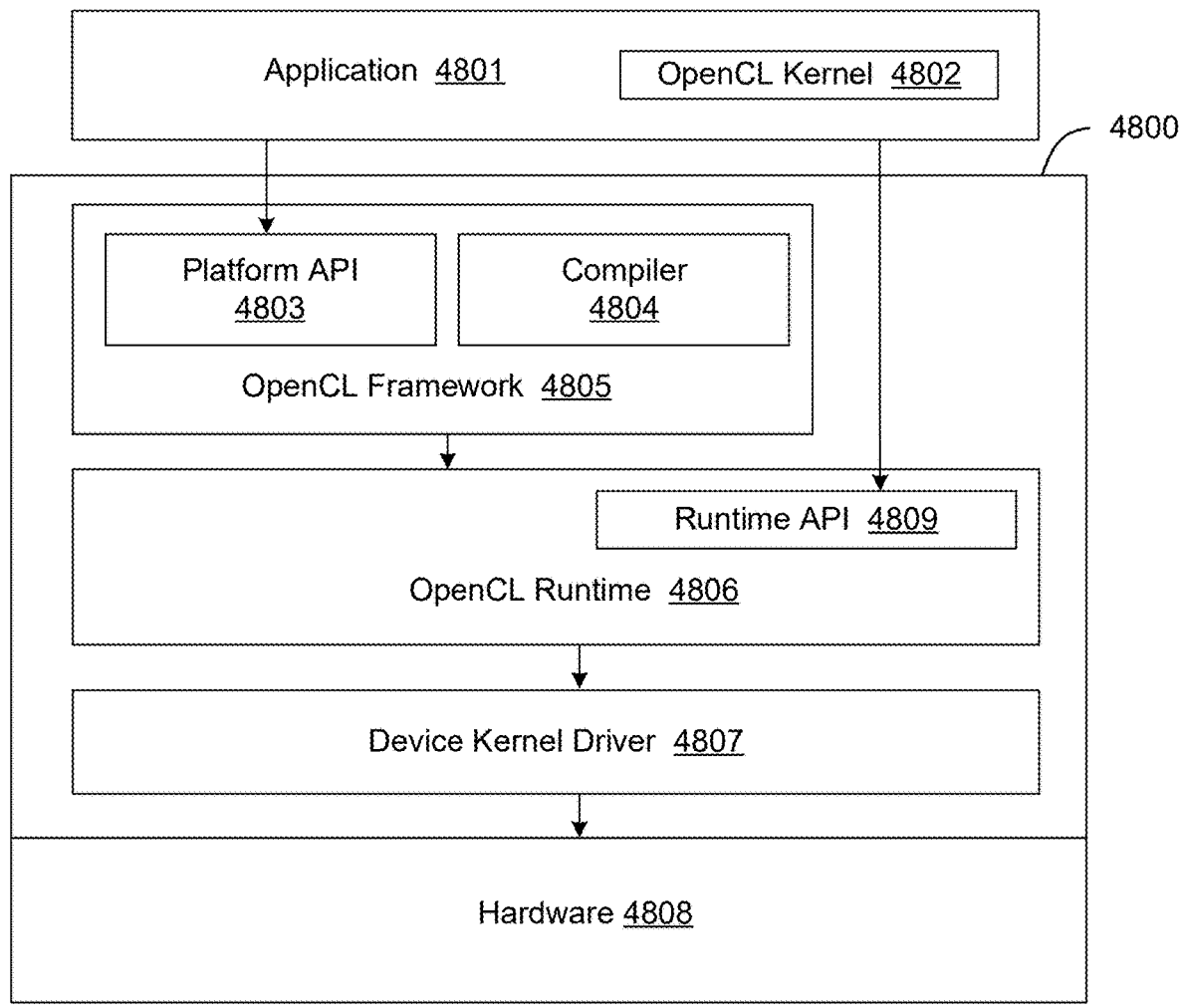
FIG. 48 illustrates an OpenCL implementation of a software stack of FIG. 45, in accordance with at least one embodiment.

FIG. 48 illustrates an OpenCL implementation of software stack 4500 of FIG. 45, in accordance with at least one embodiment. In at least one embodiment, an OpenCL software stack 4800, on which an application 4801 may be launched, includes an OpenCL framework 4805, an OpenCL runtime 4806, and a driver 4807. In at least one embodiment, OpenCL software stack 4800 executes on hardware 4609 that is not vendor-specific. As OpenCL is supported by devices developed by different vendors, specific OpenCL drivers may be required to interoperate with hardware from such vendors, in at least one embodiment.

In at least one embodiment, application 4801, OpenCL runtime 4806, device kernel driver 4807, and hardware 4808 may perform similar functionalities as application 4501, runtime 4505, device kernel driver 4506, and hardware 4507, respectively, that are discussed above in conjunction with FIG. 45. In at least one embodiment, application 4801 further includes an OpenCL kernel 4802 with code that is to be executed on a device.

In at least one embodiment, OpenCL defines a "platform" that allows a host to control devices connected to a host. In at least one embodiment, an OpenCL framework provides a platform layer API and a runtime API, shown as platform API 4803 and runtime API 4809. In at least one embodiment, runtime API 4809 uses contexts to manage execution of kernels on devices. In at least one embodiment, each identified device may be associated with a respective context, which runtime API 4809 may use to manage command queues, program objects, and kernel objects, share memory objects, among other things, for that device. In at least one embodiment, platform API 4803 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 4804 is also included in OpenCL frame-work 4805. Source code may be compiled offline prior to executing an application or online during execution of an application, in at least one embodiment. In contrast to CUDA and ROCm, OpenCL applications in at least one embodiment may be compiled online by compiler 4804, which is included to be representative of any number of compilers that may be used to compile source code and/or IR code, such as Standard Portable Intermediate Representation ("SPIR-V") code, into binary code. Alternatively, in at least one embodiment, OpenCL applications may be compiled offline, prior to execution of such applications.

In at least one embodiment, the method 1000 (see FIG. 10) may be implemented at least in part using the OpenCL software stack 4800. For example, the OpenCL software stack 4800 may be used to implement the denoise process 120, the edge detection process 122, the object detection process 124, the optional thresholding process 126, the decision logic 128, the extraction process 130, and/or the SGM process 132.

Figure 49:
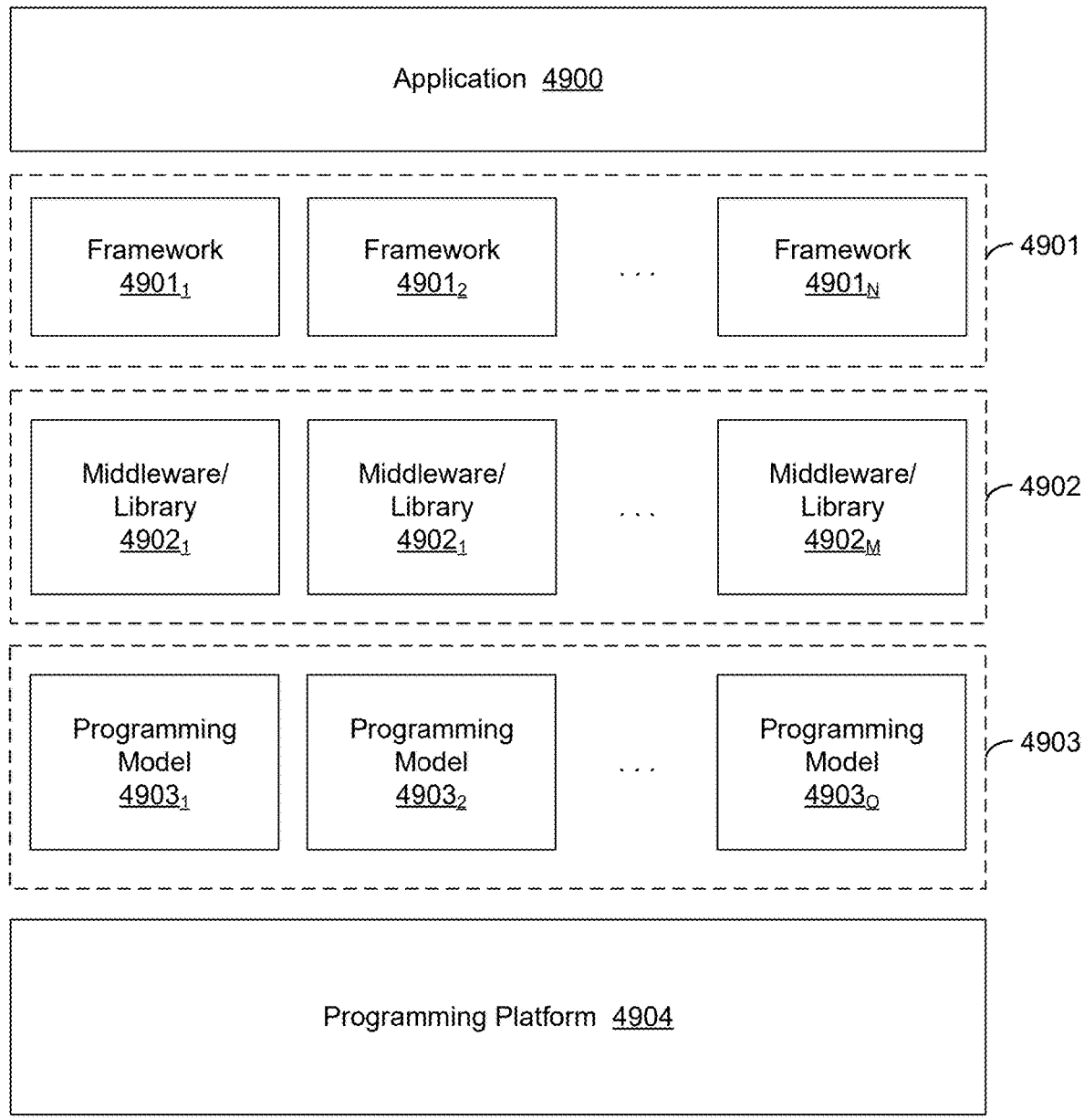
FIG. 49 illustrates software that is supported by a programming platform, in accordance with at least one embodiment.

FIG. 49 illustrates software that is supported by a programming platform, in accordance with at least one embodiment. In at least one embodiment, a programming platform 4904 is configured to support various programming models 4903, middlewares and/or libraries 4902, and frameworks 4901 that an application 4900 may rely upon. In at least one embodiment, application 4900 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDA Developer Data Loading Library ("DALI") CUDA libraries to provide accelerated computing on underlying hardware.

In at least one embodiment, programming platform 4904 may be one of a CUDA, ROCm, or OpenCL platform described above in conjunction with FIG. 46, FIG. 47, and FIG. 48, respectively. In at least one embodiment, programming platform 4904 supports multiple programming models 4903, which are abstractions of an underlying computing system permitting expressions of algorithms and data structures. Programming models 4903 may expose features of underlying hardware in order to improve performance, in at least one embodiment. In at least one embodiment, programming models 4903 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 4902 provide implementations of abstractions of programming models 4904. In at least one embodiment, such libraries include data and programming code that may be used by computer programs and leveraged during software development. In at least one embodiment, such middlewares include software that provides services to applications beyond those available from programming platform 4904. In at least one embodiment, libraries and/or middlewares 4902 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 4902 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 4901 depend on libraries and/or middlewares 4902. In at least one embodiment, each of application frameworks 4901 is a software framework used to implement a standard structure of application software. An AI/ML application may be implemented using a framework such as Caffe, Caffe2, TensorFlow, Keras, PyTorch, or MxNet deep learning frameworks, in at least one embodiment.

In at least one embodiment, the method 1000 (see FIG. 10) may be implemented at least in part using the programming platform 4904. For example, the programming platform 4904 may be used to implement the denoise process 120, the edge detection process 122, the object detection process 124, the optional thresholding process 126, the decision logic 128, the extraction process 130, and/or the SGM process 132.

Figure 50:
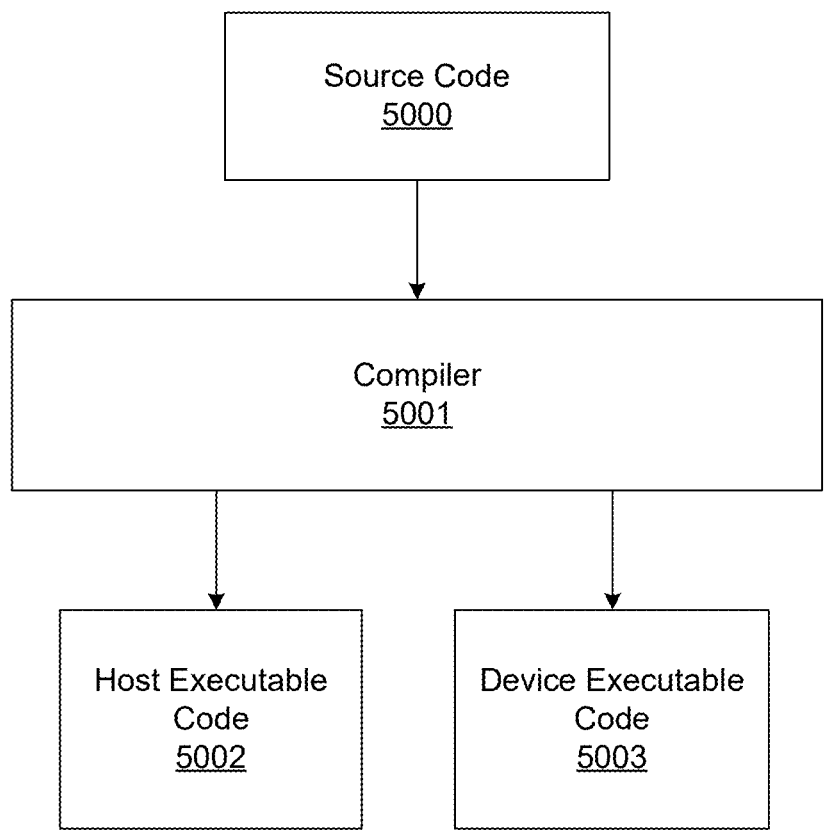
FIG. 50 illustrates compiling code to execute on programming platforms of FIGS. 45-48, in accordance with at least one embodiment.

FIG. 50 illustrates compiling code to execute on one of programming platforms of FIGS. 45-48, in accordance with at least one embodiment. In at least one embodiment, a compiler 5001 receives source code 5000 that includes both host code as well as device code. In at least one embodiment, complier 5001 is configured to convert source code 5000 into host executable code 5002 for execution on a host and device executable code 5003 for execution on a device. In at least one embodiment, source code 5000 may either be compiled offline prior to execution of an application, or online during execution of an application.

In at least one embodiment, source code 5000 may include code in any programming language supported by compiler 5001, such as C++, C, Fortran, etc. In at least one embodiment, source code 5000 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 5000 may include multiple source code files, rather than a single-source file, into which host code and device code are separated.

In at least one embodiment, compiler 5001 is configured to compile source code 5000 into host executable code 5002 for execution on a host and device executable code 5003 for execution on a device. In at least one embodiment, compiler 5001 performs operations including parsing source code 5000 into an abstract system tree (AST), performing optimizations, and generating executable code. In at least one embodiment in which source code 5000 includes a single-source file, compiler 5001 may separate device code from host code in such a single-source file, compile device code and host code into device executable code 5003 and host executable code 5002, respectively, and link device executable code 5003 and host executable code 5002 together in a single file.

In at least one embodiment, host executable code 5002 and device executable code 5003 may be in any suitable format, such as binary code and/or IR code. In a case of CUDA, host executable code 5002 may include native object code and device executable code 5003 may include code in PTX intermediate representation, in at least one embodiment. In a case of ROCm, both host executable code 5002 and device executable code 5003 may include target binary code, in at least one embodiment.

In at least one embodiment, the method of compiling code illustrated in FIG. 50 may be used to create and/or maintain the instructions 118 (see FIG. 1). In such embodiments, the method 1000 (see FIG. 10) may be implemented at least in part using the method of FIG. 50. For example, the method of FIG. 50 may be used to implement the denoise process 120, the edge detection process 122, the object detection process 124, the optional thresholding process 126, the decision logic 128, the extraction process 130, and/or the SGM process 132.

Figure 51:
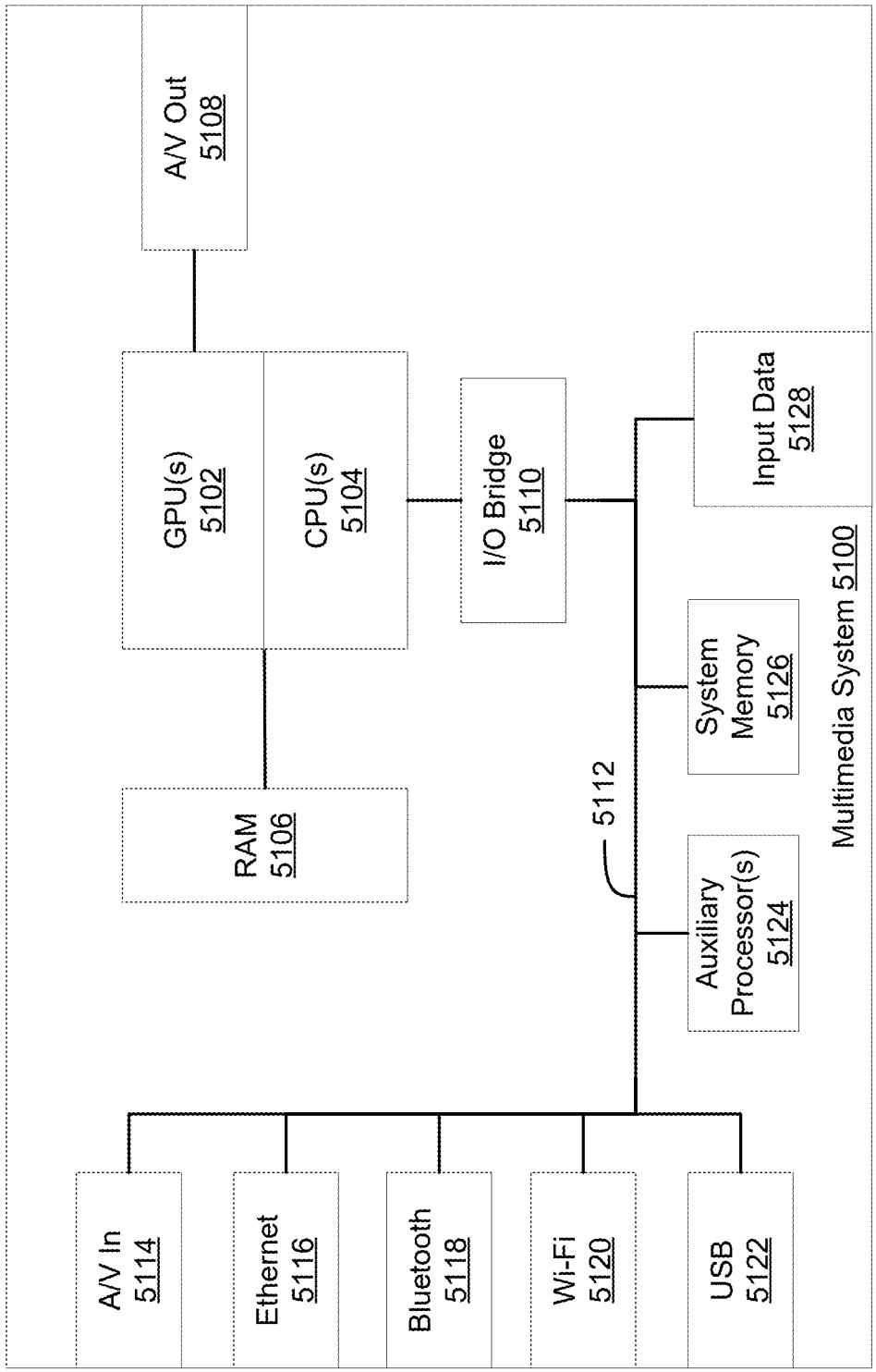
FIG. 51 illustrates a multimedia system, in accordance with at least one embodiment.

FIG. 51 illustrates a multimedia system, according to at least one embodiment. In at least one embodiment, a multimedia system is referred to as a gaming system, multimedia console, gaming console, and/or variations thereof. In at least one embodiment, FIG. 51 illustrates an overall system architecture of a computer game processing apparatus.

In at least one embodiment, multimedia system 5100 comprises graphics processing units (GPUs) 5102. In at least one embodiment, GPU(s) 5102, optionally in conjunction with CPU(s) 5104, generates video images and audio for output via audio/video (A/V) output 5108. In at least one embodiment, audio is generated in conjunction with or instead by an audio processor. In at least one embodiment, GPU(s) 5102 utilize a video encoder/video codec (e.g., coder/decoder) to form a video processing pipeline for graphics processing. In at least one embodiment, data is provided from GPU(s) 5102 to a video encoder/video codec and output to A/V output 5108 for transmission to a display. In at least one embodiment, GPU(s) 5102 is connected to one or more memory controllers to facilitate access to various types of memory, such as random access memory (RAM) 5106.

In at least one embodiment, GPU(s) 5102 is part of a processing unit comprising central processing units (CPUs) 5104. In at least one embodiment, GPU(s) 5102 and CPU(s) 5104 are part of an accelerated processing unit (APU). In at least one embodiment, CPU(s) 5104 comprise at least a level 1 cache, level 2 cache, and memory. In at least one embodiment, a level 1 cache and a level 2 cache temporarily store data and reduce a number of memory access cycles. In at least one embodiment, CPU(s) 5104 comprise at least one or more cores and one or more level caches. In at least one embodiment, memory of CPU(s) 5104 store executable code that is loaded during a boot process, such as when multimedia system 5100 is powered on.

In at least one embodiment, GPU(s) 5102 and CPU(s) 5104 communicate with bus 5112, optionally via input/output (I/O) bridge 5110, which may be a discreet component or part of GPU(s) 5102 and CPU(s) 5104. In at least one embodiment, data storage components such as system memory 5126, and input data 5128 are connected to bus 5112. In at least one embodiment, RAM 5106 also communicates with bus 5112. In at least one embodiment, auxiliary processor(s) 5124 are connected to bus 5112. In at least one embodiment, auxiliary processor(s) 5124 are provided to run or support one or more software, software applications, operating systems, and/or variations thereof executed in connection with multimedia system 5100.

In at least one embodiment, system memory 5126 stores application data that is loaded during a boot process. In at least one embodiment, input data 5128 comprises a DVD/CD drive, Blu-ray drive, hard drive, or other removable media drive. In at least one embodiment, input data 5128 is external or internal to multimedia system 5100. In at least one embodiment, application data is accessed via input data 5128 for execution, playback, and/or variations thereof. In at least one embodiment, input data 5128 is connected to I/O bridge 5110 via bus 5112.

In at least one embodiment, one or more components of multimedia system 5100 are connected via one or more buses, including serial and parallel buses, a memory bus, a peripheral bus, and a processor or local bus using various bus architectures, such as Peripheral Components Interconnects (PCI) bus, PCI-Express bus, and/or variations thereof. In at least one embodiment, multimedia system 5100 communicates with peripheral devices as appropriate via an audio/visual (A/V) input port 5114, Ethernet port 5116, Bluetooth wireless link 5118, Wi-Fi wireless link 5120, or one or more universal serial bus (USB) ports 5122. In at least one embodiment, audio and video are output via A/V output 5108, such as an HDMI port.

In at least one embodiment, video and optionally audio of multimedia system 5100 are output to one or more display devices through A/V output 5108. In at least one embodiment, display devices include devices such as a television, electronic display, computer monitor, and/or variations thereof. In at least one embodiment, video is presented in various forms, such as stereoscopic. In at least one embodiment, audio is presented through one or more audio devices in one of a number of formats such as stereo, 5.1 surround sound or 7.1 surround sound. In at least one embodiment, video and audio is presented to a head mounted display unit, such as a virtual reality device, worn by a user.

In at least one embodiment, upon boot of multimedia system 5100, application data is loaded from system memory 5126 into one or more memory and/or caches of CPU(s) 5104 and executed on CPU(s) 5104. In at least one embodiment, an application presents a graphical user interface that provides a user experience when navigating to different services available on multimedia system 5100. In at least one embodiment, applications, media, and/or variations thereof of input data 5128 are launched or played from input data 5128 to provide additional functionalities, applications, media, and/or variations thereof to multimedia system 5100. In at least one embodiment, multimedia system 5100 is configured to execute an executable program associated with a computer game in accordance with application data from system memory 5126 and input data 5128.

In at least one embodiment, the system 100 (see FIG. 1) may be implemented as or may be a component of the multimedia system 5100. The instructions 118 (see FIG. 1) may be used to obtain the optical flow map 110 (see FIGS. 1 and 2) for images captured and/or generated by the multimedia system 5100. The multimedia system 5100 may use the optical flow map 110 to perform motion estimation, object detection, frame generation (e.g., using deep learning or deep neural networks), frame extrapolation, frame interpolation, object tracking, image dominant plane extraction, movement detection, robot navigation, visual odometry, camera motion detection, image (e.g., video) compression, image (e.g., video) decompression, and the like.

Figure 52:
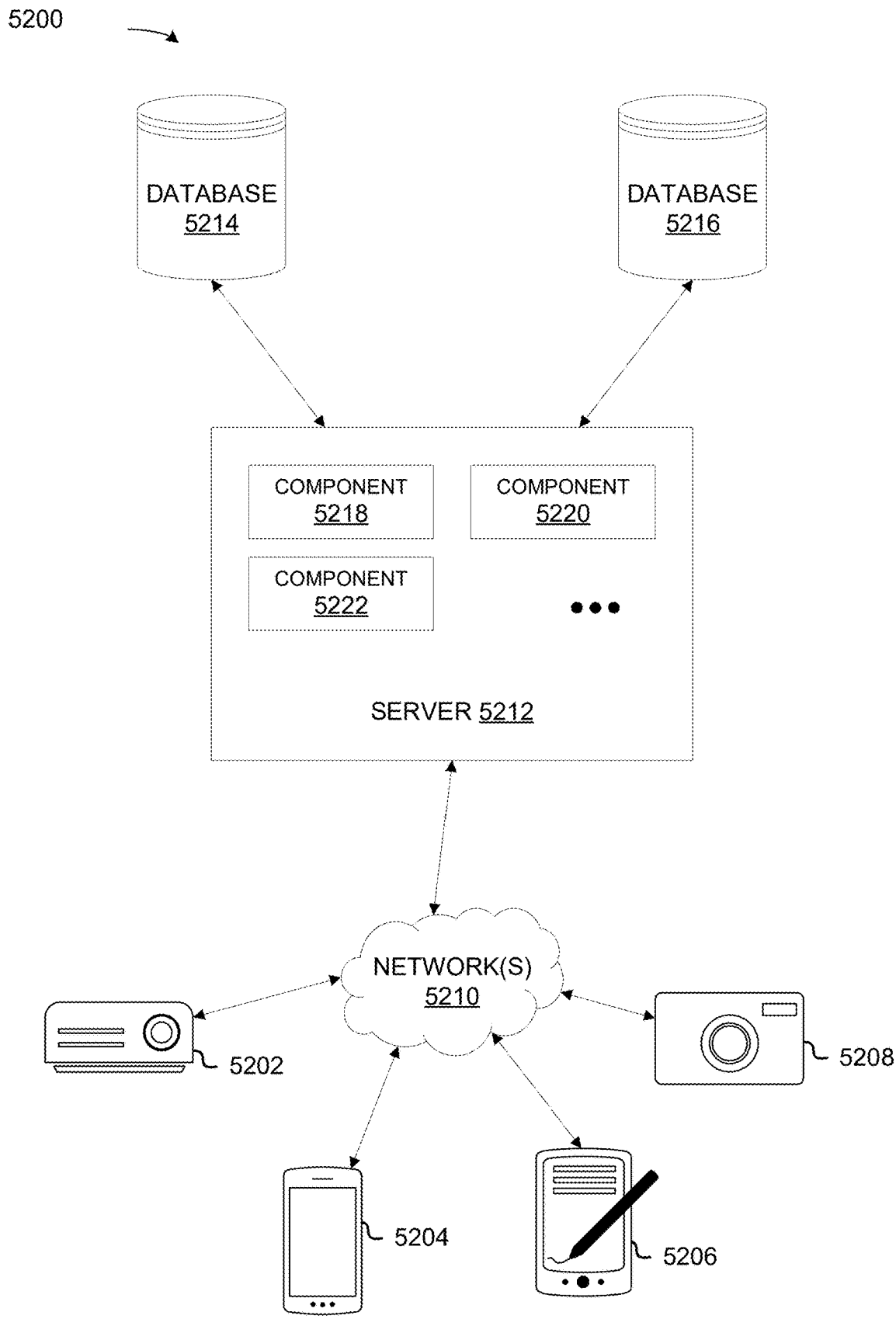
FIG. 52 illustrates a distributed system, in accordance with at least one embodiment.

FIG. 52 illustrates a distributed system 5200, in accordance with at least one embodiment. In at least one embodiment, distributed system 5200 includes one or more client computing devices 5202, 5204, 5206, and 5208, which are configured to execute and operate a client application such as a web browser, proprietary client, and/or variations thereof over one or more network(s) 5210. In at least one embodiment, server 5212 may be communicatively coupled with remote client computing devices 5202, 5204, 5206, and 5208 via network 5210.

In at least one embodiment, server 5212 may be adapted to run one or more services or software applications such as services and applications that may manage session activity of single sign-on (SSO) access across multiple data centers. In at least one embodiment, server 5212 may also provide other services or software applications can include non-virtual and virtual environments. In at least one embodiment, these services may be offered as web-based or cloud services or under a Software as a Service (SaaS) model to users of client computing devices 5202, 5204, 5206, and/or 5208. In at least one embodiment, users operating client computing devices 5202, 5204, 5206, and/or 5208 may in turn utilize one or more client applications to interact with server 5212 to utilize services provided by these components.

In at least one embodiment, software components 5218, 5220 and 5222 of system 5200 are implemented on server 5212. In at least one embodiment, one or more components of system 5200 and/or services provided by these components may also be implemented by one or more of client computing devices 5202, 5204, 5206, and/or 5208. In at least one embodiment, users operating client computing devices may then utilize one or more client applications to use services provided by these components. In at least one embodiment, these components may be implemented in hardware, firmware, software, or combinations thereof. It should be appreciated that various different system configurations are possible, which may be different from distributed system 5200. The embodiment shown in FIG. 52 is thus one example of a distributed system for implementing an embodiment system and is not intended to be limiting.

In at least one embodiment, client computing devices 5202, 5204, 5206, and/or 5208 may include various types of computing systems. In at least one embodiment, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and/or variations thereof. In at least one embodiment, devices may support various applications such as various Internet-related apps, e-mail, short message service (SMS) applications, and may use various other communication protocols. In at least one embodiment, client computing devices may also include general purpose personal computers including, by way of example, personal computers and/or laptop computers running various versions of Microsoft Windows®, Apple Macintosh®, and/or Linux operating systems. In at least one embodiment, client computing devices can be workstation computers running any of a variety of commercially-available UNIX® or UNIX-like operating systems, including without limitation a variety of GNU/Linux operating systems, such as Google Chrome OS. In at least one embodiment, client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 5210. Although distributed system 5200 in FIG. 52 is shown with four client computing devices, any number of client computing devices may be supported. Other devices, such as devices with sensors, etc., may interact with server 5212.

In at least one embodiment, network(s) 5210 in distributed system 5200 may be any type of network that can support data communications using any of a variety of available protocols, including without limitation TCP/IP (transmission control protocol/Internet protocol), SNA (systems network architecture), IPX (Internet packet exchange), AppleTalk, and/or variations thereof. In at least one embodiment, network(s) 5210 can be a local area network (LAN), networks based on Ethernet, Token-Ring, a wide-area network, Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

In at least one embodiment, server 5212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In at least one embodiment, server 5212 can include one or more virtual machines running virtual operating systems, or other computing architectures involving virtualization. In at least one embodiment, one or more flexible pools of logical storage devices can be virtualized to maintain virtual storage devices for a server. In at least one embodiment, virtual networks can be controlled by server 5212 using software defined networking. In at least one embodiment, server 5212 may be adapted to run one or more services or software applications. In at least one embodiment, server 5212 comprises one or more hardware and/or software components that implement a neural network such as those described in connection with FIG. 53-FIG. 57. In at least one embodiment, server 5212 comprises one or more neural networks, which are referred to as deep learning super sampling networks, which generate high quality versions of input frames (e.g., rendered frames of a computer graphics program, such as a video game program).

In at least one embodiment, server 5212 may run any operating system, as well as any commercially available server operating system. In at least one embodiment, server 5212 may also run any of a variety of additional server applications and/or mid-tier applications, including HTTP (hypertext transport protocol) servers, FTP (file transfer protocol) servers, CGI (common gateway interface) servers, JAVA® servers, database servers, and/or variations thereof. In at least one embodiment, exemplary database servers include without limitation those commercially available from Oracle, Microsoft, Sybase, IBM (International Business Machines), and/or variations thereof.

In at least one embodiment, server 5212 may include one or more applications to analyze and consolidate data feeds and/or event updates received from users of client computing devices 5202, 5204, 5206, and 5208. In at least one embodiment, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and/or variations thereof. In at least one embodiment, server 5212 may also include one or more applications to display data feeds and/or real-time events via one or more display devices of client computing devices 5202, 5204, 5206, and 5208.

In at least one embodiment, distributed system 5200 may also include one or more databases 5214 and 5216. In at least one embodiment, databases may provide a mechanism for storing information such as user interactions information, usage patterns information, adaptation rules information, and other information. In at least one embodiment, databases 5214 and 5216 may reside in a variety of locations. In at least one embodiment, one or more of databases 5214 and 5216 may reside on a non-transitory storage medium local to (and/or resident in) server 5212. In at least one embodiment, databases 5214 and 5216 may be remote from server 5212 and in communication with server 5212 via a network-based or dedicated connection. In at least one embodiment, databases 5214 and 5216 may reside in a storage-area network (SAN). In at least one embodiment, any necessary files for performing functions attributed to server 5212 may be stored locally on server 5212 and/or remotely, as appropriate. In at least one embodiment, databases 5214 and 5216 may include relational databases, such as databases that are adapted to store, update, and retrieve data in response to SQL-formatted commands.

In at least one embodiment, the system 100 (see FIG. 1) may be implemented on one or more components of the distributed system 5200. The instructions 118 (see FIG. 1) may be used to obtain the optical flow map 110 (see FIGS. 1 and 2) for images captured and/or generated by one or more components of the distributed system 5200. In at least one embodiment, one or more components of the distributed system 5200 may use the optical flow map 110 to perform motion estimation, object detection, object tracking, image dominant plane extraction, movement detection, robot navigation, visual odometry, camera motion detection, video compression, and the like.

Figure 53:
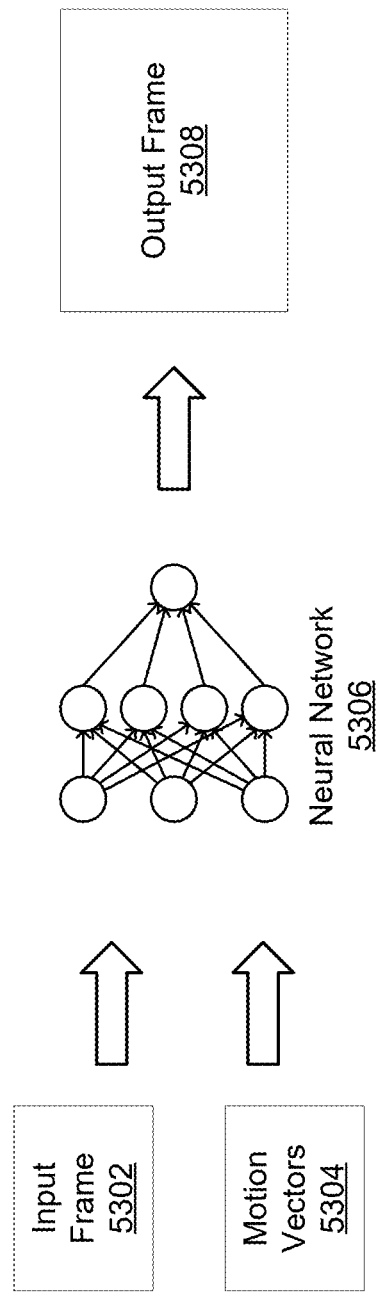
FIG. 53 illustrates a super sampling neural network, in accordance with at least one embodiment.

FIG. 53 illustrates a super sampling neural network, in accordance with at least one embodiment. In at least one embodiment, a neural network 5306 is referred to as a super sampling neural network, deep learning super sampling (DLSS) network, super sampling network, and/or variations thereof. In at least one embodiment, an input frame 5302 and motion vectors 5304 are processed by a neural network 5306 to generate an output frame 5308. In at least one embodiment, neural networks such as those described in connection with FIG. 53-57 are DLSS networks.

In at least one embodiment, an input frame 5302 is an image. In at least one embodiment, an input frame 5302 is a computer generated image that is generated by one or more computer graphics programs or software. In at least one embodiment, an input frame 5302 is an image that is captured from one or more image capturing devices, such as a camera. In at least one embodiment, an input frame 5302 is a frame of a set of frames of a video. In at least one embodiment, an input frame 5302 is a frame of a video that is captured from one or more video capturing devices, such as a video camera. In at least one embodiment, an input frame 5302 is a frame of a computer generated video that is generated by one or more computer graphics programs or software.

In at least one embodiment, an input frame 5302 is a render of a two-dimensional (2D) model. In at least one embodiment, an input frame 5302 is a render of a three-dimensional (3D) model. In at least one embodiment, an input frame 5302 is generated by a rendering computer program, which is a computer program comprising executable instructions that, when executed, generate images based at least in part on a scene. In at least one embodiment, a scene refers to a 2D or 3D model. In at least one embodiment, a scene is defined by various characteristics, such as geometry, viewpoint, texture, lighting, shading, and/or variations thereof. In at least one embodiment, a computer program obtains a scene and generates an image of a scene through use of one or more rendering algorithms. In at least one embodiment, an input frame 5302 is an image generated through use of one or more light transport modelling techniques. In at least one embodiment, an input frame 5302 is generated through one or more rasterization techniques. In at least one embodiment, an input frame 5302 is generated through one or more ray casting techniques. In at least one embodiment, an input frame 5302 is generated through one or more ray tracing techniques.

In at least one embodiment, an input frame 5302 is a frame generated by a video game program. In at least one embodiment, a video game program is executed by one or more computing devices that comprise graphics hardware that generate real-time computer graphics. In at least one embodiment, an input frame 5302 is a frame that is generated in real-time. In at least one embodiment, an input frame 5302 is a frame that is pre-rendered. In at least one embodiment, an input frame 5302 is a frame of a video game that is displayed on one or more computer graphics display hardware, such as a video display device, mobile device, virtual reality headset, and/or variations thereof. In at least one embodiment, a video game program is executing and generates a 3D scene, in which an input frame 5302 is a render of a 3D scene. In at least one embodiment, an input frame 5302 is a frame that is rendered by a rendering device with various hardware and software constraints, such as graphics hardware limitations, memory limitations, and/or variations thereof.

In at least one embodiment, a neural network 5306 is a neural network that obtains an input frame and generates an output frame. In at least one embodiment, a neural network 5306 is a convolutional autoencoder network. In at least one embodiment, a neural network 5306 is a neural network that generates a higher quality version of an input frame. In at least one embodiment, qualities of a frame include resolution and aliasing, in which a high quality frame has a high resolution and minimal aliasing. In at least one embodiment, a neural network 5306 obtains an input frame, and generates an output frame with a higher resolution and lower aliasing than an input frame. In at least one embodiment, a neural network 5306 processes frames in near real-time. In at least one embodiment, near real-time processing refers to processing in which inputs are processed within a time interval from which inputs are generated. In at least one embodiment, a neural network 5306 processes input frames in near real-time such that input frames are processed within a time interval from which they are generated and/or rendered. In at least one embodiment, a neural network 5306 processes an input frame into an output frame within a time interval such that output frames are available from input frames with minimal latency. In at least one embodiment, minimal latency refers to latency that is at or below a defined latency time interval threshold. In at least one embodiment, output frames that are available from input frames with minimal latency are available within a defined time interval, which can be any suitable value, such as seconds, fractions of a second, and/or variations thereof. In at least one embodiment, a neural network 5306 obtains a frame of a video game and generates a high resolution, minimally aliased output frame. In at least one embodiment, a neural network 5306 is trained using various neural network training techniques such as those described in connection with FIG. 54. In at least one embodiment, output frames are generated at a rate which can be perceived as continuous motion for a human being, which may refer to frame rates over a certain threshold. In at least one embodiment, output frames are generated at a target rate at or over 20 frames per second (fps) including or not limited to 23.976 fps, 24 fps, 25 fps, 29.97 fps, 30 fps, 48 fps, 50 fps, 59.94 fps, 60 fps, 90 fps, 120 fps, 240 fps, and any other suitable target frame rate. In at least one embodiment, a computer system may lack computing resources to continuously render high quality frames at a target frame rate (e.g., 4 k resolution at 60 fps) and instead render lower-resolution frames which are super-sampled using neural network 5306 to achieve said target frame (e.g., render 1080p resolution at 60 fps and super-sample to 4 k resolution).

In at least one embodiment, a neural network 5306 obtains an input frame 5302. In at least one embodiment, a neural network 5306 obtains an input frame 5302 from a video game program executing on one or more computing devices, such as a video game console, computer, mobile device, and/or variations thereof. In at least one embodiment, a computer program, such as a video game program, computer graphics program, rendering program, and/or variations thereof, provides an input frame 5302 to a neural network 5306 through one or more interfaces, such as transmitted through one or more computer networks, transferred through one or more data transfer interfaces, and/or variations thereof. In at least one embodiment, a neural network 5306 obtains an input frame 5302, which is an image generated by a video game program. In at least one embodiment, a neural network 5306 obtains an input frame 5302 and associated motion vectors 5304, which indicate direction objects in a scene (e.g., a scene depicted in an input frame 5302) are moving. In at least one embodiment, a motion vector is a vector that represents an entity in a frame based on a position of an entity in a previous frame. In at least one embodiment, a motion vector indicates a motion or direction of movement of an entity of a frame of a scene. In at least one embodiment, motion vectors 5304 comprise a collection of one or more motion vectors that indicate motions or directions of movement of entities and/or objects of an input frame 5302. In at least one embodiment, a program such as a video game program generates both input frame 5302 and motion vectors 5304.

In at least one embodiment, a neural network 5306 obtains an input frame 5302 and motion vectors 5304, and generates an output frame 5308. In at least one embodiment, a neural network 5306 generates an output frame 5308 from an input frame 5302 and/or associated motion vectors 5304. In at least one embodiment, a neural network 5306 is trained using a high quality version of an input frame 5302, in which trained neural network 5306 generates an output frame 5308 to match a high quality version of input frame 5302. In at least one embodiment, an output frame 5308 is an upscaled/higher resolution version of an input frame 5302. In at least one embodiment, an output frame 5308 is a higher resolution version of an input frame 5302. In at least one embodiment, an output frame 5308 has a lower degree of aliasing than an input frame 5302. In at least one embodiment, an output frame 5308 is a higher quality representation of an input frame 5302. In at least one embodiment, a neural network 5306 obtains an input frame 5302, which is a real-time render of a scene of a video game, and associated motion vectors 5304, and generates an output frame 5308, which is a high quality version of an input frame 5302.

In at least one embodiment, the instructions 118 (see FIG. 1) may be implemented at least in part using the neural network 5306. As mentioned above, the system 100 (see FIG. 1) may be implemented by at least a portion of the inference and/or training logic 1115. Referring to FIG. 1, the neural network 5306 (see FIG. 53) may be used to configure any of the denoise process 120, the edge detection process 122, the object detection process 124, the optional thresholding process 126, the decision logic 128, the extraction process 130, and the SGM process 132. Further, the optical flow map 110 or data derived at least in part from the optical flow map 110 may be used as an input (e.g., the motion vectors 5304) into the neural network 5306.

Figure 54:
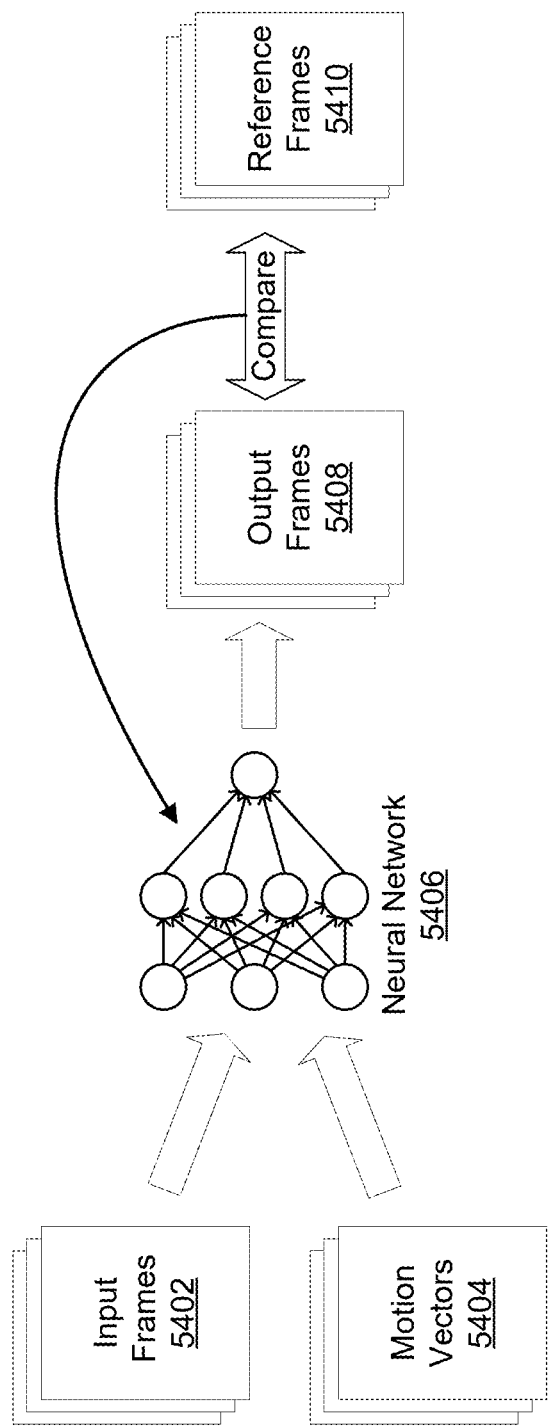
FIG. 54 illustrates an architecture of a super sampling neural network, in accordance with at least one embodiment.

FIG. 54 illustrates an architecture of a super sampling neural network, in accordance with at least one embodiment. In at least one embodiment, a neural network 5406 is referred to as a super sampling neural network, DLSS network, super sampling network, and/or variations thereof. In at least one embodiment, a neural network 5406 is trained to generate output frames 5408 from input frames 5402 and motion vectors 5404. In at least one embodiment, as part of training a neural network 5406, output frames 5408 generated by a neural network 5406 are compared with reference frames 5410 to update neural network 5406.

In at least one embodiment, input frames 5402 are input frames in accordance with those described in connection with FIG. 53. In at least one embodiment, input frames 5402 comprise one or more images, referred to as frames. In at least one embodiment, input frames 5402 comprise one or more images captured from one or more image and/or video capturing devices. In at least one embodiment, input frames 5402 comprise one or more renders of a scene. In at least one embodiment, input frames 5402 comprise frames generated by a video game program. In at least one embodiment, a video game program is executed by one or more computing devices that comprise graphics hardware that generate real-time computer graphics. In at least one embodiment, input frames 5402 are frames that are pre-rendered. In at least one embodiment, a video game program is executing and generates a 3D scene, in which input frames 5402 comprise renders of a 3D scene. In at least one embodiment, input frames 5402 are frames that are rendered by a rendering device with various hardware and software constraints, such as graphics hardware limitations, memory limitations, and/or variations thereof. In at least one embodiment, input frames 5402 are frames that are rendered with minimal post processing techniques, such as anti-aliasing (e.g., input frames 5402 comprise frames that are rendered with a little to no degree of anti-aliasing).

In at least one embodiment, post processing techniques for rendered frames include techniques and effects such as, but not limited to: ambient occlusion (e.g., horizon based ambient occlusion (HBAO), screen space ambient occlusion (SSAO)), anti-aliasing (e.g., fast approximate anti-aliasing (FXAA), super-sample anti-aliasing (SSAA), multi-sampling anti-aliasing (MSAA), temporal anti-aliasing (TXAA)), bloom, blur (e.g., depth of field, motion blur), cel shading, chromatic aberration, color correction, gamma correction, high dynamic range rendering, particle effects, shading, shadow mapping, sharpening, un-sharpening, upscaling, texture filtering (e.g., point, linear, bilinear, trilinear, anisotropic), and/or variations thereof. In at least one embodiment, input frames 5402 are frames that are rendered with little to no post processing techniques and/or effects.

In at least one embodiment, motion vectors 5404 are a set of one or more vectors that indicate directions of movement of objects of frames of input frames 5402. In at least one embodiment, a motion vector is a vector that represents an entity in a frame based on a position of an entity in a previous frame. In at least one embodiment, a motion vector indicates a motion or direction of movement of an entity of a frame of a scene. In at least one embodiment, motion vectors 5404 are generated by a program that rendered input frames 5402 and correspond to input frames 5402, in which a first set of motion vectors of motion vectors 5404 corresponds to a first frame of input frames 5402 and indicates motion of objects and/or entities depicted in a first frame of input frames 5402. In at least one embodiment, a first set of motion vectors of motion vectors 5404 corresponds to a first frame of input frames 5402 and indicates motion of objects of a first frame of input frames 5402 (e.g., directions and/or locations of where objects of a first frame of input frames 5402 will potentially be or move to in a subsequent frame of input frames 5402). In at least one embodiment, motion vectors 5404 comprise motion vectors generated by a video game program. In at least one embodiment, a video game program is executing and generates a 3D scene, in which motion vectors 5404 comprise vectors indicating movement of objects and/or entities of a 3D scene.

In at least one embodiment, reference frames 5410 comprise one or more images, referred to as frames. In at least one embodiment, reference frames 5410 correspond to input frames 5402 (e.g., each frame of reference frames 5410 corresponds to a frame of input frames 5402). In at least one embodiment, reference frames 5410 comprise one or more renders of a scene. In at least one embodiment, reference frames 5410 comprise frames generated by a video game program. In at least one embodiment, reference frames 5410 are frames that are rendered with various post processing techniques and/or effects. In at least one embodiment, reference frames 5410 are higher quality versions of input frames 5402. In at least one embodiment, a first frame of input frames 5402 is rendered from a scene using minimal post processing techniques and/or effects, and a first frame of reference frames 5410 is rendered from a same scene using post processing techniques and/or effects. In at least one embodiment, reference frames 5410 are frames rendered using 64× super sampling (64×SS).

In at least one embodiment, reference frames 5410 are frames rendered by one or more super computing devices, such as those described in connection with FIG. 14. In at least one embodiment, input frames 5402 and reference frames 5410 are frames rendered from a same computer graphics application or program (e.g., a same video game program). In at least one embodiment, reference frames 5410 and motion vectors are generated by one or more rendering devices, in which input frames 5402 and motion vectors 5404 are obtained from generated reference frames 5410 and motion vectors through one or more processes, such as downscaling generated reference frames 5410 and/or motion vectors to obtain input frames 5402 and motion vectors 5404, removing one or more post processing techniques and/or effects from generated reference frames 5410 and/or motion vectors to obtain input frames 5402 and motion vectors 5404, and variations thereof. In at least one embodiment, one or more rendering devices generate input frames 5402, motion vectors 5404, and/or reference frames 5410 from a particular computer graphics application or program (e.g., a video game program).

In at least one embodiment, a neural network 5406 is trained to process input frames 5402 and motion vectors 5404, and generate output frames 5408 that closely approximate or match corresponding reference frames 5410. In at least one embodiment, one or more rendering devices, through one or more computer graphics applications or programs, generate and store input frames 5402, motion vectors 5404, and reference frames 5410, in which one or more systems retrieve stored input frames 5402, motion vectors 5404, and reference frames 5410 to train a neural network 5406. In at least one embodiment, a neural network 5406 is a convolutional autoencoder network. In at least one embodiment, a neural network 5406 is trained using frames and/or motion vectors from a particular computer graphics application or program (e.g., a video game program) and is usable to generate frames for a particular computer graphics application or program. In at least one embodiment, a neural network 5406 is trained to generate high quality versions of input frames 5402 (e.g., upscaled/higher resolution frames, anti-aliased frames) as output frames 5408. In at least one embodiment, a neural network 5406 is trained to upscale and anti-alias frames of input frames 5402 as output frames 5408. In at least one embodiment, a neural network 5406 utilizes motion vectors 5404 to generate output frames 5408. In at least one embodiment, a neural network 5406 generates a first output frame of output frames 5408 from input frames 5402 and motion vectors 5404, generates a second output frame of output frames 5408 from a first output frame of output frames 5408, input frames 5402, and motion vectors 5404, and so on for subsequent output frames of output frames 5408. In at least one embodiment, a neural network 5406 applies sets of motion vectors from motion vectors 5404 to frames of output frames 5408 to generate subsequent frames of output frames 5408. In at least one embodiment, a neural network 5406 utilizes motion vectors 5404 as part of one or more temporal feedback processes that apply motion vectors to output frames to generate subsequent output frames.

In at least one embodiment, output frames 5408 are higher quality versions of input frames 5402, which can refer to various qualities, such as higher resolution, higher degrees of various post processing techniques and/or effects, and/or variations thereof. In at least one embodiment, a video game program is executing in connection with one or more computer graphics hardware, in which a frame is rendered and input to a neural network 5406, in which neural network 5406 generates a corresponding higher quality frame (e.g., an upscaled and/or anti-aliased frame). In at least one embodiment, a neural network 5406 is trained to output frames (e.g., output frames 5408) with various post processing techniques and/or effects from frames (e.g., input frames 5402) with minimal post processing techniques and/or effects. In at least one embodiment, a neural network 5406 obtains a frame and corresponding motion vectors, such as a frame and motion vectors of input frames 5402 and motion vectors 5404, respectively, and generates a corresponding high quality output frame, such as a frame of output frames 5408 (e.g., a frame with various post processing techniques and/or effects, such as an upscaled frame, an anti-aliased frame, an upscaled and anti-aliased frame, and/or variations thereof). In at least one embodiment, a neural network 5406 obtains an input frame (e.g., a frame of input frames 5402), a previous output frame (e.g., a previously generated output frame of output frames 5408), and motion vectors (e.g., motion vectors of motion vectors 5404), and generates an output frame (e.g., a subsequent output frame of output frames 5408).

In at least one embodiment, a neural network 5406 is trained and/or updated by comparing generated output frames 5408 with reference frames 5410. In at least one embodiment, a neural network 5406 is trained and used in connection with FIG. 53. In at least one embodiment, a neural network 5406 is trained or otherwise updated by one or more systems using a training framework such as a PyTorch, TensorFlow, Boost, Caffe, Microsoft Cognitive Toolkit/CNTK, MXNet, Chainer, Keras, Deeplearning4j, or any suitable training framework. In at least one embodiment, a neural network 5406 is trained by comparing output frames 5408 with reference frames 5410, determining differences between output frames 5408 and reference frames 5410, and utilizing determined differences to update weights and other components of neural network 5406 such that differences between output frames 5408 and reference frames 5410 are minimized.

In at least one embodiment, training is performed at least in a supervised, partially supervised, and/or unsupervised manner. In at least one embodiment, a neural network 5406 is trained to match input frames 5402 to reference frames 5410. In at least one embodiment, a neural network 5406 is trained by one or more systems that cause neural network 5406 to produce an output frame of output frames 5408 from a frame of input frames 5402, and measure a difference between an output frame of output frames 5408 and a corresponding frame of reference frames 5410. In at least one embodiment, a neural network 5406 is trained by one or more systems that cause neural network 5406 to obtain a frame of input frames 5402 and perform one or more neural network image processing/generation/rendering operations (e.g., generate new pixels, modify existing pixels) to generate an output frame of output frames 5408, compare an output frame of output frames 5408 with a corresponding frame of reference frames 5410, and adjust weights of neural network 5406 based at least in part on a comparison of an output frame of output frames 5408 with a corresponding frame of reference frames 5410. In at least one embodiment, a frame of output frames 5408 is compared with a frame of reference frames 5410 by comparing pixels of both frames with each other. In at least one embodiment, frames are compared by comparing pixel characteristics of frames (e.g., pixel intensity, pixel brightness, pixel color, pixel contrast) and measuring differences in pixel characteristics (e.g., differences in pixel intensity, pixel brightness, pixel color, pixel contrast between pixels of frames). In at least one embodiment, a neural network 5406 is trained using one or more back propagation processes in connection with one or more loss functions. In at least one embodiment, a neural network 5406 is trained using various techniques described herein such as those described in connection with FIG. 12.

In at least one embodiment, the instructions 118 (see FIG. 1) may be implemented at least in part using the neural network 5406. As mentioned above, the system 100 (see FIG. 1) may be implemented by at least a portion of the inference and/or training logic 1115. Referring to FIG. 1, the neural network 5406 (see FIG. 54) may be used to configure any of the denoise process 120, the edge detection process 122, the object detection process 124, the optional thresholding process 126, the decision logic 128, the extraction process 130, and the SGM process 132. Further, the optical flow map 110 or data derived at least in part from the optical flow map 110 may be used as an input (e.g., the motion vectors 5404) into the neural network 5406.

Figure 55:
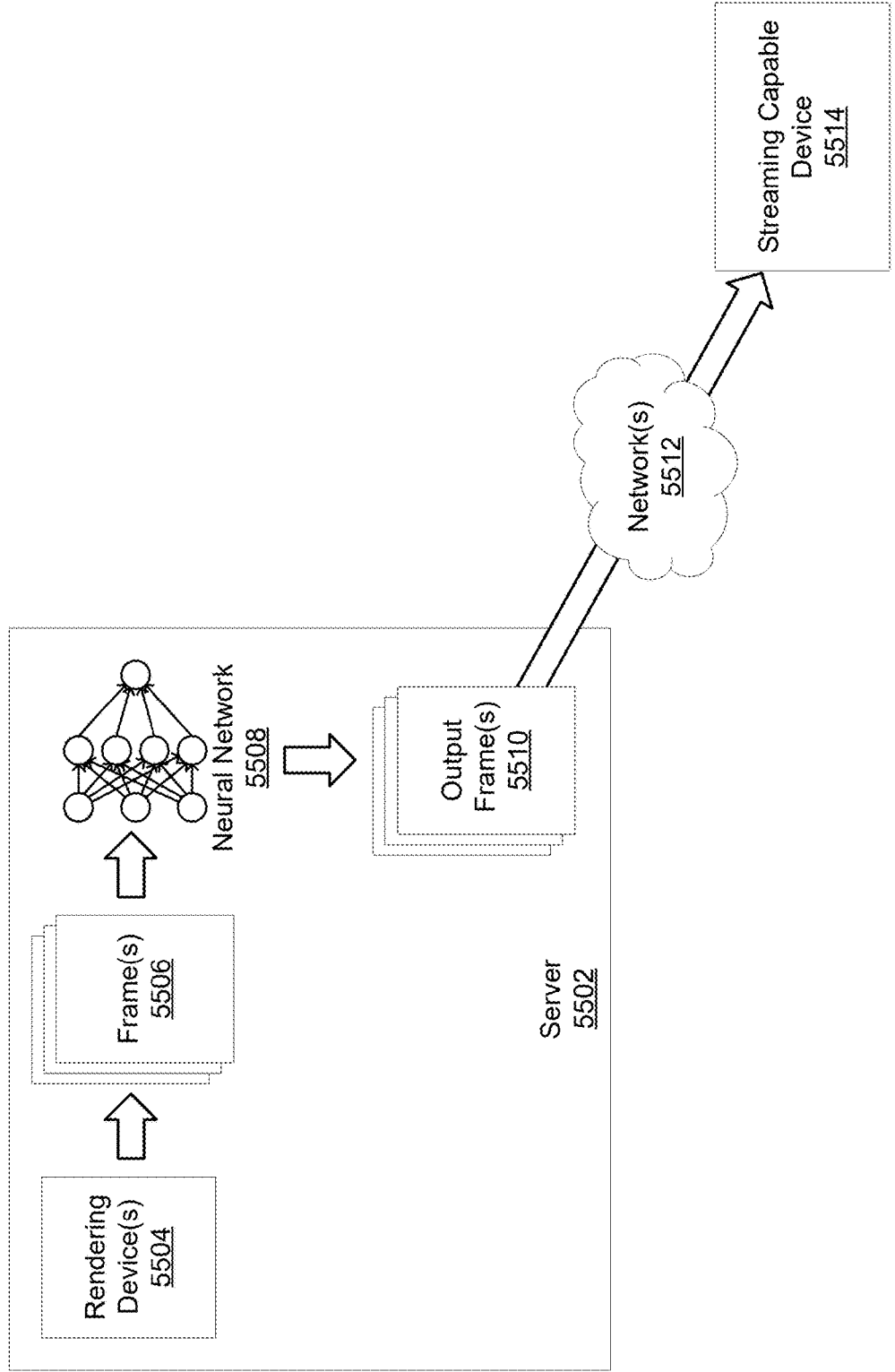
FIG. 55 illustrates an example of streaming using a super sampling neural network, in accordance with at least one embodiment.

FIG. 55 illustrates an example of streaming using a super sampling neural network, in accordance with at least one embodiment. In at least one embodiment, a neural network 5508 processes frame(s) 5506 generated by rendering device(s) 5504 to generate output frame(s) 5510, which are streamed via network(s) 5512 to a streaming capable device 5514. In at least one embodiment, a neural network 5508 is referred to as a DLSS network, super sampling neural network, super sampling network, and/or variations thereof. In at least one embodiment, a neural network 5508 is trained using techniques such as those described in connection with FIG. 54.

In at least one embodiment, a server 5502 is a collection of one or more computer hardware and/or software components. In at least one embodiment, a server 5502 provides various functionalities to other programs or devices, referred to as clients. In at least one embodiment, a server 5502 provides streaming services. In at least one embodiment, streaming services refer to services that provide streaming media to a user. In at least one embodiment, streaming media refers to multimedia (e.g., video, audio) that is constantly received by and presented to a user while being delivered by a provider. In at least one embodiment, a server 5502 provides video game streaming services. In at least one embodiment, a server 5502 provides services in which frames of a video game are constantly received by and presented to a user while being delivered/generated by a server 5502. In at least one embodiment, a server 5502 comprises rendering device(s) 5504. In at least one embodiment, a server 5502 comprises one or more hardware and/or software components that implement a neural network 5508. In at least one embodiment, a server 5502 comprises one or more data storage components (e.g., hard drives) that provide storage and processing of frame(s) 5506 and output frame(s) 5510.

In at least one embodiment, rendering device(s) 5504 comprise one or more computer graphics rendering hardware and/or software components. In at least one embodiment, rendering device(s) 5504 comprise one or more graphics processing units. In at least one embodiment, rendering device(s) 5504 comprise one or more computing devices that generate and/or render graphics. In at least one embodiment, rendering device(s) 5504 comprise one or more computing devices that generate renders from a video game. In at least one embodiment, rendering device(s) 5504 render frames of a video game or other computer graphics program. In at least one embodiment, rendering device(s) 5504, using input data from a computer graphics program (e.g., a video game program), renders frame(s) 5506.

In at least one embodiment, frame(s) 5506 are frames rendered by rendering device(s) 5504. In at least one embodiment, frame(s) 5506 are associated with motion vectors that indicate directions of movement of objects of frame(s) 5506. In at least one embodiment, frame(s) 5506 and associated motion vectors are generated by rendering device(s) 5504. In at least one embodiment, frame(s) 5506 comprise frames generated by a particular video game program. In at least one embodiment, a video game program is executed by one or more computing devices that comprise graphics hardware (e.g., rendering device(s) 5504) that generate real-time computer graphics. In at least one embodiment, a video game program is executing and generates a 3D scene, in which frame(s) 5506 comprise renders of a 3D scene. In at least one embodiment, frame(s) 5506 are frames that are rendered by a rendering device with various hardware and software constraints, such as graphics hardware limitations, memory limitations, and/or variations thereof. In at least one embodiment, frame(s) 5506 are frames that are rendered with minimal post processing techniques, such as anti-aliasing (e.g., frame(s) 5506 comprise frames that are rendered with a little to no degree of anti-aliasing).

In at least one embodiment, a neural network 5508 comprises one or more neural networks that generate high quality frames from input frames. In at least one embodiment, a neural network 5508 is trained using frames from a particular computer graphics application or program (e.g., a video game program) and is usable to generate frames for a particular computer graphics application or program. In at least one embodiment, a neural network 5508 is trained to generate high quality versions of frame(s) 5506 (e.g., upscaled/higher resolution frames, anti-aliased frames). In at least one embodiment, a neural network 5508 is trained to upscale and anti-alias frames of frame(s) 5506. In at least one embodiment, a video game program is executing in connection with one or more computer graphics hardware, in which a frame is rendered and input to a neural network 5508 (e.g., frame(s) 5506 are rendered by rendering device(s) 5504 and input to neural network 5508), in which neural network 5508 generates a corresponding higher quality frame (e.g., an upscaled and/or anti-aliased frame). In at least one embodiment, a neural network 5508 is trained to output frames with various post processing techniques and/or effects from frames with minimal post processing techniques and/or effects. In at least one embodiment, a neural network 5508 obtains a frame and corresponding motion vectors, and generates a corresponding high quality output frame (e.g., a frame with various post processing techniques and/or effects, such as an upscaled frame, an anti-aliased frame, an upscaled and anti-aliased frame, and/or variations thereof). In at least one embodiment, a neural network 5508 obtains frame(s) 5506 and motion vectors and generates output frame(s) 5510. In at least one embodiment, a neural network 5508 utilizes one or more temporal feedback processes that process output frames of output frame(s) 5510 in connection with frame(s) 5506 and associated motion vectors to generate subsequent frames of output frame(s) 5510.

In at least one embodiment, output frame(s) 5510 correspond to frame(s) 5506 (e.g., each frame of output frame(s) 5510 corresponds to a frame of frame(s) 5506). In at least one embodiment, output frame(s) 5510 are frames that are generated with various post processing techniques and/or effects. In at least one embodiment, output frame(s) 5510 are higher quality versions of frame(s) 5506. In at least one embodiment, output frame(s) 5510 comprise upscaled (e.g., higher resolution) and/or anti-aliased versions of frame(s) 5506.

In at least one embodiment, network(s) 5512 comprise any suitable computer communication network, such as Internet. In at least one embodiment, network(s) 5512 are cryptographically protected, encrypted, or otherwise secured. In at least one embodiment, network(s) 5512 comprise one or more computer network communication channels in which data is transmitted and received. In at least one embodiment, network(s) 5512 provide methods of communication between a server 5502 and a streaming capable device 5514. In at least one embodiment, output frame(s) 5510 are transmitted from a server 5502 via network(s) 5512 to a streaming capable device 5514.

In at least one embodiment, a streaming capable device 5514 is a computing device that is capable of receiving multimedia through one or more networks. In at least one embodiment, a streaming capable device 5514 is a device with limited graphics rendering capabilities that is unable to render frames such as output frame(s) 5510, but is able to access a server 5502 via network(s) 5512 to obtain output frame(s) 5510. In at least one embodiment, a streaming capable device 5514 is a streaming capable computing device such that streaming capable device 5514 comprises various hardware and/or software components that constantly receive and/or obtain multimedia from one or more networks. In at least one embodiment, a streaming capable device 5514 is a computing device such as a mobile phone, laptop, computer, gaming console, tablet, and/or variations thereof. In at least one embodiment, a streaming capable device 5514 comprises one or more computer networking components, such as various receivers, transmitters, and/or transceivers, which obtain and process multimedia transmitted through one or more networks. In at least one embodiment, a streaming capable device 5514 is operable by one or more users. In at least one embodiment, a streaming capable device 5514 receives output frame(s) 5510 through network(s) 5512. In at least one embodiment, a streaming capable device 5514 receives output frame(s) 5510 in connection with one or more programs executing on streaming capable device 5514 that display and/or process output frame(s) 5510.

In at least one embodiment, a streaming capable device 5514 comprises one or more software programs and/or applications that processes obtained output frame(s) 5510 and provides output frame(s) 5510 to be viewed (e.g., via an electronic visual display of streaming capable device 5514) and/or interacted with (e.g., via various user input hardware of streaming capable device 5514) by one or more users. In at least one embodiment, a streaming capable device 5514 comprises one or more electronic visual display hardware, such as a liquid crystal display (LCD), light-emitting diode (LED) display, and/or variations thereof, and one or more user input hardware, such as computer mouse, keyboard, gaming controller, and/or variations thereof, in which users utilize to interact with one or more software programs and/or applications executing on streaming capable device 5514. In at least one embodiment, a streaming capable device 5514 provides indications of user input to a server 5502 via network(s) 5512, in which frame(s) 5506 are generated by rendering device(s) 5504 based at least in part on user input.

In at least one embodiment, a video game program is executing on a server 5502, where frame(s) 5506 are frames of a video game program, in which frame(s) 5506 are rendered by rendering device(s) 5504, and processed and transmitted as output frame(s) 5510 to a streaming capable device 5514, in which a user interacts with streaming capable device 5514 in connection with output frame(s) 5510 (e.g., output frame(s) 5510 are frames of a video game program requiring interaction, in which a user inputs interaction to streaming capable device 5514), in which user interactions are transmitted to server 5502 to a video game program to determine how subsequent frames of a video game program are to be rendered by rendering device(s) 5504. In at least one embodiment, frame(s) 5506 are rendered based at least in part on input from a user in connection with a streaming capable device 5514, and processed by a neural network 5508 to generate output frame(s) 5510, in which output frame(s) 5510 are transmitted to streaming capable device 5514, in which further user input is received by streaming capable device 5514 and transmitted to server 5502 to generate subsequent frames, which are then processed by neural network 5508 and transmitted to streaming capable device 5514, and so on for subsequent frames and subsequent user input.

In at least one embodiment, the instructions 118 (see FIG. 1) may be implemented at least in part using the neural network 5508. As mentioned above, the system 100 (see FIG. 1) may be implemented by at least a portion of the inference and/or training logic 1115. Referring to FIG. 1, the neural network 5508 (see FIG. 55) may be used to configure any of the denoise process 120, the edge detection process 122, the object detection process 124, the optional thresholding process 126, the decision logic 128, the extraction process 130, and the SGM process 132. Further, the optical flow map 110 or data derived at least in part from the optical flow map 110 may be used as an input into the neural network 5508.

Figure 56:
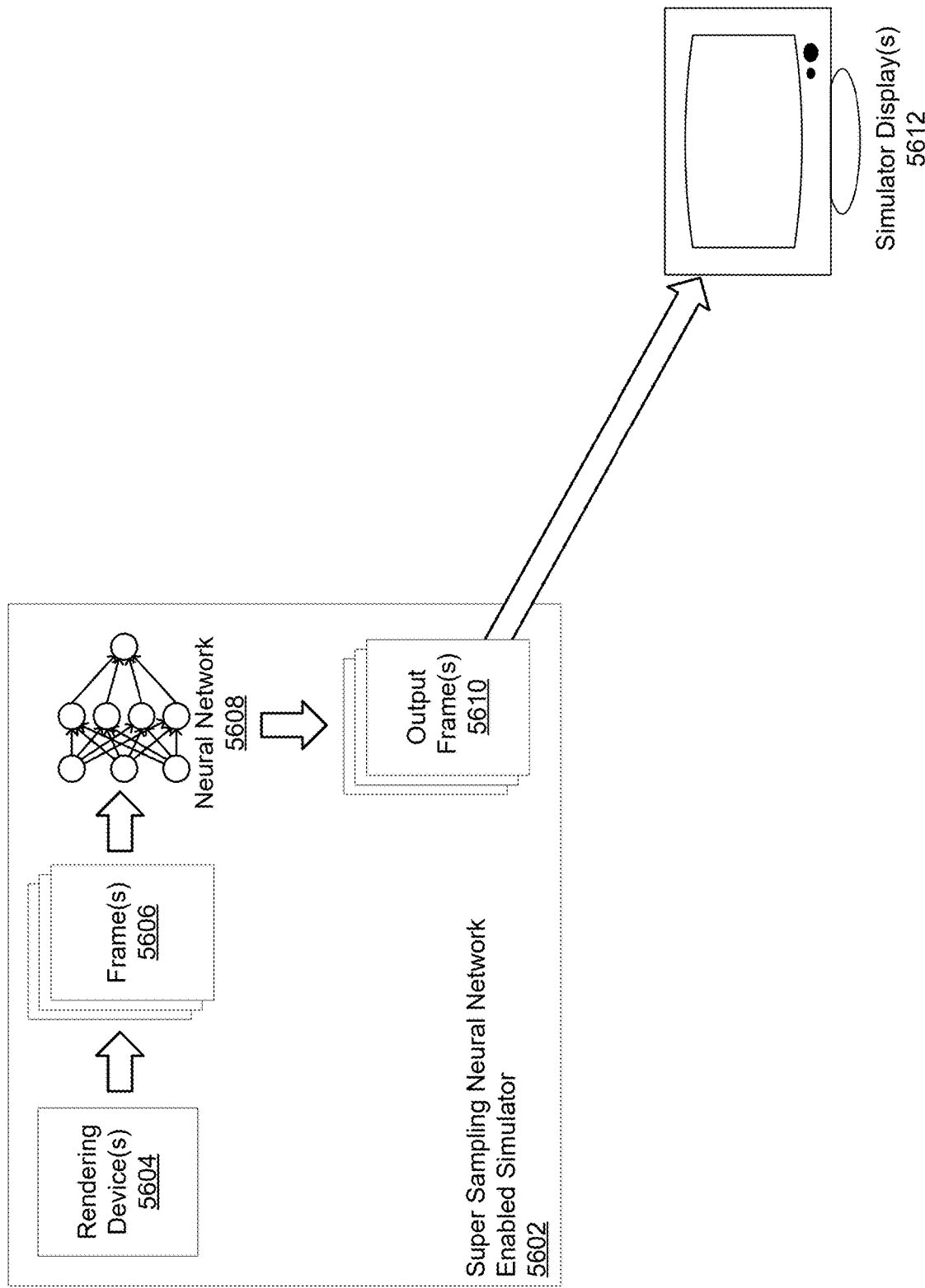
FIG. 56 illustrates an example of simulation using a super sampling neural network, in accordance with at least one embodiment.

FIG. 56 illustrates an example of simulation using a super sampling neural network, in accordance with at least one embodiment. In at least one embodiment, a neural network 5608 processes frame(s) 5606 generated by rendering device(s) 5604 to generate output frame(s) 5610, which are output to simulator display(s) 5612. In at least one embodiment, a neural network 5608 is referred to as a DLSS network, super sampling neural network, super sampling network, and/or variations thereof. In at least one embodiment, a neural network 5608 is trained using techniques such as those described in connection with FIG. 54.

In at least one embodiment, a super sampling neural network enabled simulator 5602 is a collection of one or more computer hardware and/or software components. In at least one embodiment, a super sampling neural network enabled simulator 5602 comprises rendering device(s) 5604. In at least one embodiment, a super sampling neural network enabled simulator 5602 comprises one or more hardware and/or software components that implement a neural network 5608. In at least one embodiment, a super sampling neural network enabled simulator 5602 comprises one or more data storage components (e.g., hard drives) that provide storage and processing of frame(s) 5606 and output frame(s) 5610.

In at least one embodiment, a super sampling neural network enabled simulator 5602 is a simulator device, such as a flight simulator, driving simulator, and/or variations thereof, that executes various simulator programs, such as flight simulator programs, driving simulator programs, and/or variations thereof. In at least one embodiment, a flight simulator is a device that artificially re-creates aircraft flight and an environment in which it flies. In at least one embodiment, a flight simulator, through execution of a flight simulator program, simulates various aspects of flight, such as physics of how aircraft fly, how aircraft react to applications of various flight controls, effects of other aircraft systems, and effects of factors such as turbulence, air density, wind shear, cloud, precipitation, weather, and/or variations thereof, on aircraft. In at least one embodiment, a flight simulator (e.g., a super sampling neural network enabled simulator 5602) comprises one or more hardware components that simulate an aircraft, such as hardware of a cockpit of an aircraft, that allow user interaction with a flight simulator (e.g., hardware components comprise various user input devices, such as a steering wheel, controller, joystick, buttons, switches, levers, and/or variations thereof). In at least one embodiment, a flight simulator comprises one or more displays (e.g., simulator display(s) 5612) that users interact with in connection with hardware of a flight simulator to simulate various aspects of flight. In at least one embodiment, a driving simulator is a device that artificially recreates motor vehicle movement and an environment in which it moves. In at least one embodiment, a driving simulator, through execution of a driving simulator program, simulates various aspects of operation of a motor vehicle, such as physics of a motor vehicle, how a motor vehicle reacts to applications of various motor vehicle controls, effects of other motor vehicle systems, and effects of factors such as environmental changes, wind, weather, and/or variations thereof, on motor vehicles. In at least one embodiment, a driving simulator (e.g., a super sampling neural network enabled simulator 5602) comprises one or more hardware components that simulate a motor vehicle, such as hardware of a driver seat of a motor vehicle, that allow user interaction with a driving simulator (e.g., hardware components comprise various user input devices, such as a steering wheel, pedals, controller, joystick, buttons, switches, levers, and/or variations thereof). In at least one embodiment, a driving simulator comprises one or more displays (e.g., simulator display(s) 5612) that users interact with in connection with hardware of a driving simulator to simulate various aspects of driving or other motor vehicle operation. In at least one embodiment, simulator display(s) 5612 are displays of a super sampling neural network enabled simulator 5602.

In at least one embodiment, rendering device(s) 5604 comprise one or more computer graphics rendering hardware and/or software components. In at least one embodiment, rendering device(s) 5604 comprise one or more graphics processing units. In at least one embodiment, rendering device(s) 5604 comprise one or more computing devices that generate and/or render graphics. In at least one embodiment, rendering device(s) 5604 comprise one or more computing devices that generate renders from a computer graphics program, such as a video game, simulation program, simulation video game, and/or variations thereof. In at least one embodiment, rendering device(s) 5604, using input data from a computer graphics program (e.g., a simulation program), renders frame(s) 5606.

In at least one embodiment, frame(s) 5606 are frames rendered by rendering device(s) 5604. In at least one embodiment, frame(s) 5606 are associated with motion vectors that indicate directions of movement of objects of frame(s) 5606. In at least one embodiment, frame(s) 5606 and associated motion vectors are generated by rendering device(s) 5604. In at least one embodiment, frame(s) 5606 comprise frames generated by a particular simulation program, such as a flight simulator program, driving simulator program, and/or variations thereof. In at least one embodiment, a simulation program is executed by one or more computing devices that comprise graphics hardware (e.g., rendering device(s) 5604) that generate real-time computer graphics. In at least one embodiment, a simulation program is executing and generates a 3D scene, in which frame(s) 5606 comprise renders of a 3D scene. In at least one embodiment, frame(s) 5606 are frames that are rendered with minimal post processing techniques, such as anti-aliasing (e.g., frame(s) 5606 comprise frames that are rendered with a little to no degree of anti-aliasing).

In at least one embodiment, a neural network 5608 comprises one or more neural networks that generate high quality frames from input frames. In at least one embodiment, a neural network 5608 is trained using frames from a particular computer graphics application or program (e.g., a simulation program) and is usable to generate frames for a particular computer graphics application or program. In at least one embodiment, a neural network 5608 is trained to generate high quality versions of frame(s) 5606 (e.g., upscaled/higher resolution frames, anti-aliased frames). In at least one embodiment, a simulation program is executing in connection with one or more computer graphics hardware, in which a frame is rendered and input to a neural network 5608 (e.g., frame(s) 5606 are rendered by rendering device(s) 5604 and input to neural network 5608), in which neural network 5608 generates a corresponding higher quality frame (e.g., an upscaled and/or anti-aliased frame). In at least one embodiment, a neural network 5608 is trained to output frames with various post processing techniques and/or effects from frames with minimal post processing techniques and/or effects. In at least one embodiment, a neural network 5608 obtains a frame and corresponding motion vectors, and generates a corresponding high quality output frame (e.g., a frame with various post processing techniques and/or effects, such as an upscaled/higher resolution frame, an anti-aliased frame, an upscaled and anti-aliased frame, and/or variations thereof). In at least one embodiment, a neural network 5608 obtains frame(s) 5606 and/or motion vectors and generates output frame(s) 5610. In at least one embodiment, a neural network 5608 utilizes one or more temporal feedback processes that process output frames of output frame(s) 5610 in connection with frame(s) 5606 and associated motion vectors to generate subsequent frames of output frame(s) 5610.

In at least one embodiment, output frame(s) 5610 correspond to frame(s) 5606 (e.g., each frame of output frame(s) 5610 corresponds to a frame of frame(s) 5606). In at least one embodiment, output frame(s) 5610 are frames that are generated with various post processing techniques and/or effects. In at least one embodiment, output frame(s) 5610 are higher quality versions of frame(s) 5606. In at least one embodiment, output frame(s) 5610 comprise upscaled and/or anti-aliased versions of frame(s) 5606. In at least one embodiment, output frame(s) 5610 are displayed on simulator display(s) 5612 as part of operation of one or more simulators (e.g., super sampling neural network enabled simulator 5602), such as a flight simulator that executes a flight simulator program, a driving simulator that executes a driving simulator program, and/or variations thereof. In at least one embodiment, a user is operating a super sampling neural network enabled simulator 5602 and performs one or more actions, through one or more user input devices, based at least in part on output frame(s) 5610 displayed on simulator display(s) 5612.

In at least one embodiment, the instructions 118 (see FIG. 1) may be implemented at least in part using the neural network 5608. As mentioned above, the system 100 (see FIG. 1) may be implemented by at least a portion of the inference and/or training logic 1115. Referring to FIG. 1, the neural network 5608 (see FIG. 56) may be used to configure any of the denoise process 120, the edge detection process 122, the object detection process 124, the optional thresholding process 126, the decision logic 128, the extraction process 130, and the SGM process 132. Further, the optical flow map 110 or data derived at least in part from the optical flow map 110 may be used as an input into the neural network 5608.

Figure 57:
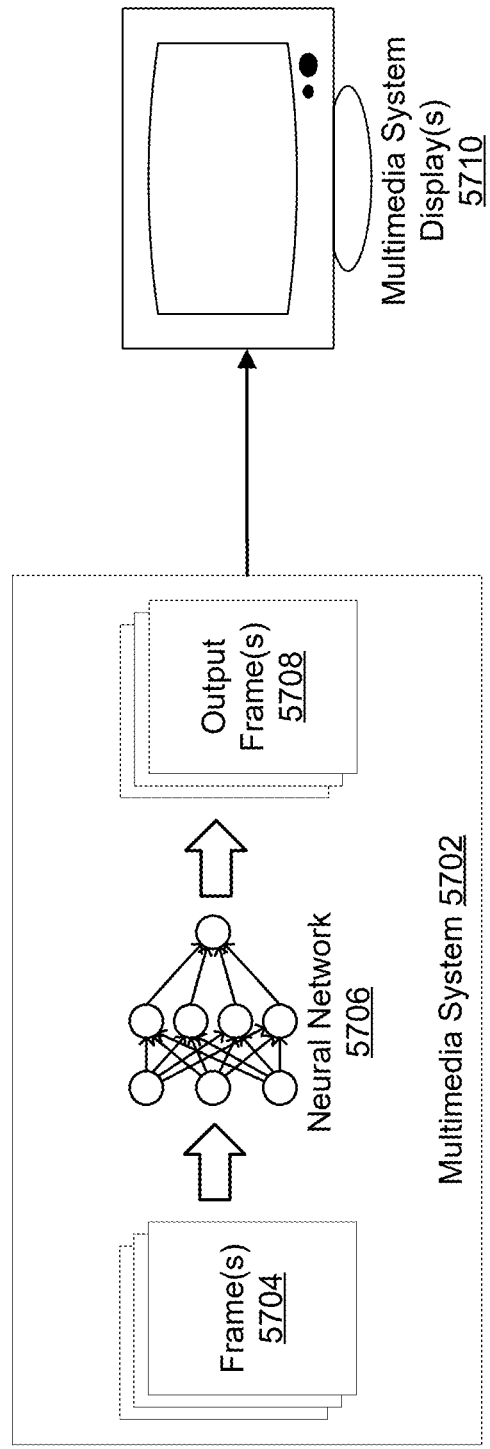
FIG. 57 illustrates an example of a device using a super sampling neural network, in accordance with at least one embodiment.

FIG. 57 illustrates an example of a device using a super sampling neural network, in accordance with at least one embodiment. In at least one embodiment, a neural network 5706 processes frame(s) 5704 generated by a multimedia system 5702 to generate output frame(s) 5708, which are output to multimedia system display(s) 5710. In at least one embodiment, a neural network 5706 is referred to as a DLSS network, super sampling neural network, super sampling network, and/or variations thereof. In at least one embodiment, a neural network 5706 is trained using techniques such as those described in connection with FIG. 54.

In at least one embodiment, a multimedia system 5702 is a collection of one or more computer hardware and/or software components. In at least one embodiment, a multimedia system 5702 comprises one or more rendering devices. In at least one embodiment, a multimedia system 5702 comprises one or more hardware and/or software components that implement a neural network 5706. In at least one embodiment, a multimedia system 5702 comprises one or more data storage components (e.g., hard drives) that provide storage and processing of frame(s) 5704 and output frame(s) 5708. In at least one embodiment, a multimedia system 5702 is a gaming console, such as those described in accordance with FIG. 51. In at least one embodiment, a multimedia system 5702 is any suitable computing device that processes multimedia, such as a computer, tablet, gaming device, gaming console, mobile device, and/or variations thereof. In at least one embodiment, multimedia system display(s) 5710 are one or more electronic visual display hardware that display data (e.g., multimedia, video games) from a multimedia system 5702. In at least one embodiment, multimedia system display(s) 5710 are displays of a multimedia system 5702.

In at least one embodiment, a multimedia system 5702 comprises one or more computer graphics rendering hardware and/or software components. In at least one embodiment, a multimedia system 5702 comprises one or more graphics processing units. In at least one embodiment, a multimedia system 5702 comprises one or more computing devices that generate and/or render graphics. In at least one embodiment, a multimedia system 5702 comprises one or more processors that execute various programs, such as video game programs, software applications, software programs, and/or variations thereof. In at least one embodiment, a multimedia system 5702 comprises one or more computing devices that generate renders from a computer graphics program, such as a video game. In at least one embodiment, a multimedia system 5702, using input data from a computer graphics program executing on multimedia system 5702 (e.g., a video game program), renders frame(s) 5704. In at least one embodiment, a multimedia system 5702 comprises one or more hardware components that allow user interaction with a multimedia system 5702 (e.g., hardware components comprise various user input devices, such as controllers, joysticks, buttons, switches, levers, and/or variations thereof). In at least one embodiment, a multimedia system 5702 is connected to one or more user input devices that allow users to interact with various programs executing on a multimedia system 5702 (e.g., video game programs).

In at least one embodiment, frame(s) 5704 are frames rendered by a multimedia system 5702. In at least one embodiment, frame(s) 5704 are associated with motion vectors that indicate directions of movement of objects of frame(s) 5704. In at least one embodiment, frame(s) 5704 and associated motion vectors are generated by a multimedia system 5702. In at least one embodiment, frame(s) 5704 comprise frames generated by a particular video game program. In at least one embodiment, a video game program is executed by one or more computing devices that comprise graphics hardware (e.g., a multimedia system 5702) that generate real-time computer graphics. In at least one embodiment, a video game program is executing and generates a 3D scene, in which frame(s) 5704 comprise renders of a 3D scene. In at least one embodiment, frame(s) 5704 are frames that are rendered with minimal post processing techniques, such as anti-aliasing (e.g., frame(s) 5704 comprise frames that are rendered with a little to no degree of anti-aliasing).

In at least one embodiment, a neural network 5706 comprises one or more neural networks that generate high quality frames from input frames. In at least one embodiment, a neural network 5706 is trained using frames from a particular computer graphics application or program (e.g., a video game program) and is usable to generate frames for a particular computer graphics application or program. In at least one embodiment, a neural network 5706 is trained to generate high quality versions of frame(s) 5704 (e.g., upscaled/higher resolution frames, anti-aliased frames). In at least one embodiment, a video game program is executing in connection with one or more computer graphics hardware, in which a frame is rendered and input to a neural network 5706 (e.g., frame(s) 5704 are rendered by a multimedia system 5702 and input to neural network 5706), in which neural network 5706 generates a corresponding higher quality frame (e.g., an upscaled/higher resolution and/or anti-aliased frame). In at least one embodiment, a neural network 5706 is trained to output frames with various post processing techniques and/or effects from frames with minimal post processing techniques and/or effects. In at least one embodiment, a neural network 5706 obtains a frame and corresponding motion vectors, and generates a corresponding high quality output frame (e.g., a frame with various post processing techniques and/or effects, such as an upscaled/higher resolution frame, an anti-aliased frame, an upscaled and anti-aliased frame, and/or variations thereof). In at least one embodiment, a neural network 5706 obtains frame(s) 5704 and/or motion vectors and generates output frame(s) 5708. In at least one embodiment, a neural network 5706 utilizes one or more temporal feedback processes that process output frames of output frame(s) 5708 in connection with frame(s) 5704 and associated motion vectors to generate subsequent frames of output frame(s) 5708.

In at least one embodiment, output frame(s) 5708 correspond to frame(s) 5704 (e.g., each frame of output frame(s) 5708 corresponds to a frame of frame(s) 5704). In at least one embodiment, output frame(s) 5708 are frames that are generated with various post processing techniques and/or effects. In at least one embodiment, output frame(s) 5708 are higher quality versions of frame(s) 5704. In at least one embodiment, output frame(s) 5708 comprise upscaled and/or anti-aliased versions of frame(s) 5704. In at least one embodiment, a neural network 5706 constantly generates output frames of output frame(s) 5708 as frames of frame(s) 5704 are rendered by a multimedia system 5702. In at least one embodiment, output frame(s) 5708 are displayed on multimedia display(s) 5710 as part of operation of one or more video game programs. In at least one embodiment, a user is operating a multimedia system 5702 and performs one or more actions, through one or more user input devices, based at least in part on output frame(s) 5708 displayed on multimedia display(s) 5710.

In at least one embodiment, the instructions 118 (see FIG. 1) may be implemented at least in part using the neural network 5706. As mentioned above, the system 100 (see FIG. 1) may be implemented by at least a portion of the inference and/or training logic 1115. Referring to FIG. 1, the neural network 5706 (see FIG. 57) may be used to configure any of the denoise process 120, the edge detection process 122, the object detection process 124, the optional thresholding process 126, the decision logic 128, the extraction process 130, and the SGM process 132. Further, the optical flow map 110 or data derived at least in part from the optical flow map 110 may be used as an input into the neural network 5706.

At least one embodiment of the disclosure can be described in view of the following clauses:

1. A method comprising: obtaining an input image and a reference image, the input image comprising a plurality of image regions; obtaining at least one penalty map comprising a set of penalty values for each of the plurality of image regions, the set of penalty values comprising, for each of the plurality of image regions, a penalty value for each of a plurality of directions intersecting the image region; and generating an optical flow map for the input and reference images based at least in part on the at least one penalty map.

2. The method of clause 1, wherein the at least one penalty map comprises first and second penalty maps, the optical flow map is generated using a Semi-Global Matching ("SGM") process comprising a first penalty value and a second penalty value to determine a cost for a particular one of the plurality of image regions, a particular disparity, and a particular one of the plurality of directions, the first penalty value is obtained using the first penalty map for the particular image region and the particular direction, and the second penalty value is obtained using the second penalty map for the particular image region and the particular direction.

3. The method of clause 2, wherein the optical flow map is generated by: determining a plurality of costs, at least one cost of the plurality of costs being determined for one of the plurality of image regions, one of a plurality of disparities, and one of the plurality of directions; obtaining a plurality of accumulated costs for each unique pair of one of the plurality of image regions and one of the plurality of disparities by summing those of the plurality of costs determined for the unique pair; selecting, for each of the plurality of image regions, a smallest one of the plurality of accumulated costs obtained for the image region, the smallest accumulated cost having been obtained for a selected one of the plurality of disparities; and placing, for each of the plurality of image regions, a value based at least in part on the selected disparity in the optical flow map in a location corresponding to the image region.

4. The method of any one of clauses 1-3, wherein obtaining the at least one penalty map comprises: producing a denoised input image by denoising the input image, producing an edge map by performing edge detection on the denoised input image, and producing an object map by performing object detection on the denoised input image, the edge map, or both the denoised input image and the edge map.

5. The method of clause 4, wherein the at least one penalty map comprises first and second penalty maps, the first penalty map is determined based at least in part on the object map, and the second penalty map is determined based at least in part on the edge map.

6. The method of clause 4 or 5, wherein obtaining the at least one penalty map further comprises producing a thresholded edge map by performing a thresholding process on the edge map to remove any edges having a width below a threshold value, the at least one penalty map comprises first and second penalty maps, the first penalty map is determined based at least in part on the object map, and the second penalty map is determined based at least in part on both the edge map and the thresholded edge map.

7. The method of any one of clauses 1-6, wherein the plurality of image regions comprises at least one of a set of feature points or a set of pixels.

8. The method of any one of clauses 1-7, wherein the input image comprises a plurality of pixels, and the plurality of image regions comprises a subset of the plurality of pixels, the subset including fewer than all of the plurality of pixels.

9. A system comprising: one or more circuits to obtain a plurality of image regions from an input image, determine a set of penalty values for each of the plurality of image regions, and create an optical flow map for the input image and a reference image based at least in part on the set of penalty values determined for each of the plurality of image regions, the set of penalty values comprising, for each of the plurality of image regions, a penalty value for each of a plurality of directions intersecting the image region.

10. The system of clause 9, further comprising: upstream hardware connected to the one or more circuits, the upstream hardware providing the input image to the one or more circuits.

11. The system of clause 9 or 10, wherein the one or more circuits comprise: at least one processor; and memory storing instructions that are executable by the at least one processor, and when executed by the at least one processor cause the at least one processor to obtain the plurality of image regions, determine the set of penalty values for at least one image region of the plurality of image regions, and create the optical flow map.

12. The system of clause 11, wherein when the instructions are executed by the at least one processor, the instructions cause the at least one processor to generate the optical flow map by: determining a plurality of costs for unique combinations of the plurality of image regions, a plurality of disparities between the input and reference images, and the plurality of directions; obtaining a plurality of accumulated costs by summing those of the plurality of costs determined for each unique pair of one of the plurality of image regions and at least one of the plurality of disparities; selecting, for at least one portion of one or more of the plurality of image regions, a smallest one of the plurality of accumulated costs obtained for the image region, the smallest accumulated cost having been obtained for a selected one of the plurality of disparities; and placing, for each of the portion of the plurality of image regions, a value based at least in part on the selected disparity in the optical flow map in a location corresponding to the image region.

13. The system of clause 12, wherein the one or more circuits are further to determine a particular one of the plurality of costs for a particular one of the unique combinations comprising a particular one of the plurality of image regions, a particular one of the plurality of disparities, and a particular one of the plurality of directions by: adding a first one of the set of penalty values to a matching term when a first disparity metric value of the particular image region differs by at most a predetermined amount from a second disparity metric value of a neighboring one of the plurality of image regions along the particular direction; and adding a second one of the set of penalty values to the matching term when the first disparity metric value differs by more than the predetermined amount from the second disparity metric value along the particular direction, the first penalty value being less than the second penalty value.

14. The system of clause 13, wherein the one or more circuits are further to determine the particular cost equals the matching term when the first disparity metric value equals the second disparity metric value.

15. The system of any one of clauses 11-14, wherein when the instructions are executed by the at least one processor, the instructions cause the at least one processor to denoise the input image to create a denoised input image, perform edge detection on the denoised input image to produce an edge map, and perform object detection on the denoised input image, the edge map, or both the denoised input image and the edge map to producing an object map.

16. The system of clause 15, wherein the set of penalty values comprises a first set of penalty values and a different second set of penalty values, each of the first set of penalty values is determined based at least in part on the object map, and each of the second set of penalty values is determined based at least in part on the edge map.

17. The system of clause 15 or 16, wherein when the instructions are executed by the at least one processor, the instructions cause the at least one processor to threshold the edge map to produce a thresholded edge map in which edges thinner than a threshold value have been removed, the set of penalty values comprises a first set of penalty values and a different second set of penalty values, each of the first set of penalty values is determined based at least in part on the object map, and each of the second set of penalty values is determined based at least in part on both the edge map and the thresholded edge map.

18. The system of any one of clauses 11-17, wherein the at least one processor comprises one or more parallel processing units.

19. The system of any one of clauses 11-18, wherein when the instructions are executed by the at least one processor, the instructions cause the at least one processor to extract a set of feature points from the input image as the plurality of image regions.

20. The system of any one of clauses 11-19, wherein when the instructions are executed by the at least one processor, the instructions cause the at least one processor to extract a set of pixels from the input image as the plurality of image regions.

21. The system of clause 20, wherein the input image comprises a plurality of pixels, and the set of pixels comprises fewer than all of the plurality of pixels.

22. One or more non-transitory processor-readable media comprising instructions that are executable by at least one processor, and when executed by the at least one processor causing the at least one processor to: obtain a set of disparity values for each of a plurality of image regions in an input image, the set of disparity values comprising, for each of the plurality of image regions, a disparity value for each of a plurality of directions intersecting the image region; and use the set of disparity values to create an optical flow map for the input image and a different reference image.

23. The one or more non-transitory processor-readable media of clause 22, wherein when the instructions are executed by the at least one processor, the instructions cause the at least one processor to generate the optical flow map by: determining a plurality of costs for unique combinations of the plurality of image regions, a plurality of disparities between the input and reference images, and the plurality of directions; obtaining a plurality of accumulated costs by summing those of the plurality of costs determined for each unique pair of one of the plurality of image regions and one of the plurality of disparities; selecting, for each of at least a portion of the plurality of image regions, a smallest one of the plurality of accumulated costs obtained for the image region, the smallest accumulated cost having been obtained for a selected one of the plurality of disparities; and storing, for each of the portion of the plurality of image regions, a value based at least in part on the selected disparity in the optical flow map in a location corresponding to the image region.

24. The one or more non-transitory processor-readable media of clause 23, wherein when the instructions are executed by the at least one processor, the instructions cause the at least one processor to store the set of disparity values as first and second disparity maps, and to determine a particular one of the plurality of costs for a particular one of the unique combinations comprising a particular one of the plurality of image regions, a particular one of the plurality of disparities, and a particular one of the plurality of directions by: obtaining first and second values from the first and second disparity maps, respectively; adding the first value to a matching term when a first disparity metric value of the particular image region differs by at most a predetermined amount from a second disparity metric value of a neighboring one of the plurality of image regions along the particular direction; and adding the second value to the matching term when the first disparity metric value differs by more than the predetermined amount from the second disparity metric value along the particular direction, the first disparity value being less than the second disparity value.

25. The one or more non-transitory processor-readable media of clause 24, wherein the at least one processor is further to determine the particular cost equals the matching term when the first disparity metric value equals the second disparity metric value.

26. The one or more non-transitory processor-readable media of any one of clauses 22-25, wherein when the instructions are executed by the at least one processor, the instructions cause the at least one processor to store the set of disparity values as first and second disparity maps, and the at least one processor obtains the set of disparity values for each of a plurality of image regions by: denoising the input image to produce a denoised input image; performing edge detection on the denoised input image to produce an edge map; producing an object map by performing object detection on the denoised input image, the edge map, or both the denoised input image and the edge map; assigning values to the first disparity map based at least in part on the object map; and assigning values to the second disparity map based at least in part on the edge map.

27. The one or more non-transitory processor-readable media of any one of clauses 22-26, wherein when the instructions are executed by the at least one processor, the instructions cause the at least one processor to store the set of disparity values as first and second disparity maps, and the at least one processor obtains the set of disparity values for each of a plurality of image regions by: denoising the input image to produce a denoised input image; performing edge detection on the denoised input image to produce an edge map; performing object detection on the denoised input image, the edge map, or both the denoised input image and the edge map to produce an object map; thresholding the edge map to remove any edges that are not thicker than a threshold value to produce a thresholded edge map; assigning values to the first disparity map based at least in part on the object map, and assigning values to the second disparity map based at least in part on the edge map and the thresholded edge map.

28. The one or more non-transitory processor-readable media of any one of clauses 22-27, wherein when the instructions are executed by the at least one processor, the instructions cause the at least one processor to extract a set of feature points or a set of pixels from the input image as the plurality of image regions.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, referring back to FIG. 17, computer programs in form of machine-readable executable code or computer control logic algorithms are stored in main memory 1704 and/or secondary storage. Computer programs, if executed by one or more processors, enable system 1700 to perform various functions in accordance with at least one embodiment. In at least one embodiment, memory 1704, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 1702, parallel processing system 1712, an integrated circuit capable of at least a portion of capabilities of both CPU 1702, parallel processing system 1712, a chipset (e.g., a group of integrated circuits designed to work and sold as a unit for performing related functions, etc.), and/or any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 1700 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 1712 includes, without limitation, a plurality of parallel processing units ("PPUs") 1714 and associated memories 1716. In at least one embodiment, PPUs 1714 are connected to a host processor or other peripheral devices via an interconnect 1718 and a switch 1720 or multiplexer. In at least one embodiment, parallel processing system 1712 distributes computational tasks across PPUs 1714 which can be parallelizable—for example, as part of distribution of computational tasks across multiple graphics processing unit ("GPU") thread blocks. In at least one embodiment, memory is shared and accessible (e.g., for read and/or write access) across some or all of PPUs 1714, although such shared memory may incur performance penalties relative to use of local memory and registers resident to a PPU 1714. In at least one embodiment, operation of PPUs 1714 is synchronized through use of a command such as _syncthreads( ), wherein all threads in a block (e.g., executed across multiple PPUs 1714) to reach a certain point of execution of code before proceeding.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
    obtaining an input image and a reference image, the input image comprising a plurality of image regions;
    obtaining at least one penalty map comprising a set of penalty values for each of the plurality of image regions, the set of penalty values comprising, for each of the plurality of image regions, a penalty value for each of a plurality of directions intersecting the image region, wherein the at least one penalty map is obtained by at least:
        denoising the input image;
        producing an edge map by performing edge detection on the denoised input image, and
        producing an object map by performing object detection on at least one of the denoised input image or the edge map; and
    generating an optical flow map for the input and reference images based at least in part on the at least one penalty map.

2. The method of claim 1, wherein the at least one penalty map comprises first and second penalty maps,
    the optical flow map is generated using a Semi-Global Matching ("SGM") process comprising a first penalty value and a second penalty value to determine a cost for a particular one of the plurality of image regions, a particular disparity, and a particular one of the plurality of directions,
    the first penalty value is obtained using the first penalty map for the particular image region and the particular direction, and
    the second penalty value is obtained using the second penalty map for the particular image region and the particular direction.

3. The method of claim 2, wherein the optical flow map is generated by:
    determining a plurality of costs, at least one cost of the plurality of costs being determined for one of the plurality of image regions, one of a plurality of disparities, and one of the plurality of directions;
    obtaining a plurality of accumulated costs for each unique pair of one of the plurality of image regions and one of the plurality of disparities by summing those of the plurality of costs determined for the unique pair;
    selecting, for each of the plurality of image regions, a smallest one of the plurality of accumulated costs obtained for the image region, the smallest accumulated cost having been obtained for a selected one of the plurality of disparities; and
    placing, for each of the plurality of image regions, a value based at least in part on the selected disparity in the optical flow map in a location corresponding to the image region.

4. The method of claim 1, wherein the at least one penalty map comprises first and second penalty maps,
    the first penalty map is determined based at least in part on the object map, and
    the second penalty map is determined based at least in part on the edge map.

5. The method of claim 1, wherein obtaining the at least one penalty map further comprises producing a thresholded edge map by performing a thresholding process on the edge map to remove any edges having a width below a threshold value,
    the at least one penalty map comprises first and second penalty maps,
    the first penalty map is determined based at least in part on the object map, and
    the second penalty map is determined based at least in part on both the edge map and the thresholded edge map.

6. The method of claim 1, wherein the plurality of image regions comprises at least one of a set of feature points or a set of pixels.

7. The method of claim 1, wherein the input image comprises a plurality of pixels, and
    the plurality of image regions comprises a subset of the plurality of pixels, the subset including fewer than all of the plurality of pixels.

8. A system comprising:
    one or more circuits to obtain a plurality of image regions from an input image, determine a set of penalty values for each of the plurality of image regions, and create an optical flow map for the input image and a reference image based at least in part on the set of penalty values determined for each of the plurality of image regions, the set of penalty values comprising, for each of the plurality of image regions, a penalty value for each of a plurality of directions intersecting the image region, wherein the optical flow map is created by:
        denoising the input image;
        producing an edge map by performing edge detection on the denoised input image; and
        producing an object map by performing object detection on at least one of the denoised input image or the edge map.

9. The system of claim 8, further comprising:
    upstream hardware connected to the one or more circuits, the upstream hardware providing the input image to the one or more circuits.

10. The system of claim 8, wherein the one or more circuits comprise:
    at least one processor; and
    memory storing instructions that are executable by the at least one processor, and when executed by the at least one processor cause the at least one processor to obtain the plurality of image regions, determine the set of penalty values for at least one image region of the plurality of image regions, and create the optical flow map.

11. The system of claim 10, wherein when the instructions are executed by the at least one processor, the instructions cause the at least one processor to generate the optical flow map by:
   determining a plurality of costs for unique combinations of the plurality of image regions, a plurality of disparities between the input and reference images, and the plurality of directions;
   obtaining a plurality of accumulated costs by summing those of the plurality of costs determined for each unique pair of one of the plurality of image regions and at least one of the plurality of disparities;
   selecting, for at least one portion of one or more of the plurality of image regions, a smallest one of the plurality of accumulated costs obtained for the image region, the smallest accumulated cost having been obtained for a selected one of the plurality of disparities; and
   placing, for each of the portion of the plurality of image regions, a value based at least in part on the selected disparity in the optical flow map in a location corresponding to the image region.

12. The system of claim 11, wherein the one or more circuits are further to determine a particular one of the plurality of costs for a particular one of the unique combinations comprising a particular one of the plurality of image regions, a particular one of the plurality of disparities, and a particular one of the plurality of directions by:
   adding a first one of the set of penalty values to a matching term when a first disparity metric value of the particular image region differs by at most a predetermined amount from a second disparity metric value of a neighboring one of the plurality of image regions along the particular direction; and
   adding a second one of the set of penalty values to the matching term when the first disparity metric value differs by more than the predetermined amount from the second disparity metric value along the particular direction, the first penalty value being less than the second penalty value.

13. The system of claim 12, wherein the one or more circuits are further to determine the particular cost equals the matching term when the first disparity metric value equals the second disparity metric value.

14. The system of claim 8, wherein the set of penalty values comprises a first set of penalty values and a different second set of penalty values,
   each of the first set of penalty values is determined based at least in part on the object map, and
   each of the second set of penalty values is determined based at least in part on the edge map.

15. The system of claim 10, wherein when the instructions are executed by the at least one processor, the instructions cause the at least one processor to threshold the edge map to produce a thresholded edge map in which edges thinner than a threshold value have been removed,
   the set of penalty values comprises a first set of penalty values and a different second set of penalty values,
   each of the first set of penalty values is determined based at least in part on the object map, and
   each of the second set of penalty values is determined based at least in part on both the edge map and the thresholded edge map.

16. The system of claim 10, wherein the at least one processor comprises one or more parallel processing units.

17. The system of claim 10, wherein when the instructions are executed by the at least one processor, the instructions cause the at least one processor to extract a set of feature points from the input image as the plurality of image regions.

18. The system of claim 10, wherein when the instructions are executed by the at least one processor, the instructions cause the at least one processor to extract a set of pixels from the input image as the plurality of image regions.

19. The system of claim 18, wherein the input image comprises a plurality of pixels, and the set of pixels comprises fewer than all of the plurality of pixels.

20. One or more non-transitory processor-readable media comprising instructions that are executable by at least one processor, and when executed by the at least one processor causing the at least one processor to:
   obtain a set of disparity values for each of a plurality of image regions in an input image, the set of disparity values comprising, for each of the plurality of image regions, a disparity value for each of a plurality of directions intersecting the image region; and
   use the set of disparity values to create an optical flow map for the input image and a different reference image, wherein the optical flow map is created by at least:
      denoising the input image;
      performing edge detection on the denoised input image to produce an edge map; and
      producing an object map by performing object detection on at least one of the denoised input image or the edge map.

21. The one or more non-transitory processor-readable media of claim 20, wherein when the instructions are executed by the at least one processor, the instructions cause the at least one processor to generate the optical flow map by:
   determining a plurality of costs for unique combinations of the plurality of image regions, a plurality of disparities between the input and reference images, and the plurality of directions;
   obtaining a plurality of accumulated costs by summing those of the plurality of costs determined for each unique pair of one of the plurality of image regions and one of the plurality of disparities;
   selecting, for each of at least a portion of the plurality of image regions, a smallest one of the plurality of accumulated costs obtained for the image region, the smallest accumulated cost having been obtained for a selected one of the plurality of disparities; and
   storing, for each of the portion of the plurality of image regions, a value based at least in part on the selected disparity in the optical flow map in a location corresponding to the image region.

22. The one or more non-transitory processor-readable media of claim 21, wherein when the instructions are executed by the at least one processor, the instructions cause the at least one processor to store the set of disparity values as first and second disparity maps, and to determine a particular one of the plurality of costs for a particular one of the unique combinations comprising a particular one of the plurality of image regions, a particular one of the plurality of disparities, and a particular one of the plurality of directions by:
   obtaining first and second values from the first and second disparity maps, respectively;
   adding the first value to a matching term when a first disparity metric value of the particular image region differs by at most a predetermined amount from a second disparity metric value of a neighboring one of the plurality of image regions along the particular direction; and adding the second value to the matching term when the first disparity metric value differs by more than the predetermined amount from the second disparity metric value along the particular direction, the first value being less than the second value.

23. The one or more non-transitory processor-readable media of claim 22, wherein the at least one processor is further to determine the particular cost equals the matching term when the first disparity metric value equals the second disparity metric value.

24. The one or more non-transitory processor-readable media of claim 20, wherein when the instructions are executed by the at least one processor, the instructions cause the at least one processor to extract a set of feature points or a set of pixels from the input image as the plurality of image regions.

25. The one or more non-transitory processor-readable media of claim 22, wherein the at least one processor obtains the set of disparity values for each of a plurality of image regions based, at least in part, on:

assigning values to the first disparity map based at least in part on the object map; and assigning values to the second disparity map based at least in part on the edge map.

26. The one or more non-transitory processor-readable media of claim 22, wherein the at least one processor obtains the set of disparity values for each of a plurality of image regions based, at least in part, on:

thresholding the edge map to remove any edges that are not thicker than a threshold value to produce a thresholded edge map;

assigning values to the first disparity map based at least in part on the object map; and assigning values to the second disparity map based at least in part on the edge map and the thresholded edge map.

* * * * *